United States Patent [19]

Hodgens et al.

[11] Patent Number: 4,887,301

[45] Date of Patent: Dec. 12, 1989

[54] PROPORTIONAL SPACED TEXT RECOGNITION APPARATUS AND METHOD

[75] Inventors: Thomas A. Hodgens, San Jose; Amy L. Lowrie; James R. Murphy, both of Fremont, all of Calif.

[73] Assignee: Dest Corporation, Milpitas, Calif.

[21] Appl. No.: 742,166

[22] Filed: Jun. 5, 1985

[51] Int. Cl.[4] .................................... G06K 9/34

[52] U.S. Cl. .................................... 382/9; 382/48

[58] Field of Search .................................... 382/9, 48

[56] References Cited

U.S. PATENT DOCUMENTS

| | | | |
|---|---|---|---|
| 3,219,974 | 11/1965 | Rabinow | 382/9 |
| 3,221,302 | 11/1965 | Silverberg | 382/48 |
| 4,083,034 | 4/1978 | Hicks | 382/48 |
| 4,206,442 | 6/1980 | Miyazaki | 382/9 |
| 4,377,803 | 3/1983 | Lotspiech | 382/9 |
| 4,512,032 | 4/1985 | Namba | 382/9 |
| 4,562,594 | 12/1985 | Bednar | 382/48 |
| 4,594,732 | 6/1986 | Tsuji | 382/9 |
| 4,611,346 | 9/1986 | Bednar | 382/9 |
| 4,635,290 | 1/1987 | Tsuji | 382/48 |
| 4,654,873 | 3/1987 | Fujisawa et al. | 382/9 |

*Primary Examiner*—Leo H. Boudreau
*Assistant Examiner*—Joseph Mancuso
*Attorney, Agent, or Firm*—Flehr, Hohbach, Test, Albritton & Herbert

[57] ABSTRACT

Proportional spaced text recognition apparatus and method is disclosed. The invention is provided for optical character recognition (OCR) systems and provides recognition of both proportional spacing and fixed pitch type formats. The invention also provides recognition of accented characters, which are a common occurrence in Western European type texts.

10 Claims, 16 Drawing Sheets

HORG — HORIZONTAL PIXEL ORIGIN OF LEFTMOST CHARACTER IN PIR

FORP — FORE POINTER TO NEXT PIR IN CHAIN

— PIR STATUS AND NUMBER OF CHARACTERS

HSIZ — HORIZONTAL SIZE IN PIXELS (WIDTH), MEASURED FROM LEFT SIDE OF FIRST CHARACTER TO RIGHT SIDE OF LAST CHARACTER

VBAS — AVERAGE ASCII-CORRECTED BASELINE OF CHARACTERS IN PIR

P.S. TEXT (INPUT)

6 BLANKS

A. m m m m m WIDE CHARACTERS

I I I I I I I I I I NARROW CHARACTERS

FIXED PITCH WITHOUT ADJUSTMENT (OUTPUT)

B. mmmmm W I D E C H A R A C T E R S

I I I I I I I I I I N A R R O W C H A R A C T E R S

FIXED PITCH WITH ADJUSTMENT (OUTPUT)

C. mmmmm W I D E C H A R A C T E R S

PROPORTIONAL SPACED TEXT RECOGNITION APPARATUS AND METHOD

CROSS REFERENCES TO RELATED APPLICATIONS

1. "Method and Apparatus for Character Recognition Employing a Dead-Band Correlator," Ser. No. 470,241, filed Feb. 28, 1983 abandoned in favor of continuation application Ser. No. 902,071, filed Aug. 27, 1986, now Pat. No. 4,700,401, issued Oct. 13, 1987.

2. "Optical Character Isolation System, Apparatus and Method," Ser. No. 535,410, filed Sept. 23, 1983.

BACKGROUND OF THE INVENTION

The present invention relates to an optical character recognition system and method. More particularly, the present invention relates to an OCR-type system which provides recognition of video character data representing text on a document having proportional spacing and/or fixed pitch formats, as well as recognition of text having accented characters.

OCR-type systems have long been known in the art in conjunction with sophisticated word processing systems implemented in the business environment, as well as a personal user environment, Many such systems operate with a proportional spacing format, which provides for proportional spacing for each line of text.

This proportional spacing is a desirable feature in many such word processing systems such as in preparation of legal briefs and memoranda, marketing projections and the like.

One problem with prior art OCR-type systems is that, in general, there is no capability of distinguishing between proportional spacing formats and fixed pitch formats, such as may be used with older type equipment. However, there are many applications where it would be desirable to have a recognition capability between proportional spaced formats and fixed pitch formats. Prior art systems have, in general, not been able to provide a recognition technique so that either type of format can be utilized in a word processing system.

In addition, OCR scanning systems have not in general been able to provide for accurate recognition of accented characters, such as appear in many Western European languages. As the word processing capability is expanded to include Western European text, a serious limitation is the deficiency of prior art systems of not being able to recognize accented characters.

SUMMARY OF THE INVENTION

It is an object of the present invention to provide a proportional spaced text recognition apparatus and method.

In one embodiment, the present invention is utilized in an optical character recognition system. The invention provides recognition of video data representative of proportional spacing or fixed pitch formats, and can convert between the different types of formats.

The present invention also provides for recognition and processing of accented characters which are common in Western European type texts.

Other objects and features of the present invention will become apparent from the following detailed description when taken in conjunction with the accompanying drawings.

BRIEF DESCRIPTION OF THE DRAWINGS

FIG. 19 depicts a representation of a proportional space input and an adjusted fixed pitch output.

DETAILED DESCRIPTION OF THE DRAWINGS

The present invention relates to optical character recognition systems. Particularly desirable OCR isolation and recognition techniques are described in the two cross-referenced applications identified above, the details of which are hereby incorporated by reference.

In general, an optical character recognition (OCR) system can be subdivided into three major subsystems. These are:

1. Character Segmentation—handles page detection, video acquisition, pre-recognition noise filtering, the identification of character fields suitable for recognition and the creation of character image buffers for use by character recognition.

2. Character Recognition—attempts to identify an unknown character image provided by character segmentation. Recognition technology may include some combination of correlation against known masks, feature analysis, decision trees or other recognition techniques.

3. Page Composition—attempts to reconstruct the page into ASCII coded lines of text (American Standard Code for Information Interchange—ASCII—is a standard code that assigns specific bit patterns to each sign, symbol, numeral, letter and operation in a specific set). Included in this subsystem may be contextual and positional analysis, post-recognition noise filtering, text spacing and skew adjustment.

The relative complexity of these subsystems will vary depending on the nature of the text read and the accuracy desired. Early OCR systems for typed pages used OCR specific fonts, such as OCR-A, which allowed little or no random noise such as dirt, paper imperfections, copier marks, etc. For these systems, simple character segmentation, recognition and page composition techniques yielded acceptable results. Later OCR systems used improved character recognition schemes to allow the use of standard office fonts, such as Prestige Elite, but were still intolerant to problems affecting character segmentation, such as noise, skew and touching characters. These systems were quite suitable in an environment of carefully prepared input documents, but were unacceptable when the input documents took the form of standard archived or correspondence pages. To account for these problems, a system using character segmentation by iterative page decomposition and page composition by character baseline analysis was developed. These two additional techniques served to eliminate such problems as skew and noise. The following describes the methodology used to implement character segmentation, character recognition and page composition in one of these later systems.

Figure 1:
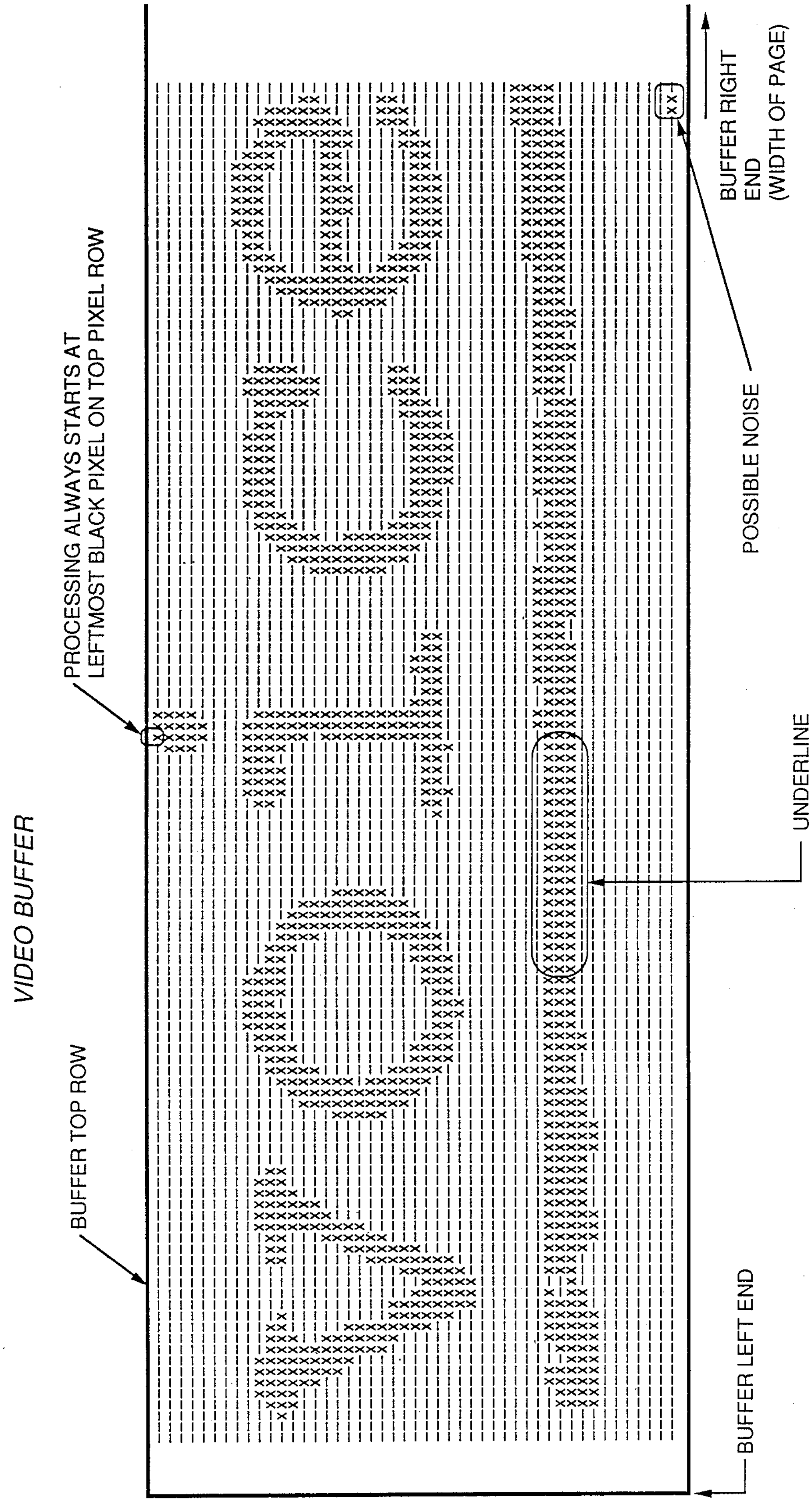
FIG. 1 depicts a representation of a video buffer.

Briefly, character segmentation by iterative page decomposition works as follows:

Input: Character segmentation assumes as input a video buffer acting as a window onto an input document. The representation of a video buffer illustrated in FIG. 1 contains a digitized image of a portion of the document, which contains recognizable typed text as well as unrecognizable features such as noise, forms features, letterheads, logos, underlines and signatures. The digitized image in the video buffer must be tall enough to hold the tallest recognizable character and as wide as the document currently being processed. The top pixel row of the video buffer may be discarded and a new pixel row added to the bottom of the buffer, in effect moving the buffer window down the document being processed. Any pixel in the video buffer may be examined or altered by the software or hardware implementing this technique.

Output: The primary output of character segmentation is a series of recognition input buffers, each containing a digitized image of a localized feature assumed to be a single character, such as the letter "S" illustrated in FIG. 2, as well as the horizontal and vertical pixel location of the feature. Secondary outputs of character segmentation include the location and length of any underlines detected, as well as the location and size of features too tall and too wide to be considered recognizable characters.

Method: The video buffer is moved down the document until the top row of the buffer contains some black. If the feature containing the leftmost black pixel is small isolated noise, it is erased from the video buffer, and processing continues with the search for black. If the feature is large enough, it is assumed to be part of a character which is itself a part of a word of text. The leftmost edge of the word is located by searching to the left until a tall, wide white region is found. Individual characters within the word are then segmented out, left to right, copied into recognition buffers and erased from the video buffer. During the segmentation process, overlapping characters, touching characters, underlines and oversized features are detected and processed. After each noise feature, word or oversized feature is processed, it is erased from the video buffer and the buffer is again moved down until the top row contains black. The entire page is thus decomposed into a series of noise, oversized and character features without any requirement to locate word or line baselines or skew angles. Features are erased from the video buffer after they are processed to insure that each feature is processed once and only once. Isolating text by word instead of by line or character provides these basic advantages:

1. Segmentation problems caused by text skew can normally be ignored within a word.

2. A smaller video buffer can be used, since a skewed line requires a much taller buffer than an unskewed line, but a skewed word is not significantly taller than an unskewed word.

3. Individual words do not normally touch other words, whereas individual characters often touch other characters within a word, therefore segmentation by word is less prone to error than segmentation by character.

Figure 2:
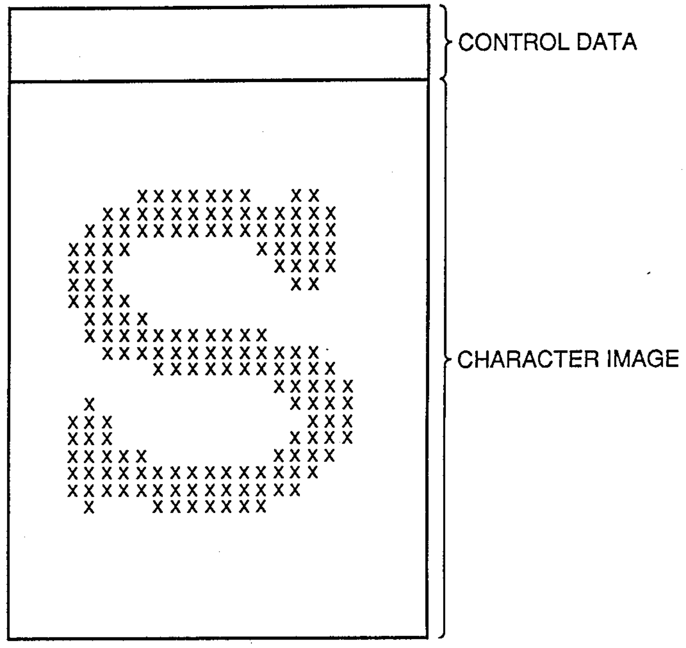
FIG. 2 depicts a representation of a recognition buffer storing the letter "S".

The character recognition technique works as follows:

Input: The primary input of the character recognition technique is a series of recognition input buffers, each containing a digitized image of a localized feature assumed by the character segmentation software to be a single character, as well as the horizontal and vertical pixel location of the feature, as illustrated in FIG. 2.

Output: The primary output of the character recognition subsystem is the input recognition buffers with an associated best fit and next best fit ASCII codes for the character in question, along with correlation scores the best fit ASCII.

Method: The character recognition subsystem may be subdivided into two major functions: iterative processing, in which the best match for an unknown character is determined, and typestyle recognition, whereby the proper typestyle for a region of text is determined, thereby increasing throughput and accuracy. These two functions are described in detail below.

During iterative processing, the unknown character is passed through a dead-band correlator and compared with a series of masks for known characters. The results of this correlation are then evaluated using tight threshold and separation criteria. If these results are acceptable with tight requirements, then the character is considered recognized with high confidence. If the character fails to meet these tight threshold and separation requirements, then the character undergoes a series of retries to attempt to make the character tightly acceptable. The first retry attempts to insure that the character is properly centered in the recognition buffer. The second level of retry processing attempts to filter small isolated noise from the character field. The third level of retry processing attempts to remove larger isolated noise. The fourth level of retry processing attempts to filter out any portions of an underline which may have been missed by the character segmentation subsystem. The fifth level of retry is a series of stroke width normalizations. These normalizers are "burn," which attempts to reduce the stroke width of very dark characters, and "regrow," which attempts to widen the stroke width of very light characters. If any of these retries causes the unknown character to become tightly acceptable based on threshold and separation, then recognition for the character is complete. If not, then following all retries, a loosely acceptable character can now be accepted with high confidence. Any other characters will be rejected.

Typestyle recognition is initiated at the beginning of each page. Each character is run through each typestyle in the system. Following recognition of each character, the results from each typestyle are evaluated. A character that is rejected in all typestyles is simply rejected. A character that is accepted in at least one font is passed on for further processing. The best typestyle is determined by comparing the level of acceptances for each typestyle. If there is more than one typestyle which recognized the character at the best level of threashold acceptance, the ASCII codes from those typestyles are compared. If all of the typestyles do not agree on the ASCII code designation, then the character is saved in a holding buffer to await typestyle determination. If the ASCII codes are all equal, the character is accepted, and the low scores of all the typestyles are added to a score counter. Any typestyle that rejects the character is eliminated. Also, any typestyle whose score counter goes over a threshold value is also eliminated. The correct typestyle for the page is recognized when only one typestyle is still enabled.

Briefly, page composition by character baseline analysis works as follows:

Input: The technique assumes as primary input a series of character recognition buffers, each containing a best fit and next best fit ASCII value and correlation score (less likely characters and scores may also be used) as well as the X-Y page pixel origin of the character. Secondary inputs include records describing underlines and forms/logo features, as for example, seen in FIG. 2.

Output: The primary output of the technique is an ASCII data string which may be displayed on a teletype compatible display or printer to recreate an accurate (to within a character) image of the original input document. Secondary outputs include escape sequences embedded in the data stream, describing underline and forms/logo feature origin and size, exact line X-Y origin, exact page length and rejected and post-processed characters.

Method: The method is broken down into two steps: word reconstruction and line reconstruction.

In word reconstruction, characters arriving in recognition buffers from the character recognition process are built back into words and stored in page image records (PIR's). This is done primarily to allow more efficient usage of system memory: since every PIR must contain several bytes of position and linkage information, it is desirable to store as much ASCII information as possible in each PIR. Since characters are not normally isolated from left to right within a word and processed by recognition in the same order, word reconstruction is merely a process of testing if each successive input character is to be appended to the end of the current input PIR. When a word ends or a PIR fills, the old PIR is linked into the active PIR chain in ascending horizontal word origin order, and a new PIR is allocated from a free PIR chain, as illustrated in FIG. 3.

Figure 3:
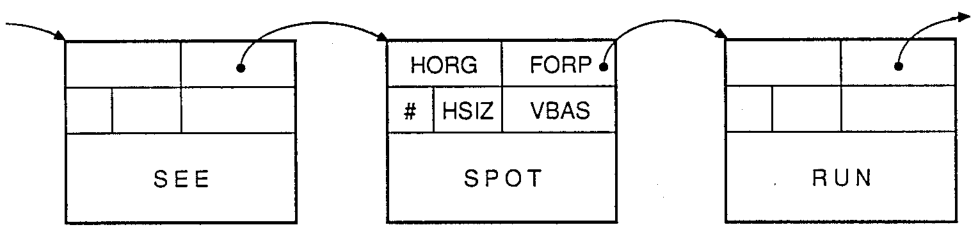
FIG. 3 depicts an illustration of page image records (PIR's).

In FIG. 3, line reconstruction is invoked when two or more lines of text are contained in the active PIR chain, or when the free PIR chain is empty. Line reconstruction makes two passes through the active PIR chain. The first pass determines the leftmost PIR of the topmost line in the active PIR chain, and the second pass starts from that leftmost PIR and outputs and restores to the free chain all PIR's on the topmost line.

As each ASCII character is added to a PIR (word), a baseline adjustment appropriate to that ASCII character is applied to the character's base point to yield a character baseline. Character baselines within a word are averaged to form a word baseline. This ASCII calculated baseline is far more accurate than a baseline derived from examination of raw digitized video, since it is resistant to errors caused by random noise and extreme cases (such as "soggy gypsum," which may cause a false baseline due to the occurrence of the many characters below the baseline). This accurate word baseline allows for the implementation of accurate positional post processing of characters such as "P" and "p", as well as accurate detection of subscripts and superscripts.

A series of problems are encountered when attempting to perform OCR on text containing accented characters, as are typically found in Western European languages, and text created on office equipment utilizing proportional space fonts. The major problems are outlined below and a series of techniques for the solution of these problems follows.

Figure 4:
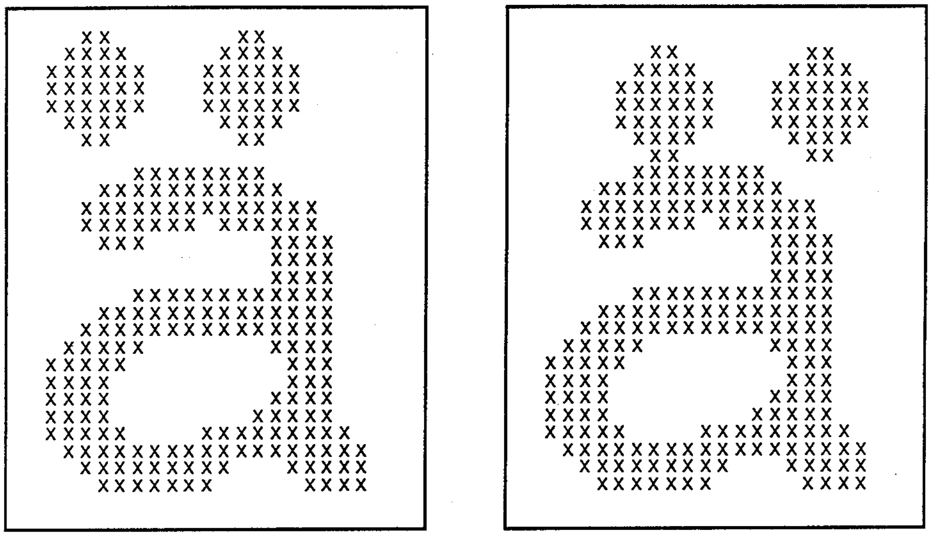
FIG. 4 depicts a representation of two accented characters, where the placement of the accent above the character varies.

Multi-strike Accented Characters: On many print sources, accented characters are formed by more than one stroke. As seen in FIG. 4, the base character is first typed, the carriage is backed up, and the accent is typed above the character. Because of variations in the way printers and typewriters handle these overstrikes, the accented characters are not easily recognized by template matching alone because of differences in the placement of the accent above the character. Another method for recognition of these characters is needed so that accurate results may be obtained.

Figure 13:
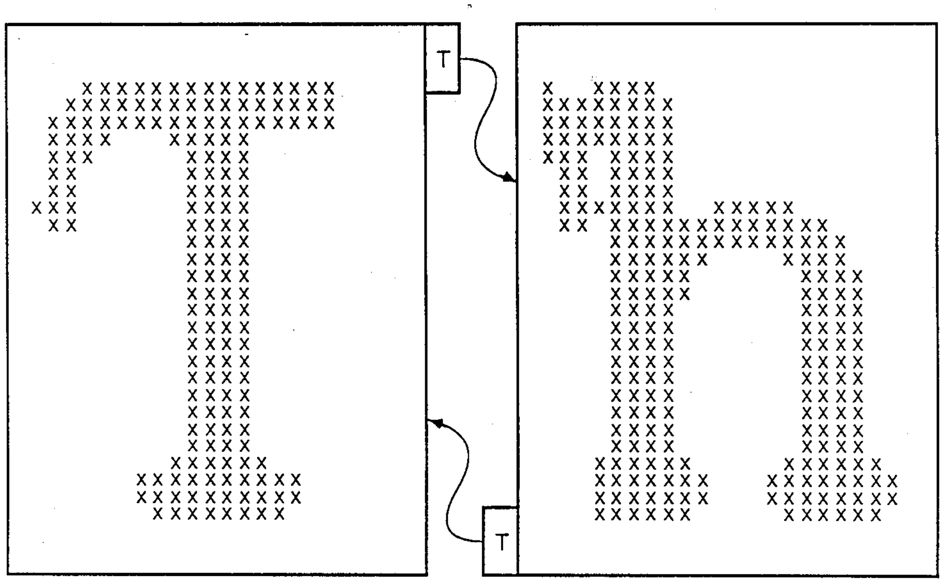
FIG. 13 depicts a representation of the segmented characters of FIG. 12.
Figure 17:
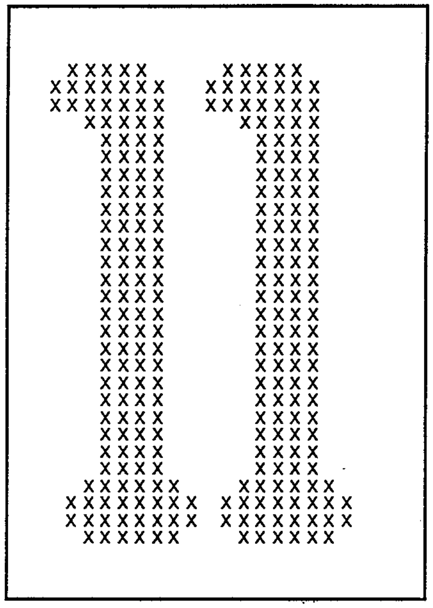
FIG. 17 depicts a representation of multiple characters which can be stored in one character buffer.

Proportionally Spaced Text: There are a number of problems which arise when current OCR technology is used to attempt to process text which is typed proportionally. First, because characters are packed closely together, it is possible for two narrow characters, such as "11", illustrated in FIG. 17, to be segmented as one character, which in current systems may mistakenly be recognized as a "U" or an "H" instead of a rejected character. Second, in proportionally spaced text a much larger proportion of characters touch than is typically found in fixed pitch text, so a much higher reject rate is encountered for this reason, as seen in FIG. 13. Lastly, because the text is being output to a device which does not have proportional space capability, the integrity of columns and underlines is lost with the change of spacing, as seen in FIG. 19.

Accented characters represent a special case of problems for character segmentation and recognition. Character segmentation is affected since many accented characters are too tall to fit into one recognition buffer. Truncation of the character so that it fits is not a valid solution, since too much of the data in the accent mark would be lost. Therefore, a technique has been developed whereby anything taller than the recognition buffer is saved in two recognition buffers, a base character and a vertical remnant, thus conserving all data in the character field for recognition. When recognition encounters an accented character, signalled by recognition against one of the "cloud" masks which are generic accented character masks, the base character is recombined with the vertical remnant. The character is then vertically segmented into an accent mark and a base character, which are recognized separately, so as to eliminate any problems with placement of the accent mark. Following recognition of the accent mark and the base character, page composition will attempt to recombine the two ASCII codes into one code for the accented character. If an invalid accent and base character is encountered, then the accent is thrown away, thus eliminating noise from some characters, for example, any accent above an "s" would be illegal, thereby filtering out the noise above the character.

Figure 5:
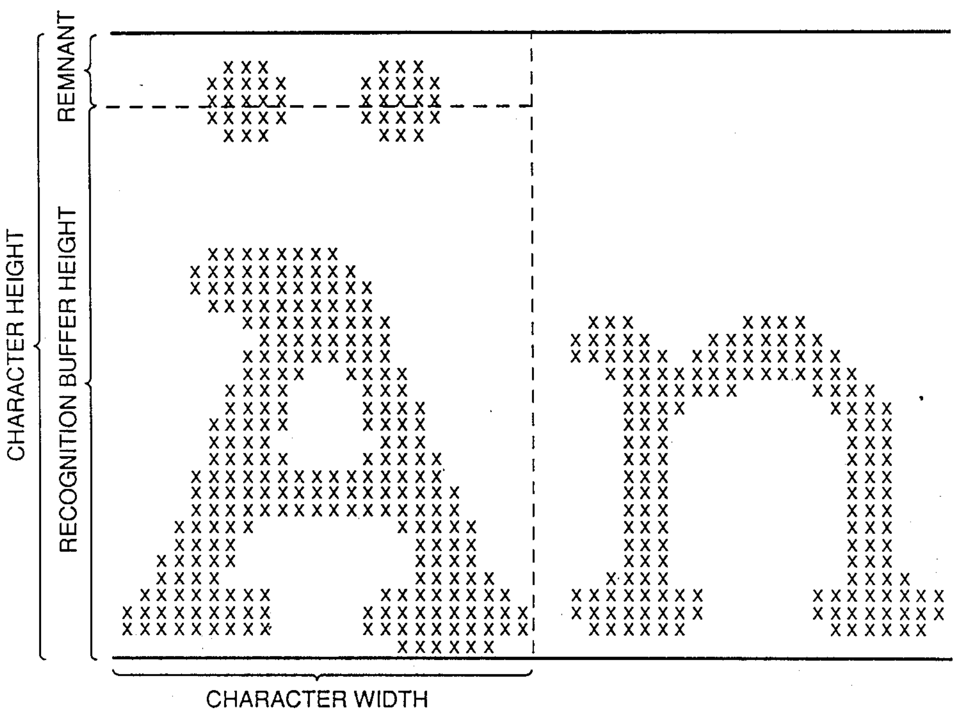
FIG. 5 depicts a representation of an oversized accented character.
Figure 6:
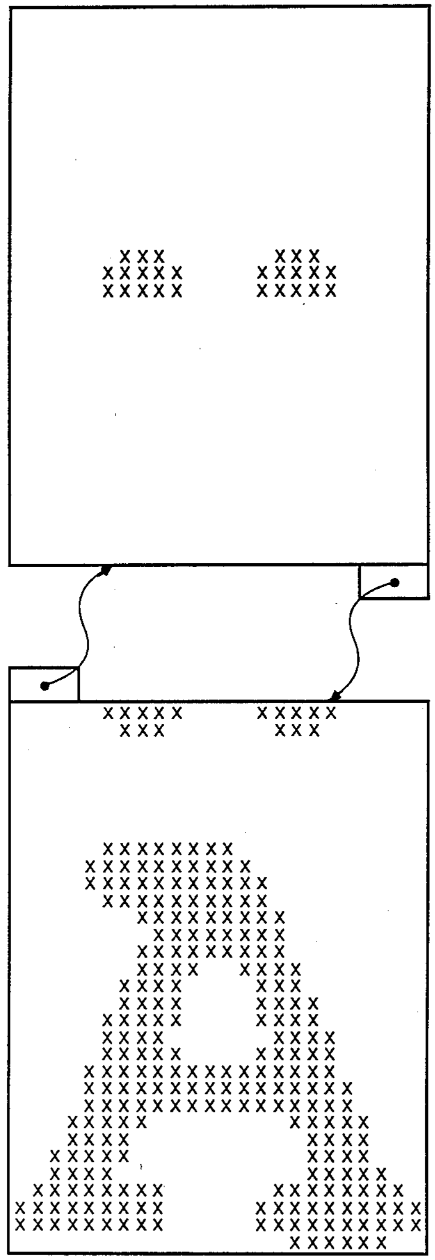
FIG. 6 depicts a representation of a base character and remnant buffer, respectively.

The processing necessary for character segmentation of accented characters is as follows. At the point where a new localized feature which is assumed to be a character is to be moved into a recognition input buffer, the character height is checked against the height of the recognition buffer. If the character is too tall, as seen in FIG. 5, then vertical remnant processing is initiated. The base character is set up to be the height of a recognition buffer and moved into one. Anything left over is moved into a new recognition buffer and both buffers are linked vertically, as seen in FIG. 6.

Recognition processing of accented characters takes as input a recognition buffer which has already been run through the correlation process. Following the correlation process previously described, the following steps are taken to attempt to recognize an accented character.

Step 1. Does character recognize as a "cloud" mask?

Figure 8:
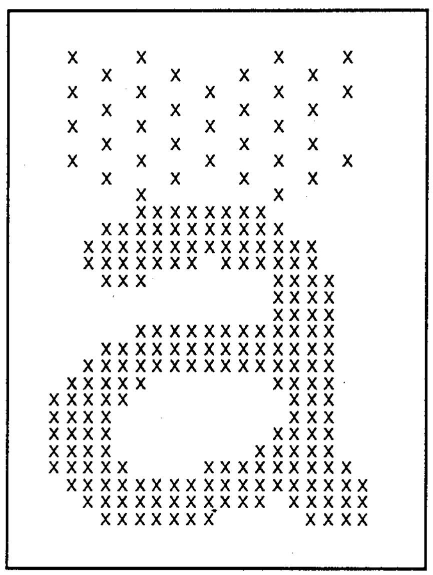
FIG. 8 depicts a representation of a cloud mask for an accented character.

If the character in question recognizes as a "cloud" mask (see FIG. 8), then this is the signal that the character is an accented character. A cloud mask is a composite of all possible accent marks for the current character. The major purpose is to offset the base character downwards, and have enough pixels above the base character so that the accent mark does not force too high a misscore. In any multilingual font, there will be cloud masks for the following base characters: a, e, i, n, o, u, A E, I, N, O, U.

Steps 2, 3, and 4. Is the character an oversized character? Recreate oversized character in recombination buffer. Move single character into recombination buffer.

These steps create an exact copy of what the character in question looked like in the video buffer. This copy is created in a special buffer known as the recombination buffer which is tall enough to hold the maximum height character.

Step 5. Initial separation of accent and base character.

Figure 9A:
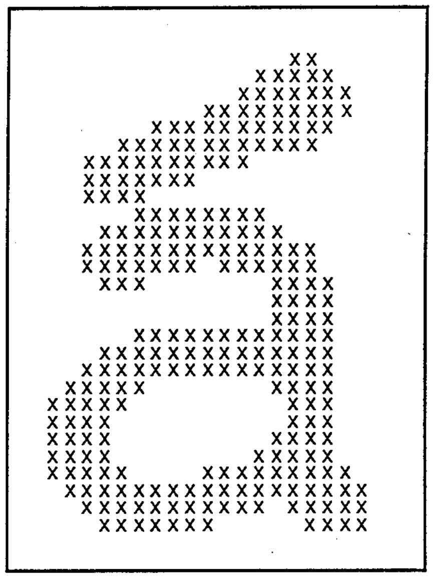
FIGS. 9A and B depict the segmentation of an accented character into a base character and an accent portion.
Figure 9B:
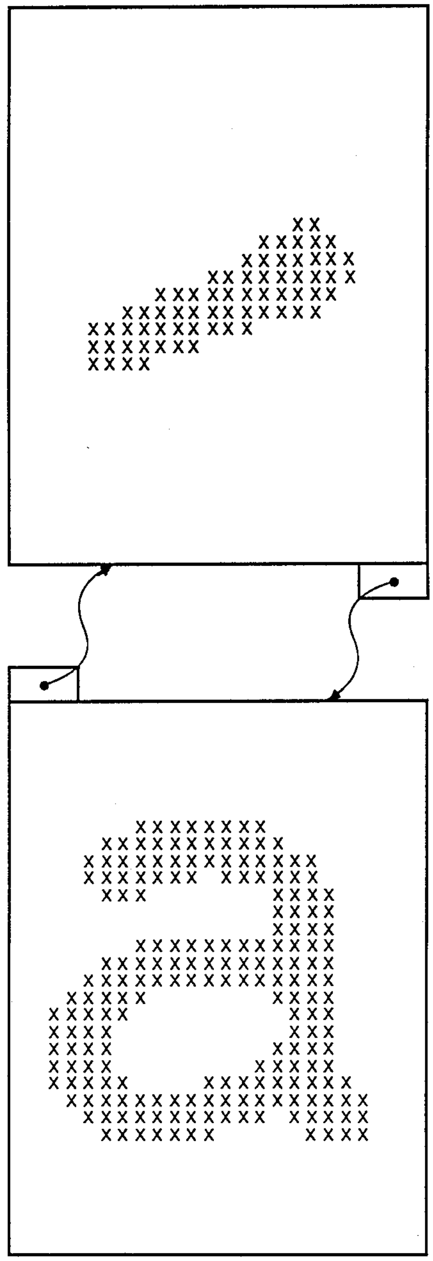

This step looks at the image of the character and determines the most likely place to separate the accent from the base character in the recombination buffer. The initial separation point is determined by white space within the character or a position with small density in the horizontal direction if the accent is touching the base character. The accent and the base character are then moved into two separate recognition buffers, as seen in FIG. 9.

Step 6. Run accent and base character through correlation.

The accent and base character recognition buffers created in either Step 5 or 8 is run against the current font to search for the best match for each. The fonts are arranged such that the accent will only be run against accents, thus eliminating the possibility of an accent being mistakenly recognized as a punctuation symbol, such as a ",".

Step 7. Did the base character recognize the tight threshold?

This step tests to see if the base character is recognized with a high level of confidence.

Step 8. Try next separation point.

If the base character did not recognize then find the next possible position to separate the accent and the base character in the recombination buffer and resegment the accent and the base character and move them into their associated recognition buffers.

Figure 10:
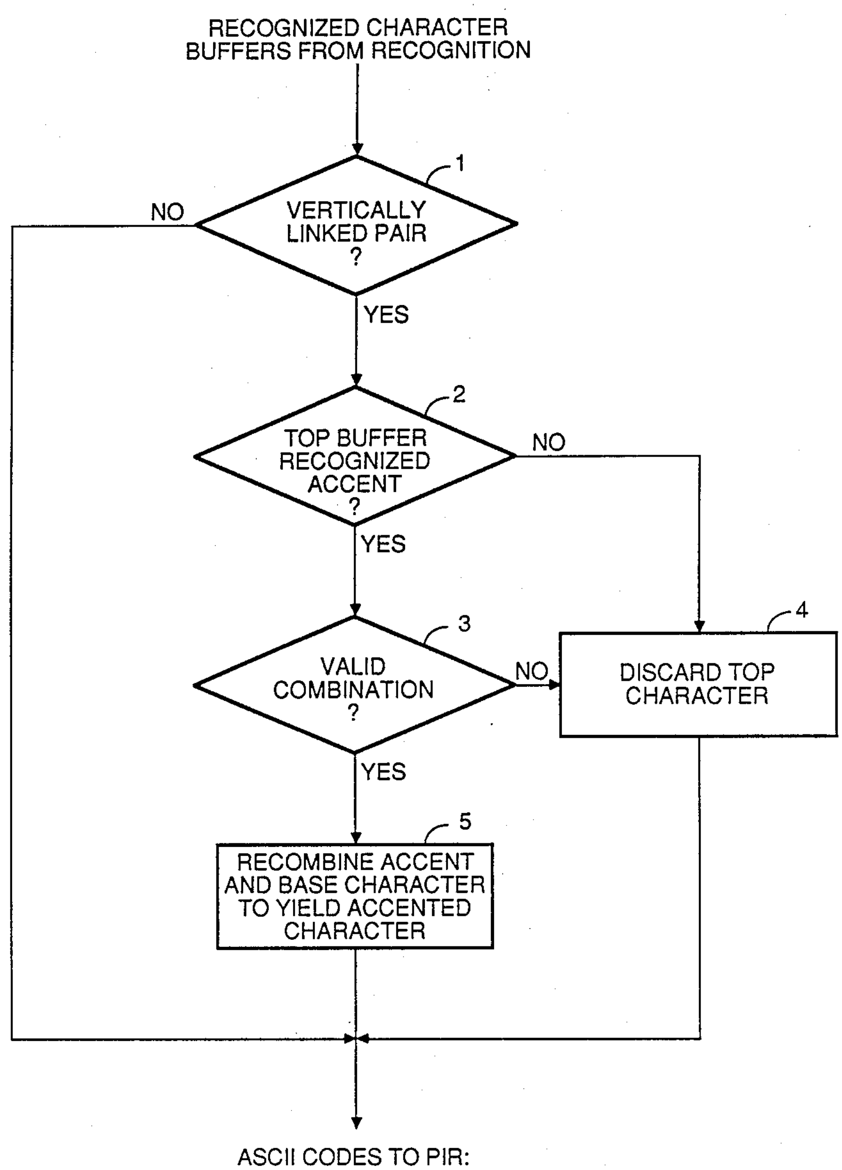
FIG. 10 depicts a flow chart illustrating the process of recombining accented characters.

Page composition processing of accented characters involves the recombination of the vertically linked pair of character buffers created by recognition (ASCII codes for the accent mark and the base character) into one accented character ASCII code. The steps taken to perform this are as follows (see FIG. 10):

Step 1. Current recognition buffer vertically linked with another or stand-alone accent positionally above a base character?

Steps 2, 3 and 4. Did top recognition buffer recognize as an accent mark?

Is the combination of accent and base character valid?Discard top character.

These steps are used to determine if the vertically linked pair of recognition buffers form a valid accented character. The first test is a check for a well recognized accent mark in the top character buffer. If this test passes, the pair is then tested to see if together they form an accented character (an umlaut above an "a" would be valid, whereas a grave above an "s" would be invalid). If either of these tests fail, then the accent is thrown away as noise.

Step 5. Recombine accent and base character to yield accented character.

This step changes the ASCII code of the base character to be the resultant accented character. Following this recombination, the top buffer is discarded.

For the recognition and page composition subsystems to work most effectively, they must have some indication of the pitch of the text being processed. That is, whether the text is typed in fixed pitch or proportional space (P.S.). The following describes how the character segmentation subsystem computes this pitch information.

In order to determine the pitch of a text region, the pitch of each word is determined using several sources of information: (1) the variation in the spacing between the centers of the characters of the word, (2) the difference in the mean of the character spacing between the word and its neighbors, and (3) the differences in the pitch determined for the word and that of its two neighboring words. Using these three sources of information, the pitch of the text can be determined with an estimated confidence.

Two scores are established for each word, a fixed pitch score and a P.S. score, the values of which depend on the first two information sources mentioned above. The final scores for a word are tallied and the pitch with the larger score value is selected as the correct pitch. Next, the confidence measure of this pitch is determined using the third information source above. The confidence measure can be one of three levels; no confidence, some confidence, and high confidence.

Figure 11:
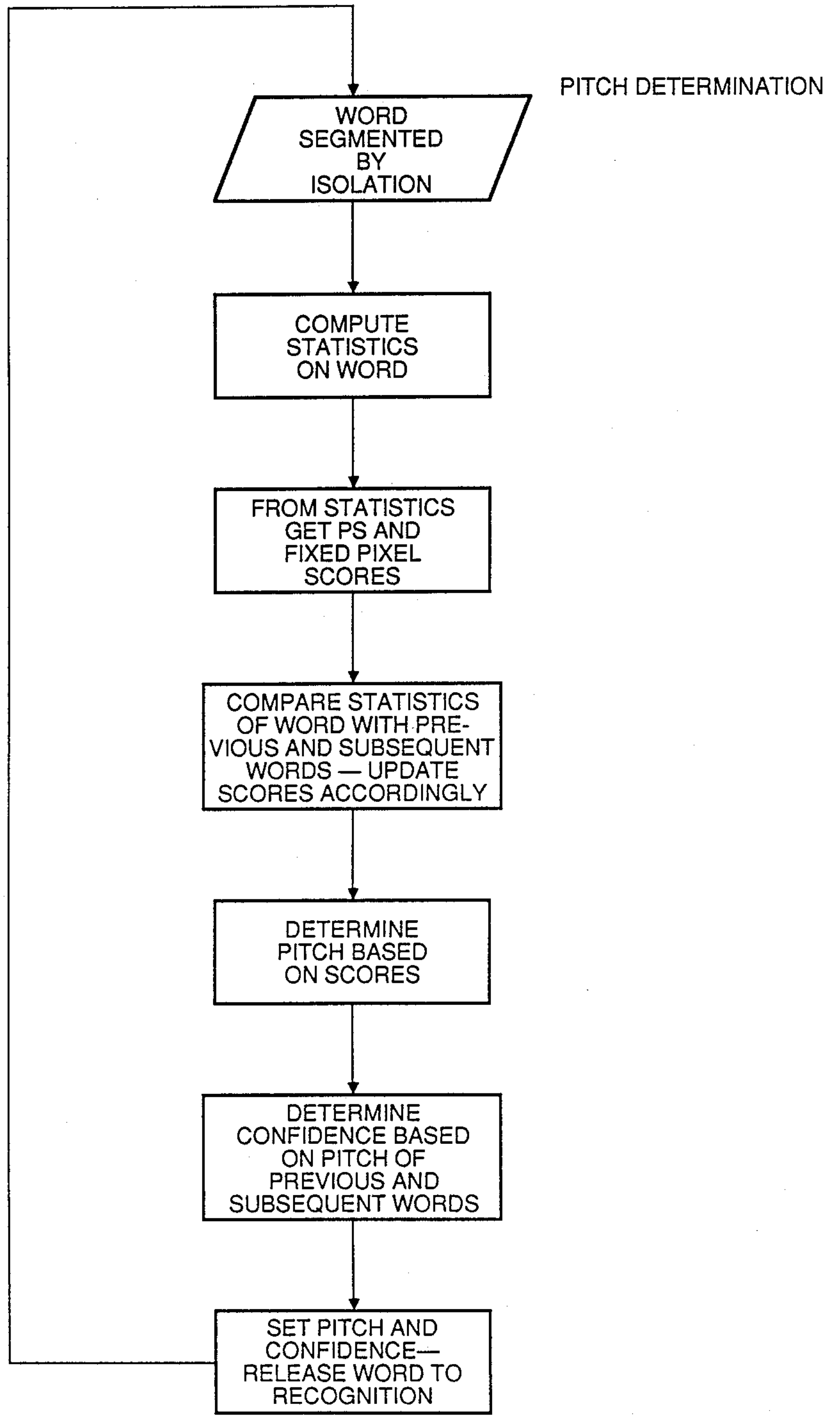
FIG. 11 depicts a flow chart illustrating the process of pitch determination.

Procedure (see FIG. 11).

Each time a word has been completed by character segmentation, i.e., has been broken up into separate characters, four steps are executed to compute the pitch and its associated confidence level.

Step 1. Two statistics on that word are computed; the mean distance between the centers of the characters, and the deviations per character from this mean.

Step 2. Using the statistics from Step 1, the scores for fixed pitch and P.S. are computed as follows: If the value of the mean distance between characters is within the range established for fixed pitch, a small weight is added to the fixed pitch score. If it is out of that range, a large weight is added to the P.S. score. In the same way, if the deviation per character from this mean is less than a certain threshold, then the fixed pitch score is given additional weight, and if it is greater, then the threshold weight is given to the P.S. score. Based on the values of these two scores, a confidence measure is given to the estimated pitch.

Step 3. In addition to using the statistics generated for the given word, those of the previous and subsequent words are used as well, In particular, the difference in the mean values of the character to character distances, as well as the actual value of this mean distance. If the differences in the means is small, then weight is added to the fixed pitch score; if the difference in the means is large, then weight is added to the P.S. score. In addition, if the actual mean of the previous or subsequent words are out of the fixed pitch range, weight is added to the P.S. score; and if either is within the range, weight is added to the fixed pitch score.

Step 4. The greater of the two scores is chosen as the pitch for the given word, and the last step is to determine the confidence in this pitch. This is done using the pitch estimated for the given word, in context with the pitch of the previous and subsequent words and their associated confidences as computed in Step 2. Based on the similarity, or difference of the neighboring pitches and their respective confidences, the final determination of the pitch and its confidence is made.

By using this method, changes in pitch may be detected as soon as they occur on the page, thus avoiding possible errors.

When two or more characters are touching so that no white path (vertical or kerned) can be found, character segmentation makes a guess as to the best location to separate the character images. This guess works well when the cut is between two serifs. However, in some cases (as in FIG. 13), the selected cut position is wrong. The following details a technique whereby these miscut characters can be corrected in character recognition by iteratively making cuts and decisions based on the recognition results.

The input to this process is a recognition buffer which has already been run through the correlation process.

Figure 14:
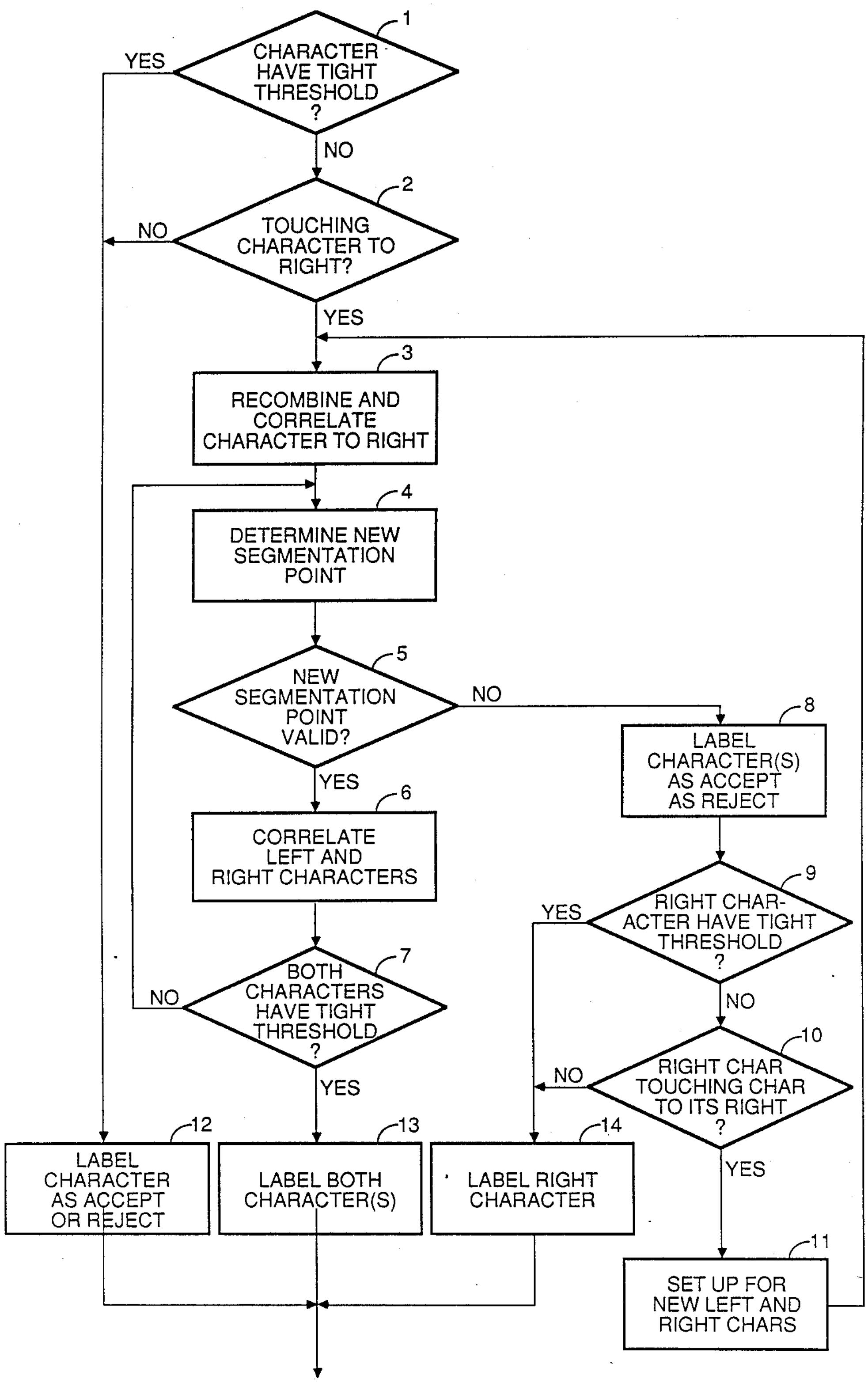
FIG. 14 depicts a flow chart illustrating the process of recognition of touching characters.

Process (see FIG. 14):

Step 1. Did character recognize with tight threshold acceptance?

This test is a check to see if the current character was not able to be tightly accepted by the correlation process regarding threshold (low score).

Step 2. Is character touching character to its right?

All recognition buffers which are sent from character segmentation to recognition are linked to the recognition buffers which contain the characters to the left and the right.

Each of these links contains a flag which specifies whether the two characters were touching before segmentation was performed (see FIG. 13). This step tests the current character to see if it was touching the character to its right.

Step 3. Recombine characters and correlate character to right.

The first portion of this step is a re-creation of the exact appearance of the touching character pair prior to segmentation in the recombination buffer. The right character of the pair is then run through the correlation process to set up its scores for the following steps.

Step 4. Determine new segmentation point.

Figure 15:
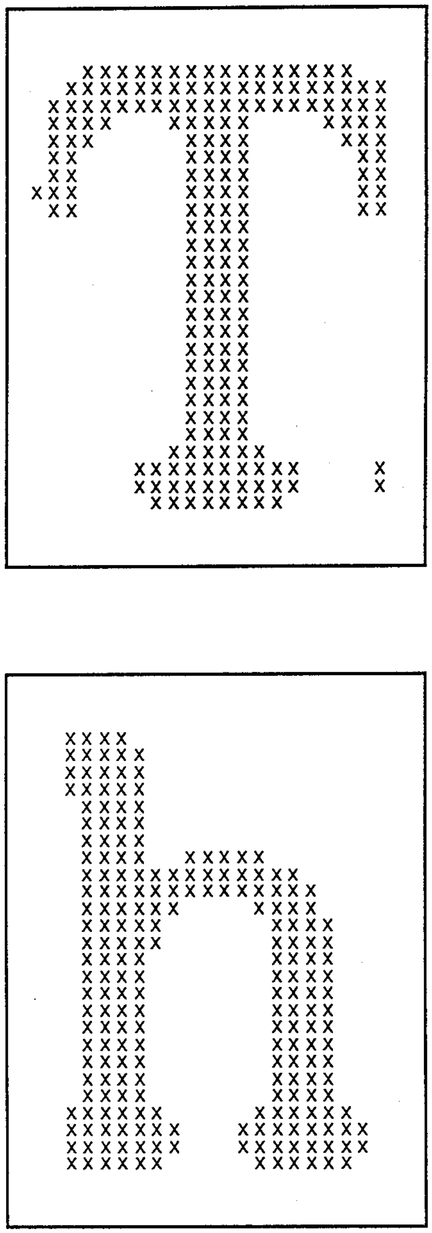
FIG. 15 depicts a representation of the segmented characters of FIG. 13.

Based on the scores of the touching character pair, a new segmentation point is determined. If neither character recognized at all, then the new segmentation point will be three pixels to the right of the original one. If one or both was loosely acceptable based on threshold, then the new segmentation point will be one pixel to the right of the original one. Once the new segmentation point is determined, then the new recognition buffers are formed from the recombination buffer, separated at the new segmentation point. If processing is currently on a later pass, then the scores are compared against the previous scores. If there was an improvement in the scores, then the new segmentation direction will be in the same direction as the previous, but one pixel further out. If the scores got worse, then the previous cut direction is investigated. If the previous cut was to the left, then the new cut will be to the right of the best previous cut point. If the previous cut was to the right, then processing is done and the best scores to date are used for the touching character pair and an invalid segmentation point indication is sent on to Step 5. Once the new segmentation point is determined, then the new recognition buffers are formed from the recombination buffer, separated at the new segmentation point. For the touching character example given in FIG. 13, the result will finally be the two recognition buffers shown in FIG. 15.

Step 5. New segmentation point valid?

This step tests to insure that the new segmentation point determined in Step 4 is valid based on the indicator sent from that step.

Step 6. Correlate left and right characters.

The new pair of recognition buffers is then run through the correlation process to see what kind of improvement, if any, was made.

Step 7. Do both characters now have tight threshold requirement?

This step tests to see if at this point, touching character processing has yielded a pair of tightly acceptable characters based on their low scores.

Step 8. Label left character for page composition.

Touching character processing was not able to resolve the pair of characters to a high degree of satisfaction, due to factors such as overlapped characters, noise, etc. The left character of the pair is labelled as an accepted or rejected character, based on threshold and separation, and passed on to page composition.

Step 9. Does right character have tight acceptance?

Following the release of the left character, the right character is tested for tight acceptance based on threshold.

Step 10. Is right character touching character to its right?

If the right character is not acceptable at this time, then it is tested to see if it is touching the character to its right.

Step 11. Set up for new left and right characters.

If the right character was not acceptable and was touching the character to its right, then the current right character becomes the new left character, and the character to its right becomes the new right character.

Thus, strings of touching characters can be resolved into recognizable characters. Processing continues with Step 3.

Steps 12, 13 and 14. Label characters as accept or reject. Label both characters. Label right character.

The character in question is labelled as an accepted or rejected character based on threshold and separation and passed on to page composition.

Figure 18:
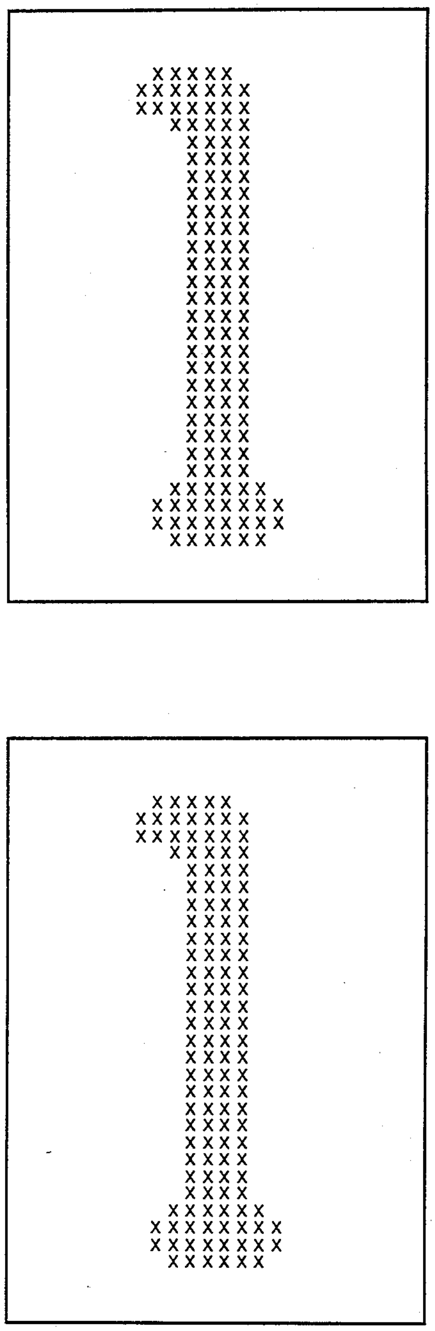
FIG. 18 depicts a representation of separated multiple characters of FIG. 17.

Often, when dealing with proportionally spaced test, two adjacent small characters can often touch, and therefore be segmented as one character by the character segmentation subsystem. These multiple characters must be resolved by the recognition subsystem. When a character does not recognize, one of the additional character retries involves dividing a single character feature from character segmentation into more than one character when the page is known to be typed in P.S., either from the font or the pitch determined in character segmentation. See FIGS. 17 and 18.

The input to this process is a recognition buffer which has already been run through the correlation process.

Figure 16:
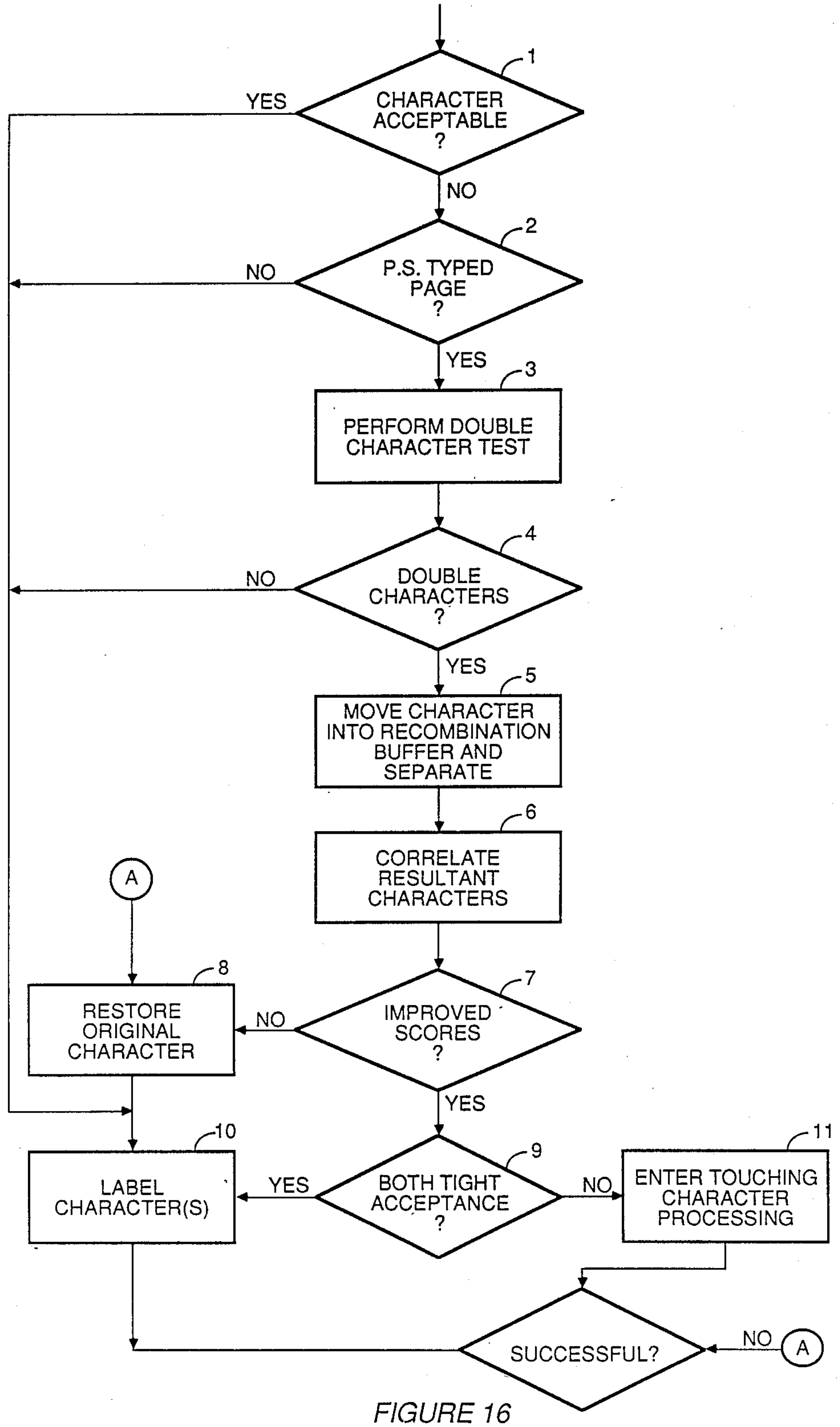
FIG. 16 depicts a flow chart illustrating the process of recognizing multiple characters within one character buffer.

Process (see FIG. 16):

Step 1. Did character recognize with tight threshold acceptance?

This test is a check to see if the current character was not able to be tightly accepted by the correlation process regarding threshold (low score).

Step 2. Is page proportionally spaced?

This test determines whether or not the character in question is from a proportionally spaced page. The determining factors in this decision are either the font (each P.S. font contains a flag which identifies it as being proportional space) and/or the pitch determined by the character segmentation process (previously described).

Step 3. Perform double character test.

This test investigates the image in the recognition buffer and attempts to make a determination as to whether or not there may be two characters in the buffer. The tests used and the order in which they are attempted are:

a. Is there a white pixel column between two images in the recognition buffer?

b. Is there a kerned path between two images in the buffer?

c. Is there a small density (1 or 2 pixels) point at which two possible images may touch?

Step 4. Is image in recognition buffer a possible double character?

This step checks to see if any of the tests in Step 3 were successful.

Step 5. Move character image into recombination buffer and separate.

The character image in question is moved into the recombination buffer and the two possible characters are separated at the point determined in Step 3 and placed in recognition buffers.

Step 6. Correlate resultant characters.

The two recognition buffers formed in Step 5 are run through the correlation process.

Step 7. Did the scores improve?

The correlation scores for both new characters are compared against the score for the original character. If both are less than the original, then it is assumed that a good double character separation was performed.

Step 8. Restore original character.

If the double character separation did not improve the correlation results as compared to the original character, then it is assumed that the original single character is the best guess for the character image. The original character and its correlation data is restored in the recognition buffer.

Step 9. Are both characters tightly acceptable?

This tests to see if the stores for both characters formed signal a tight acceptance based on threshold (low score). .

Step 10. Label character(s).

Following any of the above operations, characters are labelled as either accepted or rejected characters and passed on to page composition.

Step 11. Enter touching character processing.

If some improvement was made with the double character separation, but not enough to accept the character yet, then the character pair is passed on to touching character processing (previously described).

Step 12. Was touching character processing successful?

If following the iterative segmentation and correlation of the double character pair, both are not tightly acceptable based on the threshold requirement, then double character processing is assumed to have failed.

Because of the variations in character size and spacing with proportionally spaced text, it is not possible to simply output the text into a device which handles only fixed pitch and still expect the columns to line up (see FIG. 9). Therefore, a technique has been developed whereby the input proportionally spaced text is converted to a fixed pitch grid so that the integrity of the columns is maintained.

This procedure is implemented during the output phase of the line reconstruction pass of page composition. The inputs are a string of PIR's for the line currently being output. As characters are output from each PIR in the line, a running total is kept of the number of characters output and the total pixel width of the line segment so far. When a large white space (two or more blanks is encountered, the number of characters times a constant pitch (12 pitch was used in this application) is used to determine the length of the line segment following output. This length is compared to the actual pixel length of the line segment. If the fixed pitch length is longer than the actual length, then the horizontal white space is decreased, with a lower limit of at least one blank. If the fixed pitch length is shorter, then the horizontal white space is increased. FIG. 19 shows an example of this process.

A software source code listing for controlling the proportional spaced text and accented character recognitio techniques described above is submitted herewith as Appendix A. The isolation or separation aspect could be utilized in the second above cross-referenced application entitled "Optical Character Isolation System, Apparatus and Method."

Figure 7:
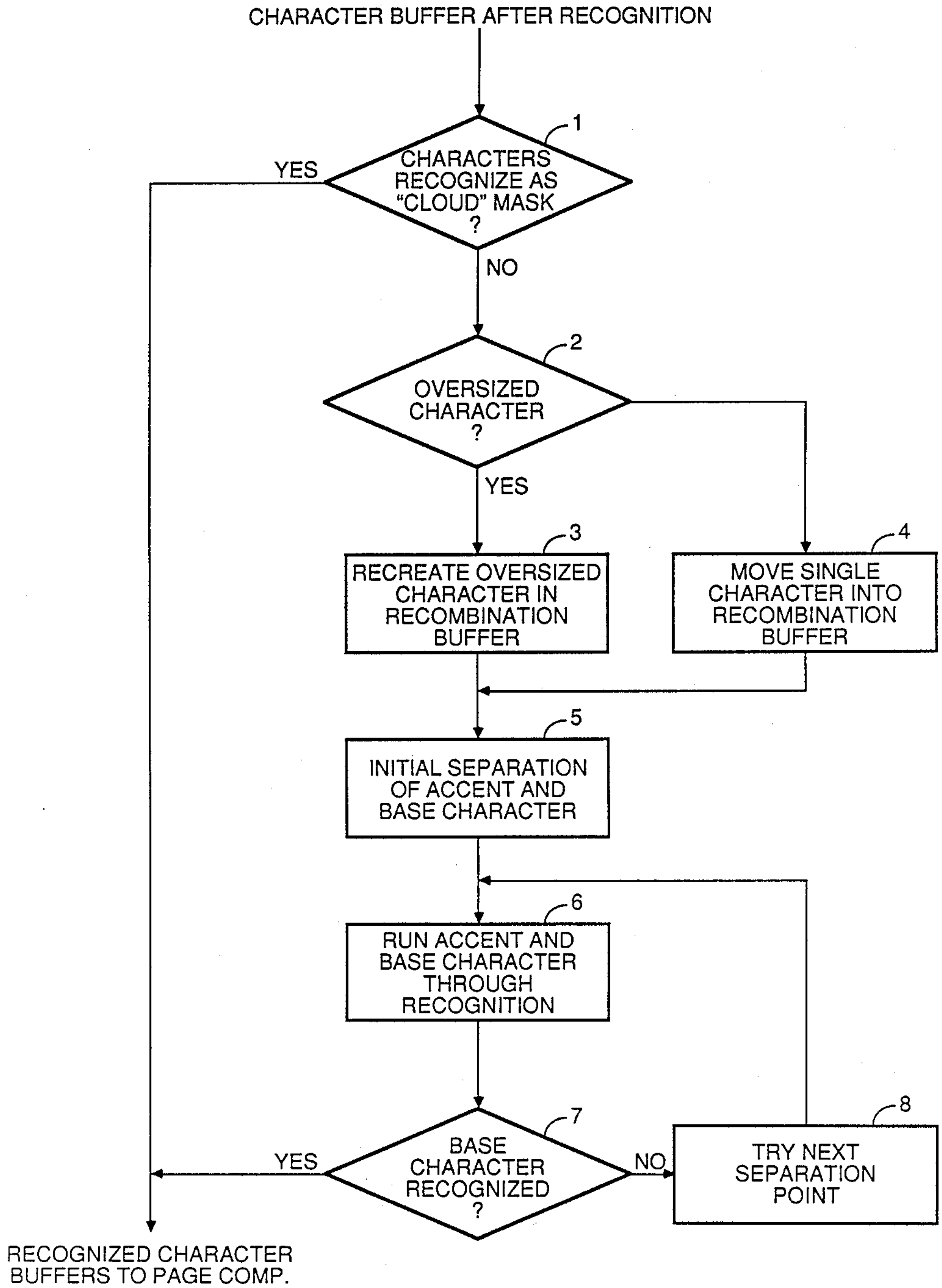
FIG. 7 depicts a flow chart illustrating the sequence of steps for recognizing an accented character.
Figure 12:
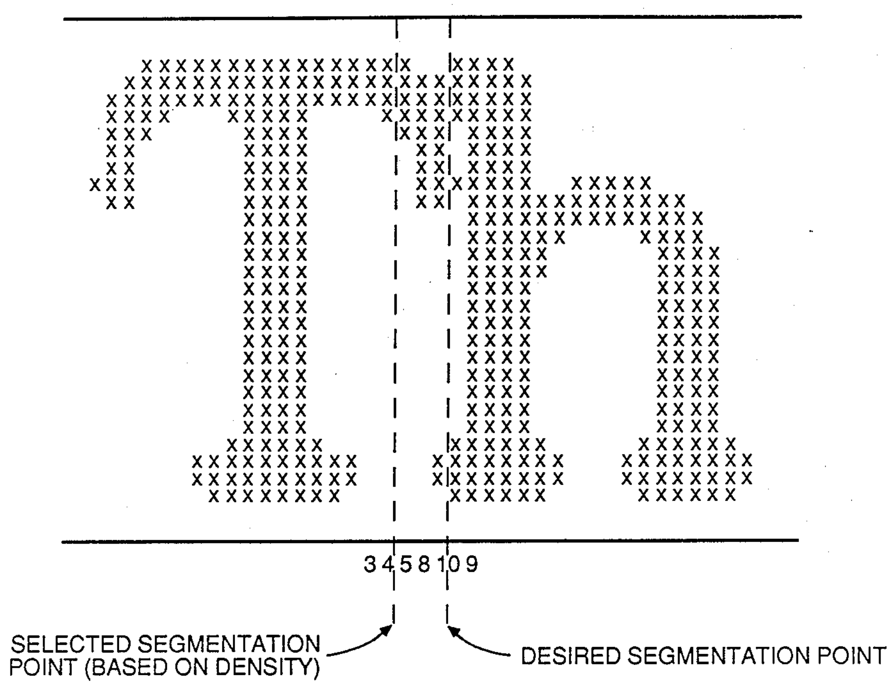
FIG. 12 depicts a representation of touching characters "Th".

Specifically, the Isolation Board 61 illustrated in FIG. 12 of that application could incorporate the teaching of the present invention. Similarly, the recognition aspects of the present invention could be utilized in the first above cross-referenced application entitled "Method and Apparatus for Character Recognition Employing a Dead-Band Correlator." The recognition board illustrated in FIG. 7 of that first application could incorporate the teachings of the present invention.

```
LOC  OBJ        LINE        SOURCE STATEMENT

$NOLIST
$LIST
$TITLE('Get next character buffer to process - Rev G')
;
;               ***************************************
;               *                                     *
;               *               RECGET                *
;               *                                     *
;               *  Next recognition buffer processing *
;               *                                     *
;               ***************************************
;
; Public procedure definitions
;
        PUBLIC  RECGET          ; Get next recognition buffer to process
        PUBLIC  ERR001          ; Error trap for crash
        PUBLIC  TAC1CT
;
; External procedures used
;
        EXTRN   HRECOM          ; Horizontal character recombination
        EXTRN   HRECM2          ; Adding another character to the recom. buffer
        EXTRN   HORSEP          ; Horizontal character separation
        EXTRN   VRECOM          ; Vertical character recombination
        EXTRN   VRECM2          ; Move single character to recomb. buffer
        EXTRN   VERSEP          ; Vertical character separation
        EXTRN   DDBINT          ; Initialization for double => touch process.
        EXTRN   DBLTST          ; Test for two characters in one buffer
        EXTRN   DBLSEP          ; Separate two characters in one buffer
        EXTRN   DBLRST          ; Double character restoration
        EXTRN   ACCTST          ; Test for accent when cloud mask
        EXTRN   FIRTST          ; Recognition feature analysis
        EXTRN   FSWTCH          ; Test to see if font switch necessary
        EXTRN   RIORES          ; Master reset of recognition hardware
        EXTRN   GETNXT          ; Get next character buffer awaiting rec
        EXTRN   ACCEPT          ; Flag buffer as awaiting page comp.
        EXTRN   CHKACC          ; Test to see if cloud mask ASCII
        EXTRN   CHKAC2          ; Test to see if accented character ASCII
        EXTRN   AWLCHK          ; Awaiting links from isolation test
        EXTRN   VERDIM          ; Compute dimensions for vertical recomb.
        EXTRN   CHGASC          ; Change cloud mask to character ASCII
        EXTRN   ALOCRB          ; Allocate a buffer to recognition
        EXTRN   DLOCRB          ; Deallocate a buffer from recognition
;
; External variables used
;
        EXTRN   RCVOCC          ; Original cut column for touching characters
        EXTRN   RCVCCC          ; Column where left & right chars recombined
        EXTRN   RCVECC          ; Column where right character ends
        EXTRN   RCRPTR          ; Pointer to center character
        EXTRN   RCLPTR          ; Pointer to left pointer
        EXTRN   RCVABA          ; Awaiting buffer allocation indicator
        EXTRN   RCVAWL          ; Awaiting touching link completion indicator
        EXTRN   RCVRHO          ; Horizontal origin of recombination buffe
```

```
LOC  OBJ        LINE       SOURCE STATEMENT

                                  EXTRN    RCVRVO       ; Vertical origin of recombination buffer
                                  EXTRN    RCVLAC       ; Indication if left character is accented
                                  EXTRN    RCVRAC       ; Indication if right character is accented
                                  EXTRN    RCVBHF       ; Previous buffer held indicator
                                  EXTRN    RCVBHP       ; Address of previous buffer (if held)
                                  EXTRN    RCVPFK       ; Primary font known indicator
                                  EXTRN    RCVEFG       ; Recognition error flag
                                  EXTRN    FRAHDR       ; Font header table
                                  EXTRN    PSFLAG       ; Proportional space flag
                                  EXTRN    FRASEG       ; Current font segment table
                                  EXTRN    SYSOPT       ; System option flag
                                  EXTRN    FNTCNT       ; Number of fonts present in system
                                  EXTRN    RCVFTP       ; Types of fonts present in machine
                                  EXTRN    RCVCCT       ; Number of chars processed during font select
                                  EXTRN    FSWFLG       ; Character being run through font switch
                           ;
                           ; Local symbol equates
                           ;
0001                       RCSNML  EQU      01H          ; Normal recognition state
0002                       RCSTOP  EQU      02H          ; Top portion of vertically separated character
0004                       RCSBTM  EQU      04H          ; Bottom portion of vertically separated char
0008                       RCSLFT  EQU      08H          ; Left portion of horizontally separated char
0010                       RCSRIT  EQU      10H          ; Right portion of horizontally separated char
0020                       RCSLDB  EQU      20H          ; Left character of double
0040                       RCSRDB  EQU      40H          ; Right character of double
0080                       RCSFSW  EQU      80H          ; Character run through font switch test
                           ;
0001                       RSPNML  EQU      01H          ; Normal recognition processing
0002                       RSPACC  EQU      02H          ; Accent processing
0004                       RSPTCH  EQU      04H          ; Touching character processing
                           ;
                           $EJECT
                           ;
                           ; Local data declarations
                           ;
                                   DSEG
0000                       ACTFLG: DS       1            ; Accented character test flag
0001                       VRTYCT: DS       1            ; Vertical retry counter
0002                       MINORG: DS       2            ; Minimum vertical origin for buffer search
0004                       MINBUF: DS       2            ; Buffer address having above origin
0006                       BUFFLG: DS       1            ; Buffer found flag
0007                       TOPRTY: DS       1            ; Retry indicator for top buffer
0008                       TPRBSC: DS       1            ; Score for bottom character in accent retry
0009                       TPRTSC: DS       1            ; Score for top character in accent retry
000A                       VRCFLG: DS       1            ; Vertical recombination flag
000B                       DBPOSC: DS       1            ; Character score for double character proc.
000C                       DBRFLG: DS       1            ; Double character reset flag
000D                       DBTFLG: DS       1            ; Double character run through touch proc.
000E                       DBCSPG: DS       1            ; Type of double character separation
000F                       TACTCT: DS       2
                           ;
                           $EJECT
                           ;
                           ; Macro definitions
                           ;
```

```
LOC  OBJ       LINE        SOURCE STATEMENT

                      $INCLUDE(:F1:MACROS.INC)
                      ;
                      ;*****************************
                      ;
                      ;  Macro LSHFT4
                      ;
                      ;         The following macro performs a four register shift operation.
                      ;         The contents in the register string B,C,D,E are shifted left
                      ;         (A) times.
                      ;
                      LSHFT4    MACRO
                                LOCAL    LSHF01         ; Local label definitions
                                LOCAL    LSHF02
                                MOV      H,A            ; Move counter to H
                                ORA      A              ; Test for zero initially
                                JZ       LSHF02         ; If zero, then don't do shift
                      LSHF01:   ORA      A              ; Clear carry
                                MOV      A,E            ; Rotate fourth byte left
                                RAL
                                MOV      E,A
                                MOV      A,D            ; Rotate carry into third byte
                                RAL
                                MOV      D,A
                                MOV      A,C            ; Rotate carry into second byte
                                RAL
                                MOV      C,A
                                MOV      A,B            ; Rotate carry into first byte
                                RAL
                                MOV      B,A
                                DCR      H              ; Decrement shift count
                                JNZ      LSHF01         ; Continue until done with shifts
                      LSHF02:
                                ENDM
                      ;
                      ;*****************************
                      ;
                      ;  Macro RSHFT4
                      ;
                      ;         The following macro performs a four register shift operation.
                      ;         The contents of the register string B,C,D,E are shifted right
                      ;         (A) times.
                      ;
                      RSHFT4    MACRO
                                LOCAL    RSHF01         ; Local label definitions
                                LOCAL    RSHF02
                                MOV      H,A            ; Move counter to H
                                ORA      A              ; Test for zero initially
                                JZ       RSHF02         ; If zero, then don't do shift
                      RSHF01:   ORA      A              ; Clear carry
                                MOV      A,B            ; Rotate first byte right
                                RAR
                                MOV      B,A
                                MOV      A,C            ; Rotate carry into second byte
                                RAR
                                MOV      C,A
```

```
LOC  OBJ          LINE        SOURCE STATEMENT

                              MOV     A,D                  ; Rotate carry into third byte
                              RAR
                              MOV     D,A
                              MOV     A,E                  ; Rotate carry into fourth byte
                              RAR
                              MOV     E,A
                              DCR     H                    ; Decrement shift count
                              JNZ     RSHF01               ; Continue until done with shifts
                        RSHF02:
                              ENDM
                        ;
                        ;*****************************
                        ;
                        ; Macro PTADR
                        ;
                        ;     The following macro computes a buffer address based on a base
                        ;     address and a buffer number
                        ;     = Base address + (128 * buffer number)
                        ;     = DE + (128 * A)
                        ;
                              EXTRN   BUFADD
                        PTADR MACRO
                              CALL    BUFADD               ; Use routine in ISOUTL
                              ENDM
                        ;
                        $EJECT
                        ;*********************************************************************
                        ;                                                                    ;
                        ; Subroutine RECSET                                                  ;
                        ;                                                                    ;
                        ;     The following subroutine is used to determine the next character ;
                        ;     buffer which should be processed by recognition.  If recognition ;
                        ;     is in the normal state and the character was tightly accepted,  ;
                        ;     then the next available buffer is returned.  If the character is ;
                        ;     horizontally or vertically linked to another character, then the ;
                        ;     character may or may not be horizontally or vertically recombined ;
                        ;     and separated to yield a better character.                      ;
                        ;                                                                    ;
                        ;     Inputs:      RECPTR      Address of last processed recognition buffer ;
                        ;                  RECRON      Current recognition status (busy or idle) ;
                        ;                                                                    ;
                        ;     Outputs:     RECPTR      Address of next buffer to process     ;
                        ;                  RECRON      Updated recognition status            ;
                        ;                  Zero flag   Indication of whether another buffer was ;
                        ;                              found to process                      ;
                        ;                                                                    ;
                        ;     Registers                                                      ;
                        ;     Affected:    All                                               ;
                        ;                                                                    ;
                        ;*********************************************************************
                        ;
                              CSEG
                        RECSET:
                        ;11/15
                        ;
```

```
LOC  OBJ                SOURCE STATEMENT

                        ; Test to see if awaiting a buffer to be allocated.
                        ;
0000 3A0000    E                  LDA    RCVABA        ; Get awaiting allocation indicator
0003 B7                           ORA    A             ;   and test for zero
0004 CA0F00    C                  JZ     RCS001        ; If zero, then not waiting - continue
0007 3D                           DCR    A             ; Test to see it awaiting for vertical
0008 CA9901    C                  JZ     NALD15        ;   separation
000B 3D                           DCR    A             ; Test to see if awaiting for double char-
000C CA5B03    C                  JZ     NALD85        ;   acter separation
                        ;
                        ; Check to see if awaiting horizontal linkages
                        ;
000F 2A0AE0             RCS001:   LHLD   RECPTR        ; Get current character address
0012 EB                           XCHG
0013 3A0000    E                  LDA    RCVAWL        ; Awaiting touching link completion ?
0016 B7                           ORA    A
0017 CA2600    C                  JZ     RCS010        ; Yes, do horizontal processing
001A 3D                           DCR    A             ; Awaiting links from left character
001B CA4302    C                  JZ     NRLD50        ;   Yes, Jump
001E 3D                           DCR    A             ; Awaiting links from right character
001F CA4308    C                  JZ     RIT020        ;   Yes, Jump
0022 3D                           DCR    A             ; Awaiting links from P.S. double character
0023 CA5B03    C                  JZ     NALD85        ;   Yes, Jump
                        ;
                        ; Test current recognition status.  If idle, then start up recognition
                        ; otherwise determine next buffer based on previous recognition results
                        ; and current recognition state
                        ;
0026 3A0AE0             RCS010:   LDA    RECRUN        ; Get recognition status
0029 B7                           ORA    A             ; Test for zero
002A CA100A    C                  JZ     CHA045        ; If zero, then rec idle, so start up
                        ;11/15
                        ;
                        ; Test for fatal software error on current character or character
                        ; deleted as noise by recognition.
                        ;
002D 2A0AE0                       LHLD   RECPTR        ; Get current character address
0030 EB                           XCHG
0031 1A                           LDAX   D             ; Test to see if the buffer was freed up as
0032 E6D2                         ANI    0D2H          ;   noise by recognition.  If so, then get
0034 FE40                         CPI    40H           ;   a new buffer to process.
0036 CAED09    C                  JZ     CHA023        ; Get next available buffer if deleted
0039 1A                           LDAX   D             ; Test for valid status
003A E6D2                         ANI    0D2H
003C FED0                         CPI    0D0H
003E CA700A    C                  JZ     ERR003
0041 FE00                         CPI    0
0043 CA700A    C                  JZ     ERR003
0046 211500                       LXI    H,RECCST      ; Point to current recognition state
0049 19                           DAD    D
004A 7E                           MOV    A,M           ; Get recognition state
004B E666                         ANI    RCSLDB+RCSRDB+RCSETS+RCSTOP ; Test for normal, left or right
004D C26B04    C                  JNZ    DLF001        ; Jump if not in one of the above states
                        ;
                        $EJECT
```

```
LOC  OBJ          LINE       SOURCE STATEMENT

                   666 ;********************************
                   667 ;
                   668 ; Recognition is in the normal, left or right state, so check to see if
                   669 ; character was recognized as cloud mask.  If so, then test for touching
                   670 ; characters.  If touching, then enter touching processing, otherwise
                   671 ; do vertical processing. Else, test to see if character was not tightly
                   672 ; accepted.  If so, then try additional retries, otherwise accept character.
                   673 ;
0050 7E            674           MOV    A,M              ; Get recognition state
0051 E680          675           ANI    RCSFSW           ; Character run through font switch test ?
0053 C22800   C    676           JNZ    CHA001           ;   Yes, don't attempt any more retries
0056 3A0000   E    677           LDA    RCVFTP           ; Get types of fonts present in machine
0059 E620          678           ANI    20H              ; Any international fonts ?
005B CA9B00   C    679           JZ     NMLK05           ;   No, no need to test for accented char
005E 7E            680           MOV    A,M              ; Test for normal state
005F E601          681           ANI    RCSNML
0061 CABA00   C    682           JZ     NMLO04           ; If not normal, then go on with vertical tests
0064 211000        683           LXI    H,RECLNL         ; Else, test to see if touching characters
0067 19            684           DAD    D
0068 7E            685           MOV    A,M              ; Get left link
0069 3C            686           INR    A                ; Test for null
006A CA7300   C    687           JZ     NMLO02           ; Jump if null left link
006D 7E            688           MOV    A,M              ; Non-null left link, test for touching
006E E680          689           ANI    80H
0070 C27F00   C    690           JNZ    NMLO03           ; Test for cloud mask if touching
0073 2C            691 NMLO02:   INR    L                ; Get right link
0074 7E            692           MOV    A,M
0075 3C            693           INR    A                ; Test for null
0076 CA6A00   C    694           JZ     NMLO04           ; Continue with vertical tests if null
0079 7E            695           MOV    A,M              ; Non-null right link, test for touching
007A E680          696           ANI    80H
007C CAEA00   C    697           JZ     NMLO04           ; Continue with vertical tests if not touching
007F 210800        698 NMLO03:   LXI    H,RECLCH         ; Touching characters :
0082 19            699           DAD    D                ;   Test for cloud mask
0083 7E            700           MOV    A,M
0084 CD0000   E    701           CALL   CHKACC
0087 CA4302   C    702           JZ     NMLO60           ; If cloud mask, then enter touch processing
                   703 ;
008A 2A0AE0        704 NMLO04:   LHLD   RECPTR           ; Get address of current recognition buffer
008D EB            705           XCHG                    ;   and put in DE
008E 210800        706           LXI    H,RECLCH
0091 19            707           DAD    D                ; Get low ASCII and test to see if
0092 7E            708           MOV    A,M              ;   it's an accented character
0093 CD0000   E    709           CALL   CHKACC *
0096 3E00          710           MVI    A,0              ; Set status if jump taken
0098 CA5C01   C    711           JZ     NML010           ; Jump if accented character
009B 210E00        712 NMLK05:   LXI    H,RECTAC         ; Not accented character
009E 19            713           DAD    D                ; Point to TAC for character
009F 7E            714           MOV    A,M              ; Get TAC
00A0 B7            715           ORA    A                ; TAC = 0 ?
00A1 CAC700   C    716           JZ     NMLO05           ; Can accept character if result is 0
00A4 3A0000   E    717           LDA    RCVFTP           ; Get font types flag
00A7 E620          718           ANI    20H              ; Any multilingual fonts present ?
00A9 CA2B01   C    719           JZ     NMLO09           ;   No, don't do accented character test
00AC 210800        720           LXI    H,RECLCH         ; Test to see if recognized as accented
```

```
LOC  OBJ              SOURCE STATEMENT

00BA 19                       DAD    D           ;   character (not cloud mask)
00BB 7E                       MOV    A,M
00BC CD0000    E              CALL   CHKAC2
00BF 3E00                     MVI    A,0         ; Set status if jump taken
00C1 CA5C01    C              JZ     NML010      ; If so, then do vertical processing
00C4 211200                   LXI    H,RECLNU    ; Since not acceptable, test to see if
00C7 19                       DAD    D           ;   vertically linked.  If so, then it
00C8 7E                       MOV    A,M         ;   may be a tall accented character
00C9 3C                       INR    A
00CA 3E10                     MVI    A,10H
00C1 C25C01    C              JNZ    NML010
00C4 C34302    C              JMP    NML060      ; Else try other forms of retry
                     ;
                     ; Character is acceptable.  If vertically linked, then also run upper
                     ; portion through to see if it is an accent.
                     ;
00C7 211200          NML005:  LXI    H,RECLNU    ; Set vertical link
00CA 19                       DAD    D
00CB 7E                       MOV    A,M
00CC 3C                       INR    A
00CD CA8A07    C              JZ     LFT001      ; Test to see if it's null
00D0 E5                       PUSH   H           ; Continue processing if null
00D1 211000    E              LXI    H,FRASEG+15 ; Save address
00D4 7E                       MOV    A,M         ; Test to see if there is an accented segment
00D5 B7                       ORA    A           ;   present in the current font
00D6 E1                       POP    H
00D7 CA0201    C              JZ     NML008
00DA 7E                       MOV    A,M         ; Jump if there is
                              FTADR              ; Else, reject the upper character buffer
00DE 3EA0                     MVI    E,0A0H      ;   and continue with touching processing
00E0 EB                       XCHG
00E1 210800                   LXI    H,8
00E4 19                       DAD    D
00E5 363F                     MVI    M,3FH
00E7 2C                       INR    L
00E8 36FF                     MVI    M,0FFH
00EA 2C                       INR    L
00EB 363F                     MVI    M,3FH
00ED 2C                       INR    L
00EE 3600                     MVI    M,0
00F0 210E00                   LXI    H,RECFAC
00F3 19                       DAD    D
00F4 3E02                     MVI    A,2
00F6 2C                       INR    L
00F7 3602                     MVI    M,2
00F9 211A00                   LXI    H,RECDBI
00FC 19                       DAD    D
00FD 3600                     MVI    M,0
00FF C38A07    C              JMP    LFT001
0102 7E              NML008:  MOV    A,M
                              FTADR              ; Compute address of upper buffer
0105 E5                       PUSH   H
0107 2A0AE5                   LHLD   RECPTR      ; Move recognition state from bottom
010A 111500                   LXI    D,RECCST    ;  to upper buffer
010D 19                       DAD    D
```

```
LOC  OBJ              SOURCE STATEMENT

010D 7E                        MOV   A,M
010E D1                        POP   D
0110 211500                    LXI   H,RECCST             ; Convert to top state
0113 19                        DAD   D
0114 E6FE                      ANI   NOT RCSMAL
0116 F602                      ORI   RCSTOP
0118 77                        MOV   M,A
0119 2C                        INR   L
011A 3602                      MVI   M,RSTACC             ; Set to accent processing for recognition
011C 210D00                    LXI   H,RECSFS             ; Clear vertical remnant flag in upper
011F 19                        DAD   D                    ;   buffer
0120 7E                        MOV   A,M
0121 E6EF                      ANI   0EFH
0123 77                        MOV   M,A
0124 EB                        XCHG
0125 220A10                    SHLD  RECPTR
0128 C3600A    C               JMP   CHA060               ; Save upper buffer as new rec buffer
                     ;
012B 211200          NML009:   LXI   H,RECLNU             ; Get vertical link
012E 19                        DAD   D
012F 7E                        MOV   A,M
0130 3C                        INR   A
0131 CA4302    C               JZ    NML060               ; Test to see if it's null
0134 7E                        MOV   A,M                  ; Continue processing if null
                               FTADH                      ; Else, reject the upper character buffer
0138 36A0                      MVI   M,0A0H               ;   and continue with touching processing
013A EB                        XCHG
013B 210B00                    LXI   H,8
013E 19                        DAD   D
013F 363F                      MVI   M,3FH
0141 2C                        INR   L
0142 36FF                      MVI   M,0FFH
0144 2C                        INR   L
0145 363F                      MVI   M,3FH
0147 2C                        INR   L
0148 3600                      MVI   M,0
014A 210E00                    LXI   H,RECTAC
014D 19                        DAD   D
014E 3602                      MVI   M,2
0150 2C                        INR   L
0151 3602                      MVI   M,2
0153 211A00                    LXI   H,RECDBI
0156 19                        DAD   D
0157 3600                      MVI   M,0
0159 C34302    C               JMP   NML050
                     SEJECT

                     ;*************************************
                     ;
                     ; Character either recognized as an cloud mask, a not tightly accepted
                     ; accented character, or a not tightly accepted vertically linked character.
                     ; Move the character to the recombination buffer, if it is not already
                     ; there and try to vertically separate it.
                     ;
015C 320000    D     NML010:   STA   ACTFLG               ; Save flag for accented character test
```

```
LOC   OBJ               SOURCE STATEMENT

015F  2A0AE0                    LHLD    RECPTR          ; Test to see if currently in a touching
0162  111500                    LXI     D,RECCST        ;   character state
0165  19                        DAD     D
0166  7E                        MOV     A,M
0167  E618                      ANI     RCSLFT+RCSBIT
0169  CA8201     C              JZ      NML012
016C  CD0000     E              CALL    ACCTST          ; If so, then test to see if there really
016F  DA8201     C              JC      NML012          ;   is an accent above the char - jump if so
0172  2A0AE0                    LHLD    RECPTR          ;   If not accent, then change ASCII to
0175  110800                    LXI     D,RECLCH        ;     alphabetic and continue with touch
0178  EB                        XCHG                    ;     processing
0179  19                        DAD     D
017A  7E                        MOV     A,M
017B  CD0000     E              CALL    CHGASC
017E  70                        MOV     M,B
017F  C38A07     C              JMP     LFT001
0182  2A0AE0            NML012: LHLD    RECPTR          ; Test to see if character is vertically
0185  EB                        XCHG                    ;   linked to another buffer already
0186  211200                    LXI     H,RECLNU
0189  19                        DAD     D
018A  7E                        MOV     A,M
018B  3C                        INR     A
018C  C2E301     C              JNZ     NML025          ; Jump if it is
018F  211500                    LXI     H,RECCST        ; Test to see if it is in one of the
0192  19                        DAD     D               ;   touching character modes.  If so,
0193  7E                        MOV     A,M             ;   then recombination is not necessary
0194  E618                      ANI     RCSLFT OR RCSBIT
0196  CC0000     E              CZ      VRECM2
                        ;
                        ; Try to allocate a buffer for the upper portion
                        ;
0199  CD0000     E      NML015: CALL    ALOCHB          ; Try to allocate a buffer
019C  D2A601     C              JNC     NML020          ; Jump if successful
019F  3E01                      MVI     A,1             ; Else, set awaiting buffer allocation
01A1  320000     E              STA     RCWABA          ;   flags and exit RECSET with recognition
01A4  B7                        ORA     A
01A5  C9                        RET
01A6  3680              NML020: MVI     M,80H           ; Flag the allocated buffer as awaiting rec
01A8  E5                        PUSH    H               ; Save address
01A9  AF                        XRA     A               ; Reset awaiting buffer allocation flags
01AA  320000     E              STA     RCWABA
01AD  11001A                    LXI     D,-SYSCHB       ; Compute a buffer number for the newly
01B0  19                        DAD     D               ;   acquired buffer to be used as a link
01B1  29                        DAD     H               ;   from the bottom buffer
01B2  4C                        MOV     C,H
01B3  2A0AE0                    LHLD    RECPTR          ; Compute a buffer number for the bottom
01B6  11001A                    LXI     D,-SYSCHB       ;   buffer to used as a link from the top
01B9  EB                        XCHG                    ;   buffer.
01BA  19                        DAD     D
01BB  29                        DAD     H
01BC  44                        MOV     B,H
01BD  211200                    LXI     H,RECLNU        ; Save the link from the bottom to the top
01C0  19                        DAD     D
01C1  71                        MOV     M,C
01C2  D1                        POP     D               ; Recover top buffer address
```

```
LOC  OBJ              SOURCE STATEMENT

01C3 D5                          PUSH  D
01C4 211000                      LXI   H,RECLNL      ; Initialize all links in the newly
01C7 19                          DAD   D             ;   acquired buffer
01C8 3EFF                        MVI   A,0FFH
01CA 77                          MOV   M,A           ;   Left  <= null
01CB 2C                          INR   L
01CC 77                          MOV   M,A           ;   Right <= null
01CD 2C                          INR   L
01CE 77                          MOV   M,A           ;   Upper <= null
01CF 2C                          INR   L
01D0 70                          MOV   M,B           ;   Lower <= buffer number of RECPTR
01D1 210D00                      LXI   H,RECSFG
01D4 19                          DAD   D             ; Initialize the separation flag for the
01D5 3600                        MVI   M,0           ;   new buffer
                       ;11/15
01D7 2A0AE0                      LHLD  RECPTR        ; Set address of bottom buffer
01DA 111A00                      LXI   D,RECDBI      ; Point to double character indicator
01DD 19                          DAD   D
01DE 3601                        MVI   M,1           ; Flag as accented double character
01E0 C30402    C                 JMP   NML035        ; Continue with separation
                       ;
                       ; Buffer was vertically linked.  Do recombination if necessary
                       ;
01E3 211500            NML025:   LXI   H,RECCST      ; Test to see if in one of the touching
01E6 19                          DAD   D             ;   character states.  If so, then not
01E7 7E                          MOV   A,M           ;   necessary to do vertical recombination
01E8 E618                        ANI   RCSLFT+RCSRIT
01EA C2F801    C                 JNZ   NML030
01ED 2A0AE0                      LHLD  RECPTR        ; Else, vertically recombine buffers
01F0 EB                          XCHG
01F1 3E01                        MVI   A,1
01F3 0E00                        MVI   C,0
01F5 CD0000    E                 CALL  VRECOM
01F8 2A0AE0            NML030:   LHLD  RECPTR        ; Compute address of upper buffer and
01FB 111200                      LXI   D,RECLNJ      ;   save it
01FE 19                          DAD   D
01FF 7E                          MOV   A,M
                                 PTADR
0203 E5                          PUSH  H
                       ;
                       ; Vertically separate the character if possible.  If this code was entered
                       ; because of a not tightly accepted vertically linked character, then test
                       ; to see if this character is accented.  If accented or entered another way
                       ; then vertically separate the accent from the character.
                       ;
0204 2A0AE0            NML035:   LHLD  RECPTR        ; Compute the starting and ending columns
0207 EB                          XCHG                ;   for the character in the recombination
0208 CD0000    E                 CALL  VERDIM        ;   buffer
020B EB                          XCHG                ; Set up parameters for vertical separation
020C D1                          POP   D             ;   routine and attempt separation
020D D5                          PUSH  D
020E 3A0000    D                 LDA   ACTFLG
0211 CD0000    E                 CALL  VERSEP
0214 DA3E02    C                 JC    NML055        ; If test was performed, and character was
                                                     ;   determined not to be accented, then
```

```
LOC  OBJ              SOURCE STATEMENT

                                                  ;   Just process as oversize character
                      ;
0217 D1                         POP     D         ; Reset the separation flag in the upper
0218 210D00                     LXI     H,RECSF3  ;   buffer
021B 19                         DAD     D
021C 7E                         MOV     A,M
021D E6EF                       ANI     0EFH
021F 77                         MOV     M,A
0220 2A0AE0                     LHLD    RECPTR    ; Set the status for the bottom buffer
0223 111500                     LXI     D,RECCSI  ;   to the bottom state for the next pass
0226 19                         DAD     D         ;   through RECGET
0227 7E                         MOV     A,M
0228 F604                       ORI     RCSBTM
022A 77                         MOV     M,A
022B 2C                         INR     L         ; Also set the recognition control flag
022C 7E                         MOV     A,M       ;   to normal processing
022D F601                       ORI     RSTNML
022F 77                         MOV     M,A
0230 AF                         XRA     A         ; Reset retry control counters and flags
0231 320100     D               STA     VRTYCT
0234 320700     D               STA     TOPRTY
0237 3C                         INR     A
0238 320A00     D               STA     VRCFLG
023B C3600A     C               JMP     CHA060
                      ;
                      ; Vertically linked character was only an oversized character. Continue.
                      ;
023E D1               NML055:   POP     D         ; Recover buffer address for bottom
023F 2A0AE0                     LHLD    RECPTR
0242 EB                         XCHG
                      ;
                      $EJECT
                      ;
                      ; Character was not vertically linked, so test to see if horizontally touching
                      ; another character.  If so, then retry horizontal separation.
                      ;
0243 2A0F00     D     NML050:   LHLD    TAC1CT
0246 23                         INX     H
0247 220F00     D               SHLD    TAC1CT
024A 2A0AE0                     LHLD    RECPTR    ; Get current character address
024D EB                         XCHG
024E 210E00                     LXI     H,RECTAC  ; Point to TAC for character
0251 19                         DAD     D
0252 7E                         MOV     A,M
0253 B7                         ORA     A         ; Test for acceptable based on TAC
0254 CA8A07     C               JZ      LFT001    ; If so, then accept character
0257 C37902     C               JMP     NML051
025A 211100                     LXI     H,RECLNK  ; Point to right link
025D 19                         DAD     D
025E 7E                         MOV     A,M       ; Get right link
025F 3C                         INR     A         ; Null right link ?
0260 CA7902     C               JZ      NML051    ;   Yes, skip link insurance code
0263 3D                         DCR     A         ; Restore right link
0264 E680                       ANI     80H       ; Get touching bit
0266 4F                         MOV     C,A       ;   and save it
0267 46                         MOV     B,M       ; Get right link
```

```
LOC  OBJ          LINE        SOURCE STATEMENT

026B 21001A       1000         LXI   H,-SYSCHB        ; Compute buffer number for current buffer
026E 19           1001         DAD   D
026F 29           1002         DAD   H
026D 7C           1003         MOV   A,H              ; Set current buffer number
026E B1           1004         ORA   C                ; OR in touching bit
026F 4F           1005         MOV   C,A              ; Result should be left link of buffer to right
0270 78           1006         MOV   A,B              ; Recover right link
                  1007         PTADR                  ; Compute address of buffer to right
0274 111000       1009         LXI   D,RECLNL         ; Point to its left link
0277 19           1010         DAD   D
0278 71           1011         MOV   M,C              ; Move in correct left link
0279 2A0AE0       1012 NML051: LHLD  RECPTR           ; Get current character buffer address
027C EB           1013         XCHG
027D AF           1014         XRA   A                ; Reset awaiting links indicator
027E 320000   E   1015         STA   RCVAWL
0281 3A0000   E   1016         LDA   RCVPFK           ; Get primary font known indicator
0284 B7           1017         ORA   A                ; Font known ?
0285 C29002   C   1018         JNZ   NML062           ;   Yes, continue
0288 3A0000   E   1019         LDA   RCVCCT           ;   No, get total character count
028B FE1E         1020         CPI   30               ; More than 30 characters processed ?
028D D22809   C   1021         JNC   CHA001           ;   Yes, don't do touching or double entries
0290 211500       1022 NML062: LXI   H,RECCST         ; Test to see if in one of the touching
0293 19           1023         DAD   D                ;   character modes
0294 7E           1024         MOV   A,M
0295 E618         1025         ANI   RCSLFT+RCSRIT
0297 C2BA07   C   1026         JNZ   LFT001           ; If so, then don't do any more tests
029A 3A0000   E   1027         LDA   RCVPFK           ; Don't do horizontal processing if still
029D B7           1028         ORA   A                ;   in font select
029E CAB803   C   1029         JZ    NML085
02A1 211000       1030         LXI   H,RECLNL         ; Test the left link to see if the character
02A4 19           1031         DAD   D                ;   was touching the one to its left
02A5 7E           1032         MOV   A,M
02A6 3C           1033         INR   A                ; Test for null
02A7 CAE102   C   1034         JZ    NML065           ; Jump if no left link
02AA 7E           1035         MOV   A,M
02AB E680         1036         ANI   80H              ; Test for touching link
02AD CAE102   C   1037         JZ    NML065           ; Jump if characters not touching
02B0 7E           1038         MOV   A,M              ; Character touching character to its left,
                  1039         PTADR                  ;   so compute the buffer address of the left
02B4 220AE0       1041         SHLD  RECPTR           ;   character and recombine the two characters
02B7 3E01         1042         MVI   A,1
02B9 CD0000   E   1043         CALL  HRECOM
02BC 2A0AE0       1044         LHLD  RECPTR
02BF 111500       1045         LXI   D,RECCST         ; Set the character status for the two
02C2 19           1046         DAD   D                ;   characters
02C3 3608         1047         MVI   M,RCSLFT
02C5 2C           1048         INR   L
02C6 3604         1049         MVI   M,RSTTCH         ; Set status to touching character processing
02C8 2A0000   E   1050         LHLD  RCRPTR
02CB 220AE0       1051         SHLD  RECPTR
02CE 111500       1052         LXI   D,RECCST
02D1 19           1053         DAD   D
02D2 3610         1054         MVI   M,RCSRIT
02D4 2C           1055         INR   L
02D5 3604         1056         MVI   M,RSTTCH         ; Set status to touching character processing
```

```
LOC  OBJ              SOURCE STATEMENT

02D7 AF                      XRA    A           ; Reset accented character indicators
02D8 320000   E              STA    RCVLAC
02DB 320000   E              STA    RCVRAC
02DE C3AD07   C              JMP    RIT005      ; Separate characters
                      ;
02E1 211100          NML065: LXI    H,RECLNK    ; Point to right link
02E4 19                      DAD    D
02E5 7E                      MOV    A,M         ; Get link to character to the right
02E6 3C                      INR    A           ; Test for null
02E7 CA5803   C              JZ     NML085      ; Jump if right link null
02EA 7E                      MOV    A,M         ; Left link is non-null
02EB E680                    ANI    80H         ; Test for touching link
02ED CA5803   C              JZ     NML095      ; Jump if not touching link
02F0 7E                      MOV    A,M         ; Test to see if links completed
02F1 3C                      INR    A
02F2 3C                      INR    A
02F3 CA0E03   C              JZ     NML070      ; No, continue processing
                                                ; Buffer is not awaiting links to the right
02F6 7E                      MOV    A,M         ;   so compute the address of the buffer to
                             PTADR              ;   the right and test to see if it is
02FA 110D00                  LXI    D,RECSFG    ;   a horizontal remnant.
02FD EB                      XCHG
02FE 19                      DAD    D
02FF 7E                      MOV    A,M
0300 E608                    ANI    08H
0302 C25803   C              JNZ    NML085      ; If so, then don't do horizontal processing
0305 EB                      XCHG
0306 7E                      MOV    A,M         ; Test to see if awaiting recognition
0307 E6D2                    ANI    0D2H
0309 FE80                    CPI    80H
030B CA1C03   C              JZ     NML075      ; Jump if awaiting recognition
030E CD0000   E      NML070: CALL   AWLCHK      ; Test to see if there are any buffers awaiting
                      ;11/15
0311 CAF809   C              JZ     CHA030      ;   recognition. If so, then process
0314 3E01                    MVI    A,1         ; No, set awaiting links indicator and exit
0316 320000   E              STA    RCVAWL      ;     recognition with RECRUN set to zero
0319 C30B0A   C              JMP    CHA040
                      ;11/15
031C 3E01            NML075: MVI    A,1
031E CD0000   E              CALL   GETNXT      ; Update variables and exit if idle
0321 C20E03   C              JNZ    NML070      ; Jump if rac needs to go idle
0324 EB                      XCHG               ; Reset double character flag
0325 211A00                  LXI    H,RECDBI
0328 19                      DAD    D
0329 3600                    MVI    M,0
032B EB                      XCHG
032C 3E01                    MVI    A,1
032E CD0000   E              CALL   BRECOM      ; Recombine characters which were touching in
                                                ;   the recombination buffer
0331 3E08                    MVI    A,RCSLFT    ; Set status as left
0333 EB                      XCHG               ; Process the left character
0334 2A0AE0                  LHLD   RECPTR      ; Save character buffer address
0337 111500                  LXI    D,RECCST    ; Point to state for left character
033A 19                      DAD    D
033B 77                      MOV    M,A         ; Set recognition status for character
```

```
LOC  OBJ                 SOURCE STATEMENT

033C 2C                        INR     L                     ; Set status to touching character processing
033D 3604                      MVI     M,RSTTCH
033F 2A0000     E              LHLD    RCBPTR                ; Run right character through recognition to
0342 220AE0                    SHLD    RECPTR                ;   give information about both characters for
0345 111500                    LXI     D,RECCST              ;   horizontal separation, if necessary
0348 19                        DAD     D
0349 3610                      MVI     M,RCSRIT
034B 2C                        INR     L                     ; Set status to touching character processing
034C 3604                      MVI     M,RSTTCH
034E AF                        XRA     A                     ; Set center character as not accented
034F 320000     E              STA     RCVLAC
0352 320000     E              STA     RCVRAC
0355 C3600A     C              JMP     CHA060                ; Exit RECGET
                         ;
                         $EJECT
                         ;
                         ; Character was not an accented character or touching character.  Test to
                         ; see if possibly there are two characters in one buffer.
                         ;
0358 2A0AE0              RML085: LHLD  RECPTR                ; Get current character buffer address
035B EB                        XCHG
035C 3A0000     E              LDA     RCVFTP                ; Get font types indicator
035F E601                      ANI     01H                   ; Any P.S. fonts present in machine
0361 CA2809     C              JZ      CHA001                ;   No, don't perform double character test
0364 210E00                    LXI     H,RECPAC              ; Only perform double test if having trouble
0367 19                        DAD     D                     ;   with character because of high low score,
0368 7E                        MOV     A,M                   ;   not low separation
0369 B7                        ORA     A
036A CA2809     C              JZ      CHA001
036D EB                        XCHG
036E CD0000     E              CALL    DBLTST                ; Perform test on character buffer
0371 2A0AE0                    LHLD    RECPTR                ; Prepare for jump if not successful
0374 EB                        XCHG
0375 D22809     C              JNC     CHA001                ; Jump if not successful
                         ;
                         ; Does appear to be double character.  Separate and try each.
                         ;
0378 F5                  RML086: PUSH  PSW                   ; Save break column
0379 78                        MOV     A,B                   ; Get type of separation performed
037A 320E00     D              STA     DRCSPS                ;   and save it
037D AF                        XRA     A                     ; Clear awaiting links indicator
037E 320000     E              STA     RCVAWL
0381 21110C                    LXI     H,RECLNR              ; Test to see if touching character to the
0384 19                        DAD     D                     ;   right
0385 7E                        MOV     A,M
0386 3C                        INR     A
0387 CAD003     C              JZ      RML090                ; If not, then allocate buffer
038A 7E                        MOV     A,M                   ; Else, linked to horizontal remnant
                               FTADR                         ; Compute address of remnant buffer
038E EB                        XCHG
038F 210D00                    LXI     H,RECSPS              ; Get separation flag for right buffer
0392 19                        DAD     D
0393 7E                        MOV     A,M
0394 EB                        XCHG
```

```
LOC  OBJ            LINE        SOURCE STATEMENT

0395 E608            1168          ANI    08H        ; Horizontal remnant ?
0397 CAD003     C    1169          JZ     NML090     ;   No, get a new buffer
039A 7E              1170          MOV    A,M        ; Get character buffer status
039B E6D2            1171          ANI    0D2H       ; Test to see if awaiting recognition
039D FE80            1172          CPI    80H
039F CAB103     C    1173          JZ     NML088     ; Continue if so
03A2 CD0000     E    1174          CALL   AWLCHK     ; Not awaiting rec, see if any other buffers
                     1175 ;11/15
03A5 CAF809     C    1176          JZ     CHA030     ; If so, then process
03A8 F1              1177 NML087:  POP    PSW        ; Reset stack
03A9 3E03            1178          MVI    A,3        ; Else, enter awaiting links mode
03AB 320000     E    1179          STA    RCVAWL
03AE C30E0A     C    1180          JMP    CHA040
                     1181 ;11/15
03B1 3E01            1182 NML088:  MVI    A,1
03B3 CD0000     E    1183          CALL   GETNXT     ; Test to see if buffer ready
03B6 C2A803     C    1184          JNZ    NML087
03B9 111A00          1185          LXI    D,RECDBL   ; Jump if rec needs to go file
03BC EB              1186          XCHG              ; Reset double character indicator
03BD 19              1187          DAD    D
03BE 3600            1188          MVI    M,0
03C0 210D00          1189          LXI    H,RECSFG
03C3 19              1190          DAD    D          ; Reset the horizontal remnant bit in the
03C4 7E              1191          MOV    A,M        ;   separation flag
03C5 E6F7            1192          ANI    0F7H
03C7 77              1193          MOV    M,A
03C8 D5              1194          PUSH   D
03C9 CD0000     E    1195          CALL   ERECOM     ; Save buffer address
03CC D1              1196          POP    D          ; Recombine the character and the remnant
03CD C33B04     C    1197          JMP    NSL100
                     1198 ;                          ; Continue with double character separation
03D0 CD0000     E    1199 NML090:  CALL   ALOCRB
03D3 D2DE03     C    1200          JNC    NML095     ; Try to allocate a buffer
03D6 F1              1201          POP    PSW        ; Jump if successful
03D7 3E02            1202          MVI    A,2        ; Restore stack
03D9 320000     E    1203          STA    RCVABA     ; Else put recognition into waiting for
03DC E7              1204          ORA    A          ;   buffer allocation state
03DD C9              1205          RET
03DE 3680            1206 NML095:  MVI    M,80H
03E0 E5              1207          PUSH   H          ; Set buffer to awaiting rec
03E1 AF              1208          XRA    A          ; Save address
03E2 320000     E    1209          STA    RCVABA     ; Reset awaiting buffer allocation flags
03E5 11001A          1210          LXI    D,-SYSCHB
03E8 19              1211          DAD    D          ; Compute a buffer number for the newly
03E9 29              1212          DAD    H          ;   acquired buffer to be used as the right
03EA 44              1213          MOV    B,H        ;   link of the current buffer
03EB 2A0AE0          1214          LHLD   RECPTR
03EE 11001A          1215          LXI    D,-SYSCHB  ; Compute a buffer number for the current
03F1 EB              1216          XCHG              ;   buffer to be used as the left link of
03F2 19              1217          DAD    D          ;   the new buffer
03F3 29              1218          DAD    H
03F4 4C              1219          MOV    C,H
                     1220 ;11/15
03F5 211900          1221          LXI    H,RECNBP
03F8 19              1222          DAD    D          ; Update next buffer pointer to show insert
```

```
LOC  OBJ            LINE        SOURCE STATEMENT

03F9 7E             1223           MOV     A,M          ; Set old link
03FA 70             1224           MOV     M,B          ; Save new link
03FB 211100         1225           LXI     H,RECLNR     ; Get the right link of the current buffer
03FE 19             1226           DAD     D            ;   save it and replace it with the number
03FF 7E             1227           MOV     A,M          ;   of the new buffer
0400 70             1228           MOV     M,B
0401 D1             1229           POP     D            ; Set up links in new buffer
0402 210D00         1230           LXI     H,RECSFG     ; Initialize the separation flag
0405 19             1231           DAD     D
0406 3600           1232           MVI     M,0
0408 211000         1233           LXI     H,RECLNL
040B 19             1234           DAD     D
040C 71             1235           MOV     M,C          ;   Left  <= current buffer
040D 2C             1236           INR     L
040E 77             1237           MOV     M,A          ;   Right <= old right link
040F F5             1238           PUSH    PSW
0410 3EFF           1239           MVI     A,0FFH
0412 2C             1240           INR     L
0413 77             1241           MOV     M,A          ;   Upper <= null
0414 2C             1242           INR     L
0415 77             1243           MOV     M,A          ;   Lower <= null
0416 211900         1244           LXI     H,RECNBP     ; Update next buffer pointer
0419 19             1245           DAD     D
                    1246  ;11/15
041A F1             1247           POP     PSW          ; Recover pointer to old right buffer
041B 77             1248           MOV     M,A
041C D5             1249           PUSH    D            ; Save buffer address
041D 3C             1250           INR     A            ; Test to see if right link is null
041E CA2904    C    1251           JZ      NHL098       ; Jump if null
0421 3D             1252           DCR     A
                    1253           PTADR
0425 111000         1255           LXI     D,RECLNL     ; Compute buffer address of old right buffer
0428 19             1256           DAD     D            ; Set left link in old right buffer to be
0429 2A0AE0         1257  NHL098:  LHLD    RECPTR       ;   new right buffer
042C 111A00         1258           LXI     D,RECDBI     ; Get original character buffer address
042F 19             1259           DAD     D            ; Point to double character indicator
0430 3602           1260           MVI     M,2          ; Flag as double character in one buffer
0432 CD0000    E    1261           CALL    VRECM2       ; Move character to the recombination buffer
0435 3E17           1262           MVI     A,23
0437 320000    E    1263           STA     RCVECC       ; Set ending column in recombination buffer
043A D1             1264           POP     D            ; Recover buffer address and continue
                    1265  ;
                    1266  ; Separate the characters
                    1267  ;
043B D5             1268  NHL100:  PUSH    D
043C 2A0AE0         1269           LHLD    RECPTR       ; Save right buffer address
043F 110900         1270           LXI     D,RECLSC     ; Save low score for original character to
0442 19             1271           DAD     D            ;   be used in test to see if double
0443 7E             1272           MOV     A,M          ;   character separation made an improvement
0444 320B00    D    1273           STA     DBPOSC
0447 D1             1274           POP     D            ; Recover right buffer address
0448 F1             1275           POP     PSW          ; Recover break column
0449 320000    E    1276           STA     RCVOCC       ; Store break column in case touch necessary
044C 2A0AE0         1277           LHLD    RECPTR
```

```
LOC  OBJ                SOURCE STATEMENT

044F CD0000    E               CALL    DBLSEP          ; Invoke separation
0452 DA8E05    C               JC      DBI015          ; If something went wrong during separation,
                                                       ;   then enter recovery mode
                         ;
0455 2A0AE0                    LHLD    RECPTR          ; Set the state of the current character
0458 111500                    LXI     D,RECCST        ;   character buffer to left of double
045B 19                        DAD     D               ;   and begin processing it
045C 3620                      MVI     M,RCSLDB
045E 2C                        INR     L
045F 3604                      MVI     M,RSTTCH
0461 AF                        XRA     A
0462 320C00    D               STA     DBRFLG          ; Reset the double character restore flag
0465 C3600A    C               JMP     CHA060
                         ;
                         $EJECT
                         ;***********************************
                         ;
                         ; Recognition is not in normal, left or right state.  Test to see in
                         ; left of double character state.
                         ;
0468 7E                  DLF001: MOV   A,M             ; Get state
0469 E620                      ANI     RCSLDB          ; Test for left double
046B CA8F04    C               JZ      DRT001          ; Jump if not
                         ;
                         ; Processing left character of double character.  Accept this character
                         ; and initiate processing of right character.
                         ;
046E 3A0C00    D               LDA     DBRFLG          ; Test to see if this was a double character
0471 B7                        ORA     A               ;   restoration pass.
0472 C22B09    C               JNZ     CHA001          ;   If so, then accept character
0475 2A0AE0                    LHLD    RECPTR          ; Compute buffer address of right character
0478 111100                    LXI     D,RECLNR
047B 19                        DAD     D
047C 7E                        MOV     A,M
                               PTADR
0480 220AE0                    SHLD    RECPTR
0483 111500                    LXI     D,RECCST        ; Set the state of the new buffer to right
0486 19                        DAD     D               ;   character of a double
0487 3640                      MVI     M,RCSRDB
0489 2C                        INR     L
048A 3604                      MVI     M,RSTTCH
048C C3600A    C               JMP     CHA060
                         ;11/15
                         ;
                         $EJECT
```

```
LOC  OBJ           LINE     SOURCE STATEMENT

                       ;*********************************
                       ;
                       ; Recognition not currently in normal, left, right or left double state.
                       ; Test for right double.
                       ;
048F 7E                DRT001: MOV    A,M               ; Get state
0490 E640                      ANI    RCSRDB            ; Test for right double
0492 CAD705      C             JZ     DTM001            ; Jump if not
                       ;
                       ; Processing is in right double state.  Test to see if there was an improvement
                       ; in scores because of this processing.  If either the left or right score is
                       ; greater than the original score, then restore the original character.  Other-
                       ; wise, accept both characters.
                       ;
0495 210900                    LXI    H,RECLSC          ; Point to low score for right character
0498 19                        DAD    D
0499 3A0B00      D             LDA    DBPOSC            ; Get the low score for the original character
049C BE                        CMP    M                 ;   and compare the two
049D DA8E05      C             JC     DRT015            ; If right is greater, then restore original
04A0 211000                    LXI    H,RECLNL          ; Compute buffer address for left character
04A3 19                        DAD    D
04A4 7E                        MOV    A,M
                               PTADR
04A8 110900                    LXI    D,RECLSC          ; Point to low score for left character
04AB EB                        XCHG
04AC 19                        DAD    D
04AD 3A0B00      D             LDA    DBPOSC            ; Get the low score for the original character
04B0 BE                        CMP    M                 ;   and compare the two
04B1 DA8E05      C             JC     DRT015            ; If left is greater, then restore original
04B4 210E00                    LXI    H,RECTAC          ; Test to see if left character can be accepted
04B7 19                        DAD    D                 ;   based on TAC
04B8 7E                        MOV    A,M
04B9 B7                        ORA    A
04BA C2EF04      C             JNZ    DRT005            ; Jump if can't
04BD D5                        PUSH   D                 ; Save left buffer pointer
04BE 2A0AE0                    LHLD   RECPTR            ; Test to see if right character can be
04C1 110E00                    LXI    D,RECTAC          ;    accepted based on TAC
04C4 19                        DAD    D
04C5 7E                        MOV    A,M
04C6 B7                        ORA    A
04C7 D1                        POP    D
04C8 C2EF04      C             JNZ    DRT005            ; If not, then enter touch processing
                       ;
04CB 3A0E00      D             LDA    DBCSFG            ; Characters are acceptable
04CE FE04                      CPI    4                 ; Test to see if separation was forced
04D0 C21005      C             JNZ    DRT010            ; Accept characters if not
04D3 210800                    LXI    H,RECLCH          ; Get low scoring character for left
04D6 19                        DAD    D
04D7 7E                        MOV    A,M
04D8 FE41                      CPI    'A'               ; Recognized as punctuation ?
04DA D21005      C             JNC    DRT010            ;   No, accept characters
04DD D5                        PUSH   D                 ; Save left buffer address
04DE 2A0AE0                    LHLD   RECPTR            ; Get right buffer address
04E1 110800                    LXI    D,RECLCH          ; Get low scoring character for right
04E4 19                        DAD    D
```

```
LOC   OBJ          SOURCE STATEMENT

04E5 7E                    MOV   A,M
04E6 D1                    POP   D       ; Recover left buffer address
04E7 FE41                  CPI   'A'     ; Right character recognize as punctuation ?
04E9 D21005   C            JNC   DRT010  ;   No, characters are acceptable
04EC C36E05   C            JMP   DRT015  ;   Yes, not good double character
                   ;
04EF 3A0000   E    DRT005: LDA   RCVPFK  ; Set primary font known indicator
04F2 B7                    ORA   A       ; Out of font select?
04F3 CA6E05   C            JZ    DRT015  ;   No, don't try touch processing
04F6 CD0000   E            CALL  RDBINT  ; Not acceptable, so initialize for touch
                                         ;   processing
04F9 3EFF                  MVI   A,0FFH  ; Set double character entering touch
04FB 320000   D            STA   DBTFLG  ;   processing flag
04FE 211500                LXI   H,RECCST ; Set recognition status for character to
0501 19                    DAD   D       ;   processing left touching
0502 3608                  MVI   M,RCSLFT
0504 2A0AE0                LHLD  RECPTR  ; Set recognition status for right character
0507 111500                LXI   D,RECCST ;   to touching processing
050A 19                    DAD   D
050B 3610                  MVI   M,RCSRIT
050D C3AD07   C            JMP   RIT005  ; Continue with touch processing
                   ;11/15
0510 211A00        DRT010: LXI   H,RECDBI ; Point to double character indicator
0513 19                    DAD   D
0514 7E                    MOV   A,M     ; Get it
0515 FE02                  CPI   2       ; Double character in one buffer ?
0517 CA2405   C            JZ    DRT012  ;  Yes, jump
051A CD0000   E            CALL  ACCEPT  ;  No,  accept both characters
051D 2A0AE0                LHLD  RECPTR
0520 EB                    XCHG
0521 C32809   C            JMP   CHA001
                   ;
0524 D5            DRT012: PUSH  D       ; Save left buffer address
0525 CD0000   E            CALL  FIRTST  ; Perform any necessary feature analysis
0528 2A0AE0                LHLD  RECPTR  ; Get right buffer address
052B EB                    XCHG
052C CD0000   E            CALL  FTRTST  ; Perform any necessary feature analysis
052F 2A0AE0                LHLD  RECPTR  ; Get right buffer address
0532 D1                    POP   D       ; Recover left buffer address
0533 E5                    PUSH  H       ;   and save it
0534 D5                    PUSH  D       ; Save left buffer address
0535 212000                LXI   H,RECCHB ; Point to character data in left buffer
0538 19                    DAD   D
0539 EB                    XCHG
053A 2A0AE0                LHLD  RECPTR
053D 0620                  MVI   B,32    ; Move 32 bytes of data from right character
053F 7E            DRT014: MOV   A,M     ;   buffer into character data portion of
0540 12                    STAX  D       ;   left character buffer
0541 2C                    INR   L
0542 1C                    INR   E
0543 05                    DCR   B
0544 C23F05   C            JNZ   DRT014
0547 E1                    POP   H       ; Recover left buffer address
0548 220AE0                SHLD  RECPTR  ; Save as current buffer address
054B EB                    XCHG
```

```
LOC  OBJ          LINE        SOURCE STATEMENT

054C 213A00       1435          LXI    H,RECCHB+RECDBI ; Clear double character flag for right
054F 19           1436          DAD    D               ;   character
0550 3600         1437          MVI    M,0
0552 212000       1438          LXI    H,RECCHB
0555 19           1439          DAD    D
0556 7E           1440          MOV    A,M             ; Flag right character as awaiting page comp.
0557 E63F         1441          ANI    3FH             ; Get status
0559 F640         1442          ORI    40H             ; Mask off status bits
055B 77           1443          MOV    M,A             ; Flag awaiting page comp.
055C E1           1444          POP    H
055D D5           1445          PUSH   D               ; Recover right buffer address
055E EB           1446          XCHG                   ; Save current buffer address
055F 211100       1447          LXI    H,RECLNR
0562 19           1448          DAD    D               ; Move right link of right buffer to current
0563 7E           1449          MOV    A,M             ;   character buffer
0564 F5           1450          PUSH   PSW
0565 EB           1451          XCHG
0566 CD0000   E   1452          CALL   DLOCRB          ; Deallocate right buffer
0569 F1           1453          POP    PSW             ; Recover link
056A D1           1454          POP    D               ; Recover current buffer address
056B 211100       1455          LXI    H,RECLNR        ; Save new right link
056E 19           1456          DAD    D
056F 77           1457          MOV    M,A
0570 1A           1458          LDAX   D
0571 E63F         1459          ANI    3FH             ; Set status for character buffer
0573 F640         1460          ORI    40H             ;   and flag it as awaiting page comp.
0575 12           1461          STAX   D
0576 211200       1462          LXI    H,RECLNU        ; Point to upper link
0579 19           1463          DAD    D
057A 7E           1464          MOV    A,M             ; Get it
057B 3C           1465          INR    A               ; Any upper remnant ?
057C CAF009   C   1466          JZ     CHA025          ;   No, continue
057F D5           1467          PUSH   D               ; Save buffer address
0580 7E           1468          MOV    A,M
                  1469          PTADR                  ; Compute address of upper buffer
0584 7E           1471          MOV    A,M             ; Flag upper buffer as awaiting page comp
0585 E63F         1472          ANI    3FH
0587 F640         1473          ORI    40H
0589 77           1474          MOV    M,A
058A D1           1475          POP    D               ; Recover bottom buffer address
058B C3F009   C   1476          JMP    CHA025          ; Process next character buffer
                  1477 ;
                  1478 ; The double character separation made the scores worse.  Restore the
                  1479 ; original character and don't do double character processing. (We probably
                  1480 ; separated a character we shouldn't have).
                  1481 ;
                  1482 ;11/15
058E 2A0AE0       1483 DRTD15:  LHLD   RECPTR          ; Compute buffer address for left character and
0591 111000       1484          LXI    D,RECLNL        ;   put the original character in it.
0594 19           1485          DAD    D
0595 7E           1486          MOV    A,M
                  1487          PTADR
0599 220AE0       1489          SHLD   RECPTR
059C EB           1490          XCHG
059D 211500       1491          LXI    H,RECCST        ; Set status in character buffer to left
```

```
LOC  OBJ              SOURCE STATEMENT

05A0 19                     DAD     D                  ;   character of a double pair
05A1 3620                   MVI     M,RCSLDB
05A3 EB                     XCHG
05A4 CD0000    E            CALL    DBLRST
05A7 3EFF                   MVI     A,0FFH             ; Set the double character restoration flag
05A9 320000    D            STA     DBRFLG
05AC 2A0AE0                 LHLD    RECPTR             ; Get pointer to original character
05AF 44                     MOV     B,H
05B0 4D                     MOV     C,L
05B1 211A00                 LXI     H,RECDBI           ; Point to double buffer flag
05B4 09                     DAD     B
05B5 7E                     MOV     A,M                ; Get flag
05B6 FE02                   CPI     2                  ; Allocated buffer or remnant ?
05B8 C2600A    C            JNZ     CHA060             ;   If remnant, then process new character
05BB 3600                   MVI     M,0
05BD 211100                 LXI     H,RECLNR           ;   Else, deallocate remnant buffer
05C0 09                     DAD     B                  ; Point to right link of original buffer
05C1 7E                     MOV     A,M                ; Get it
                            PTADR                      ; Compute address of allocated buffer
05C5 EB                     XCHG
05C6 211100                 LXI     H,RECLNR           ; Get right link of allocated buffer
05C9 19                     DAD     D
05CA 7E                     MOV     A,M
05CB 211100                 LXI     H,RECLNR           ; Save it as right link of original buffer
05CE 09                     DAD     B
05CF 77                     MOV     M,A
05D0 EB                     XCHG
05D1 CD0000    E            CALL    DLOCBB             ; Deallocate buffer
05D4 C3600A    C            JMP     CHA050             ; Process original character
                     ;
                     $EJECT
                     ;**********************************
                     ;
                     ; Recognition was not in the normal state, so test to see if it is
                     ; currently processing the bottom portion of a vertically separacted character.
                     ;
05D7 7E              BTM001: MOV    A,M                ; Get recognition state
05D8 E604                   ANI     RCSBTM             ; Compare state with bottom processing
05DA CA7B06    C            JZ      TOP001             ; Jump if not in bottom state
                     ;
                     ; Recognition is in the bottom state.  Test to see if the character was
                     ; recognized.  If it was, then test to see if it was a vowel or an n.
                     ; If so, then go on to process the top portion, otherwise try to find a
                     ; better place to separate the character.
                     ;
05DD 3A0700    D            LDA     TOPRTY             ; Test to see if in top retry processing
05E0 B7                     ORA     A
05E1 C23206    C            JNZ     BTM025             ; If so, then process bottom
05E4 2A0AE0                 LHLD    RECPTR             ; Get address of bottom character buffer
05E7 EB                     XCHG
05E8 210800                 LXI     H,RECLCH           ; Test low score to see if character recognized
05EB 19                     DAD     D                  ;    as an accented character again
05EC 7E                     MOV     A,M
05ED CD0000    E            CALL    CHKACC
```

```
LOC  OBJ              SOURCE STATEMENT

05F0 CA1806   C              JZ    BTM020          ; Continue if not
05F3 2A0AE0                  LHLD  RECPTR          ; Get recognition state
05F6 111500                  LXI   D,RECSSI
05F9 19                      DAD   D
05FA 7E                      MOV   A,M             ; Don't do any accented retries if in
05FB E618                    ANI   RCSLFT+RCSRIT   ;   touching character processing
05FD C23206   C              JNZ   BTM025
                    ;
0600 2A0AE0         BTM005:  LHLD  RECPTR
0603 EB                      XCHG
0604 210E00                  LXI   H,RECTAC        ; Point to TAC field in the buffer
0607 19                      DAD   D
0608 7E                      MOV   A,M             ; Get TAC
0609 FE01                    CPI   1               ; Test for not acceptable
060B DA3206   C              JC    BTM025          ; If not acceptable, then try to reseparate
060E 210100   D              LXI   H,VRTYCT        ; Increment vertical retry counter
0611 34                      INR   M
                    ;
0612 7E                      MOV   A,M             ; Allow five retries
0613 FE05                    CPI   5
                    ;
0615 CA3206   C              JZ    BTM025          ; If done, then don't retry again
0618 CD0000   E     BTM020:  CALL  VERDIM          ; Compute starting and ending column for sep
061B 2A0AE0                  LHLD  RECPTR          ; Compute address of top buffer
061E 111200                  LXI   D,RECLNU
0621 19                      DAD   D
0622 7E                      MOV   A,M
                             PTADR
0626 EB                      XCHG                  ; Put address of top buffer in DE
0627 2A0AE0                  LHLD  RECPTR          ; Get address of bottom buffer
062A 3E01                    MVI   A,1             ; Signal not first pass - don't do test
062C CD0000   E              CALL  VERSEP          ; Re-separate characters
062F C3600A   C              JMP   CHA050
0632 211000   E     BTM025:  LXI   H,FRASEG+15     ; Test to insure that there is an accented
0635 7E                      MOV   A,M             ;   segment in the current font.
0636 B7                      ORA   A               ;   If not, then don't run character through
0637 CA5A06   C              JZ    BTM030          ;   accented character processing
063A 2A0AE0                  LHLD  RECPTR          ;   and reject upper character
063D 111200                  LXI   D,RECLNU
0640 19                      DAD   D
0641 7E                      MOV   A,M
                             PTADR
0645 36A0                    MVI   M,0A0H
0647 110800                  LXI   D,8
064A EB                      XCHG
064B 19                      DAD   D
064C 363F                    MVI   M,3FH
064E 2C                      INR   L
064F 36FF                    MVI   M,0FFH
0651 2C                      INR   L
0652 363F                    MVI   M,3FH
0654 2C                      INR   L
0655 36FF                    MVI   M,0FFH
0657 C32809   C              JMP   CHA001
065A 2A0AE0         BTM030:  LHLD  RECPTR          ; Bottom character was accepted,
```

```
LOC  OBJ            LINE        SOURCE STATEMENT

065D EB             1604        XCHG
065E 211200         1605        LXI     H,RECLNO         ; Character was a vowel or an n, so set
0661 19             1606        DAD     D                ;   status to top and recognize top portion
0662 7E             1607        MOV     A,M
                    1608        PTADR                    ; Compute buffer address of top portion
0666 220AE0         1610        SHLD    RECPTR           ; Save top buffer address
0669 111500         1611        LXI     D,RECCST         ; Set state to top
066C 19             1612        DAD     D
066D 3602           1613        MVI     M,RCSTOP
066F 2A0AE0         1614        LHLD    RECPTR           ; Set accent recognition processing flag to
0672 111600         1615        LXI     D,RECRST         ;   normal processing mode
0675 19             1616        DAD     D
0676 3602           1617        MVI     M,RSTACC
0678 C3600A    C    1618        JMP     CHA060
                    1619 $EJECT
                    1620 ;*********************************
                    1621 ;
                    1622 ; Recognition is not currently in the normal or bottom state.  Test to see
                    1623 ; if it is processing the top portion of a separated character.
                    1624 ;
067B 7E             1625 TOP001: MOV    A,M              ; Get recognition state
067C E602           1626        ANI     RCSTOP           ; Test for top state
067E CABA07    C    1627        JZ      LFT001           ; Jump if not in bottom state
                    1628 ;
                    1629 ; Test to see if the accent was recognized OK (TAC = 0).  If not, then
                    1630 ; the accent can be retried, but only so long as it doesn't make the
                    1631 ; score for the character below the accent any worse.
                    1632 ;
0681 7E             1633        MOV     A,M              ; Don't do any accented retries if in
0682 E618           1634        ANI     RCSLFT+RCSBIT    ;   touching character processing
0684 C23507    C    1635        JNZ     TOP020
0687 3A0A00    D    1636        LDA     VRCFLG           ; Don't do test if no vertical recombination
068A B7             1637        ORA     A                ;   and separation was done
068B CA3507    C    1638        JZ      TOP020
068E 3A0700    D    1639        LDA     TOPRTY           ; Test to see if currently in accent retry
0691 B7             1640        ORA     A
0692 CAE006    C    1641        JZ      TOP010           ; If not, then test to see if retry necessary
0695 E6F0           1642        ANI     0F0H             ; Test to see if done with retries
0697 C23507    C    1643        JNZ     TOP020           ;   Yes, finish off vertical processing
069A 2A0AE0         1644        LHLD    RECPTR           ; Retries are currently in progress
069D 111300         1645        LXI     D,RECLNB         ; Point to lower buffer
06A0 19             1646        DAD     D
06A1 7E             1647        MOV     A,M
                    1648        PTADR
06A5 E5             1650        PUSH    H                ; Save bottom buffer address
06A6 110900         1651        LXI     D,RECLSC         ; Get low score for bottom character
06A9 19             1652        DAD     D
06AA 46             1653        MOV     B,M
06AB 3A0800    D    1654        LDA     TPRBSC           ; Get best low score for bottom buffer
06AE B8             1655        CMP     B                ;   and compare to new score
06AF E1             1656        POP     H
06B0 DAC406    C    1657        JC      TOP005           ; If no improvement, then recover from retry
06B3 E5             1658        PUSH    H
06B4 2A0AE0         1659        LHLD    RECPTR           ; Get low score for top character
06B7 110900         1660        LXI     D,RECLSC
06BA 19             1661        DAD     D
```

```
LOC  OBJ           SOURCE STATEMENT

06BB 46                     MOV     B,M
06BC 3A0900     D           LDA     TPBTSC          ; Get best low score for top buffer and
06BF B8                     CMP     B               ;   compare to new score
06C0 E1                     POP     H
06C1 D2E006     C           JNC     TOP010          ; If improvement, then see if need to retry
06C4 E5             TOP005: PUSH    H
06C5 2A0AE0                 LHLD    RECPTR          ; Score got worse, so re-separate characters
06C8 EB                     XCHG                    ;   at previous break point
06C9 E1                     POP     H
06CA E5                     PUSH    H
06CB 3E02                   MVI     A,2
06CD 0600                   MVI     B,0
06CF 0E17                   MVI     C,23
06D1 CD0000     E           CALL    VERSEP
06D4 E1                     POP     H               ; Start processing bottom buffer
06D5 220AE0                 SHLD    RECPTR
06D8 3EF0                   MVI     A,0F0H          ; Signal end of accent retry
06DA 320700     D           STA     TOPRTY
06DD C3500A     C           JMP     CHA050
                    ;
                    ; We weren't previously in accent retry, so test to see if we need to enter
                    ; that mode now.
                    ;
06E0 3A0700     D   TOP010: LDA     TOPRTY          ; If haven't previously done this form
06E3 B7                     ORA     A               ;   of retry, then initialize retry counter
06E4 C2EB06     C           JNZ     TOP015
06E7 AF                     XRA     A
06E8 320100     D           STA     VRTYCT
06EB 2A0AE0         TOP015: LHLD    RECPTR          ; Test TAC for accent
06EE 110E00                 LXI     D,RECTAC
06F1 EB                     XCHG
06F2 19                     DAD     D
06F3 7E                     MOV     A,M
06F4 FE01                   CPI     1               ; If zero, then accept accent
06F6 DA3507     C           JC      TOP020
06F9 210900                 LXI     H,RECLSC        ; Save low score for accent as best low score
06FC 19                     DAD     D
06FD 7E                     MOV     A,M
06FE 320900     D           STA     TPBTSC
0701 D5                     PUSH    D               ; Else, retry separation for better accent
0702 211300                 LXI     H,RECLN3        ; Point to bottom buffer
0705 19                     DAD     D
0706 7E                     MOV     A,M
                            PTADR
070A E5                     PUSH    H
070B 110900                 LXI     D,RECLSC        ; Save low score for bottom character
070E 19                     DAD     D
070F 7E                     MOV     A,M
0710 320800     D           STA     TPBBSC
0713 210100     D           LXI     H,VRTYCT        ; Increment the vertical retry counter
0716 34                     INR     M
0717 7E                     MOV     A,M             ; Test to see if maximum number of retries
0718 FE05                   CPI     5               ;   already done.
071A E1                     POP     H               ; Reset stack if jump will be taken
```

```
LOC  OBJ               SOURCE STATEMENT

071B D1                       POP     D
071C D23507      C            JNC     TOP020          ; If so, then finish vertical processing
071F E5                       PUSH    H
0720 3E01                     MVI     A,1
0722 0600                     MVI     B,0
0724 0E17                     MVI     C,23
0726 CD0000      E            CALL    VERSEP
0729 E1                       POP     H               ; Re-process buffers starting with bottom
072A 220AE0                   SHLD    RECPTR
072D 3E0F                     MVI     A,0FH           ; Set accent retry mode
072F 320700      D            STA     TOPRTY
0732 C3600A      C            JMP     CHA060
                        ;
                        ;*********************************************************************
                        ;
                        ; Recognition is in top state.  Set recognition state to vertical processing
                        ; complete and accept top portion as is.
                        ;
0735 2A0AE0             TOP020: LHLD  RECPTR          ; Set top buffer address and point
0738 111500                   LXI     D,RECCST        ;   to recognition state
073B 19                       DAD     D
073C 7E                       MOV     A,M
073D F604                     ORI     RCSBTS          ; Set state to vertical processing complete
073F 77                       MOV     M,A
0740 2ACAE0                   LHLD    RECPTR
0743 EB                       XCHG
0744 D5                       PUSH    D               ; Save top buffer address
0745 211300                   LXI     H,RECLNB        ; Set address of lower buffer and save
0748 19                       DAD     D               ;   it in RECPTR and fall through to
0749 7E                       MOV     A,M             ;   see if in touching character
                              PTADR                   ;   processing
074D 220AE0                   SHLD    RECPTR
0750 111A00                   LXI     D,RECDBI        ; Point to double character indicator
0753 EB                       XCHG
0754 19                       DAD     D
0755 7E                       MOV     A,M             ; Get it
0756 3D                       DCR     A               ; Accented character in one buffer
0757 C22809      C            JNZ     CHA001          ;   No, accept both buffers
075A EB                       XCHG
075B 112000                   LXI     D,RECCHB        ; Point to character data in bottom buffer
075E 19                       DAD     D
075F D1                       POP     D               ; Recover top buffer address
0760 D5                       PUSH    D
0761 0620                     MVI     B,32            ; Move character information for top
0763 1A                 TOP025: LDAX  D               ;   character into bottom character buffer
0764 77                       MOV     M,A
0765 2C                       INR     L
0766 1C                       INR     E
0767 05                       DCR     B
0768 C26307      C            JNZ     TOP025
076B 2A0AE0                   LHLD    RECPTR          ; Set bottom buffer address
```

```
LOC  OBJ          LINE       SOURCE STATEMENT

076E 112000       1769          LXI     D,RECCHB        ; Point to character status for top
0771 19           1770          DAD     D
0772 7E           1771          MOV     A,M             ; Flag top character as awaiting page comp
0773 E63F         1772          ANI     3FH
0775 F640         1773          ORI     40H
0777 77           1774          MOV     M,A
0778 E1           1775          POP     H               ; Recover top buffer address
0779 CD0000    F  1776          CALL    DLOCHB          ; Deallocate buffer to reserved queue
077C 2A0AE0       1777          LHLD    RECPTR          ; Set bottom buffer address
077F EB           1778          XCHG
0780 111200       1779          LXI     D,RECLNO
0783 19           1780          DAD     D               ; Point to its upper link
0784 36FF         1781          MVI     M,0FFH          ;   and null it out
0786 D5           1782          PUSH    D               ; Save address for jump
0787 C39D09    C  1783          JMP     CHA002          ; Accept character
                  1784 ;
                  1785 $EJECT
                  1786 ;**********************************
                  1787 ;
                  1788 ; Test to see if recognition is in horizontal processing - left character
                  1789 ; state.  If it is, then update the buffer pointers and process the center
                  1790 ; (or right) character.
                  1791 ;
078A 2A0AE0       1792 LFT001: LHLD  RECPTR
078D 111500       1793          LXI     D,RECCST        ; Get recognition state for this character
0790 EB           1794          XCHG
0791 19           1795          DAD     D
0792 7E           1796          MOV     A,M
0793 FC08         1797          ANI     RCSLFT          ; Test for left state
0795 CAA707    C  1798          JZ      RIT001          ; If not in left, test for center
                  1799 ;
0798 2A0000    E  1800          LHLD    HCRPTR          ; Move the buffer address for the center
079B 220AE0       1801          SHLD    RECPTR          ;   to the current buffer address
079E 111500       1802          LXI     D,RECCST
07A1 19           1803          DAD     D               ; Set status for this character to horizontal
07A2 3610         1804          MVI     M,RCSRIT        ;   processing - center character
07A4 C3600A    C  1805          JMP     CHA050          ; Exit RECSET
                  1806 ;
                  1807 $EJECT

                  1808 ;*********************
                  1809 ;
```

```
LOC  OBJ                LINE      SOURCE STATEMENT

                              ; Test to see if recognition is in horizontal processing - center character
                              ; state.  If it is, then determine whether or not the left character may be
                              ; accepted based on scores.  If not, then reseparate characters if possible
                              ; and try again.
                              ;
07A7 7E                       RIT001: MOV   A,M             ; Get recognition state
07A8 E610                             ANI   RCSHIF          ; Test for center state
07AA CA2809         C                 JZ    CHA001          ; If not in center state, accept char as is
                              ;
07AD 110E00                   RIT005: LXI   D,RECTAC        ; Point to TAC for left character
07B0 2A0000         E                 LHLD  RCLPTR
07B3 19                               DAD   D
07B4 7E                               MOV   A,M             ; Get left character TAC
07B5 47                               MOV   B,A
07B6 2A0000         E                 LHLD  RCRPTR          ; Point to TAC for center character
07B9 19                               DAD   D
07BA 7E                               MOV   A,M             ; Get right character TAC
07BB 4F                               MOV   C,A
07BC B0                               ORA   B               ; OR two results together
07BD CA1D08         C                 JZ    RIT015          ; If zero, then both characters were tightly
                                                            ;   accepted, so accept the left character
                              ;
                              ; It is not possible to accept the left character based on scores.  Try to
                              ; re-separate the characters.  If this is successful, then process the left
                              ; and center characters again.  If not, then the left character has to be
                              ; accepted as the best.
                              ;
07C0 CD0000         E         RIT010: CALL  HORSEP          ; Try to reseparate characters
07C3 D20507         C                 JNC   RIT012          ; If couldn't separate, then accept best
                                                            ;   result for left character
07C6 2A0000         E                 LHLD  RCLPTR          ; Else re-initiate recognition of the newly
07C9 220AE0                           SHLD  RECPTR          ;   separated left character
07CC 111500                           LXI   D,RECCST        ; Reset state to left only
07CF 19                               DAD   D
07D0 3608                             MVI   M,RCSLFT
07D2 C3600A         C                 JMP   CHA050
                              ;
                              ; The left character can be accepted.  If it is acceptable, then flag it as
                              ; awaiting page image.  Else, if in P.S. font, then test to see if it may
                              ; be a double character.  If so, then perform double char processing.  Then
                              ; test to see if the center character is touching a character to its right.
                              ; If it isn't, then also accept the center character.  Else, recombine the
                              ; center and right character(s), the center character becomes the new left
                              ; one and continue with recognition.
                              ;
07D5 3A0D00         D         RIT012: LDA   DBIFLG          ; Currently doing touch on a double char ?
07D8 B7                               ORA   A
07D9 CAF407         C                 JZ    RIT013          ;   No, continue
07DC 2A0000         E                 LHLD  RCLPTR          ; Get left character address
07DF 110E00                           LXI   D,RECTAC        ; Get TAC for character
07E2 19                               DAD   D
07E3 7E                               MOV   A,M
07E4 B7                               ORA   A               ; Tightly accepted based on threshold ?
```

```
LOC  OBJ        LINE        SOURCE STATEMENT

07E5 C28E05  C  1863        JNZ   DBT015     ;   No, restore original character
07E8 2A0000  E  1864        LHLD  RCRPTR     ; Set right character address
07EB 110E00     1865        LXI   D,RECTAC   ; Set TAC for character
07EE 19         1866        DAD   D
07EF 7E         1867        MOV   A,M
07F0 B7         1868        ORA   A
07F1 C28E05  C  1869        JNZ   DBT015     ; Tightly accepted based on threshold ?
07F4 3A0000  E  1870 RIT013: LDA  PSFLAG     ;   No, restore original character
07F7 B7         1871        ORA   A          ; Get proportional space indicator
07F8 CA1908  C  1872        JZ    RIT015
07FB 3A0000  D  1873        LDA   DBTFLG     ; Jump if not P.S.
07FE B7         1874        ORA   A          ; Test to see if doing touch on a double char
07FF C21908  C  1875        JNZ   RIT015
0802 2A0000  E  1876        LHLD  RCLPTR
0805 110E00     1877        LXI   D,RECTAC   ; Test to see if character is acceptable,
0808 EB         1878        XCHG             ;   i.e. TAC = 0
0809 19         1879        DAD   D
080A 7E         1880        MOV   A,M
080B B7         1881        ORA   A
080C CA1908  C  1882        JZ    RIT015
080F EB         1883        XCHG             ; Jump if acceptable
0810 CD0000  E  1884        CALL  DBLTST
0813 2A0000  E  1885        LHLD  RCLPTR     ; Perform double character test
0816 DA0509  C  1886        JC    RIT050
0819 2A0000  E  1887 RIT015: LHLD RCLPTR     ; If double character, then do processing
081C EB         1888        XCHG             ; Get pointer to left character buffer
081D 3A0D00  D  1889        LDA   DBTFLG
0820 B7         1890        ORA   A          ; Doing touch on a double character ?
0821 C21005  C  1891        JNZ   DBT010
0824 CD0000  E  1892        CALL  ACCEPT     ;   Yes, jump to double character processing
0827 2A0000  E  1893        LHLD  RCRPTR     ; Flag left character as awaiting page image
082A EB         1894        XCHG             ; Set pointer to center character
082B 210E00     1895        LXI   H,RECTAC
082E 19         1896        DAD   D          ; Point to TAC for right character
082F 7E         1897        MOV   A,M
0830 B7         1898        ORA   A          ; Get TAC for right character
0831 CA3908  C  1899        JZ    RIT035
0834 211100     1900        LXI   H,RECLNR   ; If TAC = SAC = 0, then accept right character
0837 19         1901        DAD   D          ; Set link to right character
0838 7E         1902        MOV   A,M
0839 3C         1903        INR   A
083A CA3908  C  1904        JZ    RIT035     ; Test for null
083D 7E         1905        MOV   A,M        ; If null, then accept center character
083E E680       1906        ANI   80H        ; Link is non-null,
0840 CA3908  C  1907        JZ    RIT035     ;   test for touching
0843 AF         1908 RIT020: XRA  A          ; If not touching, then accept center char
0844 320000  E  1909        STA   RCWAWL     ; Reset awaiting links indicator
0847 2A0000  E  1910        LHLD  RCRPTR
084A 111100     1911        LXI   D,RECLNR   ; Point to right link from center character
084D EB         1912        XCHG
084E 19         1913        DAD   D
084F 7E         1914        MOV   A,M
0850 3C         1915        INR   A          ; Test to see if buffer is awaiting links
0851 3C         1916        INR   A
0852 CA6108  C  1917        JZ    RIT025     ; Jump if not awaiting links
```

```
LOC  OBJ                SOURCE STATEMENT

0855 7E                        MOV    A,M      ; Buffer is not awaiting links to the right
                               PTADR           ;   so compute the address of the buffer to
0859 7E                        MOV    A,M      ;   the right and test to see if it is
085A E602                      ANI    002H     ;   awaiting recognition.
085C FE80                      CPI    80H
085E CA6F08       C            JZ     RIT030   ; Jump if awaiting recognition
0861 CD0000       E   RIT025:  CALL   AWLCHK   ; Test to see if there are any buffers awaiting
                      ;11/15
0864 CAFF09       C            JZ     CHA035   ;   recognition.  If so, then process.
0867 3E02             RIT027:  MVI    A,2      ; No, set awaiting links indicator and exit
0869 320000       E            STA    RCVAWL   ;   awaiting links and exit
086C C30B0A       C            JMP    CHA040
086F 3E01             RIT030:  MVI    A,1
0871 CD0000       E            CALL   CETNXT   ; Test to see if buffer ready
0874 C26708       C            JNZ    RIT027   ; Jump if rec needs to go idle
0877 111A00                    LXI    D,RECDBI ; Reset double character indicator
087A EB                        XCHG
087B 19                        DAD    D
087C 3600                      MVI    M,0
087E 210D00                    LXI    H,RECSPS ; Set separation flag for character
0881 19                        DAD    D
0882 7E                        MOV    A,M
0883 E60B                      ANI    0BH      ; Horizontal remnant ?
0885 EB                        XCHG
0886 C2A908       C            JNZ    RIT035   ;   Yes, don't do touch processing
                      ;11/15
0889 3E01                      MVI    A,1
088B CD0000       E            CALL   RRECM2   ; Else, recombine center character and char-
088E 2A0000       E            LHLD   RCLPTR   ;   acter to its right
0891 111500                    LXI    D,RECCST ; Set status to left
0894 19                        DAD    D
0895 3608                      MVI    M,RCSLFT
0897 2A0000       E            LHLD   RCRPTR   ; Run right character through recognition
089A 220A00                    SHLD   RECPTR
089D 111500                    LXI    D,RECCST
08A0 19                        DAD    D
08A1 3610                      MVI    M,RCSHIT
08A3 2C                        INR    L
08A4 3604                      MVI    M,BSTTCH
08A6 C3600A       C            JMP    CHA050   ; Exit RECSET
                      ;
                      ; If right character is tightly accepted, then flag as awaiting page comp.
                      ; Else, perform double character test if in P.S. font.  If test is successful,
                      ; than perform double character processing.
                      ;
08A9 3A0000       E   RIT035:  LDA    PSFLAG   ; Set P.S. indicator
08AC B7                        ORA    A
08AD CAC408       C            JZ     RIT040   ; Accept character if not P.S.
08B0 3A0000       E            LDA    DBTFLG   ; Accept character if already did double
08B3 B7                        ORA    A        ;   processing
08B4 C2C408       C            JNZ    RIT040
08B7 2A0000       E            LHLD   RCRPTR   ; Test to see if right character was tightly
08BA 110E00                    LXI    D,RECTAC ;   accepted, i.e. TAC = 0
```

```
LOC  OBJ         LINE        SOURCE STATEMENT

08BD EB           1974          XCHG
08BE 19           1975          DAD     D
08BF 7E           1976          MOV     A,M
08C0 B7           1977          ORA     A
08C1 C2CB08    C  1978          JNZ     RIT045          ; If not, then try double character test
08C4 2A0000    E  1979 RIT040:  LHLD    RCBPTR          ; All processing done on right character, so
08C7 EB           1980          XCHG                    ;   flag as awaiting page comp.
08C8 C32809    C  1981          JMP     CHA001
08CB EB           1982 RIT045:  XCHG
08CC CD0000    E  1983          CALL    DBLTST          ; Perform double character test
08CF 2A0000    E  1984          LHLD    RCBPTR
08D2 EB           1985          XCHG
08D3 D22809    C  1986          JNC     CHA001          ; If not successful, than accept character
08D6 F5           1987          PUSH    PSW             ; Save column at which to separate
08D7 211100       1988          LXI     H,RECLNB        ; Point to right link of buffer
08DA 19           1989          DAD     D
08DB 7E           1990          MOV     A,M             ; Get right link
08DC 3C           1991          INR     A               ; Null ?
08DD EB           1992          XCHG
08DE CA0509    C  1993          JZ      RIT048          ;   Yes, then jump
08E1 D5           1994          PUSH    D               ; Save buffer address
08E2 3D           1995          DCR     A               ; Restore link
                  1996          PTADR                   ; Compute address of buffer to right
08E6 110D00       1998          LXI     D,RECSFG        ; Point to separation flag for the new buffer
08E9 EB           1999          XCHG
08EA 19           2000          DAD     D
08EB 7E           2001          MOV     A,M             ; Get separation flag
08EC E608         2002          ANI     08H             ; Horizontal remnant ?
08EE E1           2003          POP     H               ; Pop buffer address in case not
08EF CA0509    C  2004          JZ      RIT048          ;   No, take jump
08F2 220AE0       2005          SHLD    RECPTR          ; Save new current buffer address (left buffer)
08F5 210D00       2006          LXI     H,RECSFG        ; Reset remnant indicator in separation flag
08F8 19           2007          DAD     D
08F9 7E           2008          MOV     A,M
08FA E6F7         2009          ANI     0F7H
08FC 77           2010          MOV     M,A
08FD D5           2011          PUSH    D               ; Save address of remnant buffer
08FE CD0000    E  2012          CALL    DRECM2          ; Recombine character and remnant
0901 D1           2013          POP     D               ; Recover remnant address
0902 C33B04    C  2014          JMP     RAL100          ; Separate the characters
0905 F1           2015 RIT048:  POP     PSW             ; Recover column at which to separate
                  2016 ;
0906 220AE0       2017 RIT050:  SHLD    RECPTR          ; Save address of recognition buffer
0909 EB           2018          XCHG
                  2019 ;
                  2020 ; We're going to try double character processing on the left character
                  2021 ; of the touching pair.  Since we've already done touch processing on
                  2022 ; these two characters, there's no need to do it again later, so set the
                  2023 ; left link of the right character to non-touching.
                  2024 ;
090A F5           2025          PUSH    PSW             ; Save separation column
090B 211100       2026          LXI     H,RECLNB        ; Point to right link of current buffer
090E 19           2027          DAD     D
090F 7E           2028          MOV     A,M             ; Get it
0910 3C           2029          INR     A               ; Test for null
```

```
LOC  OBJ          LINE       SOURCE STATEMENT

0911 CA2009   C              JZ      RIT055          ; No need to continue if null
0914 3D                      DCR     A               ; Restore link
                             PTPDR                   ; Compute address of buffer to right
0915 111000                  LXI     D,RECLNL        ; Clear the touching bit in its right link
0918 19                      DAD     D
091C 7E                      MOV     A,M
091D E67F                    ANI     7FH
091F 77                      MOV     M,A
0920 F1               RIT055: POP    PSW             ; Recover cut column
0921 2A0AE0                  LHLD    RECPTR          ; Get current buffer address
0924 EB                      XCHG
0925 C37803   C              JMP     NKLOS5          ; Perform double character processing
                        ;
                        $EJECT
                        ;**********************************
                        ;
                        ; Character has either been accepted or all retries have been done.
                        ; Set character status to awaiting page image and get another buffer.
                        ; If the character is touching the character to its right, then don't
                        ; release it just yet, but flag it as held.
                        ;
0928 D5               CHA001: PUSH   D               ; Save buffer address
0929 211300                  LXI     H,RECLNB        ; Test to insure that we are processing
092C 19                      DAD     D               ;   bottom buffer
092D 7E                      MOV     A,M
092E 3C                      INR     A               ; Down link null ?
092F CA3809   C              JZ      CHA003          ;   Yes, already on bottom or no top
0932 D1                      POP     D               ;   No,  compute address of bottom buffer
0933 3D                      DCR     A               ;         and process it
                             PTADR
0937 E5                      PUSH    H
0938 3A0000   E       CHA003: LDA    RCVPFK          ; Primary font known ?
093B 3C                      INR     A
093C C29D09   C              JNZ     CHA002          ;   No, don't do font change test
093F 3A0000   E              LDA     FSWFLG          ; Get font switch test flag
0942 B7                      ORA     A               ; Character already run through test ?
0943 C29D09   C              JNZ     CHA002          ;   Yes, don't do it again
0946 1A                      LDAX    D               ; Get character status
0947 E620                    ANI     RECERR          ; Recognition error ?
0949 CA9D09   C              JZ      CHA002          ;   No, then no need to try font change
094C 3A0000   E              LDA     SYSOPT          ; Model 201 ?
094F 0F                      RRC
0950 D29D09   C              JNC     CHA002          ;   Yes, then don't do test
0953 3A0000   E              LDA     FNTCNT          ; Only one font ?
0956 3D                      DCR     A
0957 CA9D09   C              JZ      CHA002          ;   Yes, then don't do test
095A 210900                  LXI     H,RECLSC        ; Get low score for character
095D 19                      DAD     D
095E 7E                      MOV     A,M
095F FE09                    CPI     9               ; Low score >= 9 ?
0961 DA9D09   C              JC      CHA002          ;   No, then don't do test
                        ;
                        ; Character has been rejected in the current font.  Start collecting reject
                        ; information to test to see if it is necessary to change fonts.
                        ;
```

```
LOC  OBJ          LINE          SOURCE STATEMENT

0964 E1           2087          POP   H
0965 220AE0       2088          SHLD  RECPTR       ; Recover buffer address and save it
0968 111000       2089          LXI   D,RECLNL     ; Point to left link of buffer
096B EB           2090          XCHG
096C 19           2091          DAD   D
096D 7E           2092          MOV   A,M          ; Get left link
096E 3C           2093          INR   A            ; Null left link ?
096F CA8609    C  2094          JZ    CHA004       ;   Yes, jump
0972 3D           2095          DCR   A            ;   No,  recover link
                  2096          PTADR              ; Compute address of buffer to left
0976 111100       2097          LXI   D,RECLNR     ; Null out its right link
0979 19           2099          DAD   D
097A 36FF         2100          MVI   M,0FFH
097C 2A0AE0       2101          LHLD  RECPTR       ; Get current buffer address
097F 111000       2102          LXI   D,RECLNL     ; Null out its left link
0982 EB           2103          XCHG
0983 19           2104          DAD   D
0984 36FF         2105          MVI   M,0FFH
0986 211500       2106 CHA004:  LXI   H,RECCST
0989 19           2107          DAD   D            ; Set up recognition state as font switch
098A 3680         2108          MVI   M,RCSFSW
098C 2C           2109          INR   L
098D 3601         2110          MVI   M,RSTNML     ; Set up for normal processing
                  2111 ;11/15
098F 2A0AE0       2112          LHLD  RECPTR       ; Set current buffer pointer
0992 CD0000    E  2113          CALL  FSWTCH       ; Initiate font switch test
0995 3EFF         2114          MVI   A,0FFH       ; Set font swtich flag
0997 320000    E  2115          STA   FSWFLG
099A C3600A    C  2116          JMP   CHA050       ; Process this buffer through font switch
                  2117 ;
099D AF           2118 CHA002:  XRA   A            ; Character done...
099E 320000    E  2119          STA   FSWFLG       ; Reset font switch flag
09A1 3A0000    E  2120          LDA   RCVBHF       ; Test to see if the previous buffer was held
09A4 B7           2121          ORA   A            ;   for touching character processing
09A5 CAB309    C  2122          JZ    CHA005
09A8 AF           2123          XRA   A
09A9 320000    E  2124          STA   RCVBHF       ; Reset buffer held indicator
09AC 2A0000    E  2125          LHLD  RCVBHP
09AF EB           2126          XCHG               ; If so, then the buffer can now be released
09B0 CD0000    E  2127          CALL  ACCEPT       ;   so flag it as awaiting page image
09B3 D1           2128 CHA005:  POP   D
09B4 D5           2129          PUSH  D            ; Recover buffer address
09B5 211100       2130 CHA010:  LXI   H,RECLNR
09B8 19           2131          DAD   D            ; Test to see if the current character is
09B9 7E           2132          MOV   A,M          ;   touching the character to its right.
09BA 3C           2133          INR   A            ;   If so, then hold the buffer
09BB CAE209    C  2134          JZ    CHA020
09BE 7E           2135          MOV   A,M
09BF E680         2136          ANI   80H
09C1 CAE209    C  2137          JZ    CHA020
09C4 D1           2138          POP   D
09C5 1A           2139          LDAX  D            ; Recover buffer address
09C6 F602         2140          ORI   02H          ; Flag the buffer as held by recognition
```

```
LOC   OBJ            SOURCE STATEMENT

09C8  12                     STAX   D
09C9  3E01                   MVI    A,1
09CB  320000     E           STA    RCVBHF     ; Set the buffer hold indicator for the next
09CE  EB                     XCHG              ;   pass and save the buffer address
09CF  220000     E           SHLD   RCVBHP
09D2  111200                 LXI    D,RECLNG
09D5  19                     DAD    D          ; Test to see if the buffer which was held is
09D6  7E                     MOV    A,M        ;   vertically linked.  If so, then also save
09D7  3C                     INR    A          ;   the vertically linked portion.
09D8  C2E109     C           JNZ    CHA015
09DB  2C                     INR    L
09DC  7E                     MOV    A,M
09DD  3C                     INR    A
09DE  CAF009     C           JZ     CHA025
09E1  7E             CHA015: MOV    A,M        ; Buffer was vertically linked
                             LTRACR
09E5  7E                     MOV    A,M
09E6  F602                   ORI    002H
09E8  77                     MOV    M,A
09E9  C3F009     C           JMP    CHA025
09EC  D1             CHA020: POP    D          ; Set next buffer to process
09ED  CD0000     E   CHA023: CALL   ACCEPT     ; Character was not touching character to its
                     ;                         ;   right, so flag awaiting page image
09F0  3E00           CHA025: MVI    A,0
09F2  CD0000     E           CALL   GETNXT     ; Get next buffer awaiting recognition
                     ;11/15
09F5  C20B0A     C           JNZ    CHA040     ;   One was found, exit RECSET
09F8  AF             CHA030: XRA    A
09F9  320A00     D           STA    VRCFLG     ; Reset vertical recombination flag
09FC  320D00     D           STA    DBTFLG
09FF  3E01           CHA035: MVI    A,1        ; Reset double-touching flag
0A01  3204E0                 STA    RECRUN
0A04  B7                     ORA    A
0A05  220AE0                 SHLD   RECPTR     ; Save buffer address
0A08  C31E0A     C           JMP    CHA050     ; Test for oversized character
0A0B  AF             CHA040: XRA    A          ;   No buffer found,
0A0C  3204E0                 STA    RECRUN     ;     Set recognition idle
0A0F  C9                     RET               ;     and return zero flag set
                     ;
                     $EJECT
                     ;*********************************
                     ;
                     ; Recognition was idle.  Test to see if there is a buffer which is awaiting
                     ; recognition.  If so, then process it, else remain idle.
                     ;
0A10  2A0AE0         CHA045: LHLD   RECPTR     ; Start search from previous RECPTR
                     ;11/15
0A13  3E00                   MVI    A,0
0A15  CD0000     E           CALL   GETNXT     ; Search for buffer awaiting rec
0A18  C20B0A     C           JNZ    CHA040     ; Exit if none found and remain idle
0A1B  C3F809     C           JMP    CHA030     ; If one found, then process it
                     ;
                     $EJECT
```

```
LOC  OBJ           SOURCE STATEMENT

                   ;*********************************
                   ;
                   ; Test the character to see if it is oversized and an accented character.
                   ; If so, separate the character and begin processing bottom.  Otherwise,
                   ; put recognition in normal state and exit.
                   ;
0A1E 2A0AE0        CHA050: LHLD   RECPTR        ; Set recognition buffer address
0A21 EB                    XCHG
0A22 211300                LXI    H,RECLNB      ; Set link to lower buffer
0A25 19                    DAD    D
0A26 7E                    MOV    A,M
0A27 3C                    INR    A             ; Test for null link
0A28 C2350A   C            JNZ    CHA055        ; Lower link is non-null, this is upper portion
0A2B 211500                LXI    H,RECCST      ; Point to character status
0A2E 19                    DAD    D             ;   and set it to normal
0A2F 3601                  MVI    M,RCSNML
0A31 211600                LXI    H,RECRST      ; Set recognition processing flag to normal
0A34 19                    DAD    D
0A35 3601                  MVI    M,RSTNML
0A37 C3600A   C            JMP    CHA060
0A3A 3C            CHA055: INR    A             ; Test to see if buffer is awaiting links
0A3B CAF009   C            JZ     CHA025        ; If so, then ignore for now
0A3E 7E                    MOV    A,M           ; Buffer contains top portion of character
0A3F E67F                  ANI    7FH           ; Strip off touching indicator
0A41 1F                    RAR                  ; Compute address of bottom buffer
0A42 57                    MOV    D,A           ;    = SYSCHB + (RECLNB * 123)
0A43 3E00                  MVI    A,0
0A45 1F                    RAR
0A46 5F                    MOV    E,A
0A47 2100E6                LXI    H,SYSCHB
0A4A 19                    DAD    D
0A4B 220AE0                SHLD   RECPTR        ; Process bottom character
0A4E 111500                LXI    D,RECCST      ; Set character status to normal
0A51 19                    DAD    D
0A52 3601                  MVI    M,RCSNML
0A54 2C                    INR    L
0A55 3601                  MVI    M,RSTNML      ; Set recognition processing flag to normal
0A57 2A0AE0                LHLD   RECPTR
0A5A 111A00                LXI    D,RECDBI      ; Reset double character indicator
0A5D 19                    DAD    D
0A5E 3600                  MVI    M,0
                   ;
                   CHA060:
0A60 AF            CHA065: XRA    A
0A61 320000   E            STA    RCVLAC
0A64 3E01                  MVI    A,1
0A66 3204E0                STA    RECRJN        ; Set recognition busy and
0A69 B7                    ORA    A
0A6A 2A0AE0                LHLD   RECPTR        ; return zero flag reset
0A6D C9                    RET
                   ;
                   $EJECT
```

```
LOC  OBJ          LINE        SOURCE STATEMENT

                  2247 ;**********************************
                  2248 ;
                  2249 ; Fatal error occurred. Reset the stack if necessary, set the recognition error
                  2250 ; flag and exit with recognition idle.
                  2251 ;
0A6E E1           2252 ERR001:  POP     H              ; Reset two stack locations
0A6F E1           2253 ERR002:  POP     H              ; Reset one stack location
0A70 3E29         2254 ERR003:  MVI     A,29H          ; Set recognition error flag for software crash
0A72 320000   E   2255          STA     RCVEFG
0A75 32FF7F       2256          STA     7FFFH          ; Trap ICE
0A78 CD0000   E   2257          CALL    RIDRES         ; Reset recognition hardware
0A7B AF           2258          XRA     A              ; Return idle status
0A7C C9           2259          RET
                  2260 ;
                  2261          END

ASSEMBLY COMPLETE,   NO ERRORS

CRP13.
CVPC.
S7S.
```

```
LOC  OBJ        LINE        SOURCE STATEMENT

$NOLIST
$LIST
$TITLE('Utilities for RECSET - Rev C')
;
;                  *****************************************
;                  *                                       *
;                  *            RECSET Utilities           *
;                  *                                       *
;                  *   Next recognition buffer processing  *
;                  *                                       *
;                  *****************************************
;
; Public procedure definitions
;
         PUBLIC   GETNXT              ; Get next character buffer awaiting rec
         PUBLIC   ACCEPT              ; Flag buffer as awaiting page comp.
         PUBLIC   CHKACC              ; Test to see if cloud mask ASCII
         PUBLIC   CHKAC2              ; Test to see if accented character ASCII
         PUBLIC   AWLCHK              ; Awaiting links from isolation test
         PUBLIC   VERDIM              ; Compute dimensions for vertical recomb.
         PUBLIC   CHGASC              ; Change cloud mask to character ASCII
         PUBLIC   ALOCRB              ; Allocate a buffer to recognition
         PUBLIC   DLOCRB              ; Deallocate a buffer from recognition
         PUBLIC   INITRB              ; Initialize reserved buffer queue
         PUBLIC   FTRTST              ; Feature analysis test routine
         PUBLIC   RCTRCT
;
; External procedures used
;
         EXTRN    RECFTR              ; Recognition feature analysis
         EXTRN    ERR001              ; Error condition handler
         EXTRN    HCENTR              ; Horizontally re-register character
;
; External variables used
;
         EXTRN    RCVPFK              ; Primary font known indicator
         EXTRN    RCVEFG              ; Recognition error flag
         EXTRN    FNAHDR              ; Font header table
         EXTRN    PSFLAG              ; Proportional space flag
         EXTRN    FNASEG              ; Current font segment table
         EXTRN    SYSOPT              ; System option flag
         EXTRN    FNTCNT              ; Number of fonts present in system
         EXTRN    RCVFTP              ; Types of fonts present in machine
         EXTRN    RCVCCT              ; Number of chars processed during font select
         EXTRN    RCVBHF              ; Recognition held buffer flag
         EXTRN    RCVBHP              ; Pointer to above buffer
         EXTRN    RCVCCC              ; Current cut column for separation
         EXTRN    RCVECC              ; Ending cut column
         EXTRN    RCVRAC              ; Right character accented flag
;
; Local data definitions
;
         DSEG
RESBFQ:                               ; Queue of buffers reserved for recognition
```

```
LOC  OBJ        SOURCE STATEMENT

0000            RESEF1:  DS      2
0002            RESEF2:  DS      2
0004            RCTRCT:  DS      2
                ;
                ; Local symbol equates
                ;
0001            RCSNML   EQU     01H      ; Normal recognition state
0002            RCSTOP   EQU     02H      ; Top portion of vertically separated character
0004            RCSBTM   EQU     04H      ; Bottom portion of vertically separated char
0008            RCSLFT   EQU     08H      ; Left portion of horizontally separated char
0010            RCSRIT   EQU     10H      ; Right portion of horizontally separated char
0020            RCSLDB   EQU     20H      ; Left character of double
0040            RCSRDB   EQU     40H      ; Right character of double
                ;
0001            RSTNML   EQU     01H      ; Normal recognition processing
0002            RSTACC   EQU     02H      ; Accent processing
0004            RSTTCH   EQU     04H      ; Touching character processing
                ;
                ; Macro definitions
                ;
                $INCLUDE(:F1:MACROS.INC)
                ;
                ;******************************
                ;
                ;  Macro LSHFT4
                ;
                ;        The following macro performs a four register shift operation.
                ;        The contents in the register string B,C,D,E are shifted left
                ;        (A) times.
                ;
                LSHFT4   MACRO
                         LOCAL   LSHF01   ; Local label definitions
                         LOCAL   LSHF02
                         MOV     H,A      ; Move counter to H
                         ORA     A        ; Test for zero initially
                         JZ      LSHF02   ; If zero, then don't do shift
                LSHF01:  ORA     A        ; Clear carry
                         MOV     A,E      ; Rotate fourth byte left
                         RAL
                         MOV     E,A
                         MOV     A,D      ; Rotate carry into third byte
                         RAL
                         MOV     D,A
                         MOV     A,C      ; Rotate carry into second byte
                         RAL
                         MOV     C,A
                         MOV     A,B      ; Rotate carry into first byte
                         RAL
                         MOV     B,A
                         DCR     H        ; Decrement shift count
                         JNZ     LSHF01   ; Continue until done with shifts
                LSHF02:
                         ENDM
                ;
                ;******************************
```

```
LOC  OBJ      LINE      SOURCE STATEMENT

;
; Macro RSHFT4
;
;         The following macro performs a four register shift operation.
;         The contents of the register string B,C,D,E are shifted right
;         (A) times.
;
RSHFT4   MACRO
         LOCAL   RSHF01          ; Local label definitions
         LOCAL   RSHF02
         MOV     H,A             ; Move counter to H
         ORA     A               ; Test for zero initially
         JZ      RSHF02          ; If zero, then don't do shift
RSHF01:  ORA     A               ; Clear carry
         MOV     A,B             ; Rotate first byte right
         RAR
         MOV     B,A
         MOV     A,C             ; Rotate carry into second byte
         RAR
         MOV     C,A
         MOV     A,D             ; Rotate carry into third byte
         RAR
         MOV     D,A
         MOV     A,E             ; Rotate carry into fourth byte
         RAR
         MOV     E,A
         DCR     H               ; Decrement shift count
         JNZ     RSHF01          ; Continue until done with shifts
RSHF02:
         ENDM
;
;*****************************
;
; Macro FTADR
;
;         The following macro computes a buffer address based on a base
;         address and a buffer number
;         = Base address + (128 * buffer number)
;         = DE + (128 * A)
;
         EXTRN   BUFADD
FTADR    MACRO
         CALL    BUFADD          ; Use routine in ISOUTL
         ENDM
;
$EJECT
;***********************************************************************
;                                                                       ;
; Subroutine ACCEPT                                                     ;
;                                                                       ;
;         The following subroutine is used to accept a character and flag ;
;         it as awaiting page image.  If the character was vertically sep- ;
;         arated, then both the top and bottom portions are so flagged.   ;
;                                                                       ;
;         Inputs:    DE          Address of character buffer (top if vertical) ;
;                                                                       ;
```

```
LOC  OBJ                 SOURCE STATEMENT
                     ;          Outputs:   Rec Status   Updated for character buffers as awaiting PI  ;
                     ;                                                                                  ;
                     ;          Registers                                                               ;
                     ;          Affected:  A,Flags,DE,HL                                                ;
                     ;                                                                                  ;
                     ;***********************************************************************************
                     ;
                                CSEG
0000 D5              ACCEPT:    PUSH    D            ; Save buffer address
0001 CD0D03      C              CALL    FTRTST       ; Perform feature analysis if necessary
0004 D1                         POP     D            ; Recover buffer address
0005 1A                         LDAX    D            ; Test to see if lower buffer is awaiting font
0006 E610                       ANI     10H          ;   font select
0008 C28600      C              JNZ     ACC015       ; If so, then don't release buffers
000B 211200                     LXI     H,RECLNG     ; Set link to bottom portion
000E 19                         DAD     D
000F 7E                         MOV     A,M
0010 3C                         INR     A            ; Test upper link for null
0011 C21A00      C              JNZ     ACC005       ; If non-null, then process both buffers
0014 2C                         INR     L            ; Set bottom link
0015 7E                         MOV     A,M
0016 3C                         INR     A            ; Test for null
0017 CA4000      C              JZ      ACC010       ; If null, then only one buffer to free
001A D5              ACC005:    PUSH    D            ; Save bottom buffer address
001B 7E                         MOV     A,M          ; Set connecting link
                                FTADR                ; Compute address of bottom buffer
001F 7E                         MOV     A,M          ; Test to see if buffer is awaiting font select
0020 E610                       ANI     10H
0022 D1                         POP     D            ; Recover bottom buffer address
0023 C28600      C              JNZ     ACC015       ; If yes, then don't release buffers
0026 D5                         PUSH    D
0027 E5                         PUSH    H            ; Save address
0028 110800                     LXI     D,RECLCH     ; Test for cloud mask
002B 19                         DAD     D
002C 7E                         MOV     A,M
002D CDB201      C              CALL    CHKACC
0030 C23800      C              JNZ     ACC008
0033 7E                         MOV     A,M
0034 CD8F02      C              CALL    CHGASC
0037 70                         MOV     M,B
0038 E1              ACC008:    POP     H
0039 7E                         MOV     A,M          ; Set status for bottom buffer to awaiting
003A E63D                       ANI     3DH          ;   page image
003C F640                       ORI     RECSWP
003E 77                         MOV     M,A
003F D1                         POP     D
0040 210800          ACC010:    LXI     H,RECLCH
0043 19                         DAD     D
0044 7E                         MOV     A,M
0045 CDB201      C              CALL    CHKACC
0048 C25000      C              JNZ     ACC111
004B 7E                         MOV     A,M
004C CD8F02      C              CALL    CHGASC
004F 70                         MOV     M,B
0050 1A              ACC111:    LDAX    D            ; Set status for input buffer to awaiting
0051 E63D                       ANI     3DH          ;   page image
```

```
LOC  OBJ          LINE        SOURCE STATEMENT

0053 F640          614            ORI     RECSKP
0055 12            615            STAX    D
0056 211700        616  ACC210:   LXI     H,RECPIT
0059 19            617            DAD     D
005A EB            618            XCHG
005B 3A0000    E   619            LDA     RCVPFK
005E B7            620            ORA     A
005F C26C00    C   621            JNZ     ACC012
0062 210000    E   622            LXI     H,RCVCCT
0065 34            623            INR     M                       ; Increment character count
0066 3E0F          624            MVI     A,0FH
0068 12            625            STAX    D
0069 C37500    C   626            JMP     ACC014
006C 211C00    E   627  ACC012:   LXI     H,FRADDR+FONTFT
006F 7E            628            MOV     A,M
0070 E60F          629            ANI     0FH         ; Mask off forced feature analysis bit
0072 F6F0          630            ORI     0F0H        ; Set font known indicator
0074 12            631            STAX    D
                   632  ACC014:
0075 3A0000    E   633  ACC013:   LDA     RCVBHF      ; Check to see if a buffer was held by
0078 B7            634            ORA     A           ;   recognition for touching character purposes
0079 C8            635            RZ
007A AF            636            XRA     A           ; If so, then it is okay to free up that buffer
007B 320000    E   637            STA     RCVBHF      ;   now
007E 2A0000    E   638            LHLD    RCVBHP
0081 EB            639            XCHG
0082 CD0000    C   640            CALL    ACCEPT
0085 C9            641            RET                 ; Exit
                   642  ;
                   643  $EJECT
                   644  ;
                   645  ; The buffer to be released by recognition is flagged as awaiting font select.
                   646  ; Set the links around the buffer to null, so that integrity of the links will
                   647  ; be maintained.
                   648  ;
0086 211100        649  ACC015:   LXI     H,RECLNR    ; Test to see if the right link is null or
0089 19            650            DAD     D           ;   awaiting links
008A 7E            651            MOV     A,M
008B 3C            652            INR     A
008C C8            653            RZ                  ; Jump if null
008D 3C            654            INR     A
008E CAA200    C   655            JZ      ACC020      ; Jump if awaiting touching links
0091 7E            656            MOV     A,M
0092 FE7E          657            CPI     7EH
0094 CAA200    C   658            JZ      ACC020      ; Jump if awaiting non-touching links
0097 7F            659            MOV     A,M         ; Right link is not null, so compute the
                   660            FTADR               ;   address of the buffer to the right and
009B EB            662            XCHG                ;   null out its left link.
009C 211000        663            LXI     H,RECLNL
009F 19            664            DAD     D
00A0 36FF          665            MVI     M,0FFH
00A2 211100        666  ACC020:   LXI     H,RECLNR
00A5 19            667            DAD     D
00A6 36FF          668            MVI     M,0FFH
00A8 C9            669  ACC025:   RET                 ; Exit accept
                   670  ;
                   671  $EJECT
```

```
LOC  OBJ              SOURCE STATEMENT

                 ;*******************************************************************
                 ;
                 ; Subroutine GETNXT
                 ;
                 ;       The following subroutine is used to find the next character buffer
                 ;       which is flagged as awaiting recognition, if one exists.
                 ;
                 ;       Inputs:      RECPTR          Address of current recognition buffer
                 ;                    A               Type of fetch to perform
                 ;                                       0 - next available buffer
                 ;                                       1 - next available bottom buffer
                 ;
                 ;       Outputs:     HL              Address of next character buffer found, if
                 ;                                    there was one
                 ;                    Zero flag       Indication of success of operation:
                 ;                                      Z  = Buffer found
                 ;                                      NZ = Buffer not found
                 ;
                 ;       Registers
                 ;       Affected:    A,Flags,HL,DE
                 ;
                 ;*******************************************************************
                 ;
00A9 47          GETNXT: MOV    B,A            ; Save operation type
00AA 3A47E0              LDA    PCLRCD         ; Get page clear code
00AD B7                  ORA    A              ; Abort recognition ?
00AE CAB400    C         JZ     GTN00X         ;   No, perform buffer search
00B1 AF                  XRA    A              ;   Yes, return no buffer found status to set
00B2 3C                  INR    A
00B3 C9                  RET                   ;        recognition to idle
00B4 C5          GTN00X: PUSH   B              ; Save operation type
00B5 AF          GTN000: XRA    A              ; Unlock system buffer processing
00B6 3248E0              STA    LKSCBC
00B9 FB                  EI                    ; Allow any pending interrupts to occur
00BA 00                  NOP
00BB 00                  NOP
00BC F3                  DI                    ; Don't lock out video processor for too long
00BD 3E01                MVI    A,1            ; Try to lock system buffer processing
00BF 3248E0              STA    LKSCBC
00C2 3A49E0              LDA    LKVCBC         ; Get video buffer processing lock
00C5 B7                  ORA    A              ; Video locked ?
00C6 C2B500    C         JNZ    GTN000         ;   Yes, loop and try again
00C9 2A0AE0              LHLD   RECPTR         ; Get current recognition buffer
00CC 118000      GTN005: LXI    D,SYSCHL       ; Add buffer length to point to next character
00CF 19                  DAD    D              ;   buffer
00D0 7C                  MOV    A,H            ; Get high byte of new address
00D1 FEFF                CPI    HIGH SYSCHE    ; Wrap ?
00D3 C2D900    C         JNZ    GTN010         ;   No, address ok
00D6 2100E7              LXI    H,SYSCHB+100H  ;   Yes, first buffer is next address
00D9 111A00      GTN010: LXI    D,RECDBI       ; Reset double character indicator
00DC EB                  XCHG
00DD 19                  DAD    D
00DE 3600                MVI    M,0
00E0 EB                  XCHG
00E1 7E                  MOV    A,M            ; Get status of new buffer
```

```
LOC  OBJ          LINE        SOURCE STATEMENT

00E2 E6C0           727         ANI     0C0H          ; Mask off all but status bits
00E4 FE80           728         CPI     80H           ; Test for awaiting recognition
00E6 CAFF00   C     729         JZ      GTN020        ; Return result of compare and address
00E9 FE40           730         CPI     40H           ; Awaiting page comp. ?
00EB C2AA01   C     731         JNZ     GTN040        ;   Return if not
00EE 110D00         732         LXI     D,RECSFG      ; Point to separation flag for character
00F1 EB             733         XCHG
00F2 19             734         DAD     D
00F3 7E             735         MOV     A,M           ; Get separation flag
00F4 3C             736         INR     A             ; Message from isolation ?
00F5 C2AA01   C     737         JNZ     GTN040        ;    Return if not
00F8 EB             738         XCHG                  ;   Else, skip this buffer and try the next
00F9 220AE0         739         SHLD    RECPTR        ;     one
00FC C3B500   C     740         JMP     GTN000
                    741 ;
00FF 110D00         742 GTN020: LXI     D,RECSFG      ; Character awaiting rec found
0102 EB             743         XCHG                  ; Point to separation flag for character
0103 19             744         DAD     D
0104 7E             745         MOV     A,M           ; Get separation flag
0105 3C             746         INR     A             ; Message from video ?
0106 C21601   C     747         JNZ     GTN023        ;   No,  continue
0109 1A             748         LDAX    D             ;   Yes, flag as reject, awaiting page comp.
010A F620           749         ORI     020H
010C 12             750         STAX    D
010D 211A00         751         LXI     H,RECDBI      ; Insure that double character flag is reset
0110 19             752         DAD     D
0111 3600           753         MVI     M,0
0113 C31C01   C     754         JMP     GTN025
0116 7E             755 GTN023: MOV     A,M           ; Get flag
0117 E608           756         ANI     08H           ; Horizontal remnant ?
0119 CA5701   C     757         JZ      GTN030        ;   No,  process this character
011C C1             758 GTN025: POP     B             ; Recover operation type
011D 78             759         MOV     A,B
011E 3D             760         DCR     A             ; Update pass ?
011F C5             761         PUSH    B
0120 CA6701   C     762         JZ      GTN030        ;   Yes, don't skip remnant
0123 C1             763         POP     B
0124 EB             764         XCHG                  ;   Yes, flag remnant as awaiting page comp
0125 220AE0         765         SHLD    RECPTR
0128 EB             766         XCHG
0129 211300         767         LXI     H,RECLNB      ; Point to lower link
012C 19             768         DAD     D
012D 7E             769         MOV     A,M           ; Get lower link
012E 3C             770         INR     A             ; Test for null
012F C23801   C     771         JNZ     GTN028        ; Jump if null
0132 2D             772         DCR     L             ; Point to upper link
0133 7E             773         MOV     A,M           ; Get it
0134 3C             774         INR     A             ; Test for null
0135 CA4A01   C     775         JZ      GTN029        ; Jump if null
0138 D5             776 GTN026: PUSH    D             ; Save address
0139 7F             777         MOV     A,M           ; Compute address of linked buffer
                    778         PTADR
013D 111A00         780         LXI     D,RECDBI      ; Clear double character indicator
0140 19             781         DAD     D
0141 3600           782         MVI     M,0
```

```
LOC   OBJ            SOURCE STATEMENT

0143  D1                     POP     D           ; Recover buffer address
0144  211A00                 LXI     H,RECDBI    ; Clear its double character indicator
0147  19                     DAD     D
0148  3600                   MVI     M,0
014A  CD0000    C    GTN029: CALL    ACCEPT
014D  0600                   MVI     B,0
014F  2A0AE0                 LHLD    RECPTR      ; Get new character buffer pointer
0152  111300                 LXI     D,RECLNB    ; Get lower link ?
0155  19                     DAD     D
0156  7E                     MOV     A,M
0157  3C                     INR     A           ; Null lower link ?
0158  CAB400    C            JZ      GTN00X      ;   Yes, get next available buffer
015B  3D                     DCR     A           ;   No,  compute address of bottom buffer
                             PTADR               ;        and use it for new starting point
015F  220AE0                 SHLD    RECPTR
0162  0600                   MVI     B,0
0164  C3B400    C            JMP     GTN00X      ; Get next character buffer awaiting rec
                     ;
0167  C1             GTN030: POP     B           ; Recover status
0168  78                     MOV     A,B
0169  3D                     DCR     A           ; Only want lower buffer ?
016A  C27001    C            JNZ     GTN035      ;   No, continue
016D  211300                 LXI     H,RECLNB    ; Point to lower link
0170  19                     DAD     D
0171  7E                     MOV     A,M
0172  3C                     INR     A           ; Any lower link ?
0173  CA7D01    C            JZ      GTN035      ;   No, jump
0176  EB                     XCHG                ;   Yes, get lower buffer
0177  0601                   MVI     B,1
0179  C5                     PUSH    B
017A  C3C000    C            JMP     GTN005
017D  211B00         GTN035: LXI     H,RECCTR    ; Point to centering indicator for character
0180  19                     DAD     D
0181  7E                     MOV     A,M
0182  B7                     ORA     A           ; Character need to be centered ?
0183  CAA301    C            JZ      GTN038      ;   No,  character is ready for recognition
0186  47                     MOV     B,A
0187  E680                   ANI     80H         ; Already being centered by someone ?
0189  C5                     PUSH    B
018A  C2AA01    C            JNZ     GTN040      ;   Yes, go idle until done
018D  C1                     POP     B
018E  78                     MOV     A,B         ; Set lockout bit in centering flag
018F  F680                   ORI     80H
0191  77                     MOV     M,A
0192  D5                     PUSH    D           ; Save buffer address
0193  FB                     EI                  ; Re-enable interrupts
0194  AF                     XRA     A           ; Unlock system buffer processing
0195  3248E0                 STA     LKSCBC
0198  2A0400    D            LHLD    RCTRCT
019B  23                     INX     H
019C  220400    D            SHLD    RCTRCT
019F  CD0000    E            CALL    HCENTR      ; Re-register character
01A2  D1                     POP     D
01A3  AF             GTN038: XRA     A           ; Unlock system buffer processing
01A4  3248E0                 STA     LKSCBC
```

```
LOC  OBJ              SOURCE STATEMENT

01A7 EB                        XCHG
01A8 FB                        EI                        ; HL <= New character buffer address
01A9 C9                        RET                       ; Re-enable interrupts
                       ;
01AA C1                GTN040: POP     B
01AB FB                        EI                        ; Reset stack
01AC AF                        XRA     A                 ; Re-enable interrupts
01AD 324820                    STA     LKSCBC            ; Set idle status
01B0 3C                        INR     A                 ; Unlock system buffer processing
01B1 C9                        RET
                       ;
                       $EJECT
                       ;**********************************************************************
                       ;
                       ; Subroutine CHKACC
                       ;
                       ;       The following subroutine checks to see if an input ASCII code
                       ;       identifies an accented character.
                       ;
                       ;       Inputs:      A              ASCII code to check
                       ;
                       ;       Outputs:     Zero flag      Success indicator
                       ;                                      NZ = Not accented character
                       ;                                      Z  = Accented character
                       ;
                       ;       Registers
                       ;       Affected:    Flags
                       ;
                       ;**********************************************************************
                       ;
01B2 FE17              CHKACC: CPI     17H
01B4 D2C101      C             JNC     CA1001
01B7 FE10                      CPI     10H
01B9 D2C501      C             JNC     CA1002
01BC FE07                      CPI     07H
01BE DAC501      C             JC      CA1002
                       ;
01C1 3E01              CA1001: MVI     A,1               ; Not accented character
01C3 B7                        ORA     A                 ; Return zero flag reset
01C4 C9                        RET
                       ;
01C5 AF                CA1002: XRA     A                 ; Accented character
01C6 C9                        RET                       ; Return zero flag set
                       ;
                       $EJECT
                       ;**********************************************************************
                       ;
                       ; Subroutine CHKAC2
                       ;
                       ;       The following subroutine was added on 20 Mar 1984 to check an
                       ;       ASCII code to see if it is an accented character.
                       ;
                       ;       Inputs:    A                ASCII code
                       ;
```

```
LOC  OBJ            LINE    SOURCE STATEMENT
                    893 ;         Outputs:  Zero Flag     Success indicator                        ;
                    894 ;                                     NZ - Not accented character          ;
                    895 ;                                     Z  - Accented character              ;
                    896 ;                                                                          ;
                    897 ;         Registers                                                        ;
                    898 ;         Affected: Flags                                                  ;
                    899 ;                                                                          ;
                    900 ;**************************************************************************
                    901 ;
01C7 FE80           902 CHKAC2:   CPI     80H             ; Test against A umlaut
01C9 DA0602    C    903           JC      CA2001          ; If less, not accent
01CC FE83           904           CPI     83H             ; Test against U umlaut
01CF DA0A02    C    905           JC      CA2002
01D1 FE96           906           CPI     96H             ; Test against A angstrom
01D3 CA0A02    C    907           JZ      CA2002
01D6 FE89           908           CPI     89H             ; Test againgst a circumflex
01D8 DA0602    C    909           JC      CA2001
01DB FE8F           910           CPI     8FH
01DD DA0A02    C    911           JC      CA2002
01E0 CA0602    C    912           JZ      CA2001
01E3 FE93           913           CPI     93H
01E5 DA0A02    C    914           JC      CA2002
01E8 FE95           915           CPI     95H
01EA DA0602    C    916           JC      CA2001
01ED FE97           917           CPI     97H
01EF DA0A02    C    918           JC      CA2002
01F2 FE99           919           CPI     99H
01F4 DA0602    C    920           JC      CA2001
01F7 FE9F           921           CPI     9FH
01F9 DA0A02    C    922           JC      CA2002
01FC FED0           923           CPI     0E0H
01FE DA0602    C    924           JC      CA2001
0201 FEFE           925           CPI     0FEH
0203 DA0A02    C    926           JC      CA2002
0206 3E01           927 CA2001:   MVI     A,1
0208 B7             928           ORA     A
0209 C9             929           RET
                    930
020A AF             931 CA2002:   XRA     A
020B C9             932           RET
                    933 ;
                    934 $EJECT
                    935 ;**************************************************************************
                    936 ;                                                                          ;
                    937 ;  Subroutine AWLCHK                                                       ;
                    938 ;                                                                          ;
                    939 ;         The following subroutine is used to determine if it is allowable ;
                    940 ;         for recognition to enter an awaiting links mode.  This will be   ;
                    941 ;         allowed only when there are no other buffers awaiting recognition.;
                    942 ;                                                                          ;
                    943 ;         Inputs:     RECPTR        Current recognition buffer             ;
                    944 ;                                                                          ;
                    945 ;         Outputs:    Zero Flag     Set - Another buffer awaiting rec was found ;
                    946 ;                                   Reset - No buffers found               ;
                    947 ;                                                                          ;
```

```
LOC  OBJ          LINE       SOURCE STATEMENT

                   948 ;          Registers
                   949 ;          Affected:  All                                                       ;
                   950 ;                                                                                ;
                   951 ;*********************************************************************************
                   952 ;
020C AF            953 AWLCHK: XRA     A               ; Return no buffer found status
020D 3C            954         INR     A
020E C9            955         RET
                   956 ;
020F 2A0AE0        957         LHLD    RECPTR          ; Set current buffer address
0212 EB            958         XCHG
0213 1A            959         LDAX    D               ; Set buffer status to C2 so that GETNXT will
0214 F6C2          960         ORI     0C2H            ;   not grab this buffer up again
0216 12            961         STAX    D
0217 211200        962         LXI     H,RECLNU        ; Point to link up
021A 19            963         DAD     D
021B 7E            964         MOV     A,M             ; Set vertical link
021C 3C            965         INR     A               ; Any upper buffer ?
021D CA2602     C  966         JZ      AWLOD5          ;   No, jump
0220 3D            967         DCR     A               ; Restore link
                   968         PTADR                   ; Compute buffer address of top portion
0224 7E            970         MOV     A,M             ; Set buffer status for top buffer to C2 also
0225 F6C2          971         ORI     0C2H
0227 77            972         MOV     M,A
0228 0631          973 AWLOD5: MVI     B,SYSCHC-1      ; Use one less than total buff ct for search
022A CDA900     C  974         CALL    GETNXT          ; Use search routine in GETNXT
022D F5            975         PUSH    PSW             ; Save return status
022E E5            976         PUSH    H               ; Save buffer awaiting reg (if any)
022F 2A0AE0        977         LHLD    RECPTR          ; Set current buffer pointer
0232 7E            978         MOV     A,M             ; Restore status for this buffer to what
0233 E6BD          979         ANI     0BDH            ;   it was before entering AWLCHK
0235 77            980         MOV     M,A
0236 111200        981         LXI     D,RECLNU        ; Point to link up
0239 19            982         DAD     D
023A 7E            983         MOV     A,M             ; Set link
023B 3C            984         INR     A               ; Any upper portion ?
023C CA4702     C  985         JZ      AWL010          ;   No,  jump
023F 3D            986         DCR     A               ; Restore link
                   987         PTADR                   ; Compute address of vertical portion
0243 7E            989         MOV     A,M             ; Restore status on upper buffer also
0244 E6BD          990         ANI     0BDH
0246 77            991         MOV     M,A
0247 E1            992 AWL010: POP     H               ; Recover buffer address
0248 F1            993         POP     PSW             ; Recover return status
0249 C0            994         RNZ                     ; Return if no buffer found
024A E5            995         PUSH    H               ; Save buffer address
024B 2A0AE0        996         LHLD    RECPTR          ; Set left link of current buffer to null
024E 111000        997         LXI     D,RECLNL
0251 19            998         DAD     D
0252 36FF          999         MVI     M,0FFH
0254 E1           1000         POP     H
0255 C9           1001         RET
                  1002 ;
                  1003 $EJECT
```

```
LOC  OBJ             SOURCE STATEMENT

           ;*********************************************************************
           ;                                                                    ;
           ; Subroutine VERDIM                                                  ;
           ;                                                                    ;
           ;        The following subroutine is used to compute the starting and ending ;
           ;        columns in the recombination buffer for vertical separation. ;
           ;                                                                    ;
           ;        Inputs:    DE          Address of current character buffer  ;
           ;                                                                    ;
           ;        Outputs:   B           Starting column                      ;
           ;                   C           Ending column                        ;
           ;                   RCVLAC      Indicator that left character is accented ;
           ;                   RCVRAC      Indicator that right character is accented ;
           ;                                                                    ;
           ;        Registers                                                   ;
           ;        Affected:  PSW,BC,HL                                        ;
           ;                                                                    ;
           ;*********************************************************************
           ;
0256 211500       VERDIM: LXI   H,RECCST      ; Get recognition state for character
0259 19                   DAD   D
025A 7E                   MOV   A,M
025B E601                 ANI   RCSNML        ; Normal ?
025D CA6502   C           JZ    VRD001        ;   No,  continue
0260 0600                 MVI   B,0           ;   Yes, set default values for B and C
0262 0E17                 MVI   C,23
0264 C9                   RET
0265 7E           VRD001: MOV   A,M           ; Get state
0266 E606                 ANI   RCSLFT        ; Left ?
0268 CA7902   C           JZ    VRD005        ;   No,  continue
026B 3E01                 MVI   A,1           ;   Yes, signal left character accented
026D 0600                 MVI   B,0           ;        Start at left
026F 3A0000   E           LDA   RCVCCC        ;        Current cut column is end column
0272 4F                   MOV   C,A
0273 FE18                 CPI   24            ;   Too wide ?
0275 D8                   RC                  ;     No,  exit
0276 0E17                 MVI   C,23          ;     Yes, use default
0278 C9                   RET
0279 3E01         VRD005: MVI   A,1           ; Right state, so signal right character
027B 320000   E           STA   RCVRAC        ;   is accented
027E 3A0000   E           LDA   RCVCCC        ; Use current cut column as start column
0281 47                   MOV   B,A
0282 3A0000   E           LDA   RCVECC        ; Use ending column as end
0285 4F                   MOV   C,A
0286 90                   SUB   B             ; Test to insure total width not greater
0287 FE18                 CPI   24            ;   than 24
0289 D8                   RC                  ; Return if so
028A 78                   MOV   A,B           ; Else add 23 to start value to give end
028B C617                 ADI   23            ;   column
028D 4F                   MOV   C,A
028E C9                   RET
           ;
           $EJECT
```

```
LOC  OBJ        LINE        SOURCE STATEMENT

                1057 ;*************************************************************************
                1058 ;                                                                        ;
                1059 ; Subroutine CHGASC                                                      ;
                1060 ;                                                                        ;
                1061 ;          The following subroutine is used to determine the ASCII code which
                1062 ;          goes with a particular cloud mask ASCII.  If it is not a cloud
                1063 ;          mask, then the original ASCII is returned.                    ;
                1064 ;                                                                        ;
                1065 ;          Inputs:     A              ASCII to change                    ;
                1066 ;                                                                        ;
                1067 ;          Outputs:    B              New ASCII                          ;
                1068 ;                                                                        ;
                1069 ;          Registers                                                     ;
                1070 ;          Affected:   Flags,BC                                          ;
                1071 ;                                                                        ;
                1072 ;*************************************************************************
                1073 ;
028F 4F         1074 CHGASC: MOV    C,A               ; Save original ASCII
0290 0641       1075         MVI    B,'A'
0292 B7         1076         ORA    A                 ; Test for A cloud mask
0293 C8         1077         RZ
0294 0645       1078         MVI    B,'E'
0296 3D         1079         DCR    A                 ; Test for E cloud mask
0297 C8         1080         RZ
0298 0649       1081         MVI    B,'I'             ; Test for I cloud mask
029A 3D         1082         DCR    A
029B C8         1083         RZ
029C 064F       1084         MVI    B,'O'             ; Test for O cloud mask
029E 3D         1085         DCR    A
029F C8         1086         RZ
02A0 0655       1087         MVI    B,'U'             ;  Test for U cloud mask
02A2 3D         1088         DCR    A
02A3 C8         1089         RZ
02A4 064E       1090         MVI    B,'N'             ; Test for N cloud mask
02A6 3D         1091         DCR    A
02A7 C8         1092         RZ
02A8 79         1093         MOV    A,C               ; get original ASCII
02A9 D60F       1094         SUI    0FH               ; Subtract offset
02AB 0661       1095         MVI    B,'a'             ; Test for a cloud mask
02AD 3D         1096         DCR    A
02AE C8         1097         RZ
02AF 0665       1098         MVI    B,'e'             ; Test for e cloud mask
02B1 3D         1099         DCR    A
02B2 C8         1100         RZ
02B3 0669       1101         MVI    B,'i'             ; Test for i cloud mask
02B5 3D         1102         DCR    A
02B6 C8         1103         RZ
02B7 066F       1104         MVI    B,'o'             ; Test for o cloud mask
02B9 3D         1105         DCR    A
02BA C8         1106         RZ
02BB 0675       1107         MVI    B,'u'             ; Test for u cloud mask
02BD 3D         1108         DCR    A
02BE C8         1109         RZ
02BF 066E       1110         MVI    B,'n'             ; Test for n cloud mask
02C1 3D         1111         DCR    A
```

```
LOC  OBJ            SOURCE STATEMENT

02C2 C8                     RZ
02C3 41                     MOV     B,C             ; Use original ASCII
02C4 C9                     RET
                    ;
                    $EJECT

                    ;**********************************************************************
                    ;                                                                     ;
                    ; Subroutine ALOCRB                                                   ;
                    ;                                                                     ;
                    ;       The following subroutine is used to allocate one of the two  ;
                    ;       reserved character buffers to the recognition process.       ;
                    ;                                                                     ;
                    ;       Inputs:     RESBFQ       Queue of buffers available to recognition ;
                    ;                                                                     ;
                    ;       Outputs:    HL           Address of allocated buffer          ;
                    ;                   Carry flag   Operation status                     ;
                    ;                                   Set   = No available buffers     ;
                    ;                                   Reset = Successful allocation    ;
                    ;                                                                     ;
                    ;       Registers                                                     ;
                    ;       Affected:   All                                               ;
                    ;                                                                     ;
                    ;**********************************************************************
                    ;
                    ALOCRB:
                    ;
02C5 2A0000     D           LHLD    RESBF1          ; Get first available buffer
02C8 7C                     MOV     A,H             ; Get high byte of address
02C9 3C                     INR     A               ; Already allocated ?
02CA CAD802     C           JZ      ALB005          ;   Yes, try second buffer
02CD 11FFFF                 LXI     D,0FFFFH        ;   No,  then allocate this one
02D0 EB                     XCHG                    ; Flag as allocated
02D1 220000     D           SHLD    RESBF1
02D4 EB                     XCHG                    ; HL <= buffer address
02D5 C3E802     C           JMP     ALB010          ; Exit
02D8 2A0200     D   ALB005: LHLD    RESBF2          ; Get second available buffer
02DB 7C                     MOV     A,H             ; Get high byte of address
02DC 3C                     INR     A               ; Already allocated ?
02DD CAEB02     C           JZ      ALB015          ;   Yes, not able to allocated now
02E0 11FFFF                 LXI     D,0FFFFH        ;   No,  then allocate this one
02E3 EB                     XCHG                    ; Flag as allocated
02E4 220200     D           SHLD    RESBF2
02E7 EB                     XCHG                    ; HL <= buffer address
02E8 37             ALB010: STC                     ; Successful operation
02E9 3F                     CMC                     ; Reset carry flag and exit
02EA C9                     RET
02EB 37             ALB015: STC                     ; Unsuccessful operation
02EC C9                     RET                     ; Set carry flag and exit
                    ;
                    $EJECT
```

```
LOC  OBJ              SOURCE STATEMENT

                ;*************************************************************************
                ;                                                                        ;
                ; Subroutine DLOCRB                                                      ;
                ;                                                                        ;
                ;       The following subroutine is used to deallocate a buffer to the   ;
                ;       reserved buffer queue after it is processed by recognition.      ;
                ;                                                                        ;
                ;       Inputs:     HL            Address of buffer to deallocate        ;
                ;                   RESBFQ        Queue of available character buffers   ;
                ;                                                                        ;
                ;       Outputs:    None                                                 ;
                ;                                                                        ;
                ;       Registers                                                        ;
                ;       Affected:   All                                                  ;
                ;                                                                        ;
                ;*************************************************************************
                ;
                DLOCRB:
                ;
02ED 3A0000  D          LDA     RESBF1          ; Get low byte of first queue entry
02F0 3C                 INR     A               ; This value empty ?
02F1 C2FA02  C          JNZ     DLB005          ;   No,  try next entry
02F4 220000  D          SHLD    RESBF1          ;   Yes, save buffer address
02F7 C3FD02  C          JMP     DLB010          ; Continue with flagging of buffer
02FA 220200  D  DLB005: SHLD    RESBF2          ; Save buffer address in second entry
02FD 3682       DLB010: MVI     M,082H          ; Flag buffer as reserved for recognition
02FF C9                 RET                     ; Exit
                ;
0300 2100E6     INITRB: LXI     H,SYSCHB        ; Put the addresses of the first two
0303 220000  D          SHLD    RESBF1          ;   character buffers in the reserved queue
0306 1180E6             LXI     D,SYSCHB+80H
0309 220200  D          SHLD    RESBF2
030C C9                 RET
                ;
                $EJECT
                ;*************************************************************************
                ;                                                                        ;
                ; Subroutine FTRTST                                                      ;
                ;                                                                        ;
                ;       The following subroutine is used to determine whether or not a   ;
                ;       character needs to be run through feature analysis.  If it does, ;
                ;       then feature analysis is performed on it.                        ;
                ;                                                                        ;
                ;       Inputs:     DE            Address of character buffer            ;
                ;                                                                        ;
                ;       Outputs:    Rec Status    Updated for character buffers as awaiting PI ;
                ;                                                                        ;
                ;       Registers                                                        ;
                ;       Affected:   A,Flags,DE,HL                                        ;
                ;                                                                        ;
                ;*************************************************************************
                ;
                        CSEG
```

```
LOC  OBJ           LINE        SOURCE STATEMENT

030D 210D00        1215 FTRTST: LXI    H,RECSFS        ; Point to separation flag for character
0310 19            1216         DAD    D
0311 7E            1217         MOV    A,M             ; Get flag
0312 E608          1218         ANI    08H             ; Horizontal remnant ?
0314 C0            1219         RNZ                    ;   Yes, don't perform feature analysis
0315 210F00        1220         LXI    H,RECSAC        ; Test to see if the character was rejected
0318 19            1221         DAD    D               ;   because of separation.  If so, then try
0319 7E            1222         MOV    A,M             ;   to see if the conflict can be resolved
031A FE02          1223         CPI    2               ;   in feature analysis.
031C C22303    C   1224         JNZ    FTR005          ; Jump if not separation reject
031F CD0000    E   1225         CALL   RECFTR          ; Else, perform feature analysis
0322 C9            1226         RET
0323 3A0000    E   1227 FTR005: LDA    PSFLAG          ; Get P.S. indicator in case known
0326 47            1228         MOV    B,A             ; Save it
0327 E60F          1229         ANI    0FH             ; P.S. font ?
0329 C8            1230         RZ                     ;   No, don't do feature analysis
032A 78            1231         MOV    A,B             ; Get P.S. indicator
032B E6F0          1232         ANI    0F0H            ; Mask off all but forced feature analysis
032D E610          1233         ANI    10H             ; Forced feature analysis ?
032F C40000    E   1234         CNZ    RECFTR          ;   Yes, try feature analysis
0332 C9            1235         RET
                   1236 ;
                   1237         END

ASSEMBLY COMPLETE,   NO ERRORS
```

```
  1 $NOLIST
295 $LIST
296 $TITLE('Recognition character separaration - F   S')
297 ;
298 ;       ***************************************************
299 ;       *                                                 *
300 ;       *  Recognition horizontal and vertical separation *
301 ;       *                                                 *
302 ;       ***************************************************
303 ;
304 ; Public procedure definitions
305 ;
306         PUBLIC  VERSEP         ; Vertical character separation
307         PUBLIC  HORSEP         ; Horizontal character separation
308         PUBLIC  RDBINT         ; Initialization for double => touch processing
309 ;
310 ; External procedures used
311 ;
312         EXTRN   FNDBLK         ; For finding next black bit in a byte string
313         EXTRN   CCENTR         ; For centering a character in the rec buffer
314         EXTRN   VRECM2         ; For moving a character to the recom buffer
315         EXTRN   CRCSHD         ; For creating shadows of char in char buffer
316         EXTRN   CRSHAD         ; For creating shadows of char in recom buffer
317         EXTRN   BUFLOD         ; For moving a char from recom to char buffer
318         EXTRN   PRTCHR
319 ;
```

```
LOC  OBJ        LINE        SOURCE STATEMENT

                ; External variables used
                ;
                        EXTRN   RCLPTR          ; Pointer to left character buffer
                        EXTRN   RCLTPT          ; Pointer to left upper remnant buffer (if any)
                        EXTRN   RCRPTR          ; Pointer to right character buffer
                        EXTRN   RCRTPT          ; Pointer to right upper remnant buffer(if any)
                        EXTRN   RCVCCC          ; Current cut column in recombination buffer
                        EXTRN   RCVECC          ; Ending column in recombination buffer
                        EXTRN   RCVFPS          ; First pass indicator for horizontal retry
                        EXTRN   RCVLAC          ; Indicator whether left char is accented
                        EXTRN   RCVLPS          ; Last pass indicator through retry
                        EXTRN   RCVOCC          ; Original cut column between characters
                        EXTRN   RCVRAC          ; Indicator whether right char is accented
                        EXTRN   RCVRHO          ; Horizontal offset to first char in rec. buf
                        EXTRN   RCVRTC          ; Number of times horizontal retry tried
                        EXTRN   RCVRVO          ; Vertical offset of recombination buffer
                        EXTRN   TOPBLK          ; Uppermost black in character
                        EXTRN   BTMBLK          ; Lowermost black in character
                        EXTRN   LFTBLK          ; Leftmost black in character
                        EXTRN   RITBLK          ; Rightmost black in character
                        EXTRN   SHFTCT          ; Shift count for character shadows
                        EXTRN   SHADH1          ; Horizontal character shadow
                        EXTRN   SHADH2
                        EXTRN   SHADH3
                        EXTRN   SHADV1          ; Vertical character shadow
                        EXTRN   SHADV2
                        EXTRN   SHADV3
                        EXTRN   SHADV4
                        EXTRN   SHADV5
                        EXTRN   RLBYTE          ; Left byte of character shadow
                        EXTRN   RRBYTE          ; Right byte of character shadow
                        EXTRN   RTBYTE          ; Top byte of character shadow
                        EXTRN   RBBYTE          ; Bottom byte of character shadow
                        EXTRN   ISFLAG          ; Proportional space flag
                        EXTRN   RCVPFK          ; Primary font known flag
                ;
                $EJECT
                ;
                ; Local variable declarations
                ;
                        DSEG
0000            RCVBCC: DS      1       ; Best cut column for characters
0001            RCVBLC: DS      1       ; Best large (x3) cut point
0002            RCVBSL: DS      1       ; Best score for left character
0003            RCVBSR: DS      1       ; Best score for right character
0004            RCVCIN: DS      1       ; Cut increment
0005            RCVLCT: DS      1       ; Number of large cuts made to characters
0006            RCVSCT: DS      1       ; Number of small cuts made to characters
                ;
0007            NXTBLK: DS      1       ; Uppermost black of bottom of character
0008            NXTWHT: DS      1       ; White space between areas of black
0009            LT1BLK: DS      1       ; Bottom black of bottom character
000A            WIDTH:  DS      1       ; Total character width
000B            BRKROW: DS      1       ; Break row for vertical separation
```

```
LOC  OBJ        LINE     SOURCE STATEMENT

000C                 SEPFLG: DS      1              ; Vertical separation process flag
                     ;
000D                 RCOUNT: DS      1              ; Row count for character buffer fill
                     ;
000E                 TEMP1:  DS      3              ; Temp storage for shadows
                     ;
0011                 LCUTFG: DS      1              ; Large cut flag
                     ;
                     $EJECT
                     ;
                     ; Macro definitions
                     ;
                     $INCLUDE(:F1:MACROS.INC)
                =    ;
                =    ;*****************************
                =    ;
                =    ; Macro LSHFT4
                =    ;
                =    ;       The following macro performs a four register shift operation.
                =    ;       The contents in the register string B,C,D,E are shifted left
                =    ;       (A) times.
                =    ;
                =    LSHFT4  MACRO
                =            LOCAL   LSHF01         ; Local label definitions
                =            LOCAL   LSHF02
                =            MOV     H,A            ; Move counter to H
                =            ORA     A              ; Test for zero initially
                =            JZ      LSHF02         ; If zero, then don't do shift
                =    LSHF01: ORA     A              ; Clear carry
                =            MOV     A,E            ; Rotate fourth byte left
                =            RAL
                =            MOV     E,A
                =            MOV     A,D            ; Rotate carry into third byte
                =            RAL
                =            MOV     D,A
                =            MOV     A,C            ; Rotate carry into second byte
                =            RAL
                =            MOV     C,A
                =            MOV     A,B            ; Rotate carry into first byte
                =            RAL
                =            MOV     B,A
                =            DCR     H              ; Decrement shift count
                =            JNZ     LSHF01         ; Continue until done with shifts
                =    LSHF02:
                =            ENDM
                =    ;
                =    ;*****************************
                =    ;
                =    ; Macro RSHFT4
                =    ;
                =    ;       The following macro performs a four register shift operation.
                =    ;       The contents of the register string B,C,D,E are shifted right
                =    ;       (A) times.
                =    ;
                =    RSHFT4  MACRO
```

LOC OBJ LINE SOURCE STATEMENT

```
        LOCAL   RSHF01          ; Local label definitions
        LOCAL   RSHF02
        MOV     H,A             ; Move counter to H
        ORA     A               ; Test for zero initially
        JZ      RSHF02          ; If zero, then don't do shift
RSHF01: ORA     A               ; Clear carry
        MOV     A,B             ; Rotate first byte right
        RAR
        MOV     B,A
        MOV     A,C             ; Rotate carry into second byte
        RAR
        MOV     C,A
        MOV     A,D             ; Rotate carry into third byte
        RAR
        MOV     D,A
        MOV     A,E             ; Rotate carry into fourth byte
        RAR
        MOV     E,A
        DCR     H               ; Decrement shift count
        JNZ     RSHF01          ; Continue until done with shifts
RSHF02:
        ENDM
;
;*****************************
;
; Macro PTADR
;
;       The following macro computes a buffer address basal on a base
;       address and a buffer number
;       = Base address + (128 * buffer number)
;       = DE + (128 * A)
;
        EXTRN   BUFADD
PTADR   MACRO
        CALL    BUFADD          ; Use routine in ISOUTL
        ENDM
;
$EJECT
;****************************************************************************
;
; Subroutine VERSEP
;
;       The following subroutine is used to vertically separate an accent
;       from the character below it. The total character is in a recom-
;       bination buffer which is divided into the accent in one character
;       buffer and the character below it in another. Multiple passes are
;       possible on the separation to try to find the best spot to break
;       the character. For an oversize character on the first attempt at
;       vertical separation, a check can be made to see if the character
;       is actually or may be an accented character. If it is not, then
;       no separation takes place.
;
;       Inputs:    A                High order nibble
;                                     Indicator as to whether first pass
```

```
LOC  OBJ              SOURCE STATEMENT
                  ;                                         0 = first pass                               ;
                  ;                                         1 = later pass                               ;
                  ;                                      Low order nibble                                ;
                  ;                                        Indicator for accented character test         ;
                  ;                                          0 = don't bother with test                  ;
                  ;                                          1 = perform test for accented character     ;
                  ;                           B          Starting column in recombination buffer        ;
                  ;                           C          Ending column in recombination buffer          ;
                  ;                           DE         Address of buffer to put top portion (accent)  ;
                  ;                           HL         Address of buffer to put lower portion (char)  ;
                  ;                           SYSBCM     Recombination buffer containing character      ;
                  ;                           PRVBRK     Previous row at which character was broken     ;
                  ;                                      for multi-pass operation                       ;
                  ;                                                                                     ;
                  ;           Outputs:        (DE)       Top portion of character (accent)              ;
                  ;                           (HL)       Bottom portion of character (character)        ;
                  ;                           Zero flag  Indication of successful break                 ;
                  ;                                        Z  = Successful separation point found       ;
                  ;                                        NZ = No separation point found               ;
                  ;                           Carry flag Indication of accented character for over-     ;
                  ;                                      size character test                            ;
                  ;                                        C  = Character is not an accented character  ;
                  ;                                        NC = Character is an accented character      ;
                  ;                                                                                     ;
                  ;                                                                                     ;
                  ;           Registers                                                                 ;
                  ;           Affected:  All                                                            ;
                  ;                                                                                     ;
                  ;**************************************************************************************
                  ;
                              CSEG
0000 D5           VERSEP:     PUSH     D                    ; Save input registers
0001 E5                       PUSH     H
0002 C5                       PUSH     B
0003 F5                       PUSH     PSW
0004 320000   D               STA      SEPFLG
                  ;
                  ; Create vertical shadows of the character in the recombination buffer
                  ;
0007 CD0000   E               CALL     CRSHAD
                  ;
                  $EJECT
                  ;************************************
                  ;
                  ; Compute the leftmost and rightmost black in the character.
                  ;
000A 210000   E               LXI      H,SHADH1             ; Compute leftmost black
000D 0600                     MVI      B,0
000F 0E17                     MVI      C,23
0011 3E01                     MVI      A,1
0013 CD0000   E               CALL     FNDBLK
0016 320000   E               STA      LFTBLK
0019 210000   E               LXI      H,SHADH3             ; Compute rightmost black
001C 0617                     MVI      B,23
001E 0E00                     MVI      C,0
```

```
LOC  OBJ           LINE        SOURCE STATEMENT

0020 3EFF          537                MVI     A,-1
0022 CD0000   E    538                CALL    FNDBLK
0025 320000   E    539                STA     RITBLK
0028 47            540                MOV     B,A                ; Compute width of total character
0029 3A0000   E    541                LDA     LFTBLK             ;   = RITBLK - LFTBLK + 1
002C 4F            542                MOV     C,A
002D 78            543                MOV     A,B
002E 91            544                SUB     C
002F 3C            545                INR     A
0030 320A00   D    546                STA     WIDTH
                   547  ;
                   548  $EJECT
                   549  ;**********************************
                   550  ;
                   551  ; Test to see if there is white space between the top and bottom portions
                   552  ; of the character.  If there is, then this is the place to separate the
                   553  ; character
                   554  ;
0033 210000   E    555                LXI     H,SHADV1           ; Starting byte of vertical shadow
0036 010805        556                LXI     B,508H             ; B <= Number of vertical shadow bytes
                   557                                           ; C <= Number of bits per byte
0039 1600          558                MVI     D,0                ; Initialize total shadow counter
003B 7E            559                MOV     A,M                ; Get first shadow byte
                   560  ;
                   561  ; Look for first black bit
                   562  ;
003C B7            563  BLKLP1:   ORA     A                      ; Clear carry
003D 17            564                RAL                        ; Rotate leftmost bit into carry
003E DA5100   C    565                JC      FNDBL1             ; If carry set, then black found
0041 14            566                INR     D                  ; Increment total shadow counter
0042 0D            567                DCR     C                  ; Otherwise, decrement bit counter
0043 C23C00   C    568                JNZ     BLKLP1             ; Continue until done with byte
0046 23            569                INX     H                  ; Done with byte, get next one
0047 7E            570                MOV     A,M
0048 0E08          571                MVI     C,8                ; Reinitialize bit counter
004A 05            572                DCR     B                  ; Decrement byte counter
004B C23C00   C    573                JNZ     BLKLP1             ; Continue for all bytes
004E C3FA00   C    574                JMP     NOWHIT             ; If shadow exhausted, than no white bet. black
                   575  ;
                   576  ; Look for white bit in shadow
                   577  ;
0051 F5            578  FNDBL1:   PUSH    PSW                    ; Save current byte
0052 7A            579                MOV     A,D                ; Save total shadow counter as top black
0053 320000   E    580                STA     TOPBLK             ;   in character
0056 3A0C00   D    581                LDA     SEPFLG             ; Get separation processing flag
0059 E60F          582                ANI     0FH                ; Test for not first pass
005B C2CB00   C    583                JNZ     LTRPAS             ; Jump if later pass
005E F1            584                POP     PSW                ; Recover current byte
005F 14            585                INR     D                  ; Increment total shadow counter
0060 0D            586                DCR     C                  ; Decrement count for last rotate
0061 C26C00   C    587                JNZ     WITLP1             ; Continue if byte not exhausted
0064 05            588                DCR     B                  ; Decrement byte counter
0065 CAFA00   C    589                JZ      NOWHIT             ; If shadow exhausted, than no white
0068 0E08          590                MVI     C,8                ; Reinitialize bit counter
```

```
LOC  OBJ            LINE        SOURCE STATEMENT

006A 23              591           INX    H
006B 7E              592           MOV    A,M           ; Get next byte of shadow
006C B7              593  WITLP1:  ORA    A             ; Clear carry
006D 17              594           RAL                  ; Rotate leftmost bit into carry
006E D28100    C     595           JNC    FNDWT1        ; If carry reset, then white found
0071 14              596           INR    D             ; Increment total shadow counter
0072 0D              597           DCR    C             ; Else, decrement bit counter
0073 C26C00    C     598           JNZ    WITLP1        ; Continue for all bits
0076 0E08            599           MVI    C,8           ; If bit count exhausted, reinitialize
0078 23              600           INX    H             ; Get next byte of shadow
0079 7E              601           MOV    A,M
007A 05              602           DCR    B             ; Decrement byte counter
007B C26C00    C     603           JNZ    WITLP1        ; Continue for all bytes

007E C3FA00    C     604           JMP    NOWHIT        ; If shadow exhausted, then no white
                     605  ;
                     606  ; Look for another black bit following the white one
                     607  ;
0081 F5              608  FNDWT1:  PUSH   PSW           ; Save current byte
0082 7A              609           MOV    A,D           ; Save total shadow count as white found
0083 320800    D     610           STA    NZTWHT        ;   between black
0086 F1              611           POP    PSW           ; Recover current byte
0087 14              612           INR    D             ; Increment total shadow count
0088 0D              613           DCR    C             ; Decrement bit counter for last rotate
0089 C29400    C     614           JNZ    BLKLP2        ; Continue if not exhausted
008C 23              615           INX    H             ; Else, get next byte of shadow
008D 7E              616           MOV    A,M
008E 0E08            617           MVI    C,8           ; Reinitialize bit counter
0090 05              618           DCR    B             ; Decrement byte counter
0091 CAFA00    C     619           JZ     NOWHIT        ; No white between black if already zero
0094 B7              620  BLKLP2:  ORA    A             ; Clear carry flag
0095 17              621           RAL                  ; Rotate leftmost bit into carry
0096 DAA900    C     622           JC     FNDBL2        ; If carry set, then black found
0099 14              623           INR    D             ; Else, increment total shadow count
009A 0D              624           DCR    C             ; Decrement bit counter
009B C29400    C     625           JNZ    BLKLP2        ; Continue if byte not exhausted
009E 23              626           INX    H             ; Get next byte of shadow
009F 7E              627           MOV    A,M
00A0 0E08            628           MVI    C,8           ; Reinitialize bit counter
00A2 05              629           DCR    B             ; Decrement byte counter
00A3 C29400    C     630           JNZ    BLKLP2        ; Continue while all bytes not done
00A6 C3FA00    C     631           JMP    NOWHIT        ; If another black not found, then no white
                     632                                ;   between blacks
                     633  ;
                     634  $EJECT
                     635  ;**********************************
                     636  ;
                     637  ; White space was found between areas of black, so divide the character there
                     638  ;
                     639  ;**************************************************************************
                     640  ;
                     641  ; Changed 21 Feb 1984 to allow for taller accents
                     642  ;
00A9 F5              643  FNDBL2:  PUSH   PSW           ; Save current byte
```

```
LOC  OBJ          LINE        SOURCE STATEMENT

00AA 3A0000   E    644         LDA    TOPBLK         ; Test to insure that the top portion is a
00AD D5            645         PUSH   D
00AE 5F            646         MOV    E,A
00AF 7A            647         MOV    A,D
00B0 93            648         SUB    E
00B1 D1            649         POP    D
00B2 FE12          650         CPI    18             ;   valid size (height < 18)
00B4 D2F900   C    651         JNC    NOWHT1         ; Jump if too large a top portion
00B7 3A0000   E    652         LDA    TOPBLK         ; Test to insure that the top portion is taller
00BA C603          653         ADI    3              ;   than four pixels
00BC BA            654         CMP    D
00BD D2EB00   C    655         JNC    CNTSRC         ; Continue search if not
00C0 F1            656         POP    PSW            ; Restore stack
                   657 ;
                   658 ;*******************************************************************
                   659 ;
00C1 7A            660         MOV    A,D            ; Save total shadow counter as top of next
00C2 320700   D    661         STA    NXTBLK         ;   black region
00C5 3A0800   D    662         LDA    NXTWHT         ; Save white space between black as break
00C8 320B00   D    663         STA    BRKROW         ;   row for the character
00CB C32601   C    664         JMP    VERLOD         ; Load top and bottom character buffers
                   665 ;
00CE F1            666 LTRPAS: POP    PSW            ; Reset stack
                   667 ;
                   668 ;*******************************************************************
                   669 ;
                   670 ;  Added 22 Feb 1984 to allow for recovery from an accented character retry
                   671 ;
00CF 3A0C00   D    672         LDA    SUPFLG         ; Set status flag for separation
00D2 E60F          673         ANI    0FH            ; Set mode
00D4 3D            674         DCR    A              ; Check for later pass
00D5 CA1301   C    675         JZ     NOTFST         ; If later pass, then process
00D8 3A0B00   D    676         LDA    BRKROW         ; Else, in recovery mode
00DB 3D            677         DCR    A              ; Cut characters one row above current cut
00DC 320B00   D    678         STA    BRKROW
00DF 320800   D    679         STA    NXTWHT
00E2 320700   D    680         STA    NXTBLK
00E5 C32601   C    681         JMP    VERLOD
                   682 ;
                   683 ;*******************************************************************
                   684 ;
                   685 ;  Added 7 Mar 1984 to not break at noise above an accent
                   686 ;
00E8 F1            687 CNTSRC: POP    PSW            ; Recover current byte
00E9 14            688         INR    D              ; Increment total shadow count
00EA 0D            689         DCR    C              ; Decrement bit counter
00EB C23C00   C    690         JNZ    BLKLP1         ; Continue search if byte not exhausted
00EE 23            691         INX    H              ; Get next byte of shadow
00EF 7E            692         MOV    A,M
00F0 0E08          693         MVI    C,8            ; Initialize bit counter
00F2 05            694         DCR    B              ; Decrement byte counter
00F3 CAFA00   C    695         JZ     NOWHT1         ; No white break if shadow exhausted
00F6 C33C00   C    696         JMP    BLKLP1         ; Continue search
                   697 ;
                   698 $EJECT
```

```
LOC  OBJ          LINE     SOURCE STATEMENT

                           ;***********************************
                           ;
                           ; No white space was found between areas of black.  Test to see if a test
                           ; is desired to see if its an accented character.  If so, then don't do
                           ; separation but exit with flags set.  Otherwise, determine a place to
                           ; break the character and load the character buffers.
                           ;
00F9 F1                    NOWHT1: POP     PSW          ; Reset stack
00FA F1                    NOWHIT: POP     PSW          ; Recover flags
00FB F5                            PUSH    PSW
00FC E6F0                          ANI     0F0H         ; Is test flag non-zero ?
00FE C29901     C                  JNZ     FAILAC       ;   Yes, then signal failed accent test
0101 F1                            POP     PSW          ;   No, recover first pass flag
0102 F5                            PUSH    PSW
0103 E60F                          ANI     0FH          ; Test for first pass
0105 C21901     C                  JNZ     NOTFST       ; Jump if not first pass
                           ;
                           ;*************************************************************************
                           ;
                           ; Changed 21 Feb 1984 to allow for taller accents
                           ;
                           ;
0108 3A0000     E                  LDA     TOPBLK       ; If first pass, just add 7 to top black
010B C605                          ADI     5            ;    to determine place to separate character
                           ;
                           ;*************************************************************************
                           ;
010D 320B00     D                  STA     BRKROW
0110 320800     D                  STA     NXTWHT
0113 320700     D                  STA     NXTBLK
0116 C32501     C                  JMP     VERLOD       ; Load top and bottom character buffers
0119 3A0B00     D          NOTFST: LDA     BRKROW       ; If not first pass, then add one to the
011C 3C                            INR     A            ;    previous break row to determine the new
011D 320B00     D                  STA     BRKROW       ;    break row.
0120 320800     D                  STA     NXTWHT
0123 320700     D                  STA     NXTBLK
                           ;
                           $EJECT
                           ;***********************************
                           ;
                           ; Division point for characters has been discovered.  Load the top and
                           ; the bottom portions of the character into their respective buffers
                           ;
0126 210000     E          VERLOD: LXI     H,SHADV5     ; Compute bottom black of the entire character
0129 0627                          MVI     B,39
012B 0E00                          MVI     C,0
012D 3EFF                          MVI     A,-1
012F CD0000     E                  CALL    ENDBLK
0132 320900     D                  STA     BT1BLK       ;    and save it
                           ;
                           ; Compute height and width of top portion and move it into the top
                           ; character buffer
                           ;
```

```
LOC  OBJ          LINE        SOURCE STATEMENT

0135 F1            752         POP    PSW         ; Recover starting column in B
0136 C1            753         POP    B           ;   and top buffer address in DE
0137 E1            754         POP    H
0138 D1            755         POP    D
0139 E5            756         PUSH   H           ; Restore registers
013A C5            757         PUSH   B
013B EB            758         XCHG
013C 3A0000    E   759         LDA    TOPBLK      ; Move buffer address to HL
013F 57            760         MOV    D,A         ; Compute height of top character :
0140 3A0B00    D   761         LDA    NXTWHT      ;   = NXTWHT - TOPBLK
0143 5F            762         MOV    E,A
0144 92            763         SUB    D
0145 57            764         MOV    D,A
0146 7B            765         MOV    A,E         ; Save NXTWHT - 1 as bottommost black
0147 3D            766         DCR    A
0148 320000    E   767         STA    BTMBLK
014B 3A0A00    D   768         LDA    WIDTH       ; Move character width to E
014E 5F            769         MOV    E,A
014F CD0000    E   770         CALL   BUFLOD      ; Load top portion of character into buffer
0152 EB            771         XCHG
0153 2A0AE0        772         LHLD   RECPTR
0156 EB            773         XCHG
0157 D5            774         PUSH   D
0158 220AE0        775         SHLD   RECPTR
015B E5            776         PUSH   H
015C 110000    E   777         LXI    D,PRTCHR    ; Change LXI to CALL for debug
015F E1            778         POP    H
0160 CD0000    E   779         CALL   CCENTR
0163 E1            780         POP    H
0164 220AE0        781         SHLD   RECPTR
                   782  ;
                   783  ; Compute height and width of bottom portion and move it into the bottom
                   784  ; character buffer
                   785  ;
0167 C1            786         POP    B           ; Recover starting column
0168 E1            787         POP    H           ; Recover bottom buffer address
0169 3A0700    D   788         LDA    NXTBLK      ; Compute height of bottom character :
016C 320000    E   789         STA    TOPBLK      ;   = BT1BLK - NXTBLK + 1
016F 3C            790         INR    A
0170 57            791         MOV    D,A
0171 3A0900    D   792         LDA    BT1BLK
0174 320000    E   793         STA    BTMBLK
0177 92            794         SUB    D
0178 3C            795         INR    A
0179 3C            796         INR    A
017A 57            797         MOV    D,A
017B 3A0A00    D   798         LDA    WIDTH       ; Move character width to E
017E 5F            799         MOV    E,A
017F CD0000    E   800         CALL   BUFLOD
0182 EB            801         XCHG
0183 2A0AE0        802         LHLD   RECPTR
0186 EB            803         XCHG
0187 D5            804         PUSH   D
0188 220AE0        805         SHLD   RECPTR
```

```
LOC  OBJ               SOURCE STATEMENT

018B E5                      PUSH    H
018C 110000     E            LXI     D,FETCHR         ; Change LXI to CALL for debug
018F E1                      POP     H
0190 CD0000     E            CALL    CCENTR
0193 E1                      POP     H
0194 220AE0                  SHLD    RECPTR
                        ;
0197 AF                      XRA     A                ; Clear carry and zero flags
0198 C9                      RET                      ; Exit
                        ;
                        $EJECT
                        ;********************************
                        ;
                        ; Character failed accented character test.  So, return
                        ; carry set
                        ;
0199 F1                 FAILAC: POP     PSW           ; Restore stack
019A C1                      POP     B
019B E1                      POP     H
019C D1                      POP     D
019D AF                      XRA     A                ; Clear zero flag
019E 3C                      INR     A
019F 37                      STC                      ; Set carry flag
01A0 C9                      RET
                        ;
                        $EJECT
                        ;***********************************************************************
                        ;                                                                      ;
                        ; Subroutine HORSEP                                                    ;
                        ;                                                                      ;
                        ;       The following subroutine is used to retry the horizontal separation ;
                        ;       of two characters in the recombination buffer.  Based on the results ;
                        ;       of the last pass through recognition and the previous cut position ;
                        ;       between the characters, a new cut point is determined and the char- ;
                        ;       acters are re-separated.  The characters may be separated at any ;
                        ;       point within 9 pixels of the original separation point.  The incre- ;
                        ;       ment between cuts will be three if both characters are not recognized ;
                        ;       and one if they are close.                                     ;
                        ;                                                                      ;
                        ;       Inputs:     RCLPTR      Pointer to left character buffer       ;
                        ;                   RCLTPT      Pointer to left upper remnant buffer (if any) ;
                        ;                   RCRPTR      Pointer to right character buffer      ;
                        ;                   RCRTPT      Pointer to right upper remnant buffer (if any);
                        ;                   RCVBCC      Best cut column for characters         ;
                        ;                   RCVBLC      Best large (x3) cut point              ;
                        ;                   RCVBSL      Best score for left character          ;
                        ;                   RCVBSR      Best score for right character         ;
                        ;                   RCVCCC      Current cut column in recombination buffer ;
                        ;                   RCVCIN      Cut increment                          ;
                        ;                   RCVFPS      First pass indicator for horizontal retry ;
                        ;                   RCVLCT      Number of large cuts made to characters ;
                        ;                   RCVLPS      Last pass indicator through retry      ;
```

```
LOC  OBJ             LINE    SOURCE STATEMENT

                             ;                    RCVOCC           Original cut column between characters
                             ;                    RCVRTC           Number of times horizontal retry tried
                             ;                    RCVSCT           Number of small cuts made to characters
                             ;
                             ;       Outputs:     RCVBCC           Updated
                             ;                    RCVBLC           Updated
                             ;                    RCVBSL           Updated
                             ;                    RCVBSR           Updated
                             ;                    RCVCCC           Updated
                             ;                    RCVCIN           Updated
                             ;                    RCVFPS           Updated
                             ;                    RCVLCT           Updated
                             ;                    RCVLPS           Updated
                             ;                    RCVRTC           Updated
                             ;                    RCVSCT           Updated
                             ;                    Carry            Re-separation complete indicator
                             ;                                        C - Re-separation not complete
                             ;                                       NC - Re-separation complete
                             ;
                             ;       Registers
                             ;       Affected:    All
                             ;
                             ;**********************************************************************
                             ;
                             HORSEP:
                             ;
                             ; Test to see if this is the last pass for this pair of characters.  If so,
                             ; test finished indicator (carry reset)
                             ;
01A1 3A0000     E                    LDA     RCVLPS          ; Get last pass indicator
01A4 B7                              ORA     A               ; Test for zero
01A5 C2A104     C                    JNZ     LSTPAS          ; If non-zero, then last pass
                             ;
                             ; Test to see if this form of retry has already been done too many times.
                             ; If it has, then separate the characters at the best cut point and force the
                             ; next pass to be the last one.
                             ;
01A8 3A0000     E                    LDA     RCVRTC          ; Get retry counter
01AB FE09                            CPI     9               ; Test to see if less then 9
01AD D20004     C                    JNC     SETLST          ; If not, then force last pass
01B0 3C                              INR     A               ; Else, increment retry counter
01B1 320000     E                    STA     RCVRTC
                             ;
                             $EJECT
```

```
LOC   OBJ             SOURCE STATEMENT

                ;***********************************
                ;
                ; Test to see if this is the first pass for this pair of characters.  If so,
                ; then initialize best scores and best cut points.  If the characters were
                ; close to being recognized, then perform the next cut one pixel to the
                ; right, otherwise perform the next cut three pixels to the right
                ;
01B4 3A0000   E               LDA     RCVFPS          ; Set first pass indicator
01B7 B7                       ORA     A               ; Test for zero
01B8 C22002   C               JNZ     NOFSTP          ; If non-zero, then not first pass
01BB 3C                       INR     A               ; Else, set up for second pass
01BC 320000   E               STA     RCVFPS
                ;
01BF AF                       XRA     A               ; Initialize large cut flag
01C0 321100   D               STA     LCUTFG
01C3 2A0000   E               LHLD    RCLPTR          ; Get pointer to left character
01C6 EB                       XCHG
01C7 210900                   LXI     H,RECLSC        ; Get low score for left character and save
01CA 19                       DAD     D               ;   it as the new best score for the left
01CB 7E                       MOV     A,M             ;   character
01CC 320200   D               STA     RCVBSL
01CF D5                       PUSH    D               ; Save left buffer address
01D0 2A0000   E               LHLD    RCRPTR          ; Get low score for right character and save
01D3 EB                       XCHG                    ;   it as the new best score for the right
01D4 210900                   LXI     H,RECLSC        ;   character
01D7 19                       DAD     D
01D8 7E                       MOV     A,M
01D9 320300   D               STA     RCVBSR
01DC 3A0000   E               LDA     RCVOCC          ; Save original cut column as best cut column
01DF 320000   D               STA     RCVBCC
01E2 320000   E               STA     RCVCCC          ;   and as current cut column
01E5 EB                       XCHG                    ; Get TAC for right character and save in C
01E6 110E00                   LXI     D,RECTAC
01E9 19                       DAD     D
01EA 4E                       MOV     C,M
01EB E1                       POP     H               ; Get TAC for left character and save in B
01EC 19                       DAD     D
01ED 46                       MOV     B,M
01EE 79                       MOV     A,C             ; Test to see if the TAC for the left character
01EF FE02                     CPI     2               ;   is less than two.  If so, then do a small
01F1 DAFA01   C               JC      SMCUT1          ;   cut
01F4 78                       MOV     A,B             ; Test to see if the TAC for the right char-
01F5 FE02                     CPI     2               ;   acter is less than two.  If not, then do a
01F7 D21002   C               JNC     LGCUT1          ;   large cut
01FA 3EFF       SMCUT1:       MVI     A,0FFH          ; Set up for okay characters to separate
01FC 320000   E               STA     RCVFPS
01FF 3E01                     MVI     A,1             ; Perform a small cut between the characters
0201 320400   D               STA     RCVCIN          ; Set the cut increment to +1
0204 320600   D               STA     RCVSCT          ; Set the small cut count to 1
0207 3A0000   E               LDA     RCVOCC          ; Save the original cut column as the best
020A 320100   D               STA     RCVBLC          ;   large cut column
020D C32104   C               JMP     SEPRAT          ; Separate the characters
0210 3E03       LGCUT1:       MVI     A,3             ; Perform a large cut between the characters
0212 320400   D               STA     RCVCIN          ; Set the cut increment to +3
0215 3E01                     MVI     A,1             ; Set the large cut counter to 1
```

```
LOC  OBJ                SOURCE STATEMENT
0217 320500   D                 STA    RCVLCT
021A 321100   D                 STA    LCUTFG         ; Set large cut flag
021D C32104   C                 JMP    SEPRAT         ; Separate the characters
                       ;
                       $EJECT
                       ;*********************************
                       ;
                       ; This was not the first pass through horizontal retry.  Test to see if there
                       ; was an improvement in scores.  If there was, then continue cutting along the
                       ; same direction, if possible.
                       ;
0220 3D                NOFSTP: DCR    A              ; Second pass ?
0221 C22C02   C                 JNZ    NOFST1         ;   No,  continue
0224 3E02                       MVI    A,2            ;   Yes, set up for second pass
0226 320000   E                 STA    RCVFPS
0229 C33D02   C                 JMP    NOFST3
022C 3D                NOFST1: DCR    A              ; Third pass ?
022D C23802   C                 JNZ    NOFST2         ;   No,  continue
0230 3E03                       MVI    A,3            ;   Yes, set up for third pass
0232 320000   E                 STA    RCVFPS
0235 C33D02   C                 JMP    NOFST3
0238 3EFF              NOFST2: MVI    A,0FFH         ; Currently running valid touching processing
023A 320000   E                 STA    RCVFPS         ; Set as such
023D 2A0000   E        NOFST3: LHLD   RCLPTR         ; Get the pointer to the left character
0240 110900                     LXI    D,RECLSC       ; Get the low score for the left character
0243 19                         DAD    D              ;   and save it in B
0244 46                         MOV    B,M
0245 2A0000   E                 LHLD   RCRPTR         ; Get the pointer to the right character
0248 19                         DAD    D              ; Get the low score for the right character
0249 4E                         MOV    C,M            ;   and save it in C
024A 3A0200   D                 LDA    RCVBSL         ; Test to see if the low score for the left
024D 57                         MOV    D,A            ;   character is better than the previous
024E 78                         MOV    A,B            ;   low score
024F BA                         CMP    D
0250 DA6B02   C                 JC     MIN1           ; If not less, then try right character
0253 3A0300   D                 LDA    RCVBSR         ; Test to see if the low score for the right
0256 57                         MOV    D,A            ;   character is better than the previous
0257 79                         MOV    A,C            ;   low score
0258 BA                         CMP    D
0259 DA6B02   C                 JC     MIN1           ; Jump if a new minimum
025C C28E03   C                 JNZ    NOMIN1         ; Right got worse, so change cut direction
025F 3A0200   D                 LDA    RCVBSL         ; Test left character to see if it remained
0262 57                         MOV    D,A            ;   the same
0263 78                         MOV    A,B
0264 BA                         CMP    D
0265 C28E03   C                 JNZ    NOMIN1         ; If not equal, then change cut direction
0268 C3F602   C                 JMP    CHRREJ         ; Else, process character as if it had
                                                       ;   been rejected
                       ;
026B 78                MIN1:   MOV    A,B            ; Both low scores were new minimums, so update
026C 320200   D                 STA    RCVBSL         ;   the new low scores and the new best cut
026F 79                         MOV    A,C            ;   column
0270 320300   D                 STA    RCVBSR
0273 3A0000   D                 LDA    RCVCCC
0276 320000   D                 STA    RCVBCC
                       ;
```

```
LOC   OBJ              SOURCE STATEMENT

0279  2A0000   E            LHLD  RCRFPS     ; Recover the buffer address for the right
027C  110E00                LXI   D,RECTAC   ;   character and move the TAC for the
027F  19                    DAD   D          ;   character into C
0280  4E                    MOV   C,M
0281  2A0000   E            LHLD  RCLPTR     ; Recover the buffer address for the left
0284  19                    DAD   D          ;   character and move the TAC into B
0285  46                    MOV   B,M
                  ;
0286  78                    MOV   A,B        ; Test to see if the TAC for the left character
0287  FE02                  CPI   2          ;   is less than 2. If so, then there move
0289  DA9202   C            JC    CHRACC     ;   into small cut mode if not already
028C  79                    MOV   A,C        ; Test to see if the TAC for the right charac-
028D  FE02                  CPI   2          ;   ter is less than 2. If not, then continue
028F  D2F602   C            JNC   CHRREJ     ;   with large cuts. If doing small cuts, then
                                             ;   force last pass
                  ;
0292  3EFF        CHRACC:   MVI   A,0FFH     ; At least one character is acceptable. So
0294  320000   E            STA   RCVFPS     ;   okay to continue touch processing
0297  3A0400   D            LDA   RCVCIN     ; Set cut increment
029A  FE03                  CPI   3          ; Test for large cut to the right
029C  C2C502   C            JNZ   NOCIP3     ; Jump if not
029F  3A0000   E            LDA   RCVCCC     ; In large cut mode, save new cut point as the
02A2  320100   D            STA   RCVBLC     ;   best large cut point
02A5  3A0500   D            LDA   RCVLCP     ; Test to see if the large cut point is at 9
02A8  FE02                  CPI   2          ;   pixels to the right. If so, then only cut
02AA  C2BA02   C            JNZ   NOLCP3     ;   to the left
02AD  3EFF                  MVI   A,-1       ; Set the cut increment to -1
02AF  320400   D            STA   RCVCIN
02B2  3E01                  MVI   A,1        ; Set the small cut count to 1
02B4  320600   D            STA   RCVSCT
02B7  C32104   C            JMP   SEPRAT     ; Separate the characters
                  ;
02BA  3E01        NOLCP3:   MVI   A,1        ; Not at far right of cut margin. So set cut
02BC  320400   D            STA   RCVCIN     ;   increment to cut one pixel to the right.
02BF  320600   D            STA   RCVSCT     ; Set small cut count to 1
02C2  C32104   C            JMP   SEPRAT     ; Separate the characters
                  ;
02C5  FEFD        NOCIP3:   CPI   -3         ; Cut increment not 3, so test for -3
02C7  C2DB02   C            JNZ   NOCIN3     ;   to see if at far left of cut margin
02CA  3E01                  MVI   A,1        ; If so, then set cut increment to cut one
02CC  320400   D            STA   RCVCIN     ;   one pixel to the right
02CF  320600   D            STA   RCVSCT     ; Set small cut count to 1
02D2  3A0000   E            LDA   RCVCCC     ; Set current cut column as the best large
02D5  320100   D            STA   RCVBLC     ;   cut column
02D8  C32104   C            JMP   SEPRAT     ; Separate the characters
                  ;
02DB  3A0600   D  NOCIN3:   LDA   RCVSCT     ; Currently doing small cuts :
02DE  47                    MOV   B,A        ; If no large cuts were done, maximum number
02DF  3A1100   D            LDA   LCUFPS     ;   of small cuts is 6, otherwise it is 3.
02E2  B7                    ORA   A          ;   Test to see if already cut maximum
02E3  3E03                  MVI   A,3
02E5  C2EA02   C            JNZ   NOCIP1
02E8  3E06                  MVI   A,6
02EA  B8          NOCIP1:   CMP   B
```

```
LOC  OBJ            SOURCE STATEMENT

02EB CAA104    C             JZ     LSTPAS     ; If so, then this is the best result
02EE 78                      MOV    A,B        ; Else, increment small cut count and try
02EF 3C                      INR    A          ;   cutting the characters again
02F0 320500    D             STA    RCVSCT
02F3 C32104    C             JMP    SEPRAT
                    ;
                    $EJECT
                    ;
                    ; Characters can still not be accepted.  If second pass, then try cutting to
                    ; the right.  If third pass, then don't continue separation of characters if
                    ; both are rejects (don't want to spend all day on noise). Else, continue with
                    ; large cuts until full 9 pixels around original cut point have been tried.
                    ; If they have, then characters must be rejected.  If currently doing small
                    ; cuts, then force last pass.
                    ;
02F6 3A0000    F    CHRREJ:  LDA    RCVFPS     ; Set pass indicator
02F9 3D                      DCR    A
02FA 3D                      DCR    A          ; Second pass ?
02FB CAEE03    C             JZ     NOMIN1     ;   Yes, change direction of cut
02FE 3D                      DCR    A          ; Third pass ?
02FF CA0D04    C             JZ     SETLST     ;   Yes, don't try any further
0302 3A0400    D             LDA    RCVCIN     ; Get cut increment
0305 FE03                    CPI    3          ; Test to see if cutting to the right
0307 C22C03    C             JNZ    NTCIP3     ; Jump if cutting to the left
030A 3A0500    D             LDA    RCVLCT     ; Get large cut count
030D FE02                    CPI    2          ; Test to see if at far right
030F C22503    C             JNZ    NTLCP3     ; If not, continue cutting to the right
0312 3EFD                    MVI    A,-3       ; Else, start cutting to the left of the
0314 320400    D             STA    RCVCIN     ;   original cut point by threes
0317 3A0000    E             LDA    RCVOCC
031A 320000    E             STA    RCVCCC
031D 3E01                    MVI    A,1        ; Set large cut count to 1
031F 320500    D             STA    RCVLCT
0322 C32104    C             JMP    SEPRAT     ; Separate the characters
                    ;
0325 3C             NTLCP3:  INR    A          ; Large cut count was not three, so continue
0326 320500    D             STA    RCVLCT     ;   cutting to the right
0329 C32104    C             JMP    SEPRAT
                    ;
032C FEFD           NTCIP3:  CPI    -3         ; Cut increment not +3, test for -3
032E C24003    C             JNZ    NTCIM3     ; Jump if not doing large cuts to the left
0331 3A0500    D             LDA    RCVLCT     ; Get large cut count
0334 FE02                    CPI    2          ; Test to see if at far left
0336 CA0D04    C             JZ     SETLST     ; If so, force last pass (done all we can)
0339 3C                      INR    A          ; Otherwise, update large cut counter and
033A 320500    D             STA    RCVLCT     ;   continue cutting to the left
033D C32104    C             JMP    SEPRAT
                    ;
0340 FE01           NTCIM3:  CPI    1          ; Cut increment not -3, test for +1
0342 C27303    C             JNZ    NTCIP1     ; Jump if not doing small cuts to the right
0345 3A0500    D             LDA    RCVSCT     ; Set small cut count
0348 47                      MOV    B,A        ; Test to see if done with small cuts to right
0349 3A1100    D             LDA    LCUTPS
034C B7                      ORA    A
```

```
LOC  OBJ              SOURCE STATEMENT

034D 3E03                    MVI   A,3
034F C25403     C            JNZ   NTCM04
0352 3E06                    MVI   A,6
0354 F8          NTCM04:     CMP   B
0355 78                      MOV   A,B
0356 C26C03     C            JNZ   NTSCP2     ; Jump if not done
0359 3EFF                    MVI   A,-1       ; Done cutting to right, try to cut to the left
035B 320400     D            STA   RCVCIN     ; Set cut increment to -1
035E 3E01                    MVI   A,1        ; Set small cut count to 1
0360 320600     D            STA   RCVSCT
0363 3A0100     D            LDA   RCVBLC     ; Start cutting from position of best large
0366 320000     E            STA   RCVCCC     ;   cut column
0369 C32104     C            JMP   SEPRAT     ; Separate the characters
                     ;
036C 3C          NTSCP2:     INR   A          ; Not done cutting to the right, so try
036D 320600     D            STA   RCVSCT     ;   cutting one more to the right
0370 C32104     C            JMP   SEPRAT
                     ;
0373 3A0600     D NTCIP1:    LDA   RCVSCT     ; Cut increment is -1, so test to see if
0376 47                      MOV   B,A        ;   two cuts have already been made in this
0377 3A1100     D            LDA   LCUTF3     ;   direction.  If so, this is the last pass
037A B7                      ORA   A          ;   Otherwise, try one more cut to the left.
037B 3E03                    MVI   A,3
037D C28203     C            JNZ   NTCP04
0380 3E06                    MVI   A,6
0382 B8          NTCP04:     CMP   B
0383 CA0D04     C            JZ    SETLST
0386 78                      MOV   A,B
0387 3C                      INR   A
0388 320600     D            STA   RCVSCT
038B C32104     C            JMP   SEPRAT
                     ;
                     $EJECT
                     ;**********************************
                     ;
                     ; There was not an improvement in the low scores on this pass.  So, if
                     ; currently cutting to the right, then start cutting to the left.  If
                     ; currently cutting to the left, then set up for the last pass and exit
                     ; using the best previous cut column to separate the characters.
                     ;
038E 3A0400     D NOMIN1:    LDA   RCVCIN     ; Set cut increment
0391 FE03                    CPI   3          ; Test to see if doing large cuts to right
0393 C2FA03     C            JNZ   NTINF3     ; Jump if not
0396 3A0000     E            LDA   RCVRTC     ; If first pass, then three pixels to the right
0399 FE01                    CPI   1          ;   was too large, so try one pixel to the
039B C2A703     C            JNZ   NTFST1     ;   right.
039E 320400     D            STA   RCVCIN
03A1 320600     D            STA   RCVSCT
03A4 C32104     C            JMP   SEPRAT
03A7 3EFD        NTFST1:     MVI   A,-3       ; Set cut increment to cut to the left of
03A9 320400     D            STA   RCVCIN     ;   original character cut column and try
03AC 3A0000     E            LDA   RCVDCC     ;   to re-separate the characters there
03AF 320000     E            STA   RCVCCC
03B2 3E01                    MVI   A,1
```

```
LOC  OBJ            SOURCE STATEMENT

03B4 320500   D              STA    RCVLCT
03B7 C32104   C              JMP    SEPRAT
                    ;
03BA FEFD           STINP3:  CPI    -3             ; Test to see if currently doing large cuts
03BC CAFA03   C              JZ     CHKFPS         ;   to left.  If so, set up last pass using
                                                   ;   best cut point
                    ;
03BF FE01                    CPI    1              ; Test to see if doing small cuts to right.
03C1 C2FA03   C              JNZ    CHKFPS         ; If not, then set up last pass
03C4 3A0000   E              LDA    RCVRTC         ; If only first pass through separation, then
03C7 FE01                    CPI    1              ;   try doing large cuts to the left
03C9 CAA703   C              JZ     NTFST1
03CC 2A0000   E              LHLD   RCLPTR         ; Also if there was no improvement in the
03CF 110900                  LXI    D,RECLSC       ;   scores during all the small cut passes,
03D2 19                      DAD    D              ;   then also try large cuts to the left
03D3 4E                      MOV    C,M
03D4 2A0000   E              LHLD   RCHPTR
03D7 19                      DAD    D
03D8 46                      MOV    B,M
03D9 3A0200   D              LDA    RCVBSL
03DC B9                      CMP    C
03DD DAE703   C              JC     NTFST2
03E0 3A0300   D              LDA    RCVBSR
03E3 B8                      CMP    B
03E4 D2A703   C              JNC    NTFST1
03E7 3EFF           NTFST2:  MVI    A,-1           ; Set cut increment to cut to the left of the
03E9 320400   D              STA    RCVCIN         ;   best large cut column and try to re-
03EC 3A0100   D              LDA    RCVBLC         ;   separate the characters there
03EF 320000   E              STA    RCVCCC
03F2 3E01                    MVI    A,1
03F4 320500   D              STA    RCVSCI
03F7 C32104   C              JMP    SEPRAT
                    ;
                    ; No improvement was seen by cutting to the right.  Test to see if only
                    ; first pass through separation (cut column too far to right).  If so, then
                    ; continue cutting to the left.
                    ;
03FA 4F             CHKFPS:  MOV    C,A            ; Save cut increment
03FB 3A0000   E              LDA    RCVRTC         ; Get retry counter
03FE FE01                    CPI    1              ; Test to see if first pass
0400 C20D04   C              JNZ    SETLST         ; If not, then end of processing for this pair
0403 3A0000   E              LDA    RCVCCC         ; Update current cut column
0406 81                      ADD    C
0407 320000   E              STA    RCVCCC
040A C32104   C              JMP    SEPRAT         ; Separate characters
                    ;
                    SEJECT
                    ;**********************************
                    ;
                    ; It was determined that no possible cut point exists which can be better
                    ; than the one which yielded the best low scores so far.  So separate the
                    ; characters at that point and set the last pass indicator so that after
                    ; the next recognition pass, the characters will be processed as such.
                    ;
```

```
LOC  OBJ            SOURCE STATEMENT

040D 3A0000   D  SETLST: LDA     RCVBCC      ; Set the current cut column to be the
0410 320000   E          STA     RCVCCC      ;   value for the best cut column
0413 AF                  XRA     A           ; Set the cut increment to 0
0414 320400   D          STA     RCVCIN
0417 2F                  CMA                 ; Set the last pass indicator
0418 320000   E          STA     RCVLPS      ;   and continue with separation
041B 3A0000   E          LDA     RCVCCC      ; Skip over test to see if valid cut column
041E C36904   C          JMP     SEPLST
                 ;
                 $EJECT
                 ;*********************************
                 ;
                 ; Separate the left and right characters.  The left character will be the
                 ; one from column zero to column RCVCIN + RCVCCC.  The center character will
                 ; be the remainder of the buffer.  The characters will then be placed in the
                 ; character buffer and returned from the subroutine.  If a character is too
                 ; tall and is flagged to be an accented character, then it will also be
                 ; vertically separarated.
                 ;
0421 3A0000   E  SEPRAT: LDA     PSFLAG      ; Currently using P.S. font ?
0424 B7                  ORA     A
0425 C23C04   C          JNZ     SEPR01      ;   Yes, see if new cut point is valid for PS
0428 3A0000   E          LDA     RCVPFK      ; Get font known flag
042B B7                  ORA     A           ; Primary font known ?
042C C35C04   C          JMP     SEPR02      ;   Yes, then fixed pitch
042F 2A0000   E          LHLD    RCLPTR      ; Get left character address
0432 111800              LXI     D,RECIPF    ; Get isolation pitch flag
0435 19                  DAD     D
0436 7E                  MOV     A,M
0437 E60F                ANI     0FH         ; P.S. ?
0439 CA5C04   C          JZ      SEPR02      ;   No, process as fixed pitch
043C 3A0000   E  SEPR01: LDA     RCVECC      ; Get ending column in recombination buffer
043F 4F                  MOV     C,A         ; Save it
0440 0F                  RRC                 ; Comput 1/4 of ending column
0441 0F                  RRC
0442 E63F                ANI     3FH
0444 2F                  CMA                 ; Comput 3/4 of ending column
0445 3C                  INR     A           ;   = (end column) - (end column / 4)
0446 81                  ADD     C
0447 47                  MOV     B,A         ; Save result
0448 3A0400   D          LDA     RCVCIN      ; Compute new cut column
044B 4F                  MOV     C,A         ;   = RCVCCC + RCVCIN
044C 3A0000   E          LDA     RCVCCC
044F 81                  ADD     C
0450 FE18                CPI     24          ; Result larger than 24 ?
0452 D26904   C          JNC     SEPLST      ;   No, use computed cut column
0455 B8                  CMP     B           ; Result larger than 3/4 of end column
0456 D26E03   C          JNC     NORIN1      ;   Yes, can't use this cut point
0459 C36904   C          JMP     SEPLST      ;   No, use computed cut point
045C 3A0400   D  SEPR02: LDA     RCVCIN      ; Compute column at which to break the
045F 4F                  MOV     C,A         ;   the character
0460 3A0000   E          LDA     RCVCCC      ;   = RCVCCC + RCVCIN
0463 81                  ADD     C
0464 FE18                CPI     18H         ; Test to see if this cut will overflow
```

```
LOC   OBJ             SOURCE STATEMENT

                                               ;   the left buffer
0466 D2BE03   C            JNC    NOMIN1       ; If so, then quit cutting in this direction
0469 320000   E   SEPLST:  STA    RCVCCC
046C 4F                    MOV    C,A
046D 0600                  MVI    B,0          ; Starting column for left character is zero
046F C5                    PUSH   B            ; Save break column
0470 2A0000   E            LHLD   RCLTPT       ; Save buffer address for top portion of
0473 EB                    XCHG                ;   character in DE (may be null)
0474 2A0000   E            LHLD   RCLPTR       ; HL <= Buffer address for bottom
0477 CDA404   C            CALL   CHRMOV       ; Move the character from the recombination
                                               ;   buffer into the character buffer
047A C1                    POP    B            ; Recover cut column number
047B DAA104   C            JC     LSTPAS       ; If error on load, set last pass
047E 41                    MOV    B,C          ; Cut column number + 1 is the starting
047F 04                    INR    B            ;   column for the right character
0480 78                    MOV    A,B          ; Add 24 to starting column to give ending
0481 C618                  ADI    24           ;   column in recombination buffer
0483 4F                    MOV    C,A
0484 2A0000   E            LHLD   RCRTPT       ; DE <= Buffer address for top (may be null)
0487 EB                    XCHG
0488 2A0000   E            LHLD   RCRPTR       ; HL <= Buffer address for bottom
048B CDA404   C            CALL   CHRMOV       ; Move the character from the recombination
                                               ;   buffer into the character buffer
048E DAA104   C            JC     LSTPAS       ; If error on load, set last pass
0491 37                    STC
0492 C9                    RET
0493 2A0000   E            LHLD   RCLPTR
0496 CD0000   E            CALL   PRTCHR
0499 2A0000   E            LHLD   RCRPTR
049C CD0000   E            CALL   PRTCHR
049F 37                    STC                 ; Set carry for retries not all finished
04A0 C9                    RET                 ; Exit HORSEP
                  ;
                  $EJECT

                  ;**********************************
                  ;
                  ; Last pass processing.  Return carry reset to signal end
                  ; of horizontal retries.
                  ;
04A1 37           LSTPAS:  STC
04A2 3F                    CMC
04A3 C9                    RET
                  ;
                  $EJECT
```

```
LOC  OBJ            SOURCE STATEMENT

                    ;****************************************************************************
                    ;
                    ;  Subroutine CHRMOV                                                        ;
                    ;                                                                           ;
                    ;         The following subroutine is used to move a character from the     ;
                    ;         recombination buffer into a character buffer for horizontal separa- ;
                    ;         tion.  If the character is accented, then vertical separation is ;
                    ;         called and the recognition states for the top and bottom buffers  ;
                    ;         are set.                                                          ;
                    ;                                                                           ;
                    ;         Inputs:     B        Starting column of character in recom. buffer ;
                    ;                     C        Starting row of character in recom. buffer   ;
                    ;                     DE       Address of buffer to put top portion of char ;
                    ;                     HL       Address of buffer to put bottom of char      ;
                    ;                     A        Indication of whether character is accental  ;
                    ;                                                                           ;
                    ;         Outputs:    (DE)     Top portion of character (if any)            ;
                    ;                     (HL)     Bottom portion of char (or entire character) ;
                    ;                                                                           ;
                    ;         Registers                                                         ;
                    ;         Affected:   AF,BC                                                 ;
                    ;                                                                           ;
                    ;****************************************************************************
                    ;
04A4 D5             CHRMOV: PUSH   D                   ; Save input registers
04A5 E5                     PUSH   H
04A6 C5                     PUSH   B
                    ;
                    ; Create horizontal and vertical shadows of the character.  From these
                    ; determine the top, bottom, left and rightmost black pixel locations.
                    ;
04A7 CD0000    E            CALL   CRSHAD              ; Create shadows of character
                    ;
04AA 210000    E            LXI    H,SHADV1            ; Find the first black bit in the vertical
04AD 0600                   MVI    B,0                 ;   shadow.  This is the uppermost black in
04AF 0127                   MVI    C,39                ;   the character
04B1 3E01                   MVI    A,1
04B3 CD0000    E            CALL   FNDBLK
04B6 D20F05    C            JNC    CHMERR              ; If no black in character then error
04B9 320000    E            STA    TOPBLK
                    ;
04BC 210000    E            LXI    H,SHADV5            ; Find the last black bit in the vertical
04BF 0627                   MVI    B,39                ;   shadow.  This is the lowermost black in
04C1 0E00                   MVI    C,0                 ;   the character.
04C3 3EFF                   MVI    A,-1
04C5 CD0000    E            CALL   FNDBLK
04C8 320000    E            STA    BTMBLK
                    ;
04CB 210000    E            LXI    H,SHADH1            ; Find the first black bit in the horizontal
04CE 0600                   MVI    B,0                 ;   shadow.  This is the leftmost black in
04D0 0E17                   MVI    C,23                ;   the character
04D2 3E01                   MVI    A,1
04D4 CD0000    E            CALL   FNDBLK
04D7 320000    E            STA    LFTBLK
                    ;
```

```
LOC  OBJ            SOURCE STATEMENT

04DA 210000  E          LXI    H,SHADHS       ; Find the last black bit in the horizontal
04DD 0617               MVI    B,23           ;   shadow.  This is the rightmost black in
04DF 0E00               MVI    C,0            ;   the character.
04E1 3EFF               MVI    A,-1
04E3 CD0000  E          CALL   FNDBLK
04E6 320000  E          STA    RITBLK
                 ;
                 ; Move the character from the recombination buffer into the character buffer
                 ; pointed to by HL.
                 ;
04E9 C1                 POP    B              ; Recover start and end column
04EA E1                 POP    H              ; Recover buffer addresses
04EB D1                 POP    D
04EC E5                 PUSH   H
04ED D5                 PUSH   D              ; Resave buffer addresses
04EE 3A0000  E          LDA    LFTBLK
04F1 5F                 MOV    E,A            ; Compute the width of the character :
04F2 3A0000  E          LDA    RITBLK         ;   E = RITBLK - LFTBLK + 1
04F5 93                 SUB    E
04F6 3C                 INR    A
04F7 5F                 MOV    E,A
04F8 3A0000  E          LDA    TOPBLK
04FB 57                 MOV    D,A            ; Compute the height of the character :
04FC 3A0000  E          LDA    BTMBLK         ;   D = BTMBLK - TOPBLK + 1
04FF 92                 SUB    D
0500 3C                 INR    A
0501 57                 MOV    D,A
0502 CD0000  E          CALL   HOFLOD         ; Move the character into the character buffer
0505 D1                 POP    D              ; Recover buffer addresses
0506 E1                 POP    H
0507 E5                 PUSH   H
0508 CD0000  E          CALL   CCENTR         ; Insure that character is centered
050B E1                 POP    H              ; Restore stack
050C 37                 STC                   ; Clear carry to signal successful move
050D 3F                 CMC
050E C9                 RET                   ; Exit CHRMOV
                 ;
050F C1          CHMERR: POP   B              ; Restore stack and return carry set to
0510 E1                 POP    H              ;   signal move error (blank buffer)
0511 D1                 POP    D
0512 C9                 RET
                 ;
                 $EJECT
```

```
LOC  OBJ              SOURCE STATEMENT
                      ;*******************************************************************
                      ;
                      ; Subroutine RDBINI
                      ;
                      ;       The following subroutine is used to initialize all variables so
                      ;       that touching character processing can be done on any double
                      ;       character in P.S. which is not separated exactly right.
                      ;
                      ;       Inputs:     DE           Left portion of double character
                      ;                   RECPTR       Right portion of double character
                      ;
                      ;       Outputs:    RCVRTC       Retry counter for touch processing
                      ;                   RCVLPS       Last pass indicator for touch
                      ;                   RCVFPS       First pass indicator
                      ;                   RCRPTR       Pointer to right character
                      ;                   RCLPTR       Pointer to left character
                      ;
                      ;       Registers
                      ;       Affected:   PSW,HL
                      ;
                      ;*******************************************************************
                      ;
0513 AF               RDBINI: XRA    A          ; Set
0514 320000    E              STA    RCVRTC     ;   Retry count <= 0
0517 320000    E              STA    RCVLPS     ;   Not last pass
051A 320000    E              STA    RCVFPS     ;   Is first pass
051D 2A0AE0                   LHLD   RECPTR     ; Get right character buffer pointer
0520 220000    E              SHLD   RCRPTR     ;   and save it
0523 EB                       XCHG
0524 220000    E              SHLD   RCLPTR     ; Save left character buffer pointer
0527 EB                       XCHG
0528 C9                       RET
                      ;
                              END

ASSEMBLY COMPLETE,  NO ERRORS

CHP13.
SVP6.
SYS.

                      $NOLIST
                      $LIST
                      $TITLE('Recognition double character processing')
                      ;
                      ;       ******************************************
                      ;       *                                        *
                      ;       *  Recognition double character processing *
                      ;       *                                        *
                      ;       ******************************************
                      ;
                      ; Public procedure definitions
                      ;
                              PUBLIC  DBLTST           ; Double character test
                              PUBLIC  DBLSEP           ; Double character separation
                              PUBLIC  DBLRST           ; Double character restoration
                      ;
```

```
LOC  OBJ        LINE     SOURCE STATEMENT

                310 ; External procedures used
                311 ;
                312          EXTRN   FNDBLK      ; For finding next black bit in a byte string
                313          EXTRN   CCENTR      ; For centering a character in the rec buffer
                314          EXTRN   CRCSHD      ; For creating shadows of char in char buffer
                315          EXTRN   CRSHAD      ; For creating shadows of char in recom buffer
                316          EXTRN   RUFLOD
                317          EXTRN   FRTCHR      ; For moving a char from recom to char buffer
                318 ;
                319 ; External variables used
                320 ;
                321          EXTRN   RCVLCC      ; Ending column in recombination buffer
                322          EXTRN   TOPBLK      ; Uppermost black in character
                323          EXTRN   BTMBLK      ; Lowermost black in character
                324          EXTRN   LFTBLK      ; Leftmost black in character
                325          EXTRN   RITBLK      ; Rightmost black in character
                326          EXTRN   SHADH1      ; Horizontal character shadow
                327          EXTRN   SHADH2
                328          EXTRN   SHADH3
                329          EXTRN   SHADV1      ; Vertical character shadow
                330          EXTRN   SHADV2
                331          EXTRN   SHADV3
                332          EXTRN   SHADV4
                333          EXTRN   SHADV5
                334          EXTRN   RLBYTE      ; Left byte of character shadow
                335          EXTRN   RRBYTE      ; Right byte of character shadow
                336          EXTRN   RTBYTE      ; Top byte of character shadow
                337          EXTRN   RBBYTE      ; Bottom byte of character shadow
                338          EXTRN   PSFLAG      ; Proportional space flag
                339          EXTRN   RCVPFK      ; Primary font known flag
                340          EXTRN   RCVOCC      ; Original cut column for characters
                341          EXTRN   RCVFTP      ; Types of fonts present in machine
                342 ;
                343 $EJECT
                344 ;
                345 ; Local variable declarations
                346 ;
                347          DSEG
0000            348 BRKROW:  DS      1           ; Break row for vertical separation
0001            349 COLSUM:  DS      24          ; Column pixel density counters for DBLTST
0019            350 MIDPT:   DS      1           ; Midpoint of character
001A            351 SHFTCT:  DS      1           ; Number of pixels to shift for kerns
001B            352 KRNBUF:  DS      32          ; Center eight pixels of character
003B            353 PAS2FG:  DS      1           ; Second pass flag for kernel test
003C            354 CHRSIZ:  DS      1           ; Horizontal sized of character
                355 ;
                356 $EJECT
                357 ;
                358 ; Macro definitions
                359 ;
                360 $INCLUDE(:F1:MACROS.INC)
              = 361 ;
              = 362 ;*******************************
              = 363 ;
```

```
LOC  OBJ        LINE       SOURCE STATEMENT

; Macro LSHFT4
;
;          The following macro performs a four register shift operation.
;          The contents in the register string B,C,D,E are shifted left
;          (M) times.
;
LSHFT4   MACRO
         LOCAL    LSHF01          ; Local label definitions
         LOCAL    LSHF02
         MOV      H,A             ; Move counter to H
         ORA      A               ; Test for zero initially
         JZ       LSHF02          ; If zero, then don't do shift
LSHF01:  ORA      A               ; Clear carry
         MOV      A,E             ; Rotate fourth byte left
         RAL
         MOV      E,A
         MOV      A,D             ; Rotate carry into third byte
         RAL
         MOV      D,A
         MOV      A,C             ; Rotate carry into second byte
         RAL
         MOV      C,A
         MOV      A,B             ; Rotate carry into first byte
         RAL
         MOV      B,A
         DCR      H               ; Decrement shift count
         JNZ      LSHF01          ; Continue until done with shifts
LSHF02:
         ENDM
;
;*****************************
;
; Macro RSHFT4
;
;          The following macro performs a four register shift operation.
;          The contents of the register string B,C,D,E are shifted right
;          (M) times.
;
RSHFT4   MACRO
         LOCAL    RSHF01          ; Local label definitions
         LOCAL    RSHF02
         MOV      H,A             ; Move counter to H
         ORA      A               ; Test for zero initially
         JZ       RSHF02          ; If zero, then don't do shift
LSHF01:  ORA      A               ; Clear carry
         MOV      A,B             ; Rotate first byte right
         RAR
         MOV      B,A
         MOV      A,C             ; Rotate carry into second byte
         RAR
         MOV      C,A
         MOV      A,D             ; Rotate carry into third byte
         RAR
         MOV      D,A
         MOV      A,E             ; Rotate carry into fourth byte
```

```
LOC  OBJ               SOURCE STATEMENT

               =                  ENR
               =                  MOV      E,A
               =                  DCR      B                ; Decrement shift count
               =                  JNZ      RSHF01           ; Continue until done with shifts
               =         RSHF02:
               =                  ENDM
               =         ;
               =         ;******************************
               =         ;
               =         ; Macro PFADR
               =         ;
               =         ;        The following macro computes a buffer address based on a base
               =         ;        address and a buffer number
               =         ;        = Base address + (128 * buffer number)
               =         ;        = DE + (128 * A)
               =         ;
               =                  EXTRN    BUFADD
               =         PFADR    MACRO
               =                  CALL     BUFADD           ; Use routine in ISOUTL
               =                  ENDM
                         $EJECT
                         ;*************************************************************************
                         ;                                                                        ;
                         ; Subroutine DBLTST                                                      ;
                         ;                                                                        ;
                         ;        The following subroutine performs a test on a character to see  ;
                         ;        if it may be two characters which fit into one buffer.  A white ;
                         ;        column is searched for between black in the shadow.  If one is  ;
                         ;        found, then the character is assumed to be two.                 ;
                         ;                                                                        ;
                         ;        Inputs:     HL           Address of character buffer to test    ;
                         ;                                                                        ;
                         ;        Outputs:    A            Column at which white was found (if any);
                         ;                    Carry        Test results :                         ;
                         ;                                    NC - Not double character           ;
                         ;                                    C  - Double character               ;
                         ;                                                                        ;
                         ;        Registers                                                       ;
                         ;        Affected:   All                                                 ;
                         ;                                                                        ;
                         ;*************************************************************************
                         ;
                                  CSEG
0000 3A0000     E        DBLTST:  LDA      RCVFTP           ; Get font types present in machine
0003 E631                         ANI      031H             ; P.S. fonts present ?
0005 C20A00     C                 JNZ      DBTS00           ;   Yes, may be okay to do test
0008 AF                           XRA      A                ;   No, no need to do double char test
0009 C9                           RET
000A 3A0000     E        DBTS00:  LDA      RCVPFK           ; Test to see if primary font is known
000D B7                           ORA      A
000E CA1600     C                 JZ       DLT001           ; If not, then okay to do double test
0011 3A0000     E                 LDA      PSFLAG           ; Primary font known, so test to see if P.S.
0014 B7                           ORA      A
0015 C8                           RZ                        ; Don't do double test if not in P.S. font
0016 E5                  DLT001:  PUSH     H
```

```
LOC  OBJ           LINE         SOURCE STATEMENT

0017 CD0000   E     474          CALL    CCENTR          ; Insure that character is centered
001A E1             475          POP     H
001B E5             476          PUSH    H
001C 210000   E     477          LXI     H,PRICHR
001F D1             478          POP     D               ; Don't perform double character test if
0020 210300         479          LXI     H,RECHSZ        ;   character width is less than 14
0023 19             480          DAD     D
0024 7E             481          MOV     A,M
0025 FE0E           482          CPI     14
0027 3F             483          CMC
0028 D0             484          RNC
0029 47             485          MOV     B,A             ; Save character width
002A 211100         486          LXI     H,RECLNK        ; Point to right link
002D 19             487          DAD     D
002E D5             488          PUSH    D               ; Save buffer pointer
002F 7E             489          MOV     A,M             ; Get right link
0030 3C             490          INR     A               ; Right link null ?
0031 CA4A00   C     491          JZ      DBT000          ;   Yes, then jump
0034 3D             492          DCR     A               ; Restore right link
                    493          FTADR                   ; Compute address of right buffer
0038 110D00         495          LXI     D,RECSPS        ; Point to separation flag for right buffer
003B EB             496          XCHG
003C 19             497          DAD     D
003D 7E             498          MOV     A,M             ; Get sep flag
003E E608           499          ANI     08H             ; Horizontal remnant ?
0040 CA4A00   C     500          JZ      DBT000          ;   Yes, then jump
0043 210300         501          LXI     H,RECHSZ        ; Point to horizontal size of remnant
0046 19             502          DAD     D
0047 7E             503          MOV     A,M             ; Get remnant width
0048 80             504          ADD     B               ; Add to character width to yield total
0049 47             505          MOV     B,A             ;   character width
004A 78             506 DBT000:  MOV     A,B             ; Save character width
004B 320000   D     507          STA     CHRSIZ
004E EB             508          XCHG
                    509 ;
                    510 ; Create shadows of character in character buffer
                    511 ;
004F E1             512          POP     H               ; Recover buffer address
0050 E5             513          PUSH    H
0051 CD0000   E     514          CALL    CRCSHD
                    515 ;
                    516 ; Look for first black bit in character
                    517 ;
0054 210000   E     518          LXI     H,RLBYTE        ; Start search at leftmost byte of shadow
0057 010803         519          LXI     B,308H          ; Counters (B=# of bytes, C=# of bits)
005A 1600           520          MVI     D,0             ; Total bit counter
005C 7E             521          MOV     A,M             ; Get first byte
005D B7             522 DBT001:  ORA     A               ; Clear carry flag
005E 17             523          RAL                     ; Rotate leftmost bit into carry
005F DA7200   C     524          JC      DBT005          ; Jump if black
0062 14             525          INR     D               ; Increment total bit counter
0063 0D             526          DCR     C               ; Decrement bit counter
0064 C25D00   C     527          JNZ     DBT001          ; Continue until byte exhausted
0067 05             528          DCR     B               ; Byte exhausted, decrement byte counter
0068 CADE00   C     529          JZ      DBT030          ; Return w/ NC if all bytes searched
```

```
LOC  OBJ              SOURCE STATEMENT

006B 23                        INX     H          ; Else get next byte
006C 7E                        MOV     A,M
006D 0E08                      MVI     C,8        ; Set bit counter
006F C35D00     C              JMP     DBT001     ; Continue search
                      ;
                      ; Black bit found.  Save information and search for white.
                      ;
0072 F5               DBT005:  PUSH    PSW        ; Save current byte
0073 7A                        MOV     A,D        ; Save current bit as leftmost black
0074 320000     E              STA     LFTBLK
0077 F1                        POP     PSW        ; Recover current byte
0078 14                        INR     D          ; Update total counter
0079 0D                        DCR     C          ; Decrement bit counter
007A C28500     C              JNZ     DBT010     ; Jump if current byte not exhausted
007D 05                        DCR     B          ; Else, decrement byte counter
007E CADE00     C              JZ      DBT030     ; Return w/ NC if all bytes searched
0081 23                        INX     H          ; Else get next byte
0082 7E                        MOV     A,M
0083 0E08                      MVI     C,8        ; Set bit counter
0085 B7               DBT010:  ORA     A          ; Clear carry
0086 17                        RAL                ; Rotate leftmost bit into carry
0087 D29A00     C              JNC     DBT015     ; Jump if white
008A 14                        INR     D          ; Increment total count
008B 0D                        DCR     C          ; Decrement bit counter
008C C28500     C              JNZ     DBT010     ; Continue search if byte not exhausted
008F 05                        DCR     B          ; Else, decrement byte counter
0090 CADE00     C              JZ      DBT030     ; Return w/ NC if all bytes searched
0093 23                        INX     H          ; Else get next byte
0094 7E                        MOV     A,M
0095 0E08                      MVI     C,8        ; Set bit counter
0097 C38500     C              JMP     DBT010     ; Continue search
                      ;
                      ; White bit found after black.  Save current column as break column.
                      ; Search for black bit next.
                      ;
009A F5               DLT015:  PUSH    PSW        ; Save current byte
009B 7A                        MOV     A,D        ; Save current count as break column position
009C 320000     D              STA     BRKROW
009F F1                        POP     PSW        ; Recover current byte
00A0 14                        INR     D          ; Increment total count
00A1 0D                        DCR     C          ; Decrement bit counter
00A2 C2AD00     C              JNZ     DBT020     ; Jump if byte not exhausted
00A5 05                        DCR     B          ; Else, decrement byte counter
00A6 CADE00     C              JZ      DBT030     ; Return w/ NC if all bytes searched
00A9 23                        INX     H          ; Else get next byte
00AA 7E                        MOV     A,M
00AB 0E08                      MVI     C,8        ; Set bit counter
00AD B7               DBT020:  ORA     A          ; Clear carry
00AE 17                        RAL                ; Rotate leftmost bit into carry
00AF DAC200     C              JC      DBT025     ; Jump if black
00B2 14                        INR     D          ; Increment total count
00B3 0D                        DCR     C          ; Decrement bit counter
00B4 C2AD00     C              JNZ     DBT020     ; Continue search if byte not exhausted
00B7 05                        DCR     B          ; Else, decrement byte counter
00B8 CADE00     C              JZ      DBT030     ; Return w/ NC if all bytes searched
```

```
LOC  OBJ              SOURCE STATEMENT

00BB 23                      INX     H                ; Else, get next byte
00BC 7E                      MOV     A,M
00BD 0E08                    MVI     C,8              ; Set bit counter
00BF C3AD00    C             JMP     DBT020           ; Continue search
                      ;
                      ; Black found after white, so is double character.  Move break column to
                      ; accumulator and return with carry set.
                      ;
00C2 3A3C00    D      DBT025: LDA    CHRSIZ           ; Get total character width
00C5 0F                      RRC                      ; Divide it by four
00C6 0F                      RRC
00C7 E63F                    ANI     3FH
00C9 47                      MOV     B,A              ; Save result
00CA 3A0000    D             LDA     BRKROW           ; Get desired break column
00CD C602                    ADI     2                ; Fudge a little
00CF B8                      CMP     B                ; Break column >= 1/4 (Character size) ?
00D0 DADE00    C             JC      DBT030           ;   No, don't separate at this point
00D3 E1                      POP     H                ; Reset stack
00D4 3A0000    D             LDA     BRKROW
00D7 320000    E             STA     RCVDCC
00DA 37                      STC
00DB 0601                    MVI     B,1
00DD C9                      RET
                      ;
                      ; No white space found within shadow.  If primary font is a P.S. font, then
                      ; sum pixels down center twelve columns of character buffer and search for a
                      ; small density in the center.
                      ;
00DE E1               DBT030: POP    H                ; Reset stack
00DF 3A0000    E             LDA     PSFLAG           ; Get P.S. indicator
00E2 B7                      ORA     A                ; Test for zero
00E3 C2F400    C             JNZ     DBT031           ; Return if not P.S.
00E6 EB                      XCHG
00E7 211800                  LXI     H,RECIPF         ; Get isolation pitch indicator
00EA 19                      DAD     D
00EB 7E                      MOV     A,M
00EC FEBF                    CPI     BFH              ; P.S. ?
00EE EB                      XCHG
00EF CAF400    C             JZ      DBT031           ;   Yes, do touching double test
00F2 AF                      XRA     A                ;   No,  return test failed
00F3 C9                      RET
                      ;
00F4 EB               DBT031: XCHG
00F5 D5                      PUSH    D                ; Save buffer address
00F6 0E18                    MVI     C,24             ; Initialize character width
00F8 79                      MOV     A,C              ; Divide character width by 2 to give character
00F9 B7                      ORA     A                ;   midpoint and save it.
00FA 1F                      RAR
00FB 321900    D             STA     MIDPT
00FE D60B                    SUI     11               ; Subtract default width midpoint to yield
0100 321A00    D             STA     SHFTCT           ;   number of pixels to shift
0103 D1                      POP     D                ; Recover buffer address
0104 D5                      PUSH    D
0105 AF                      XRA     A                ; Set second pass flag to show processing
0106 323B00    D             STA     PAS2FG           ;   second byte column of character
```

```
LOC  OBJ          LINE        SOURCE STATEMENT

0109 212000        640          LXI    H,RECCHB      ; Point to character data
010C 19            641          DAD    D
010D 111B00   D    642          LXI    D,KRNBUF      ; Set starting address for kern buffer
0110 3E20          643          MVI    A,32          ; Initialize row counter
                   644 ;
0112 F5            645 DBT105:  PUSH   PSW           ; Save row counter
0113 2C            646          INR    L             ; Point to second byte of character row
0114 7E            647          MOV    A,M           ; Get it
0115 2C            648          INR    L             ; Point to next row
0116 2C            649          INR    L
0117 12            650          STAX   D             ; Save in kern buffer
0118 13            651          INX    D             ; Point to next row byte
0119 F1            652          POP    PSW           ; Recover row counter
011A 3D            653          DCR    A             ; Continue until all rows processed
011B C21201   C    654          JNZ    DBT105
                   655 ;
011E 211B00   D    656 DBT110:  LXI    H,KRNBUF      ; Point to first byte in column
0121 7E            657          MOV    A,M           ; Get first byte
0122 2F            658          CMA                  ; Complement for tracking white
0123 47            659          MOV    B,A           ; Set as previous mask
0124 3E1F          660          MVI    A,31          ; Set row counter for remaining rows
0126 F5            661 DBT120:  PUSH   PSW           ; Save row counter
0127 23            662          INX    H             ; Point to next byte
0128 7E            663          MOV    A,M           ;   and get it
0129 2F            664          CMA                  ; Set for white
012A 4F            665          MOV    C,A           ; Save complemented byte
012B B7            666          ORA    A             ; Spread black one pixel either way to catch
012C 1F            667          RAR                  ;   diagonal paths
012D 57            668          MOV    D,A
012E 79            669          MOV    A,C
012F B7            670          ORA    A
0130 17            671          RAL
0131 B1            672          ORA    C
0132 B2            673          ORA    D
0133 A0            674          ANA    B             ; Any overlap from previous byte
0134 CA4A01   C    675          JZ     DBT130        ; No, then characters touch at this point
0137 CDB402   C    676          CALL   BITHDB        ; Adjust mask for new row
013A F1            677          POP    PSW           ; Recover row counter
013B 3D            678          DCR    A             ; Continue until all rows processed
013C C22601   C    679          JNZ    DBT120
                   680 ;
                   681 ;
                   682 ; Successful kerned path found, separate character at midpoint
                   683 ;
013F D1            684          POP    D             ; Restore stack
0140 3A1900   D    685          LDA    MIDPT         ; Use character midpoint as break column
0143 320000   E    686          STA    RCVDCC
0146 37            687          STC
0147 0602          688          MVI    B,2
0149 C9            689          RET
                   690 ;
014A F1            691 DBT130:  POP    PSW           ; Reset stack
014B 3A3B00   D    692          LDA    PAS2FG        ; Already tried third byte column of char
014E B7            693          ORA    A
014F C29901   C    694          JNZ    DBT132        ;   Yes, done with kerned test
```

```
LOC  OBJ            LINE          SOURCE STATEMENT

0152 D1              695           POP     D            ; Recover character buffer address
0153 D5              696           PUSH    D
0154 210300          697           LXI     H,RECHSZ     ; Set horizontal size of character
0157 19              698           DAD     D
0158 7E              699           MOV     A,M
0159 FE18            700           CPI     24           ; Test to see if oversize character
015B C29901     C    701           JNZ     DBT132       ; If not, then dont't test 3rd byte for kerned
015E 211100          702           LXI     H,RECLNK     ; Set right link
0161 19              703           DAD     D
0162 7E              704           MOV     A,M
0163 3C              705           INR     A            ; Test for null
0164 CA9901     C    706           JZ      DBT132       ; If null, then not oversize character
0167 3D              707           DCR     A            ; Compute address of right buffer
                     708           FTADR
0168 110D00          710           LXI     D,RECSFG     ; Get separation flag for right character
016B 19              711           DAD     D
016F 7E              712           MOV     A,M
0170 E608            713           ANI     08H          ; Test for remnant
0172 CA9901     C    714           JZ      DBT132       ; Jump if not remnant
0175 3EFF            715           MVI     A,0FFH       ; Character is oversized, so try third byte
0177 323500     D    716           STA     PAS2F3       ;   column of character for kerned
017A 3E14            717           MVI     A,20         ; Set midpoint of character for kernel
017C 321900     D    718           STA     MIDPT        ;   separation in third byte of character
017F D1              719           POP     D            ; Recover character buffer address
0180 D5              720           PUSH    D
0181 212000          721           LXI     H,RECCHB     ; Point to character data
0184 19              722           DAD     D
0185 111B00     D    723           LXI     D,KRNBUF
0188 3E20            724           MVI     A,32         ; Set row counter
018A F5              725 DBT131:   PUSH    PSW          ; Save row counter
018B 2C              726           INR     L            ; Point to third byte of character row
018C 2C              727           INR     L
018D 7E              728           MOV     A,M          ; Get it
018E 2C              729           INR     L            ; Point to next row
018F 12              730           STAX    D            ; Save byte in kern buffer
0190 13              731           INX     D
0191 F1              732           POP     PSW          ; Recover row counter
0192 3D              733           DCR     A            ; Continue until all rows processed
0193 C28A01     C    734           JNZ     DBT131
0196 C31E01     C    735           JMP     DBT110       ; Try kerned test on new byte column
                     736 ;
0199 D1              737 DBT132:   POP     D            ; Recover character buffer address
019A D5              738           PUSH    D
                     739 ;
019B 210100     D    740           LXI     H,COLSUM     ; Zero out column counters
019E 0618            741           MVI     B,24         ; Twelve bytes
01A0 AF              742           XRA     A
01A1 77              743 DBT035:   MOV     M,A
01A2 23              744           INX     H
01A3 05              745           DCR     B
01A4 C2A101     C    746           JNZ     DBT035
01A7 212000          747           LXI     H,RECCHB     ; Point to data for center eight columns of
01AA 19              748           DAD     D            ;   top row of character buffer
01AB 0E20            749           MVI     C,32         ; Process 32 rows
01AD 7E              750 DBT040:   MOV     A,M          ; Get byte from row
```

```
LOC  OBJ            SOURCE STATEMENT

01AE 2C                       INR   L         ; Point to next byte in row
01AF E5                       PUSH  H         ; Save row address
01B0 210100    D              LXI   H,COLSUM  ; Set column counter address
01B3 0608                     MVI   B,8       ; Bit counter
01B5 B7                       ORA   A         ; Clear carry flag
01B6 17             DBT042:   RAL             ; Rotate leftmost bit into carry
01B7 D2BB01    C              JNC   DBT045    ; Jump if not one
01BA 34                       INR   M         ; Else, update density count for column
01BB 23             DBT045:   INX   H         ; Point to next column density count
01BC 05                       DCR   B         ; Decrement bit counter
01BD C2B601    C              JNZ   DBT042    ; Continue until all bits processed
01C0 E3                       XTHL            ; Get character buffer address
01C1 7E                       MOV   A,M       ; Get next byte of character
01C2 2C                       INR   L         ;   and update buffer address
01C3 E3                       XTHL
01C4 B7                       ORA   A         ; Clear carry flag
01C5 0608                     MVI   B,8       ; Set bit counter
01C7 17             DBT046:   RAL             ; Rotate net bit into carry
01C8 D2CC01    C              JNC   DBT048    ; Jump if not black
01CB 34                       INR   M         ; Else, increment counter
01CC 23             DBT048:   INX   H         ; Point to next counter
01CD 05                       DCR   B         ; Decrement bit counter
01CE C2C701    C              JNZ   DBT046    ; Continue until count exhausted
01D1 E3             DBT050:   XTHL            ; Get character buffer address
01D2 7E                       MOV   A,M       ; Get next byte of character
01D3 2C                       INR   L         ;   and update buffer address
01D4 E3                       XTHL
01D5 0608                     MVI   B,8       ; Process most significant 2 bits of next byte
01D7 B7                       ORA   A         ; Clear carry
01D8 17             DBT052:   RAL             ; Rotate next bit into carry
01D9 D2DD01    C              JNC   DBT055    ; Jump if not one
01DC 34                       INR   M         ; Else, increment counter
01DD 23             DBT055:   INX   H         ; Point to next counter
01DE 05                       DCR   B         ; Decrement bit counter
01DF C2D801    C              JNZ   DBT052    ; Continue until all bits processed
01E2 E1                       POP   H         ; Recover buffer address
01E3 0D                       DCR   C         ; Decrement row counter
01E4 C2AD01    C              JNZ   DBT040    ; Continue until all rows processed
                    ;
                    ; Compute the center of the character if there is a remnant.  Use the center
                    ; 14 bytes of the densities for the test
                    ;
01E7 3E05                     MVI   A,5       ; Store default shift count if not remnant
01E9 321A00    D              STA   SHFTCT
01EC D1                       POP   D         ; Recover buffer address
01ED D5                       PUSH  D
01EE 210300    C              LXI   H,RECHSZ  ; Get horizontal size of character
01F1 19                       DAD   D
01F2 7E                       MOV   A,M
01F3 FE18                     CPI   24        ; Test to see if oversize
01F5 C21902    C              JNZ   DBT055    ; No remnant if not oversize
01F8 211100                   LXI   H,RECLNK  ; Compute buffer address of buffer to right
01FB 19                       DAD   D
01FC 7E                       MOV   A,M
                              PTADR
```

```
LOC  OBJ                  SOURCE STATEMENT

0200 110000   D            LXI   D,RECSFG          ; Get separation flag
0203 EB                    XCHG
0204 19                    DAD   D
0205 7E                    MOV   A,M
0206 E608                  ANI   08                ; Horizontal remnant ?
0208 CA1902   C            JZ    DBT056            ;   No,  continue
020B 210300                LXI   H,RECHSZ          ;   Yes, get horizontal size of remnant
020E 19                    DAD   D
020F 7E                    MOV   A,M
0210 C618                  ADI   24                ; Compute total character size
0212 B7                    ORA   A                 ; Divide by 2 to yield midpoint
0213 1F                    RAR
0214 D607                  SUI   7                 ; Bias to give shift count
0216 321A00   D            STA   SHFTCT
0219 210100   D   DBT056:  LXI   H,COLSUM          ; Shift 12 bytes to left by count in SHFTCT
021C 3A1A00   D            LDA   SHFTCT
021F 4F                    MOV   C,A               ; Compute starting address to start shift
0220 0600                  MVI   B,0
0222 09                    DAD   B
0223 110100   D            LXI   D,COLSUM          ; Destination address
0226 060C                  MVI   B,12              ; Shift 12 bytes
0228 7E           DBT058:  MOV   A,M               ; Get source byte
0229 12                    STAX  D                 ;   and store it
022A 23                    INX   H                 ; Update pointers
022B 13                    INX   D
022C 05                    DCR   B                 ; Decrement byte counter
022D C22802   C            JNZ   DBT058            ; Continue until 12 bytes shifted
                  ;
                  ; Density counts have been formed, test to see if there is one with fewer than
                  ; four pixels in the center.  Break the character at the least dense location
                  ; closest to the center if so.
                  ; The order in which the bytes are searched is:
                  ;          11-9-7-5-3-1-2-4-6-8-10-12
                  ;
0230 210700   D            LXI   H,COLSUM+5        ; Start at center
0233 EB                    XCHG
0234 060B                  MVI   B,11              ; Process eight bytes
0236 0E00                  MVI   C,0               ; Starting counter
0238 79           DBT060:  MOV   A,C               ; Compute offset from center for this count
0239 3C                    INR   A                 ;   = (Count + 1) / 2 carry becomes sign
023A B7                    ORA   A
023B 1F                    RAR
023C 2600                  MVI   H,0
023E 6F                    MOV   L,A
023F D24702   C            JNC   DBT065            ; Don't negate if no carry
0242 2F                    CMA
0243 26FF                  MVI   H,0FFH
0245 6F                    MOV   L,A
0246 23                    INX   H
0247 19           DBT065:  DAD   D                 ; Add offset to address of center byte
0248 7E                    MOV   A,M               ; Test byte for small pixel count
0249 FE03                  CPI   3
024B DA7002   C            JC    DBT070            ; If so, then break row found
024E 0C                    INR   C                 ; Else, update counts and try again until
024F 05                    DCR   B                 ;   all bytes processed
```

```
LOC  OBJ            LINE        SOURCE STATEMENT

0250 C23802    C     862            JNZ    DBT050
0253 D1              863            POP    D              ; No small pixel density, so test to see if
0254 3A0000    E     864            LDA    PSFLAG         ;    both isolation and recognition say this
0257 B7              865            ORA    A              ;    is P.S.
0258 C26502    C     866            JNZ    DBT067         ; Return if recognition says it isn't
025B 211800          867            LXI    H,RECIPF       ; Point to isolation pitch flag
025E 19              868            DAD    D
025F 7E              869            MOV    A,M            ; Set it
0260 FEBF            870            CPI    0FH            ; High confidence P.S. ?
0262 C26E02    C     871            JNZ    DBT068         ;    No, don't make default cut
0265 3A3C00    D     872 DBT067:    LDA    CHRSIZ         ;    Yes, compute midpoint of character at
0268 B7              873            ORA    A              ;         which to make default cut
0269 1F              874            RAR
026A 0604            875            MVI    B,4
026C 37              876            STC
026D C9              877            RET
026E AF              878 DBT068:    XRA    A
026F C9              879            RET
0270 110100    D     880 DBT070:    LXI    D,COLSUM       ; Compute column at which to break
0273 7A              881            MOV    A,D            ;    = (Match Addr) - (Addr of COLSUM) + 8
0274 2F              882            CMA
0275 57              883            MOV    D,A
0276 7B              884            MOV    A,E
0277 2F              885            CMA
0278 5F              886            MOV    E,A
0279 13              887            INX    D
027A 19              888            DAD    D
027B 3A1A00    D     889            LDA    SHFTCT
027E 85              890            ADD    L
027F D1              891            POP    D
0280 37              892            STC
0281 0603            893            MVI    B,3            ; Set return status
0283 C9              894            RET
                     895 ;
                     896 ; Bit horizontal overlapped black.  Select all segments in C which overlap
                     897 ; black segments in ACC.  Output in B.
                     898 ;
0284 47              899 BITHOB:    MOV    B,A            ; Output will include ACC
0285 5F              900            MOV    E,A
0286 B7              901            ORA    A              ; Clear carry
0287 17              902 BITHL1:    RAL                   ; Shift mask left
0288 A1              903            ANA    C              ; Select new contiguous bits
0289 57              904            MOV    D,A            ; Save remaining mask bits
028A B0              905            ORA    B              ; Add new bits to output mask
028B 47              906            MOV    B,A            ; Save
028C 7A              907            MOV    A,D            ; Any mask bits left ?
028D B7              908            ORA    A
028E C28702    C     909            JNZ    BITHL1         ;    Yes, continue mask extension
0291 7B              910            MOV    A,E            ; Restore initial mask
0292 B7              911            ORA    A              ; Now pick up bits to the right
0293 1F              912 BITHL2:    RAR                   ; Shift mask right
0294 A1              913            ANA    C              ; Select new contiguousbits
0295 57              914            MOV    D,A
0296 B0              915            ORA    B
0297 47              915            MOV    B,A
```

```
LOC  OBJ                SOURCE STATEMENT

0298 7A                       MOV     A,D
0299 B7                       ORA     A                   ; Any mask hits left ?
029A C29302       C           JNZ     BITHL2              ;
029D C9                       RET
                        ;
                        $EJECT
                        ;***************************************************************************
                        ;
                        ; Subroutine DBLSEP
                        ;
                        ;       The following subroutine is used to separate two characters
                        ;       which are in one buffer.  The column at which to separate the
                        ;       characters was computed in the previous call to DBLTST.
                        ;
                        ;       Inputs:         A           Column at which to separate characters
                        ;                       HL          Current character buffer (will hold left)
                        ;                       DE          Character buffer to hold right
                        ;
                        ;       Outputs:        (HL)        Character to left of break column
                        ;                       (DE)        Character to right of break column
                        ;
                        ;       Registers
                        ;       Affected:       All
                        ;
                        ;***************************************************************************
                        ;
029E D5                 DBLSEP: PUSH    D                   ; Save registers
029F F5                       PUSH    PSW
02A0 E5                       PUSH    H
                        ;
                        ; Compute leftmost, rightmost, uppermost and lowermost black in the character
                        ;
02A1 011700                   LXI     B,23                ; Create shadows of character in recom buffer
02A4 CD0000       E           CALL    CRSHAD
                        ;
02A7 210000       E           LXI     H,SHADH1            ; Start a left byte of shadow
02AA 3E01                     MVI     A,1                 ; Search from left to right
02AC 011700                   LXI     B,23
02AF CD0000       E           CALL    FNDBLK
02B2 D23903       C           JNC     DBS100              ; Jump if blank recombination buffer (abort)
02B5 320000       E           STA     LFTBLK              ; Save leftmost black
                        ;
02B8 3A0000       E           LDA     RCVECC              ; Use ending column in recombination buffer
02BB 320000       E           STA     RITBLK              ; Save righmost black
                        ;
02BE 210000       E           LXI     H,SHADV1            ; Start at top byte of shadow
02C1 3E01                     MVI     A,1                 ; Search from left to right
02C3 012700                   LXI     B,39
02C6 CD0000       E           CALL    FNDBLK
02C9 D23903       C           JNC     DBS100              ; Abort if blank recombination buffer
02CC 320000       E           STA     TOPBLK              ; Save uppermost black
                        ;
02CF 210000       E           LXI     H,SHADV5            ; Start at bottom byte of shadow
02D2 3EFF                     MVI     A,-1                ; Search from right to left
02D4 010027                   LXI     B,2700H
```

```
LOC  OBJ              SOURCE STATEMENT

02D7 CD0000  E            CALL    FNDBLK
02DA 320000  E            STA     BTMBLK          ; Save lowermost black
                   ;
                   ; Separate the left character and save it
                   ;
02DD E1                   POP     H               ; Recover left buffer address
02DE F1                   POP     PSW             ; Recover break column
02DF F5                   PUSH    PSW             ; Resave registers
02E0 E5                   PUSH    H
02E1 0603                 MVI     B,3             ; Compute the shadow for the left character
02E3 210000  E            LXI     H,SHADH1
02E6 CDB603  C            CALL    GENMSK
02E9 E1                   POP     H
02EA F1                   POP     PSW
02EB F5                   PUSH    PSW
02EC E5                   PUSH    H
02ED 4F                   MOV     C,A             ; Compute width of left character
02EE 3A0000  E            LDA     LFTBLK          ;    = Break Column - LFTBLK + 1
02F1 47                   MOV     B,A
02F2 79                   MOV     A,C
02F3 90                   SUB     B
02F4 3C                   INR     A
02F5 5F                   MOV     E,A
02F6 3A0000  E            LDA     TOPBLK          ; Compute height of character
02F9 4F                   MOV     C,A             ;    = BTMBLK - TOPBLK + 1
02FA 3A0000  E            LDA     BTMBLK
02FD 91                   SUB     C
02FE 3C                   INR     A
02FF 57                   MOV     D,A
0300 D5                   PUSH    D               ; Save height and width
0301 CD0000  E            CALL    BUFLOD          ; Move left character from recombination
                                                  ;   buffer to character buffer
0304 D1                   POP     D               ; Recover left buffer address
0305 E1                   POP     H
0306 D5                   PUSH    D
0307 E5                   PUSH    H
0308 CD0000  E            CALL    CCENTR          ; Center left character
030B E1                   POP     H
030C 110000  E            LXI     D,PRTCHR
                   ;
                   ; Separate the right character and save it
                   ;
030F D1                   POP     D               ; Recover break column
0310 F1                   POP     PSW
0311 F5                   PUSH    PSW
0312 D5                   PUSH    D
0313 47                   MOV     B,A             ; Compute number of bits in right mask
0314 3A0000  E            LDA     MOVECC
0317 90                   SUB     B
0318 0603                 MVI     B,3             ; Create mask for right character
031A 210000  E            LXI     H,SHADH1
031D CDB603  C            CALL    GENMSK
0320 D1                   POP     D               ; Recover height and width
0321 F1                   POP     PSW             ; Recover break column
0322 E1                   POP     H               ; Recover right buffer address
0323 47                   MOV     B,A             ; Compute width of right character
```

```
LOC  OBJ           SOURCE STATEMENT

0324 3A0000   E           LDA     RITBLK          ;   = RITBLK - Break Column + 1
0327 90                   SUB     B
0328 3C                   INR     A
0329 5F                   MOV     E,A             ; Use height of left character
032A E5                   PUSH    H               ; Save right buffer address
032B CD0000   E           CALL    BUFLOD          ; Move the right character from the recombina-
                                                  ;   tion buffer to the character buffer
032E E1                   POP     H               ; Recover buffer address
032F E5                   PUSH    H
0330 CD0000   E           CALL    CCENTR          ;   and center the right character
0333 E1                   POP     H
0334 110000   E           LXI     D,PRTCHR
0337 AF                   XRA     A               ; Reset carry flag
0338 C9                   RET                     ; Exit DBLSEP
                    ;
0339 E1             DBS100: POP   H               ; Reset stack
033A F1                   POP     PSW
033B D1                   POP     D
033C AF                   XRA     A
033D 37                   STC                     ; Set carry flag to signal aborted separation
033E C9                   RET
                    ;
                    $EJECT
                    ;***********************************************************************
                    ;
                    ; Subroutine DBLRST                                                   ;
                    ;                                                                     ;
                    ;       The following subroutine is used to restore the original character ;
                    ;       following double character processing.  This is called when double ;
                    ;       character processing actually made the results worse.          ;
                    ;                                                                     ;
                    ;       Inputs:      HL           Address to put restored character    ;
                    ;                                                                     ;
                    ;       Outputs:     (HL)         Original character                   ;
                    ;                    Right char   Remnant (if any)                     ;
                    ;                                                                     ;
                    ;       Registers                                                     ;
                    ;       Affected:    All                                              ;
                    ;                                                                     ;
                    ;***********************************************************************
                    ;
033F E5             DBLRST: PUSH  H               ; Save buffer address
0340 011700               LXI     B,23            ; Create character shadows
0343 CD0000   E           CALL    CRSHAD
                    ;
0346 210000   E           LXI     H,SHADV1        ; Start at top byte of shadow
0349 3E01                 MVI     A,1             ; Search from left to right
034B 012700               LXI     B,39
034E CD0000   E           CALL    FNDBLK
0351 320000   E           STA     TOPBLK          ; Save uppermost black
                    ;
0354 210000   E           LXI     H,SHADV5        ; Start at bottom byte of shadow
0357 3EFF                 MVI     A,-1            ; Search from right to left
0359 010027               LXI     B,2700H
035C CD0000   E           CALL    FNDBLK
```

```
LOC  OBJ            LINE          SOURCE STATEMENT

035F 4F              1083          MOV    C,A           ; Save lowermost black
0360 3A0000    E     1084          LDA    TOPBLK        ; Compute character height
0363 47              1085          MOV    B,A           ;   = BTMBLK - TOPBLK + 1
0364 79              1086          MOV    A,C
0365 90              1087          SUB    B
0366 3C              1088          INR    A
0367 57              1089          MOV    D,A
0368 1E18            1090          MVI    E,24          ; Set character width as 24
036A E1              1091          POP    H
036B D5              1092          PUSH   D             ; Save height
036C E5              1093          PUSH   H
036D 0600            1094          MVI    B,0           ; Character starts at column 0
036F CD0000    E     1095          CALL   BUFLOD        ; Move character to buffer
0372 E1              1096          POP    H
0373 E5              1097          PUSH   H
0374 CD0000    E     1098          CALL   CCENTR
0377 E1              1099          POP    H
0378 111100          1100          LXI    D,RECLNR      ; Compute buffer address of right character
037B 19              1101          DAD    D
037C 7E              1102          MOV    A,M
                     1103          PIADR
0380 110000          1104          LXI    D,RECSPS      ; Set separation flag in right character to
0383 EB              1106          XCHG                 ;   show that it is a remnant
0384 19              1107          DAD    D
0385 7E              1108          MOV    A,M
0386 F608            1109          ORI    08H
0388 77              1110          MOV    M,A
0389 E1              1111          POP    B
038A 3A0000    E     1112          LDA    RCVECC        ; Recover height
038D FE18            1113          CPI    24            ; Test to see if original character was wider
038F DA9C03    C     1114          JC     DBR005        ;   than 24.
0392 EB              1115          XCHG                 ; If not, then just clear the remnant buffer
0393 D617            1116          SUI    23            ; Else, compute width of remnant
0395 5F              1117          MOV    E,A
0396 0618            1118          MVI    B,24          ; Remnant starts at column 24
0398 CD0000    E     1119          CALL   BUFLOD        ; Load remnant into buffer
039B C9              1120          RET
                     1121 ;
039C 212000          1122 DBR005:  LXI    H,RECCHB      ; There is no black remnant, so just clear
039F 19              1123          DAD    D             ;   the remnant buffer
03A0 0660            1124          MVI    B,96
03A2 AF              1125          XRA    A
03A3 77              1126 DBR010:  MOV    M,A
03A4 2C              1127          INR    L
03A5 05              1128          DCR    B
03A6 C2A303    C     1129          JNZ    DBR010
03A9 210300          1130          LXI    H,RECHSZ
03AC 19              1131          DAD    D
03AD 3600            1132          MVI    M,0
03AF 210700          1133          LXI    H,RECVSZ
03B2 19              1134          DAD    D
03B3 3600            1135          MVI    M,0
03B5 C9              1136          RET
                     1137 ;
                     1138 $EJECT
```

```
LOC  OBJ            LINE        SOURCE STATEMENT
                    1139 ;*********************************************************************
                    1140 ;                                                                     ;
                    1141 ; Subroutine GENMSK                                                   ;
                    1142 ;                                                                     ;
                    1143 ;       The following subroutine is used to generate a mask for horizontal ;
                    1144 ;       character separation.                                        ;
                    1145 ;                                                                     ;
                    1146 ;       Inputs:       A            Number of leading black bits       ;
                    1147 ;                     B            Number of bytes in mask            ;
                    1148 ;                     HL           Address of first byte of mask      ;
                    1149 ;                                                                     ;
                    1150 ;       Outputs:      (HL)         Character mask                     ;
                    1151 ;                                                                     ;
                    1152 ;       Registers                                                     ;
                    1153 ;       Affected:     All                                             ;
                    1154 ;                                                                     ;
                    1155 ;*********************************************************************
                    1156 ;
                    1157 GENMSK:
03B6 D608           1158 GNM005: SUI     8               ; Subtract 8 from cut column
03B8 DAC303    C    1159         JC      GNM010          ; Jump if result is less than zero
03BB 36FF           1160         MVI     M,0FFH          ; Else, full byte of shadow
03BD 23             1161         INX     H
03BE 05             1162         DCR     B
03BF C2B603    C    1163         JNZ     GNM005
03C2 C9             1164         RET
03C3 C608           1165 GNM010: ADI     8               ; Restore count
03C5 5F             1166         MOV     E,A             ; Compute offset to bit table
03C6 1600           1167         MVI     D,0
03C8 E5             1168         PUSH    H
03C9 21DB03    C    1169         LXI     H,GNMBT1
03CC 19             1170         DAD     D
03CD 7E             1171         MOV     A,M             ; Get bit mask
03CE E1             1172         POP     H               ; And save it
03CF 77             1173         MOV     M,A
03D0 23             1174         INX     H
03D1 05             1175         DCR     B
03D2 C8             1176         RZ
03D3 3600           1177 GNM015: MVI     M,0             ; Blank out remaining bytes of mask
03D5 23             1178         INX     H
03D6 05             1179         DCR     B
03D7 C2D303    C    1180         JNZ     GNM015
03DA C9             1181         RET
                    1182 ;
03DB 00             1183 GNMBT1: DB      0
03DC 80             1184         DB      80H
03DD C0             1185         DB      0C0H
03DE E0             1186         DB      0E0H
03DF F0             1187         DB      0F0H
03E0 F8             1188         DB      0F8H
03E1 FC             1189         DB      0FCH
03E2 FE             1190         DB      0FEH
                    1191 ;
                    1192         END
ASSEMBLY COMPLETE,   NO ERRORS
CHP13.
SVP6.
SZS.
```

```
LOC  OBJ          LINE      SOURCE STATEMENT

$NOLIST
$LIST
$TITLE('Recognition recombination routines - Rev A')
;
;        ***************************************************
;        *                                                 *
;        * Recognition Horizontal and Vertical Recombination *
;        *                                                 *
;        ***************************************************
;
;
; Public procedure definitions
;
         PUBLIC  HRECOM            ; For recombining characters horizontally
         PUBLIC  HRECM2            ; For recombining a char with one in recom. buf
         PUBLIC  VRECOM            ; For recombining characters vertically
         PUBLIC  VRECM2            ; For moving one character to the recom. buffer
;
; External procedure definitions
;
         EXTRN   CHRLOD            ; For moving a character to the recom. buffer
         EXTRN   FNDBLK            ; For finding 1st black bit in string of bytes
         EXTRN   CCENTR            ; For centering a character in a buffer
         EXTRN   CRCSHD            ; For creating character shadows
         EXTRN   RCMOUT
         EXTRN   PRTCHR
;
; External variable definitions
;
         EXTRN   RTBYTE            ; First byte of vertical shadow
         EXTRN   RBBYTE            ; Last byte of vertical shadow
         EXTRN   RLBYTE            ; First byte of horizontal shadow
         EXTRN   RCLPTR            ; Pointer to the left character buffer
         EXTRN   RCLTPT            ; Pointer to left upper char. buffer (if any)
         EXTRN   RCRPTR            ; Pointer to the right character buffer
         EXTRN   RCRTPT            ; Pointer to right upper char. buffer (if any)
         EXTRN   RCVOCC            ; Original separation column in recom. buffer
         EXTRN   RCVCCC            ; Last separation column used by separation
         EXTRN   RCVECC            ; Ending column in recombination buffer
         EXTRN   RCVRHO            ; Horizontal origin of chars in recom buffer
         EXTRN   RCVRVO            ; Vertical origin of chars in recom buffer
         EXTRN   RCVLPS            ; Last pass indicator for separation retry
         EXTRN   RCVFPS            ; First pass indicator for separation retry
         EXTRN   RCVRTC            ; Retry counter for horizontal retries
         EXTRN   LFTBLK            ; Leftmost black in character
         EXTRN   TOPBLK            ; Uppermost black in character
         EXTRN   BTMBLK            ; Lowermost black in character
         EXTRN   SHFTCT            ; Number of pixels to shift character
         EXTRN   MINORG            ; Minimum horizontal origin for vert recom
;
$EJECT
;
; Local variable declarations
;
         DSEG
```

```
LOC  OBJ        LINE        SOURCE STATEMENT

0000                  NXTCOL: DS      1                 ; Starting column to load next character
                      ;
                      $EJECT
                      ;*********************************
                      ;
                      ; Macro Definitions
                      ;
                      ;        The following macros are used by routines in RECRCM
                      ;
                      $INCLUDE(:F1:MACROS.INC)
                    = ;
                    = ;*****************************
                    = ;
                    = ; Macro LSHFT4
                    = ;
                    = ;        The following macro performs a four register shift operation.
                    = ;        The contents in the register string B,C,D,E are shifted left
                    = ;        (A) times.
                    = ;
                    = LSHFT4  MACRO
                    =         LOCAL   LSHF01            ; Local label definitions
                    =         LOCAL   LSHF02
                    =         MOV     H,A               ; Move counter to H
                    =         ORA     A                 ; Test for zero initially
                    =         JZ      LSHF02            ; If zero, then don't do shift
                    = LSHF01: ORA     A                 ; Clear carry
                    =         MOV     A,E               ; Rotate fourth byte left
                    =         RAL
                    =         MOV     E,A
                    =         MOV     A,D               ; Rotate carry into third byte
                    =         RAL
                    =         MOV     D,A
                    =         MOV     A,C               ; Rotate carry into second byte
                    =         RAL
                    =         MOV     C,A
                    =         MOV     A,B               ; Rotate carry into first byte
                    =         RAL
                    =         MOV     B,A
                    =         DCR     H                 ; Decrement shift count
                    =         JNZ     LSHF01            ; Continue until done with shifts
                    = LSHF02:
                    =         ENDM
                    = ;
                    = ;*****************************
                    = ;
                    = ; Macro RSHFT4
                    = ;
                    = ;        The following macro performs a four register shift operation.
                    = ;        The contents of the register string B,C,D,E are shifted right
                    = ;        (A) times.
                    = ;
                    = RSHFT4  MACRO
                    =         LOCAL   RSHF01            ; Local label definitions
                    =         LOCAL   RSHF02
                    =         MOV     H,A               ; Move counter to H
```

```
LOC  OBJ      LINE        SOURCE STATEMENT

                          ORA    A           ; Test for zero initially
                          JZ     RSHF02      ; If zero, then don't do shift
                 RSHF01:  ORA    A           ; Clear carry
                          MOV    A,B         ; Rotate first byte right
                          RAR
                          MOV    B,A
                          MOV    A,C         ; Rotate carry into second byte
                          RAR
                          MOV    C,A
                          MOV    A,D         ; Rotate carry into third byte
                          RAR
                          MOV    D,A
                          MOV    A,E         ; Rotate carry into fourth byte
                          RAR
                          MOV    E,A
                          DCR    H           ; Decrement shift count
                          JNZ    RSHF01      ; Continue until done with shifts
                 RSHF02:
                          ENDM
                 ;
                 ;*****************************
                 ;
                 ; Macro PTADR
                 ;
                 ;        The following macro computes a buffer address based on a base
                 ;        address and a buffer number
                 ;        = base address + (128 * buffer number)
                 ;        = DE + (128 * A)
                 ;
                          EXTRN  BUFADD
                 PTADR    MACRO
                          CALL   BUFADD      ; Use routine in ISOUTL
                          ENDM
                 ;
                 $EJECT
```

```
LOC  OBJ              SOURCE STATEMENT

          ;*****************************************************************************
          ;                                                                           ;
          ; Subroutine HRECON                                                         ;
          ;                                                                           ;
          ;       The following subroutine recombines a character and the touching    ;
          ;       character to its right in the recombination buffer.  Vertically     ;
          ;       linked characters are also recombined.  The characters are recom-   ;
          ;       bined based on word drop and horizontal offsets, so the resulting   ;
          ;       image is the same as was in the video buffer.                       ;
          ;                                                                           ;
          ;       Inputs:     RECPTR        Current recognition buffer to be linked to  ;
          ;                                 the character to its right                ;
          ;       Outputs:    SYSRCM        Recombination buffer with combined characters ;
          ;                   RCLPTR        Pointer to the left character buffer        ;
          ;                   RCLTPP        Pointer to left upper char. buffer (if any) ;
          ;                   RCRPTR        Pointer to the right character buffer       ;
          ;                   RCRTPP        Pointer to right upper char. buffer (if any) ;
          ;                   RCVOCC        Original separation column in recom. buffer ;
          ;                   RCVRHO        Horizontal origin of chars in recom buffer  ;
          ;                   RCVRVO        Vertical origin of chars in recom buffer    ;
          ;                   RCVLPS        Last pass indicator for separation retry    ;
          ;                   RCVFPS        First pass indicator for separation retry   ;
          ;                   RCVRTC        Retry counter for separation retry          ;
          ;                                                                           ;
          ;       Registers                                                           ;
          ;       Affected:   All                                                     ;
          ;                                                                           ;
          ;*****************************************************************************
          ;
                  CSEG
          HRECON:
          ;
          ; Zero out the recombination buffer prior to recombining characters
          ;
0000 21008C       LXI     H,SYSRCM          ; Recombination buffer origin address
0003 0628         MVI     B,40              ; Zero out 40 rows
0005 AF           XRA     A
          ZEROLP: REPT    10                ; Zero out ten bytes per row
                  MOV     M,A
                  INX     H
                  ENDM
001A 05           DCR     B                 ; Decrement row counter
001B C20600   C   JNZ     ZEROLP            ; Continue until all rows cleared
          ;
          ; Compute the buffer address of the character to the right of the current one
          ;
001E 2A0000   E   LHLD    RECPTR            ; Save current character buffer address as
0021 220000   E   SHLD    RCLPTR            ;   as address of left character buffer
0024 CD0000   E   CALL    CCENTR            ; Insure character is centered
0027 2A0000   E   LHLD    RCLPTR
002A 210000   E   LXI     H,PRTCHR
002D 2A0000   E   LHLD    RCLPTR
0030 111100       LXI     D,RECLNK          ; Get link to character to the right
0033 19           DAD     D
0034 7E           MOV     A,M               ; Compute buffer address based on link
```

```
LOC  OBJ               SOURCE STATEMENT

                              PTADR
003B 220000    E              SHLD     RCRPTR          ; Save as address of right character buffer
003E CD0000    E              CALL     CCENTR          ; Insure character is centered
003E 2A0000    E              LHLD     RCRPTR
0041 210000    E              LXI      H,PRTCHR
                       ;
                       ; Initialize horizontal and vertical offset information
                       ;
0044 2A0000    E              LHLD     RCLFTB          ; Get horizontal origin for the left character
0047 EB                       XCHG                     ;   and save it as the horizontal origin for
0048 210100                   LXI      H,RECHCO        ;   the recombination buffer
004B 19                       DAD      D
004C 4E                       MOV      C,M
004D 2C                       INR      L
004E 46                       MOV      B,M
004F E5                       PUSH     H
0050 60                       MOV      H,B
0051 69                       MOV      L,C
0052 220000    E              SHLD     RCVRHO
0055 7C                       MOV      A,H             ; Save complement of horizontal origin as
0056 2F                       CMA                      ;   an offset to determine starting columns
0057 67                       MOV      H,A             ;   in the recombination buffer
0058 7D                       MOV      A,L
0059 2F                       CMA
005A 6F                       MOV      L,A
005B 23                       INX      H
005C 220000    E              SHLD     MINORG
005F E1                       POP      H
0060 2C                       INR      L               ; Point to character width
0061 7E                       MOV      A,M             ; Save character width as starting column for
0062 320000    D              STA      NXTCOL          ;   the right character and as the original
0065 3D                       DCR      A
0066 320000    E              STA      RCVOCC          ;   separation point for the characters
0069 2C                       INR      L               ; Get vertical origin for the left character
006A 4E                       MOV      C,M             ;   and save it as the vertical origin for
006B 2C                       INR      L               ;   the recombination buffer
006C 46                       MOV      B,M
006D 2C                       INR      L               ; Get vertical word drop for character
006E 7E                       MOV      A,M
006F 60                       MOV      H,B
0070 69                       MOV      L,C
0071 220000    E              SHLD     RCVRVO
                       ;
                       ; Load the left character into the recombination buffer.  If it is vertically
                       ; linked, then vertically recombine the character in the buffer.
                       ;
0074 0E00                     MVI      C,0             ; Load the left character starting at column
0076 47                       MOV      B,A             ;   0 and down the vertical word drop
0077 211200                   LXI      H,RECLNO        ; Get the vertical link for the character
007A 19                       DAD      D
007B 7E                       MOV      A,M
007C 3C                       INR      A               ; Test for null
007D CA9200    C              JZ       HRLC01          ; If null, then load character
0080 C5                       PUSH     B               ; Else compute buffer address of top portion
0081 D5                       PUSH     D               ;   of the character and save it
```

```
LOC  OBJ               SOURCE STATEMENT

0082 7E                        MOV     A,M
                               PTADR
0086 220000     E              SHLD    RCLTPT
0089 D1                        POP     D                ; Perform vertical recombination for this
008A C1                        POP     B                ;   character
008B AF                        XRA     A
008C CDE701     C              CALL    VRECOM
008F C39500     C              JMP     ENDLFT           ; Continue with right character
0092 CD0000     E     HRECO1:  CALL    CHRLOD           ; Load character into buffer
                      ;
                      ; Load the right character into the recombination buffer.  If it is vertically
                      ; linked, then vertically recombine the character in the buffer
                      ;
0095 2A0000     E     ENDLFT:  LHLD    RCRPTR           ; Set the pointer to the right character
0098 EB                        XCHG                     ;   buffer
0099 210600                    LXI     H,RECVWS         ; Set the vertical word drop for the character
009C 19                        DAD     D                ;   character to use as the starting row to
009D 46                        MOV     B,M              ;   load the character
009E 3A0000     D              LDA     NXTCOL           ; Load the character directly following the
00A1 4F                        MOV     C,A              ;   left character
00A2 210300                    LXI     H,RECHSZ         ; Compute ending column in recombination buffer
00A5 19                        DAD     D
00A6 7E                        MOV     A,M
00A7 81                        ADD     C
00A8 320000     E              STA     RCVECC
00AB 211200                    LXI     H,RECLNU         ; Set the vertical link for the character
00AE 19                        DAD     D
00AF 7E                        MOV     A,M
00B0 3C                        INR     A                ; Test for null
00B1 CAC600     C              JZ      HRECO2           ; If null, then don't do vertical recombination
00B4 C5                        PUSH    B                ; Else, compute the address of the top
00B5 D5                        PUSH    D                ;   character buffer and save it
00B6 7E                        MOV     A,M
                               PTADR
00BA 220000     E              SHLD    RCRTPT
00BD D1                        POP     D                ; Vertically recombine the two portions of
00BE C1                        POP     B                ;   the right character
00BF AF                        XRA     A
00C0 CDE701     C              CALL    VRECOM
00C3 C3C900     C              JMP     ENDRIT           ; Continue with final initialization
00C6 CD0000     E     HRECO2:  CALL    CHRLOD           ; Load the right character into the recombi-
                                                        ;   nation buffer
                      ;
                      ; Perform initialization for horizontal separation retry routines
                      ;
00C9 AF               ENDRIT:  XRA     A
00CA 320000     E              STA     RCVLPS           ; Set not last pass
00CD 320000     E              STA     RCVRTC           ; Set no retries done yet
00D0 320000     E              STA     RCVFPS           ; Set first pass
00D3 C9                        RET                      ; Exit HRECOM
                      ;
00D4 21008C                    LXI     H,SYSRCM
00D7 CD0000     E              CALL    RCMOUT
00DA C9                        RET
                      ;
                      $EJECT
```

```
LOC  OBJ          SOURCE STATEMENT
              ;*********************************************************************
              ;                                                                     *
              ; Subroutine HRECM2                                                   *
              ;                                                                     *
              ;        The following subroutine is used to recombine a character to the *
              ;        right of a character already in the recombination buffer.  The *
              ;        character which is currently the right character in the recombina- *
              ;        tion buffer is shifted to the left and the new character is put *
              ;        in the recombination buffer to its right.                   *
              ;                                                                     *
              ;        Inputs:     RCRPTR       Pointer to the character which is currently *
              ;                                 the right character in the recombination *
              ;                                 buffer.                            *
              ;                    RCVCCC       Position where the best previous cut was *
              ;                                 made in the recombination buffer.  *
              ;                                                                     *
              ;        Outputs:    SYSRCM       Updated recombination buffer       *
              ;                    RCLPTR       Pointer to left character buffer (prev. right)*
              ;                    RCRPTR       Pointer to right character buffer (new one) *
              ;                    RCVOCC       Original cut column between the characters *
              ;                    RCVRHO       Horizontal origin of new recombination buffer *
              ;                    RCVLPS       Last pass indicator for separation (reset) *
              ;                    RCVFPS       First pass indicator for separation (set) *
              ;                    RCVRTC       Separation retry counter (reset)   *
              ;                                                                     *
              ;        Registers                                                    *
              ;        Affected:   All                                              *
              ;                                                                     *
              ;*********************************************************************
              ;
              HRECM2:
              ;
              ; Shift the character which is to the right of the previous separation
              ; cut column so that it is flush with the left side of the recombination
              ; buffer.
              ;
00DB 3A0000  E          LDA     RCVCCC        ; Compute the number of full bytes which
00DE 3C                 INR     A
00DF 47                 MOV     B,A           ;   must be shifted
00E0 0F                 RRC                   ;   = RCVCCC / 8
00E1 0F                 RRC
00E2 0F                 RRC
00E3 E61F               ANI     1FH
00E5 4F                 MOV     C,A           ; Save as counter in C
00E6 0600               MVI     B,0           ; Add byte count to starting recombination
00E8 21008C             LXI     H,SYSRCM      ;   buffer address to give starting address
00EB 09                 DAD     B             ;   for character
00EC 11008C             LXI     D,SYSRCM      ; DE <= Destination address
00EF 0628               MVI     B,40          ; Process 40 rows
00F1 0E04     HR2LP1:   MVI     C,4           ; Process four bytes per row
00F3 7E       HR2LP2:   MOV     A,M           ; Move one byte to the left
00F4 12                 STAX    D
00F5 3600               MVI     M,0           ;   and zero it out on the right side
00F7 23                 INX     H             ; Update addresses
00F8 13                 INX     D
```

```
LOC  OBJ          LINE        SOURCE STATEMENT

00F9 0D            683          DCR      C              ; Decrement byte counter
00FA C2F300   C    684          JNZ      HR2LP2         ; Jump if not done with row
00FD C5            685          PUSH     B              ; Save row counter
00FE 010600        686          LXI      B,6            ; Update address registers to point to
0101 09            687          DAD      B              ;   the next row of the recombination
0102 EB            688          XCHG                    ;   buffer
0103 09            689          DAD      B
0104 EB            690          XCHG
0105 C1            691          POP      B              ; Recover row counter
0106 05            692          DCR      B              ;   and decrement it
0107 C2F100   C    693          JNZ      HR2LP1         ; Jump if all rows not processed
                   694  ;
                   695  ; The character has been shifted as full bytes, so now shift it by bits.
                   696  ;
010A 3A0000   E    697          LDA      RCVCCC         ; Compute the number of bits to shift the
010D 3C            698          INR      A
010E E607          699          ANI      07H            ;   character = RCVCCC mod 8
0110 CA4E01   C    700          JZ       NBITSH         ; If zero, then no need to shift
0113 320000   E    701          STA      SHFTCT         ; Save shift count
0116 0628          702          MVI      B,40           ; Process 40 rows
0118 21000C        703          LXI      H,SYSRCM       ;   in the recombination buffer
011B C5            704  HR2LP3: PUSH     B              ; Save row counter
011C E5            705          PUSH     H              ; Save recombination buffer address
011D 46            706          MOV      B,M            ; Load four bytes from recombination buffer
011E 23            707          INX      H              ;   into B-C-D-E register string to be used
011F 4E            708          MOV      C,M            ;   as a four byte shift register
0120 23            709          INX      H
0121 56            710          MOV      D,M
0122 23            711          INX      H
0123 5E            712          MOV      E,M
0124 3A0000   E    713          LDA      SHFTCT         ; Shift the four registers by the previously
                   714          LSHFT4                  ;   computed shift count (shift is to left)
013D E1            734          POP      H              ; Save the shifted registers back into
013E 70            735          MOV      M,B            ;   memory to result as one shifted row of
013F 23            736          INX      H              ;   the character.
0140 71            737          MOV      M,C
0141 23            738          INX      H
0142 72            739          MOV      M,D
0143 23            740          INX      H
0144 73            741          MOV      M,E
0145 010700        742          LXI      B,7            ; Update the recombination buffer address to
0148 09            743          DAD      B              ;   point to the next row
0149 C1            744          POP      B              ; Recover row counter
014A 05            745          DCR      B              ;   and decrement it
014B C21B01   C    746          JNZ      HR2LP3         ; Continue until all rows processed
                   747  ;
                   748  $EJECT
                   749  ;
                   750  ; Update the pointers and variables regarding horizontal and vertical
                   751  ; offset information of the recombination buffer.
                   752  ;
014E 3A0000   E    753  NBITSH: LDA      RCVCCC         ; Update the negative of the horizontal
0151 3C            754          INR      A
0152 2F            755          CMA                     ;   origin of the recombination buffer
0153 4F            756          MOV      C,A            ;   = MINORG - RCVCCC
```

```
LOC  OBJ                SOURCE
0154 06FF                MVI     B,0FFH
0156 03                  INX     B
0157 2A0000     E        LHLD    MINORG
015A 09                  DAD     B
015B 220000     E        SHLD    MINORG
015E 2A0000     E        LHLD    RCVRHO         ; Update the horizontal origin of the
0161 79                  MOV     A,C            ;   recombination buffer
0162 2F                  CMA                    ;   = RCVRHO + RCVCCC
0163 4F                  MOV     C,A
0164 78                  MOV     A,B
0165 2F                  CMA
0166 47                  MOV     B,A
0167 03                  INX     B
0168 09                  DAD     B
0169 220000     E        SHLD    RCVRHO
                                                ; Vertical origin for the recombination
                                                ;   buffer will stay the same
016C 2A0000     E        LHLD    RCRPTR         ; Move the pointer from the previous right
016F 220000     E        SHLD    RCLPTR         ;   buffer to the left pointer
0172 111100              LXI     D,RECLNR       ; Compute the address of the new character
0175 19                  DAD     D              ;   buffer and save it as the right buffer
0176 7E                  MOV     A,M            ;   address
                         PTADR
017A 220000     E        SHLD    RCRPTR
                    ;
017D 110100              LXI     D,RECHCO       ; Compute the original cut column for the
0180 19                  DAD     D              ;   characters
0181 5E                  MOV     E,M            ;   = RCRPTR(RECHCO) + MINORG
0182 2C                  INR     L
0183 56                  MOV     D,M
0184 2A0000     E        LHLD    MINORG
0187 19                  DAD     D
0188 7D                  MOV     A,L
0189 320000     E        STA     RCVOCC
018C 4F                  MOV     C,A            ; Save as starting column for load
                    ;
                    $EJECT
                    ;
                    ; Move the new character buffer into the proper position in the
                    ; recombination buffer.
                    ;
018D 2A0000     E        LHLD    RCRPTR         ; Insure that the character is centered
0190 CD0000     E        CALL    CCENTR
0193 2A0000     E        LHLD    RCRPTR         ; Test to see if the new character is
0196 111200              LXI     D,RECLNU       ;   vertically linked.  If so, then
0199 EB                  XCHG                   ;   vertically recombine the two buffers
019A 19                  DAD     D              ;   into the recombination buffer
019B 7E                  MOV     A,M
019C 3C                  INR     A
019D CAC901     C        JZ      RREC03         ; Jump if not vertically linked
                    ;
01A0 D5                  PUSH    D              ; Save buffer address
01A1 7E                  MOV     A,M            ; Compute address of top buffer
                         PTADR
01A5 220000     E        SHLD    RCRPPT         ;   and save as pointer
```

```
LOC  OBJ                SOURCE STATEMENT

01A8 E3                        XTHL                         ; Recover bottom buffer address
01A9 110100                    LXI      D,RECHCO            ; Compute starting column at which to
01AC EB                        XCHG                         ;   recombine the characters
01AD 19                        DAD      D
01AE D5                        PUSH     D
01AF 5E                        MOV      E,M
01B0 2C                        INR      L
01B1 56                        MOV      D,M
01B2 2A0000    E               LHLD     MINDHS
01B5 19                        DAD      D
01B6 4D                        MOV      C,L
01B7 D1                        POP      D                   ; Compute end column in recombination buffer
01B8 210300                    LXI      H,RECHSZ
01BB 19                        DAD      D
01BC 7E                        MOV      A,M
01BD 81                        ADD      C
01BE 320000    E               STA      RCVECC
01C1 E1                        POP      H                   ; Recover buffer addresses
01C2 AF                        XRA      A
01C3 CDE701    C               CALL     VRECOM              ; Vertically recombine the character
01C6 C3D501    C               JMP      ENDRH2
                      ;
01C9 2A0000    E      HREC03:  LHLD     RCBPTR              ; No vertical recombination was necessary,
01CC EB                        XCHG                         ;   so move the character into the recombina-
01CD 210600                    LXI      H,RECVWS            ;   tion buffer using the vertical word
01D0 19                        DAD      D                   ;   drop as the starting row
01D1 46                        MOV      B,M
01D2 CD0000    E               CALL     CHRLOD

                      $EJECT
                      ;
                      ; Initialize variables for horizontal separation
                      ;
01D5 AF               ENDRH2:  XRA      A                   ; Initialize :
01D6 320000    E               STA      RCVLPS              ;   Not last pass
01D9 320000    E               STA      RCVRTC              ;   Retry counter
01DC 320000    E               STA      RCVFPS              ;   First pass
01DF C9                        RET
                      ;
01E0 21008C                    LXI      H,SYSRCM
01E3 CD0000    E               CALL     RCMOUT
01E6 C9                        RET
                      ;
                      $EJECT
```

```
LOC  OBJ            SOURCE STATEMENT

                ;*************************************************************************
                ;                                                                         ;
                ; Subroutine VRECOM                                                       ;
                ;                                                                         ;
                ;       The following subroutine vertically recombines a character which  ;
                ;       has been separated by isolation. The character is recombined just ;
                ;       as it appeared in the video buffer. The recombination buffer may  ;
                ;       or may not be initialized prior to execution of this routine.     ;
                ;                                                                         ;
                ;       Inputs:    A              Initialization flag                     ;
                ;                                    0 = Don't initialize recombination buffer
                ;                                    1 = Initialize recombination buffer  ;
                ;                  C              Starting column in recombination buffer to
                ;                                 load character                          ;
                ;                  DE             Buffer address of bottom portion of character
                ;                                                                         ;
                ;       Outputs:   SYSRCM         Recombination buffer with verticall recom-
                ;                                 bined character added to it             ;
                ;                                                                         ;
                ;       Registers                                                         ;
                ;       Affected:  All                                                    ;
                ;                                                                         ;
                ;*************************************************************************
                ;
01E7 C5         VRECOM: PUSH   B                  ; Save input register
01E8 D5                 PUSH   D
                ;
                ; Test the initialization flag, and if initialization is desired, then zero
                ; out the first three bytes of each row of the recombination buffer.
                ;
01E9 B7                 ORA    A                  ; Test initialization flag
01EA CA2302   C         JZ     SKPZER             ; If zero, then don't initialize
01ED 2100BC             LXI    H,SYSRCM           ; Set recombination buffer origin address
01F0 0628               MVI    B,40               ; Initialize 40 rows
01F2 AF                 XRA    A
                ZER2LP: REPT   3                  ; Zero out three bytes per row
                        MOV    M,A
                        INR    L
                        ENDM
01F9 110700             LXI    D,7                ; Point to the next row of the recombination
01FC 19                 DAD    D                  ;   buffer
01FD 05                 DCR    B                  ; Decrement row counter
01FE C2F301   C         JNZ    ZER2LP             ; Continue until all rows initialized
                ;
                ; Since initialization was called for, compute the horizontal and vertical
                ; origin information for the recombination buffer
                ;
0201 D1                 POP    D                  ; Recover buffer address
0202 D5                 PUSH   D
0203 210100             LXI    H,RECHCO           ; Point to horizontal origin for character
0206 19                 DAD    D
0207 46                 MOV    B,M                ; Set horizontal origin for character and
0208 2C                 INR    L                  ;   save it as the horizontal origin for the
0209 66                 MOV    H,M                ;   recombination buffer
020A 68                 MOV    L,B
```

```
LOC  OBJ               SOURCE STATEMENT

020B 220000    E                SHLD    RCVRHO
020E 7C                         MOV     A,H          ; Save the complement of the horizontal origin
020F 2F                         CMA                  ;   to be used as an offset to determine
0210 67                         MOV     H,A          ;   starting column in the recombination buffer
0211 7D                         MOV     A,L
0212 2F                         CMA
0213 6F                         MOV     L,A
0214 23                         INX     H
0215 220000    E                SHLD    MINORG
0218 210400                     LXI     H,RECVWO     ; Point to vertical origin for character
021B 19                         DAD     D
021C 46                         MOV     B,M          ; Get vertical origin and save it as the
021D 2C                         INR     L            ;   vertical origin of the recombination buffer
021E 66                         MOV     H,M
021F 68                         MOV     L,B
0220 220000    E                SHLD    RCVRVO
                        ;
                        ; Compute the buffer address of the top character buffer
                        ;
0223 D1                 SKPZER: POP     D            ; Get buffer address for bottom portion
0224 D5                         PUSH    D
0225 211200                     LXI     H,RECLNO     ; Get link to top portion
0228 19                         DAD     D
0229 7E                         MOV     A,M
                                PIADR                ; Compute buffer address of top portion
022D E5                         PUSH    H            ; Save buffer address
                        ;
                        ; Save the top portion of the character to the recombination buffer
                        ;
022E D1                         POP     D            ; Get address of top buffer
022F E1                         POP     H            ; Recover column to start the character
0230 C1                         POP     B
0231 C5                         PUSH    B
0232 E5                         PUSH    H
0233 210600                     LXI     H,RECVWS     ; Get the vertical word drop for the character
0236 19                         DAD     D            ;   and save it as the starting row
0237 46                         MOV     B,M
0238 CD0000    E                CALL    CHRLOD       ; Load the top portion into the recom. buffer
                        ;
                        ; Save the bottom portion of the character to the recombination buffer
                        ;
023B D1                         POP     D            ; Get address of bottom buffer
023C C1                         POP     B            ; Recover column to start the character
023D 210600                     LXI     H,RECVWS     ; Get the vertical word drop for the character
0240 19                         DAD     D            ;   and save it as the starting row
0241 46                         MOV     B,M
0242 CD0000    E                CALL    CHRLOD       ; Load the btm portion into the recom. buffer
                        ;
0245 C9                         RET                  ; Exit vertical recombination
                        ;
0246 21008C                     LXI     H,SYSRCM
0249 CD0000    E                CALL    RCMOUT
024C C9                         RET
                        ;
                        $EJECT
```

```
LOC  OBJ          SOURCE STATEMENT

             ;*********************************************************************
             ;
             ;  Subroutine VRECM2
             ;
             ;        The following subroutine is used to move a single character buffer
             ;        into the recombination buffer so that vertical separation may be
             ;        performed on the character.
             ;
             ;        Inputs:      RECPTR      Address of character buffer to move
             ;
             ;        Outputs:     SYSRCM      Recombination buffer with character moved
             ;                     RCVRHO      Horizontal origin of recombination buffer
             ;                     RCVRVO      Vertical origin of recombination buffer
             ;
             ;        Registers
             ;        Affected:    All
             ;
             ;*********************************************************************
             ;
024D 2A0AE0  VRECM2: LHLD   RECPTR         ; Get buffer address and save it
0250 E5              PUSH   H
             ;
             ; Zero out the first three bytes of each row of the recombination buffer.
             ;
0251 21008C          LXI    H,SYSRCM       ; Get recombination buffer origin address
0254 0628            MVI    B,40           ; Initialize 40 rows
0256 AF              XRA    A
             ZER3LP: REPT   3              ; Zero out three bytes per row
                     MOV    M,A
                     INR    L
                     ENDM
025B 110700          LXI    D,7            ; Point to the next row of the recombination
0260 19              DAD    D              ;   buffer
0261 05              DCR    B              ; Decrement row counter
0262 C25702   C      JNZ    ZER3LP         ; Continue until all rows initialized
             ;
             ; Compute the horizontal and vertical origin information for the
             ; recombination buffer
             ;
0265 D1              POP    D              ; Recover buffer address.
0266 D5              PUSH   D
0267 210100          LXI    H,RECHCO       ; Point to horizontal origin for character
026A 19              DAD    D
026B 46              MOV    B,M            ; Get horizontal origin for character and
026C 2C              INR    L              ;   save it as the horizontal origin for the
026D 66              MOV    H,M            ;   recombination buffer
026E 68              MOV    L,B
026F 220000   E      SHLD   RCVRHO
0272 7C              MOV    A,H            ; Save the complement of the horizontal origin
0273 2F              CMA                   ;   to be used as an offset to determine
0274 67              MOV    H,A            ;   starting column in the recombination buffer
0275 7D              MOV    A,L
0276 2F              CMA
0277 6F              MOV    L,A
0278 23              INX    H
```

```
LOC  OBJ          LINE        SOURCE STATEMENT

0279 220000   E   1036          SHLD    MINORG
027C 210400       1037          LXI     H,RECVWD          ; Point to vertical origin for character
027F 19           1038          DAD     D
0280 46           1039          MOV     B,M               ; Get vertical origin and save it as the
0281 2C           1040          INR     L                 ;   vertical origin of the recombination buffer
0282 66           1041          MOV     H,M
0283 68           1042          MOV     L,B
0284 220000   E   1043          SHLD    RCVRVO
                  1044 ;
                  1045 ; Save the character to the recombination buffer
                  1046 ;
0287 D1           1047          POP     D                 ; Get address of character buffer
0288 210600       1048          LXI     H,RECVWS          ; Get the vertical word drop for the character
028B 19           1049          DAD     D                 ;   and save it as the starting row
028C 46           1050          MOV     B,M
028D 0E00         1051          MVI     C,0               ; Start in column zero
028F CD0000   E   1052          CALL    CHRLOD            ; Load the chr portion into the recom. buffer
                  1053 ;
0292 C9           1054          RET                       ; Exit vertical recombination
                  1055 ;
0293 21008C       1056          LXI     H,SYSRCM
0296 CD0000   E   1057          CALL    RCMOUT
0299 C9           1058          RET
                  1059 ;
                  1060          END

ASSEMBLY COMPLETE,   NO ERRORS

SEP13.
SVP6.
SZS.
```

```
LOC  OBJ        LINE      SOURCE STATEMENT

                   1 $NOLIST
                 295 $LIST
                 296 $TITLE('Recognition separation & recombination utilities')
                 297 ;
                 298 ;          ***********************************************
                 299 ;          *                                             *
                 300 ;          * Recognition separation & recombination utilities *
                 301 ;          *                                             *
                 302 ;          ***********************************************
                 303 ;
                 304 ;
                 305 ; Public procedure definitions
                 306 ;
                 307          PUBLIC   BUFLOD          ; Load character from recom buffer
                 308          PUBLIC   CRSHAD          ; Create shadows of char in recom buffer
                 309          PUBLIC   CHRLOD          ; Load character into recom buffer
                 310          PUBLIC   FNDBLK          ; Find black in array of bytes
                 311          PUBLIC   ACCTST          ; Test for accented character
                 312 ;
                 313 ; External procedures used
                 314 ;
                 315          EXTRN    CRCSHD          ; Create shadows of char in buffer
                 316          EXTRN    CCENTR          ; Center character within buffer
                 317 ;
                 318 ; External variable definitions
                 319 ;
                 320          EXTRN    SHADH1          ; Horizontal shadow of char in recom. buffer
                 321          EXTRN    SHADH2
                 322          EXTRN    SHADH3
                 323          EXTRN    SHADV1          ; Vertical shadow of char in recom. buffer
                 324          EXTRN    SHADV2
                 325          EXTRN    SHADV3
                 326          EXTRN    SHADV4
                 327          EXTRN    SHADV5
                 328          EXTRN    RTBYTE          ; Vertical shadow of char in char buffer
                 329          EXTRN    RBBYTE
                 330          EXTRN    TOPBLK          ; Uppermost black in character
                 331          EXTRN    BTMBLK          ; Lowermost black in character
                 332          EXTRN    RCVRHO          ; Horizontal origin of recombination buffer
                 333          EXTRN    RCVRVO          ; Vertical origin of recombination buffer
                 334          EXTRN    SHFTCI          ; Number of pixels to shift character
                 335          EXTRN    MINORG          ; Minimum horizontal origin for vert. recom
                 336 ;
                 337 $EJECT
                 338 ;
                 339 ; Local data declarations
                 340 ;
                 341          DSEG
0000             342 MASK1:   DS       1               ; Character mask bytes
0001             343 MASK2:   DS       1
0002             344 MASK3:   DS       1
0003             345 MASK4:   DS       1
                 346 ;
0004             347 STCOLM:  DS       1               ; Starting column for character in buffer
0005             348 ENDCOL:  DS       1               ; Ending column for character in buffer
```

```
LOC  OBJ          SOURCE STATEMENT

0006                CHRHT:   DS      1              ; Character height
0007                CHRWID:  DS      1              ; Character width
0008                CHRBUF:  DS      2              ; Current character buffer address
000A                CHRFOV:  DS      1              ; Overflow count for large characters
000B                OUTPTR:  DS      2              ; Pointer into character buffer
000D                INPTR:   DS      2              ; Pointer into recombination buffer
                    ;
000F                RCOUNT:  DS      1              ; Row count for character buffer fill
0010                SHIFTX:  DS      3              ; Dummy jump for character registration
0013                STBYTE:  DS      1              ; Starting byte location for character
                    ;
                    $EJECT
                    ;
                    ; Macro definitions
                    ;
                    $INCLUDE(:F1:MACROS.INC)
                  = ;
                  = ;******************************
                  = ;
                  = ; Macro LSHFT4
                  = ;
                  = ;        The following macro performs a four register shift operation.
                  = ;        The contents in the register string B,C,D,E are shifted left
                  = ;        (A) times.
                  = ;
                  = LSHFT4   MACRO
                  =          LOCAL   LSHF01         ; Local label definitions
                  =          LOCAL   LSHF02
                  =          MOV     H,A            ; Move counter to H
                  =          ORA     A              ; Test for zero initially
                  =          JZ      LSHF02         ; If zero, then don't do shift
                  = LSHF01:  ORA     A              ; Clear carry
                  =          MOV     A,E            ; Rotate fourth byte left
                  =          RAL
                  =          MOV     E,A
                  =          MOV     A,D            ; Rotate carry into third byte
                  =          RAL
                  =          MOV     D,A
                  =          MOV     A,C            ; Rotate carry into second byte
                  =          RAL
                  =          MOV     C,A
                  =          MOV     A,B            ; Rotate carry into first byte
                  =          RAL
                  =          MOV     B,A
                  =          DCR     H              ; Decrement shift count
                  =          JNZ     LSHF01         ; Continue until done with shifts
                  = LSHF02:
                  =          ENDM
                  = ;
                  = ;******************************
                  = ;
                  = ; Macro RSHFT4
                  = ;
                  = ;        The following macro performs a four register shift operation.
                  = ;        The contents of the register string B,C,D,E are shifted right
                  = ;        (A) times.
```

```
LOC  OBJ      LINE      SOURCE STATEMENT

                    ;
                    RSHFT4  MACRO
                            LOCAL   RSHF01          ; Local label definitions
                            LOCAL   RSHF02
                            MOV     H,A             ; Move counter to H
                            ORA     A               ; Test for zero initially
                            JZ      RSHF02          ; If zero, then don't do shift
                    RSHF01: ORA     A               ; Clear carry
                            MOV     A,B             ; Rotate first byte right
                            RAR
                            MOV     B,A
                            MOV     A,C             ; Rotate carry into second byte
                            RAR
                            MOV     C,A
                            MOV     A,D             ; Rotate carry into third byte
                            RAR
                            MOV     D,A
                            MOV     A,E             ; Rotate carry into fourth byte
                            RAR
                            MOV     E,A
                            DCR     H               ; Decrement shift count
                            JNZ     RSHF01          ; Continue until done with shifts
                    RSHF02:
                            ENDM
                    ;
                    ;******************************
                    ;
                    ; Macro PTADB
                    ;
                    ;       The following macro computes a buffer address based on a base
                    ;       address and a buffer number
                    ;       = Base address + (128 * buffer number)
                    ;       = DE + (128 * A)
                    ;
                            EXTRN   BUFADD
                    PTADB   MACRO
                            CALL    BUFADD          ; Use routine in ISOUTL
                            ENDM
                    ;
                    $EJECT
                    ;****************************************************************************
                    ;                                                                          ;
                    ; Subroutine BUFLOD                                                        ;
                    ;                                                                          ;
                    ;       The following subroutine is used to load a character from the rec- ;
                    ;       ombination buffer into a character buffer.  The character will end ;
                    ;       up centered in the character buffer.                               ;
                    ;                                                                          ;
                    ;       Inputs:     B           Starting column for character in rec. buffer ;
                    ;                   D           Character height                           ;
                    ;                   E           Character width                            ;
                    ;                   HL          Address of character buffer                ;
                    ;                                                                          ;
                    ;       Outputs:    HL          Preserved                                  ;
                    ;                   (HL)        Centered character from recombination buffer ;
```

```
LOC  OBJ          LINE      SOURCE STATEMENT

                  460 ;
                  461 ;         Registers
                  462 ;         Affected:  AF,BC,DE
                  463 ;
                  464 ;*********************************************************************
                  465 ;
                  466           CSEG
0000 E5           467 BUFLOD:  PUSH    H
0001 210000    D  468           LXI     H,STCOLM        ; Save input parameters in variable locations
0004 70           469           MOV     M,B
0005 23           470           INX     H
0006 23           471           INX     H
0007 72           472           MOV     M,D
0008 23           473           INX     H
0009 73           474           MOV     M,E
000A E1           475           POP     H
000B 220000    D  476           SHLD    CHRBUF
                  477 ;
                  478 ; Create a mask for the character to be moved by shifting the horizontal
                  479 ; shadow to the left by the number of pixels the starting column is off
                  480 ; a byte boundary.
                  481 ;
000E 78           482           MOV     A,B             ; Compute the number of pixels which the
000F E607         483           ANI     07H             ;   starting column is off a byte boundary
0011 210000    E  484           LXI     H,SHADH1        ; Move the three byte of the horizontal
0014 46           485           MOV     B,M             ;   into B-C-D.
0015 23           486           INX     H
0016 4E           487           MOV     C,M
0017 23           488           INX     H
0018 56           489           MOV     D,M
0019 1E00         490           MVI     E,0
                  491           RSHFT4                  ; Shift the shadow to the right
0031 210000    D  511           LXI     H,MASK1         ; Save the shifted shadow as a mask for the
0034 70           512           MOV     M,B             ;   character
0035 23           513           INX     H
0036 71           514           MOV     M,C
0037 23           515           INX     H
0038 72           516           MOV     M,D
0039 23           517           INX     H
003A 73           518           MOV     M,E
                  519 ;
                  520 ; Compute the vertical position of the character in the recombination buffer
                  521 ; and blank fill the rows above the character in the character buffer.
                  522 ;
003B 2A0000    D  523           LHLD    CHRBUF          ; Get the current recognition buffer
003E 110000       524           LXI     D,RECCHB        ;   and point to the character data field
0041 19           525           DAD     D               ;   of the buffer
0042 AF           526           XRA     A               ; Initialize character overflow indicator
0043 320A00    D  527           STA     CHROFW
0046 3A0600    D  528           LDA     CHRHT           ; Compute the number of rows above the
0049 3C           529           INR     A               ;   character which must be blank filled
004A 1F           530           RAR                     ;   = 15 - (character height / 2)
004B 47           531           MOV     B,A
004C 3E10         532           MVI     A,16
004E 90           533           SUB     B
```

```
LOC  OBJ          LINE        SOURCE STATEMENT

004F F25800    C   534          JP      BUFL01          ; Jump if greater than zero
0052 3A0600    D   535          LDA     CHRHT           ; Test to see if character is too tall
0055 D620          536          SUI     32
0057 320A00    D   537          STA     CHROFV          ; Save character height - 32 as overflow
005A AF            538          XRA     A               ; Set null blank rows to fill
005B CA6A00    C   539 BUFL01:  JZ      BUFF03          ; Skip blank fill if count is zero
005E 0600          540          MVI     B,0             ; Otherwise, zero fill three bytes per
0060 70            541 BUFLL2:  MOV     M,B             ;   row of the character buffer
0061 2C            542          INR     L
0062 70            543          MOV     M,B
0063 2C            544          INR     L
0064 70            545          MOV     M,B
0065 2C            546          INR     L
0066 3D            547          DCR     A               ; Decrement row counter
0067 C26000    C   548          JNZ     BUFLL2          ; Continue until done with blank fill
                   549 ;
                   550 EJECT
                   551 ;**********************************
                   552 ;
                   553 ; Store the character into the recombination buffer.  The character will
                   554 ; also be centered in the horizontal direction.
                   555 ;
006A 3EC3          556 BUFF03:  MVI     A,0C3H          ; Set up jump instruction for character
006C 321000    D   557          STA     SHIFTX          ;   registration
006F 220B00    D   558          SHLD    OJTPTB          ; Save character buffer address
0072 3A0000    E   559          LDA     TOPBLK          ; Compute the byte address of the starting
0075 B7            560          ORA     A               ;   row and column in the recombination
0076 5F            561          MOV     E,A             ;   buffer :
0077 17            562          RAL                     ;   = SYSRCM + (10 * TOPBLK) + (STCOLM / 8)
0078 17            563          RAL
0079 83            564          ADD     E
007A 17            565          RAL
007B 5F            566          MOV     E,A
007C 3E00          567          MVI     A,0
007E 17            568          RAL
007F 57            569          MOV     D,A
0080 21008C        570          LXI     H,SYSRCM
0083 19            571          DAD     D
0084 3A0400    D   572          LDA     STCOLM
0087 0F            573          RRC
0088 0F            574          RRC
0089 0F            575          RRC
008A E61F          576          ANI     1FH
008C 5F            577          MOV     E,A
008D 1600          578          MVI     D,0
008F 19            579          DAD     D
0090 220000    D   580          SHLD    INPTR
                   581 ;
                   582 ; Compute the number of pixels to pad the left of the character in the
                   583 ; buffer.
                   584 ;
0093 AF            585          XRA     A               ; Reset carry
0094 3A0700    D   586          LDA     CHRWID          ; Compute number of pixels which should be
0097 3C            587          INR     A               ;   nulled out in the character buffer so
0098 1F            588          RAR                     ;   that the character will be centered :
0099 47            589          MOV     B,A             ;   = 12 - (Character width / 2)
```

```
LOC  OBJ           LINE        SOURCE STATEMENT

009A 3E0C           590          MVI    A,12
009C 90             591          SUB    B
009D F2A100   C     592          JP     BUFR00        ; If positive, add left pad
00A0 AF             593          XRA    A             ; Else, no padding
00A1 47             594 BUFR00:  MOV    B,A           ; Save padding count
00A2 3A0400   D     595          LDA    STCOLM        ; Compute initial left edge bit displacement
00A5 E607           596          ANI    07H           ;   = STCOLM mod 8
00A7 90             597          SUB    B             ; Subtract padding count to yield shift
00A8 F2C900   C     598          JP     BUFR02        ; If positive shift left residual
00AB 2A0000   D     599 BUFRL1:  LHLD   MASK1         ; If negative, adjust masks by a whole byte
00AE 54             600          MOV    D,H
00AF 65             601          MOV    H,L
00B0 2E00           602          MVI    L,0
00B2 220000   D     603          SHLD   MASK1
00B5 2A0200   D     604          LHLD   MASK3
00B8 65             605          MOV    H,L
00B9 6A             606          MOV    L,D
00BA 220200   D     607          SHLD   MASK3
00BD 2A0D00   D     608          LHLD   INPTR         ; Adjust origin address
00C0 2B             609          DCX    H
00C1 220D00   D     610          SHLD   INPTR
00C4 C608           611          ADI    8             ; Adjust residual count
00C6 FAAB00   C     612          JM     BUFRL1        ; Continue if still negative (off by > 8)
                    613 ;
                    614 ; Build the shift table jump and register the character
                    615 ;
00C9 D608           616 BUFR02:  SUI    8             ; Set trailing black count
00CB 2F             617          CMA
00CC 07             618          RLC                  ; 8 instruction bytes / shift
00CD 07             619          RLC
00CE 07             620          RLC
00CF 210B01   C     621          LXI    H,REGTAB      ; Get shift list base
00D2 85             622          ADD    L             ; A <= low jump address
00D3 321100   D     623          STA    SHIFTX+1      ; Save
00D6 D2DA00   C     624          JNC    BUFR03        ; Don't bump high address if no overflow
00D9 24             625          INR    H
00DA 7C             626 BUFR03:  MOV    A,H           ; Save high address for jump
00DB 321200   D     627          STA    SHIFTX+2
00DE 3A0600   D     628          LDA    CHRHT         ; Save number of rows equal to height
                    629 ;
                    630 ; Register one line segment.  Load four bytes, mask off edges and
                    631 ; register the character and store.
                    632 ;
00E1 320F00   D     633          STA    RCOUNT        ; Save as counter
00E4 2A0D00   D     634 BUFSL1:  LHLD   INPTR         ; Get recombination buffer pointer
00E7 3A0000   D     635          LDA    MASK1         ; Get first mask
00EA A6             636          ANA    M             ; Get portion of character which goes with
00EB 57             637          MOV    D,A           ;   mask and save
00EC 23             638          INX    H             ; Point to next byte of character
00ED 3A0100   D     639          LDA    MASK2         ; Get second mask
00F0 A6             640          ANA    M             ; Get portion of character which goes with
00F1 5F             641          MOV    E,A           ;   mask and save
00F2 23             642          INX    H             ; Point to next byte of character
00F3 3A0200   D     643          LDA    MASK3         ; Get third mask
00F6 A6             644          ANA    M             ; Get portion of character which goes with
00F7 47             645          MOV    B,A           ;   mask and save
```

```
LOC  OBJ            LINE        SOURCE STATEMENT

00FB 23              646          INX     H                ; Point to next byte of character
00F9 3A0300     D    647          LDA     MASK4            ; Get fourth mask
00FC A6              648          ANA     M                ; Get portion of character which goes with
00FD 4F              649          MOV     C,A              ;    mask and save
00FE E5              650          PUSH    H                ; Save recombination buffer address
00FF 210A00     D    651          LXI     H,CHRFOV         ; Point to overflow counter
0102 35              652          DCR     M                ;    and decrement it
0103 F25001     C    653          JP      BUFS02           ; Ignore row if overflows buffer
0106 6F              654          MOV     L,A              ; D,E,H,L = 4 byte shift register
0107 60              655          MOV     H,B
0108 C31000     D    656          JMP     SHIFTX           ; Indirect into shift table
                     657 ;
                     658 ; Shift four byte field left and store resulting three byte in
                     659 ; character buffer.
                     660 ;
010B            C    661 RESTAB   EQU     $
                     662          REPT    7                ; Inline shift table
-                    663          XCHG
-                    664          DAD     H
-                    665          XCHG
-                    666          DAD     H
-                    667          JNC     $+4
-                    668          INX     D                ; Output D,E,H,L rotate one left
                     669          ENDM
0143 44              712          MOV     B,H              ; Store three output byte in character
0144 2A0B00     D    713          LHLD    OUTPTR           ;    buffer
0147 72              714          MOV     M,D
0148 2C              715          INR     L
0149 73              716          MOV     M,E
014A 2C              717          INR     L
014B 70              718          MOV     M,B
014C 2C              719          INR     L
014D 220B00     D    720          SHLD    OUTPTR           ; Save updated character buffer pointer
0150 E1              721 BUFS02:  POP     H                ; Update address to point to next row
0151 110700          722          LXI     D,7              ;    of recombination buffer
0154 19              723          DAD     D
0155 220D00     D    724          SHLD    INPTR
0158 210F00     D    725          LXI     H,RCOUNT         ; Decrement row counter
015B 35              726          DCR     M
015C C2E400     C    727          JNZ     BUFSL1           ; Continue until character fully loaded
                     728 ;
                     729 ; Fill the remainder of the character buffer with nulls
                     730 ;
015F 2A0B00     D    731          LHLD    OUTPTR           ; Get character buffer address
0162 7D              732 BUFLL4:  MOV     A,L              ; Check for end of buffer
0163 E67F            733          ANI     7FH
0165 CA7201     C    734          JZ      BUFL05           ; Jump if end of buffer
0168 AF              735          XRA     A                ; Else, zero out next row of buffer
0169 77              736          MOV     M,A
016A 2C              737          INR     L
016B 77              738          MOV     M,A
016C 2C              739          INR     L
016D 77              740          MOV     M,A
016E 2C              741          INR     L
016F C36201     C    742          JMP     BUFLL4
                     743 ;
```

```
LOC  OBJ           LINE       SOURCE STATEMENT

                          ; Set recognition buffer control variables for position on the page.
                          ;
0172 2A0000    E          BUFL06: LHLD   RCVRHO        ; Compute horizontal origin of character
0175 3A0400    D                  LDA    STCOLM        ;   from left of page
0178 5F                           MOV    E,A           ;   = RCVRHO + STCOLM
0179 1600                         MVI    D,0
017B 19                           DAD    D
017C EB                           XCHG
017D 2A0800    D                  LHLD   CHRBUF        ; Get current buffer address
0180 2C                           INR    L             ; Point to horizontal offset
0181 73                           MOV    M,E           ; Store horizontal origin
0182 2C                           INR    L
0183 72                           MOV    M,D
0184 2C                           INR    L             ; Point to width
0185 3A0700    D                  LDA    CHRWID        ; Store width
0188 77                           MOV    M,A
0189 2C                           INR    L             ; Point to vertical origin
018A EB                           XCHG
018B 2A0000    E                  LHLD   RCVRVO        ; Get vertical origin for recombination
018E EB                           XCHG                 ;   buffer and save it as vertical origin
018F 73                           MOV    M,E           ;   for character
0190 2C                           INR    L
0191 72                           MOV    M,D
0192 2C                           INR    L             ; Point to vertical word drop
0193 3A0000    E                  LDA    TOPBLK        ; Save topmost black as vertical word drop
0196 77                           MOV    M,A
0197 2C                           INR    L             ; Point to height
0198 3A0600    D                  LDA    CHRHT         ; Save height
019B 77                           MOV    M,A
019C 2A0800    D                  LHLD   CHRBUF        ; Recover character buffer address
019F C9                           RET
                          ;
                          $EJECT
                          ;*********************************************************************
                          ;                                                                     ;
                          ; Subroutine CRSHAD                                                   ;
                          ;                                                                     ;
                          ;       The following subroutine is used to create a horizontal and vertical ;
                          ;       shadow of a character in the recombination buffer.            ;
                          ;                                                                     ;
                          ;       Inputs:     B          Starting column in the recombination buffer ;
                          ;                   C          Ending column in the recombination buffer   ;
                          ;                                                                     ;
                          ;       Outputs:    SHADH1-3   Horizontal shadow                      ;
                          ;                   SHADV1-5   Vertical shadow                        ;
                          ;                                                                     ;
                          ;*********************************************************************
                          ;
01A0 C5                   CRSHAD: PUSH   B             ; Save input registers
01A1 78                           MOV    A,B           ; Compute shift count for character
01A2 E607                         ANI    07H
01A4 320000    E                  STA    SHFTCT
01A7 AF                           XRA    A             ; Initialize the masks for the character
01A8 210000    D                  LXI    H,MASK1
01AB 77                           MOV    M,A
```

```
LOC  OBJ          LINE        SOURCE STATEMENT

01AC 23            799         INX   H
01AD 77            800         MOV   M,A
01AE 23            801         INX   H
01AF 77            802         MOV   M,A
01B0 23            803         INX   H
01B1 77            804         MOV   M,A
01B2 79            805         MOV   A,C          ; Compute the number of black bits in the
01B3 90            806         SUB   B            ;   character so that masks can be created
01B4 3C            807         INR   A
01B5 47            808         MOV   B,A
01B6 3A0000    E   809         LDA   SHFTCT
01B9 80            810         ADD   B
01BA 210000    D   811         LXI   H,MASK1      ; Create mask of black bits in the character
01BD 47            812         MOV   B,A
01BE 78            813         MOV   A,B          ; Set remaining black bit count
01BF D608          814 CLOOP4: SUI   8            ; Subtract 8
01C1 FACA01    C   815         JM    CRSHO1       ; If result < 0, then full byte isn't black
01C4 36FF          816         MVI   M,0FFH       ; Else, store all black in mask
01C6 23            817         INX   H
01C7 C3BF01    C   818         JMP   CLOOP4       ; Continue for full bytes
01CA C608          819 CRSHO1: ADI   8            ; Return to original count
01CC CAD801    C   820         JZ    CRSHO2       ; If zero, then don't fill in any more bits
01CF 47            821         MOV   B,A          ; Save counter
01D0 AF            822         XRA   A            ; Initialize last mask byte
01D1 37            823 CLOOP5: STC                ; Rotate a one bit into the mask
01D2 1F            824         RAR
01D3 05            825         DCR   B            ; Decrement counter
01D4 C2D101    C   826         JNZ   CLOOP5       ; Continue until count exhausted
01D7 77            827         MOV   M,A          ; Save last mask byte
01D8 210000    E   828 CRSHO2: LXI   H,SHADH1     ; Initialize the horizontal shadow
01DB AF            829         XRA   A
01DC 77            830         MOV   M,A
01DD 23            831         INX   H
01DE 77            832         MOV   M,A
01DF 23            833         INX   H
01E0 77            834         MOV   M,A
01E1 C1            835         POP   B            ; Recover column inputs
01E2 210000    E   836         LXI   H,SHADV1     ; Set starting address for vertical shadow
01E5 E5            837         PUSH  H
01E6 21008C        838         LXI   H,SYSRCM     ; Compute starting byte in recombination
01E9 78            839         MOV   A,B          ;   buffer :
01EA 0F            840         RRC                ;   = SYSRCM + (starting column / 8)
01EB 0F            841         RRC
01EC 0F            842         RRC
01ED E61F          843         ANI   1FH
01EF 5F            844         MOV   E,A
01F0 1600          845         MVI   D,0
01F2 19            846         DAD   D
01F3 0E05          847         MVI   C,5          ; Vertical shadow byte counter
01F5 78            848         MOV   A,B          ; Compute number of bits to shift character
01F6 E607          849         ANI   07H
01F8 320000    E   850         STA   SHFTCT
01FB 110800        851 CLOOP1: LXI   D,8          ; Initialize counters:
                   852                            ;   D = Initial vertical shadow byte
                   853                            ;   E = Vertical shadow byte bit counter
01FE C5            854 CLOOP2: PUSH  B
01FF D5            855         PUSH  D
0200 3A0000    D   856         LDA   MASK1        ; Load four bytes of character into
```

```
LOC  OBJ           LINE          SOURCE STATEMENT
0203 A6             857          ANA   M
0204 47             858          MOV   B,A          ;   registars B,C,D,E
0205 23             859          INX   H
0206 3A0100    D    860          LDA   MASK2
0209 A6             861          ANA   M
020A 4F             862          MOV   C,A
020B 23             863          INX   H
020C 3A0200    D    864          LDA   MASK3
020F A6             865          ANA   M
0210 57             866          MOV   D,A
0211 23             867          INX   H
0212 3A0300    D    868          LDA   MASK4
0215 A6             869          ANA   M
0216 5F             870          MOV   E,A
0217 23             871          INX   H
0218 3A0000    E    872          LDA   SHFTCT
021B E5             873          PUSH  H            ; Shift the character left
                    874          LSHFT4
0232 F1             894          POP   H
0233 3A0000    E    895          LDA   SHADH1
0236 B0             896          ORA   B            ; OR first byte of character into first
0237 320000    E    897          STA   SHADH1       ;    byte of horizontal shadow
023A 3A0000    E    898          LDA   SHADH2
023D B1             899          ORA   C            ; OR second byte of character into second
023E 320000    E    900          STA   SHADH2       ;    byte of horizontal shadow
0241 78             901          MOV   A,B
0242 B1             902          ORA   C            ; OR with B for row composite
0243 47             903          MOV   B,A
0244 3A0000    E    904          LDA   SHADH3
0247 B2             905          ORA   D            ; OR third byte of character into third
0248 320000    E    906          STA   SHADH3       ;    byte of horizontal shadow
024B 78             907          MOV   A,B
024C B2             908          ORA   D            ; OR with B for row composite
024D 110500         909          LXI   D,5
0250 19             910          DAD   D            ; Updatе the recombination buffer address
0251 D1             911          POP   D            ;    to point to the next row
0252 C1             912          POP   B            ; Recover counters and vertical mask
0253 B7             913          ORA   A
0254 CA5802    C    914          JZ    CSKIP1       ; Test for null row composite
0257 3F             915          CMC                ; Jump if null
0258 7A             916 CSKIP1:  MOV   A,D          ; Else signal black in row
0259 17             917          RAL                ; Rotate carry into vertical mask
025A 57             918          MOV   D,A
025B 1D             919          DCR   E
025C C2FE01    C    920          JNZ   CLOOP2       ; Decrement vertical bit counter
025F E3             921          XTHL               ; Continue until byte done
0260 77             922          MOV   M,A          ; Store vertical shadow byte
0261 23             923          INX   H
0262 E3             924          XTHL
0263 0D             925          DCR   C
0264 C2F501    C    926          JNZ   CLOOP1       ; Decrement vertical shadow byte counter
0267 E1             927          POP   H            ; continue until done
0268 C9             928          RET
                    929 ;
                    930 $EJECT
```

```
LOC  OBJ          LINE         SOURCE STATEMENT

                  931 ;*************************************************************************
                  932 ;                                                                       ;
                  933 ; Subroutine CHRLOD                                                     ;
                  934 ;                                                                       ;
                  935 ;         The following subroutine is used to load a character from a recog- ;
                  936 ;         nition buffer into the recombination buffer.  The character is ;
                  937 ;         loaded flush against an input column and row.                 ;
                  938 ;                                                                       ;
                  939 ;         Inputs:       B             Starting row in recombination buffer ;
                  940 ;                       C             Starting column in recombination buffer ;
                  941 ;                       DE            Address of recognition buffer     ;
                  942 ;                                                                       ;
                  943 ;         Outputs:      SYSRCM        Recombination buffer with character loaded ;
                  944 ;                                                                       ;
                  945 ;         Registers                                                     ;
                  946 ;         Affected:     All                                             ;
                  947 ;                                                                       ;
                  948 ;*************************************************************************
                  949 ;
0269 D5           950 CHRLOD: PUSH   D                   ; Save input registers
026A C5           951         PUSH   B
                  952 ;
                  953 ; Create shadows of the character and determine the leftmost, uppermost
                  954 ; and lowermost black in the character.
                  955 ;
026B EB           956         XCHG
026C CD0000    E  957         CALL   CRCSHD              ; Create shadows of the character
                  958 ;
026F 210000    E  959         LXI    H,BTBYTE            ; Find the uppermost black bit in the vertical
0272 0600         960         MVI    B,0                 ;   shadow and save it
0274 0E1F         961         MVI    C,31
0276 3E01         962         MVI    A,1
0278 CD5F03    C  963         CALL   FNDBLK
027B D25C03    C  964         JNC    ERREXT
027E 320000    E  965         STA    TOPBLK              ; If blank character, then exit
                  966 ;
0281 210000    E  967         LXI    H,BBBYTE            ; Find the lowermost black bit in the vertical
0284 061F         968         MVI    B,31                ;   shadow and save it
0286 0E00         969         MVI    C,0
0288 3EFF         970         MVI    A,-1
028A CD5F03    C  971         CALL   FNDBLK
028D 320000    E  972         STA    BTMBLK
                  973 ;
                  974 ; Compute the number of pixels which the character will have to be
                  975 ; shifted to make it flush with the starting column.
                  976 ;
0290 C1           977         POP    B                   ; Get starting row and column
0291 D1           978         POP    D                   ;   and buffer address
0292 D5           979         PUSH   D
0293 210100       980         LXI    H,RECHCO            ; Point to horizontal origin for character
0296 19           981         DAD    D
0297 5E           982         MOV    E,M                 ; Get horizontal origin
0298 2C           983         INR    L
0299 56           984         MOV    D,M
029A 2A0000    E  985         LHLD   MINCHS              ; Add to offset to yield starting column
```

```
LOC   OBJ                SOURCE STATEMENT

029D  19                      DAD     D
029E  4D                      MOV     C,L            ;   in recombination buffer
029F  79                      MOV     A,C
02A0  0F                      RRC                    ; Compute byte offset for starting column
02A1  0F                      RRC                    ;   = Starting column / 8
02A2  0F                      RRC
02A3  E61F                    ANI     1FH
02A5  321300       D          STA     STBYTE
02A8  79                      MOV     A,C
02A9  E507                    ANI     07H            ; Compute the starting bit in the just
02AB  4F                      MOV     C,A            ;   computed byte = Starting column mod 8
02AC  D1                      POP     D
02AD  D5                      PUSH    D              ; Get buffer address
02AE  210300                  LXI     H,RECHSZ
02B1  19                      DAD     D              ; Get width of character
02B2  7E                      MOV     A,M
02B3  FE19                    CPI     25             ; Test to insure that width is not greater
02B5  DABA02       C          JC      CLD005         ;   than 24
02B8  3E18                    MVI     A,24           ; Jump if not
02BA  5F             CLD005:  MOV     E,A            ; Else, limit width
02BB  3E18                    MVI     A,24           ; Compute distance from left of character
02BD  93                      SUB     E              ;   buffer to character
02BE  B7                      ORA     A              ;   = (24 - width) / 2
02BF  1F                      RAR
02C0  5F                      MOV     E,A
02C1  79                      MOV     A,C
02C2  93                      SUB     E              ; Subtract result from starting column
02C3  320000       E          STA     SHFTCT         ;   to yield the number of pixels to shift
                         ;                           ;   the character
                         ; Compute starting byte address in the recombination buffer to begin
                         ; loading the character.
                         ;
02C6  1600                    MVI     D,0            ; Starting address in recombination buffer
02C8  78                      MOV     A,B            ;   = SYSRCM + (10 * Start row) + STBYTE
02C9  B7                      ORA     A              ; Clear carry
02CA  17                      RAL                    ; Start row * 2
02CB  17                      RAL                    ; Start row * 4
02CC  80                      ADD     B              ; Start row * 5
02CD  17                      RAL                    ; Start row * 10
02CE  5F                      MOV     E,A            ; Move low byte
02CF  3E00                    MVI     A,0            ; Initialize high byte
02D1  17                      RAL                    ; Rotate carry into low bit (for overflow)
02D2  57                      MOV     D,A            ; Save high byte
02D3  21008C                  LXI     H,SYSRCM       ; Add to SYSRCM
02D6  19                      DAD     D
02D7  3A1300       D          LDA     STBYTE
02DA  5F                      MOV     E,A            ; Add to STBYTE
02DB  1600                    MVI     D,0
02DD  19                      DAD     D              ; Yields starting address in recombination buf
                         ;
                         ; Compute the starting address in the character buffer
                         ;
02DE  E3                      XTHL                   ; Exchange recom buf addr with char buf addr
02DF  112000                  LXI     D,32           ; Point to character data
02E2  19                      DAD     D
```

```
LOC   OBJ           LINE       SOURCE STATEMENT

02E3 3A0000    E   1041            LDA     TOPBLK          ; Add 3 * TOPBLK
02E6 47            1042            MOV     B,A
02E7 B7            1043            ORA     A
02E8 17            1044            RAL
02E9 80            1045            ADD     B
02EA 5F            1046            MOV     E,A
02EB 1600          1047            MVI     D,0
02ED 19            1048            DAD     D               ; Result : Starting address in character buffer
                   1049                                    ;   = Character buffer address +
                   1050                                    ;     32 + (3 * TOPBLK)
                   1051 ;
                   1052 ; Load the character from the character buffer into the recombination buffer
                   1053 ;
02EF 3A0000    E   1054 LOADLP:    LDA     BTMBLK          ; Test current row against bottommost row of
02F1 47            1055            MOV     B,A             ;   character
02F2 3A0000    E   1056            LDA     TOPBLK
02F5 B8            1057            CMP     B
02F6 CAFC02    C   1058            JZ      CONTO           ; If equal, then continue
02F9 D25A03    C   1059            JNC     CKIPLD          ; If greater, then done with load
02FC 3C            1060 CONTO:     INR     A               ; Update current row in buffer
02FD 320000    E   1061            STA     TOPBLK
0300 46            1062            MOV     B,M             ; Load first byte of character row into
0301 2C            1063            INR     L               ;   first shift register
0302 4E            1064            MOV     C,M             ; Load second byte of character row into
0303 2C            1065            INR     L               ;   second shift register
0304 56            1066            MOV     D,M             ; Load third byte of character row into
0305 2C            1067            INR     L               ;   third shift register
0306 1E00          1068            MVI     E,0             ; Initialize fourth shift register
0308 E5            1069            PUSH    H               ; Save character buffer address
0309 3A0000    E   1070            LDA     SHFTCT          ; Get shift count
030C B7            1071            ORA     A               ; Test sign
030D FA2903    C   1072            JM      LFTSHF          ; If negative, then shift left
                   1073            RSHFT4                  ; Else, shift right
0326 C34103    C   1093            JMP     CONT1           ; Continue
0329 2F            1094 LFTSHF:    CMA                     ; Complement shift count for left shift
032A 3C            1095            INR     A
                   1096            LSHFT4                  ; Perform left shift
0341 E1            1116 CONT1:     POP     H               ; Recover character buffer address
0342 E3            1117            XTHL                    ;   and exchang with recom buffer address
0343 7E            1118            MOV     A,M             ; OR first byte of character into recombination
0344 B0            1119            ORA     B               ;   buffer
0345 77            1120            MOV     M,A
0346 23            1121            INX     H
0347 7E            1122            MOV     A,M             ; OR second byte of character into
0348 B1            1123            ORA     C               ;   recombination buffer
0349 77            1124            MOV     M,A
034A 23            1125            INX     H
034B 7E            1126            MOV     A,M             ; OR third byte of character into recombination
034C B2            1127            ORA     D               ;   buffer
034D 77            1128            MOV     M,A
034E 23            1129            INX     H
034F 7E            1130            MOV     A,M             ; OR fourth byte of character into
0350 B3            1131            ORA     E               ;   recombination buffer
0351 77            1132            MOV     M,A
0352 110700        1133            LXI     D,7             ; Point to next row in recombination buffer
```

```
LOC  OBJ                SOURCE STATEMENT

0355 19                         DAD     D
0356 E3                         XTHL                    ; Exchange recombination buffer address with
                                                        ;   character buffer address
0357 C3EE02     C               JMP     LOADLP          ; Continue character load
                        ;
035A E1                 EXITLD: POP     H               ; Restore stack
035B C9                         RET                     ; Exit CHRLOD
                        ;
035C C1                 ERREXT: POP     B               ; Restore stack
035D D1                         POP     D
035E C9                         RET
                        ;
                        $EJECT
                        ;************************************************************************
                        ;
                        ; Subroutine FNDBLK
                        ;
                        ;       The following subroutine is used to find the first bit in an
                        ;       array of bytes which is set to a one.  The search can start any-
                        ;       where in the array and can run in either direction.
                        ;
                        ;       Inputs:     A             Direction of search
                        ;                                    1 = Search to right
                        ;                                   -1 = Search to left
                        ;                   B             Bit position at which to begin search
                        ;                   C             Last possible bit position
                        ;                   HL            Address of first byte at which to search
                        ;
                        ;       Outputs:    A             Bit position at which search succeeded
                        ;                   Carry         Flag to indicate success or failure
                        ;                                   0 - Failure
                        ;                                   1 - Success
                        ;
                        ;       Registers
                        ;       Affected:   All
                        ;
                        ;************************************************************************
                        ;
035F B7                 FNDBLK: ORA     A               ; Test for direction of search
0360 FA9303     C               JM      LEFTSR          ; Jump if left search
                        ;
                        ; Search to right
                        ;   First determine if search begins on a byte boundary.
                        ;   If not, then adjust first byte
                        ;
0363 78                         MOV     A,B             ; Get starting bit position
0364 0F                         RRC                     ;   and divide by eight
0365 0F                         RRC
0366 0F                         RRC
0367 E6E0                       ANI     0E0H
0369 7E                         MOV     A,M             ; Get first byte
036A 1608                       MVI     D,8             ; Initial bit count
036C CA7B03     C               JZ      FNDLP1          ; Skip if no need to adjust
036F 5F                         MOV     E,A             ; Save number of bits to skip
0370 3E08                       MVI     A,8             ; Determine number of bits which will
```

```
LOC  OBJ           SOURCE STATEMENT

0372 93                    SUB   E                ;   be left
0373 57                    MOV   D,A
0374 7E                    MOV   A,M              ; Get first byte
0375 B7           SKPOLP:  ORA   A                ; Clear carry
0376 17                    RAL                    ; Rotate to left
0377 1D                    DCR   E                ; Decrement skip counter
0378 C27503   C            JNZ   SKPOLP           ; Continue until skip finished
037B 5F           FNDLP1:  MOV   E,A              ; Save current byte
037C 79                    MOV   A,C              ; Get maximum bit number
037D B8                    CMP   B                ; Test to see if not found
037E DAC703   C            JC    NOTFND           ; Jump if no black found
0381 7B                    MOV   A,E              ; Recover current byte
0382 B7                    ORA   A                ; Clear carry
0383 17                    RAL                    ; Rotate left bit into carry
0384 DAC403   C            JC    FOUND            ; Jump if black bit found
0387 04                    INR   B                ; Increment current bit counter
0388 15                    DCR   D                ; Decrement bits in byte counter
0389 C27B03   C            JNZ   FNDLP1           ; Continue if byte not exhausted
038C 23                    INX   H                ; Byte count exhausted, so
038D 7E                    MOV   A,M              ;   get next byte and continue
038E 1608                  MVI   D,8
0390 C37B03   C            JMP   FNDLP1
                  ;
                  ; Search to left
                  ;   First determine if search begins on a byte boundary.
                  ;   If not, then adjust first byte
                  ;
0393 78           LEFTSR:  MOV   A,B              ; Get starting bit position
0394 3C                    INR   A                ;   increment,
0395 0F                    RRC                    ;   and divide by eight
0396 0F                    RRC
0397 0F                    RRC
0398 E6E0                  ANI   0E0H
039A 7E                    MOV   A,M              ; Get first byte
039B 1608                  MVI   D,8              ; Initial bit count
039D CAAC03   C            JZ    FNDLP2           ; Skip if no need to adjust
03A0 5F                    MOV   E,A              ; Save number of bits to skip
03A1 3E08                  MVI   A,8              ; Determine number of bits which will
03A3 93                    SUB   E                ;   be left
03A4 57                    MOV   D,A
03A5 7E                    MOV   A,M              ; Get first byte
03A6 B7           SKP1LP:  ORA   A                ; Clear carry
03A7 1F                    RAR                    ; Rotate to right
03A8 1D                    DCR   E                ; Decrement skip counter
03A9 C2A603   C            JNZ   SKP1LP           ; Continue until skip finished
03AC 5F           FNDLP2:  MOV   E,A              ; Save current byte
03AD 78                    MOV   A,B              ; Get current bit number
03AE B9                    CMP   C                ; Test to see if not found
03AF DAC703   C            JC    NOTFND           ; Jump if no black found
03B2 7B                    MOV   A,E              ; Recover current byte
03B3 B7                    ORA   A                ; Clear carry
03B4 1F                    RAR                    ; Rotate right bit into carry
03B5 DAC403   C            JC    FOUND            ; Jump if black bit found
03B8 05                    DCR   B                ; Increment current bit counter
03B9 15                    DCR   D                ; Decrement bits in byte counter
```

```
LOC  OBJ          LINE    SOURCE STATEMENT

03BA C2AC03   C           JNZ     FNDLP2        ; Continue if byte not exhausted
03BD 2B                   DCX     B             ; Byte count exhausted, so
03BE 7E                   MOV     A,M           ;   get next byte and continue
03BF 1608                 MVI     D,8
03C1 C3AC03   C           JMP     FNDLP2
                  ;
                  ; Black bit found.  Set carry and return matched bit number.
                  ;
03C4 78           FOUND:  MOV     A,B
03C5 37                   STC
03C6 C9                   RET
                  ;
                  ; Black bit not found.  Reset carry
                  ;
03C7 37           NOTFND: STC
03C8 3F                   CMC
03C9 C9                   RET
                  ;
                  $EJECT
                  ;*****************************************************************
                  ;
                  ; Subroutine ACCTST                                              *
                  ;                                                                *
                  ;       The following subroutine is used to test if a character really is
                  ;       an accented character.  This is used during touching character
                  ;       processing and is used to insure that a small piece of the seriff
                  ;       from another character is what makes it look like a accent cloud
                  ;       mask.  The top five rows of the character are ORed together, and
                  ;       if the resulting width is greater than or equal to six, then the
                  ;       character is assumed to be accented.
                  ;
                  ;       Inputs:      RECPTR       Character buffer to test
                  ;
                  ;       Outputs:     Carry        Test results indicator
                  ;                                   NC - Not accented character
                  ;                                   C  - Accented character
                  ;
                  ;       Registers
                  ;       Affected:    All
                  ;
                  ;*****************************************************************
                  ;
                  ACCTST:
                  ;
                  ; Look for uppermost black in the character buffer
                  ;
03CA 2ACAE0               LHLD    RECPTR        ; Point to character data in buffer
03CD 112000               LXI     D,RECCHB
03D0 19                   DAD     D
03D1 2D                   DCR     L
03D2 0620                 MVI     B,32          ; Adjust address for pre-increment
03D4 05           ACT005: DCR     B             ; Set number of rows
03D5 C8                   RZ                    ; Decrement row counter
03D6 2C                   INR     L             ; Not accented character if blank buffer
03D7 7E                   MOV     A,M           ; Point to first byte of row
                                                ; Get first byte
```

```
LOC  OBJ            SOURCE STATEMENT

03D8 2C                    INR   L
03D9 B6                    ORA   M              ; OR with second byte
03DA 2C                    INR   L
03DB B6                    ORA   M              ; OR with third byte
03DC CAD403    C           JZ    ACT005         ; Continue until non-blank row found
                   ;
                   ; Uppermost black row found.  Compute area of top five rows
                   ;
03DF 3E1F                  MVI   A,31           ; Compute row number at which top black
03E1 90                    SUB   B              ;   was found
03E2 FE0A                  CPI   10             ; Test if too low for accented character
03E4 D0                    RNC                  ; Return if it is (not accented)
                   ;
03E5 2D                    DCR   L              ; Point to first byte in top row
03E6 2D                    DCR   L
03E7 060F                  MVI   B,15           ; Process fifteen bytes
03E9 AF                    XRA   A              ; Initialize sum
03EA 110001                LXI   D,ACTOBG       ; Set base address for bit count table
03ED 4E            ACT007: MOV   C,M            ; Get byte
03EE 2C                    INR   L              ; Point to next byte
03EF E5                    PUSH  H              ; Save address
03F0 69                    MOV   L,C            ; Set up offset into bit count table
03F1 2600                  MVI   H,0
03F3 19                    DAD   D              ; Point to count for byte
03F4 86                    ADD   M              ; Add to sum which will yield area
03F5 E1                    POP   H              ; Recover character buffer address
03F6 05                    DCR   B              ; Decrement byte counter
03F7 C2ED03    C           JNZ   ACT007         ; Continue until count exhausted
                   ;
                   ; Test just computed area to test to see if accent.
                   ;
03FA FE14                  CPI   20             ; Use 20 as threshold
03FC 3F                    CMC                  ; Set correct return status
03FD C9                    RET                  ; Exit ACCTST
                   ;
                           END

ASSEMBLY COMPLETE,   NO ERRORS

SKP13.
SVP6.
SZS.
```

```
LOC   OBJ        LINE        SOURCE STATEMENT

$NOLIST
$LIST

$TITLE('01/31/85 - SYSTEM EXECUTIVE FOR ISOLATION  ')

;                     ************
;                     *          *
;                     *  M1EXEC  *
;                     *          *
;                     ************

;          PUBLIC PROCEDURES

           PUBLIC   PGWSCN            ;
           PUBLIC   CHRSEP            ;
           PUBLIC   TCHSEP            ;
           PUBLIC   PSLSET            ;
           PUBLIC   ISOSEP            ;
           PUBLIC   ISOPCN            ;
           PUBLIC   SETVSZ            ;
           PUBLIC   LBFILL            ;TEMPORARILY ALLOW
;
;
;       PUBLIC DATA
;****************************************
;   added 5-30-84 AL  FOR PS CHECK
;
           PUBLIC   SPASFG            ; FLAG FOR A 2ND PASS AT PS HORSEP

;   added 8-5-84 for isolation to determine pitch and send words to rec
;
           PUBLIC   WDFLAG            ; WHICH WORD WERE ON
           PUBLIC   PRVFLG
           PUBLIC   CONPIT            ; WORD CONFIDENCE AND PITCH->CURCBP

; added 9-19-84 to communicate with M1CHSP if char sent was rejected as noise
           PUBLIC   BADCHR
;
;****************************************

;          EXTERNAL DATA

           EXTRN    ITSMLP            ;  MAX PAGE LENGTH BEFORE JAM

;          EXTERNAL PROCEDURES - M1CHRS

           EXTRN    HORSWS                   ;SEPARATE HORIZONTALLY
           EXTRN    VERSWS                   ;SEPARATE VERTICALLY
           EXTRN    HTKSEP                   ;

;          EXTERNAL PROCEDURES SEPUTL

           EXTRN    MSKGEN                   ;
           EXTRN    CHWCOL                   ;
```

```
LOC  OBJ        LINE    SOURCE STATEMENT

                         EXTRN   ROWDIF          ;
                         EXTRN   TCHRST          ;
                         EXTRN   SETLRW          ;
                         EXTRN   WBCOLD          ;
                         EXTRN   BITBLB          ;
                         EXTRN   GETPRW          ;

                ;        EXTERNAL PROCEDURES - ISOUTL

                         EXTRN   RETCM           ;RETURN  THE CONDITION CODES SET NEG
                         EXTRN   RETCP           ;RETURN CONDITION CODES POSITIVE
                         EXTRN   DSUB            ;DOUBLE WORD SUBTRACT
                         EXTRN   DIVBY4          ;
                         EXTRN   DIVBY8          ;
                         EXTRN   DIKDIV          ;
                         EXTRN   OUTCLF          ;
                         EXTRN   OUT5SP
                         EXTRN   OUTHEX
                         EXTRN   OUTBYT




                ;        EXTERNAL PROCEDURES - M1UNDL

                         EXTRN   UNDERL          ;


                ;        EXTERNAL PROCEDURES  M1MNBL

                         EXTRN   MBEROC          ;
                         EXTRN   MBCONT          ;


                ;        EXTERNAL PROCEDURES

                         EXTRN   CHRXFR          ;
                         EXTRN   FREEWD          ; ADDED FOR RELEASING 1 WORD AT A TIME
                         EXTRN   ISOREC          ;
                         EXTRN   EOPTST          ;
                         EXTRN   VDUMP           ;
                         EXTRN   MBEOUT          ;
                         EXTRN   ERRMES          ;
                         EXTRN   TIMOUT          ;
                         EXTRN   OPTION          ;
                         EXTRN   VIDFSL          ;
                         EXTRN   TCHINT          ;
                         EXTRN   CRASH           ;

                ;        EXTERNALS FOR LBFILL

                         EXTRN   ISOPSW          ;
                         EXTRN   VBFILL          ;

                         EXTRN   IFSCRT          ;
```

```
LOC  OBJ        LINE        SOURCE STATEMENT

                                 EXTRN   ITSCBF                   ;



                           ;     EXTERNAL DATA - M1DATA

                                 EXTRN   P3LS1L                   ;
                                 EXTRN   P3LS2L           ;
                                 EXTRN   P3CHSA           ;
                                 EXTRN   P3CHCA           ;
                                 EXTRN   P3CVSZ           ;
                                 EXTRN   P3CHSZ           ;
                                 EXTRN   HORSBC           ;
                                 EXTRN   P3CHBA           ;
                                 EXTRN   P3CVPC           ;
                                 EXTRN   P3CHPC
                                 EXTRN   P3CHPA           ;
                                 EXTRN   P3CHUA           ;
                                 EXTRN   P3CSFG           ;
                                 EXTRN   PRHCBP           ;
                                 EXTRN   PRVCBP           ;
                                 EXTRN   PRVCBF           ;
                                 EXTRN   PRHCBF           ;
                                 EXTRN   WRDEND           ;
                                 EXTRN   WRDSTR           ;
                                 EXTRN   P3CRCF
                                 EXTRN   P3ADWR           ;
                                 EXTRN   P3WSRC           ;
                                 EXTRN   P3LEND           ;
                                 EXTRN   DLLBEG           ;
                                 EXTRN   MBTCNT           ;
                                 EXTRN   BFRLCT           ;
                                 EXTRN   PASCT1           ;
                                 EXTRN   PASCT2           ;
                           ;
                           ;***********************************
                           ;
                           ; Modification #4
                           ;
                                 EXTRN   HRMPRC           ; Horizontal remnant processing flag
                           ;
                           ;***********************************
                           ; EXTERN DATA FOR WORD RELEASES 8-12-84 :AL
                                 EXTRN   Q1STRT           ; POINTER INTO Q FOR START OF WD 1
                                 EXTRN   Q2STRT
                                 EXTRN   Q3STRT
                                 EXTRN   QCOUNT

                                 DSEG


                           ;     LOCAL   DATA

0000                       RWSNED: DS    1                ;
                           ;
```

```
LOC  OBJ          SOURCE STATEMENT

                  ;AAAAAAAAAAAAAAAAAAAAAAAAAAAAAAAAAAAAAAAAAAAAAAA
                  ;
0001              SPASFG: DS      1               ; 2ND PASS THRU HORSEF FLAG
                  ;
                  ;AAAAAAAAAAAAAAAAAAAAAAAAAAAAAAAAAAAAAAAAAAAAAAAAAAAAAAA
                  ;
                  ; FOR ISOLATION TO DETERMINE PITCH: AL 8-1-84
                  ;
0002              CQUEUE: DS      35              ; Q HOLDING THE DISTANCES BETWEEN CHARS
0025              QPTR:   DS      2               ; POINTER TO LOCATION IN THE Q
0027              PREVCT: DS      2               ; SAVE LOCATION OF PREVIOUS HOR CUT
0029              MEAN:   DS      2               ; MEAN OF THE PITCH IN GIVEN WORD
002B              PREVMN: DS      1               ; MEAN OF HISTORIC WORD PITCH
002C              MEAN1:  DS      1               ; MEAN OF WORD 1
002D              MEAN2:  DS      1
002E              MEAN3:  DS      1
002F              DEVSUM: DS      1               ; SUM OF ABSOLUTE DIFFERENCES FROM MEAN
0030              CCOUNT: DS      1               ; NUM CHAR/WORD - 1
0031              PGSTRT: DS      1               ; FLAG INDICATING PAGE JUST STARTED
0032              WDFLAG: DS      1               ; WHICH WORD WERE ON
0033              PRVFLG: DS      1               ; USED BY CHEKER TO SEE IF NEW WORD
0034              CONFID: DS      1               ; CONFIDENCE IN PITCH CHOSEN
0035              CONPIT: DS      1               ; ENCODED COFIDENCE AND PITCH
0036              PSCR:   DS      1               ; GENERIC PS SCORE
0037              FIXSCR: DS      1               ; GENERIC FIXED SCORE
0038              CONF:   DS      1               ; GENERIC PITCH AND CONFIDENCE FLAG
0039              PITCH:  DS      1               ; GENERIC PITCH VARIABLE
                  ; added 8-5-84

003A              W1FSCR: DS      1               ; WORD 1's FIXED PITCH SCORE
003B              W1PSCR: DS      1               ; WORD 1's PS SCORE
003C              W1CONF: DS      1               ; WORD 1's DETERMINED PITCH AND CONFIDENCE
003D              W2FSCR: DS      1
003E              W2PSCR: DS      1
003F              W2CONF: DS      1
0040              W3FSCR: DS      1
0041              W3PSCR: DS      1
0042              W3CONF: DS      1
                  ;
                  ; 9-5-84: AL
                  ;
                  ; added for forcing end of words if they exceed a certain number of chars.

0008              MAXCHR  EQU     8
                  ;
                  ; added 9-19-84 for communication to MICHSP if char sent rejected as noise
0043              BADCHR: DS      1
                  ;
                  ;
                  ;AAAAAAAAAAAAAAAAAAAAAAAAAAAAAAAAAAAAAAAAAAAAAAAAAAAAAAAAAAAA
                  ;
                  ;**********************************
                  ;
                  ; TH - 14 July 1984
                  ;
```

```
LOC  OBJ                SOURCE STATEMENT

                  ; Variables for second pass through PGWSCN when excessive word drop is found.
                  ;
0044              %SCPFG: DS      1                    ; Second pass flag
0045              PGBOWS: DS      1                    ; Search depth depending on pass
                  ;
                  ;***********************************
                  ;
                          CSEG

                  $EJECT
                  ;*******************************************************************************
                  ;
                  ; M1LXEC Record of changes                                                     ;
                  ;                                                                              ;
                  ;           1)  02/XX/84    MM       Original modularization                   ;
                  ;           2)  04/04/84    TH       Modification so that kernal characters are ;
                  ;                                    not passed to recognition as touching     ;
                  ;           3)  04/05/84    TH       Correct bug in touch separation exec      ;
                  ;           4)  04/23/84    TH       Correct bug in CHRSEP calling exec        ;
                  ;           5)  04/30/84    TH       Initialize horizontal processing flag     ;
                  ;                                                                              ;
                  ;*******************************************************************************
                  ;
                  $EJECT

                  ;                 **********************************
                  ;                 *                                *
                  ;                 *  CHARACTER SEPERATION PROCESS  *
                  ;                 *                                *
                  ;                 **********************************

                  ;NEW PAGE DETECTED - INITIALIZE

0000 210085       ISOSEP: LXI     H,SYSCHB+80H    ;INITIALIZE CURRENT BUFFER POINTER
0003 220CE0               SHLD    CURCBP          ;CURRENT BUFFER
0006 3EFF                 MVI     A,NULL          ;MARK BUFFER ADDRESS
0008 320000     E         STA     PRVCBF          ;AS NULL
000B 320000     E         STA     PRHCBF          ;THIS ONE TOO
000E 320000     E         STA     PRHCBP          ;THIS IS FOR START OF PAGE/WORD PROCESSING
0011 320100     E         STA     PRHCBP+1        ;
                  ;
                  ;***********************************
                  ;
                  ; Modification #4
                  ;
                  ;       Initialize horizontal remnant processing flag
                  ;
0014 AF                   XRA     A
0015 320000     E         STA     HRMPRC
                  ;
                  ;***********************************
                  ;
                  ;***********************************
                  ;
```

```
LOC  OBJ           LINE        SOURCE STATEMENT
                          ; TH - 14 July 1984
                          ;
                          ; Initialize second pass through PGWSCN flag
                          ;
0018 324400    D                  STA     WSCPFG
                          ;
                          ;**********************************
                          ;
001B 3EFF                         MVI     A,0FFH            ;INITIALIZE UNREADABLE PAGE TIMEOUT
001D 320000    E                  STA     PAGCT2            ;VARIABLES
0020 21A001                       LXI     H,415             ;= APPROX. 1 MIN. OF DEADMAN TIMEOUT
0023 220000    E                  SHLD    PAGCT1
0026 AF                           XRA     A                 ;
0027 320000    E                  STA     BFRLCT            ;
002A 320000    E                  STA     ISOSFG            ;SET INITIAL ISOLATION STATUS
002D 320000    E                  STA     RBTCNT            ;SET INITIAL RB TABLE COUNT
0030 320000    E                  STA     PGRDWR            ;SET INITIAL ROWS SINCE DEEP SCAN
                          ; added 6-5-84 for pitch determination
0033 323100    D                  STA     PGSTRT            ; STARTING NEW Page
0036 323BE0                       STA     PPITCH            ; INIT PITCH TO FIXED
0039 323500    D                  STA     CONPIT            ; INIT CONPIT TO LOW CONFIDENCE FIXED
003C 67                           MOV     H,A               ;
003D 6F                           MOV     L,A               ;
003E 220000    E                  SHLD    ULLEFS            ;RESET UL BOTTOM EDGE
0041 2246E0                       SHLD    PAGACT            ;RESET PAGE ACTIVE TIME
0044 3E01                         MVI     A,1
0046 323200    D                  STA     WDFLAG            ; INITIALIZE WORD FLAG
0049 3E07                         MVI     A,7
004B 320000    E                  STA     WRDSTR            ; INIT START COLUMN
004E 320000    E                  STA     PGLEAD            ; INIT LEFT EDGE ADDRESS
0051 3EF8                         MVI     A,0F8H
0053 320000    E                  STA     WRDEND            ; INIT ENDING COLUMN
0056 3A2EE0                       LDA     VBSIZE            ;SET TOTAL BUFFER SIZE
0059 3230E0                       STA     VBLMAX            ;AS READ SIZE
005C 011800                       LXI     B,PIXLPI/10       ;IGNORE INITIAL 1/10 INCH OF PAGE
005F CD3E0B    C                  CALL    LBFILL            ;
0062 010017                       LXI     B,(PIXLPI/10-1)*256 ;
0065 CD3E0B    C                  CALL    LBFILL            ;
0068 3A2FE0                       LDA     VBLADR            ;TEST FOR FALSE PAGE START INDICATION
006B CD0000    E                  CALL    VIDPSQ            ;END OF PAGE?
006E 3E05                         MVI     A,ESCEPF          ;IF SO, FLAG FALSE PAGE
0070 C2C701    C                  JNZ     ISOPCN            ;AND ABORT PAGE
0073 EB                           XCHG                      ;SAVE INITIAL LEFT PAGE EDGE
0074 223CE0                       SHLD    PAGLES            ;
0077 CD0000    E                  CALL    TCHINT            ;INITIALIZE TOUCH SEPERATION
007A 3E01                         MVI     A,1               ;
007C 320000    E                  STA     PGWSRC            ;SET INITIAL ROW COUNT
007F 3E16                         MVI     A,22
0081 322B00    D                  STA     PREVMN            ; SET AN INITIAL PITCH MEAN
0084 AF                           XRA     A
0085 320000    E                  STA     JCOUNT
0088 323300    D                  STA     PRVFLG            ; PREV WORD WAS 0
                          $EJECT
```

```
LOC  OBJ          LINE        SOURCE STATEMENT

                  1352 ;*********************
                  1353 ;SCAN UNTIL END OF PAGE FOUND OR NON-WHITE ROW FOUND.
                  1354 ;TEST FOR EXCESSIVE PAGE LENGTH DUE TO JAM.  FORCE END OF LINE IF ENOUGH
                  1355 ;INTER-LINE WHITE FOUND.
                  1356 PGSCAN: IF    DEBUG           ;
008B 3E02         1357        MVI    A,VSSEPR        ;
008D 3247E0       1358        STA    VIDRUN          ;
                  1359        ENDIF                  ;
0090 2A2CE0       1360        LHLD   VBLORG          ;SET VERTICAL LINE ORIGIN IN PIXELS
0093 3A0000     E 1361        LDA    ITSMLP          ;AT MAX PAGE LENGTH?
0096 BD           1362        CMP    L               ;
0097 CA9F00     C 1363        JZ     PGSCBO          ;IF SAME, TRY HIGH
009A 3C           1364        INR    A               ;OK IF OFF BY 1
009B BD           1365        CMP    L               ;
009C C2B100     C 1366        JNZ    PGSCXO          ;LOW BYTE DOESNT MATCH
009F 3A0100     E 1367 PGSCBO: LDA   ITSMLP+1        ;TRY HIGH BYTE
00A2 BC           1368        CMP    H               ;
00A3 C2B100     C 1369        JNZ    PGSCXO          ;NO, CONTINUE
00A6 01B840       1370        LXI    B,MESCPJ*255+MCTBEP+MCTRCC ;BEEP AND DISPLAY PAGE JAM
00A9 CD0000     E 1371        CALL   LERMES          ;
00AC 3E02         1372        MVI    A,ESCEPJ        ;IF CLEAR PRESSED,
00AE C2C701     C 1373        JNZ    ISOPCN          ;CANCEL PAGE DUE TO JAM AND EXIT
00B1 210000     E 1374 PGSCXO: LXI   H,PGADWR        ;BUMP BLANK ROW COUNT
00B4 34           1375        INR    M               ;
00B5 C2B900     C 1376        JNZ    PGSCXX          ;IF NO WRAPAROUND, CONTINUE
00B8 35           1377        DCR    M               ;HOLD AT MAX
00B9 7E           1378 PGSCXX: MOV   A,M             ;
00BA FE78         1379        CPI    120             ; IF ENCOUNTER WHITE SPACE >= 1/2"
                  1380                               ; RELEASE ALL WORDS BEING HELD
00BC FAD000     C 1381        JM     PGSCKY          ;
00BF CDCA01     C 1382        CALL   LETOUT          ;
00C2 AF           1393        XRA    A               ;
00C3 323100     D 1384        STA    PGSTRT          ; RESTART PITCH DETERMINATION PROCESS
00C6 320000     E 1385        STA    PGADWR          ; RESET BLANK ROW COUNTER
00C9 323300     D 1386        STA    PRVFLG          ;
00CC 3C           1387        INR    A               ;
00CD 323200     D 1388        STA    WDFLAG          ; UPDATE WORD FLAGS
00D0 210000     E 1389 PGSCKY: LXI   H,PGWSRC        ;GET SKIP COUNT
00D3 46           1390        MOV    B,M             ;SET AS RETURN COUNT
00D4 3E02         1391        MVI    M,2             ;SET DOUBLE SKIP
00D6 3E08         1392        MVI    A,PSNFVS        ;SET NOISE SEARCH DEPTH
00D8 CDEB0A     C 1393        CALL   PGBSET          ;
00DB 3A2FE0       1394        LDA    VBLADR          ;GET BUFFER TOP ROW
00DE 47           1395        MOV    B,A             ;SAVE
00DF E606         1396        ANI    06H             ;TEST FOR END OF PAGE AND ADJUST LEFT EDGE
00E1 C20E01     C 1397        JNZ    PGSCX1          ;EVERY 4 ROWS
00E4 78           1398        MOV    A,B             ;RESTORE
00E5 CD0000     E 1399        CALL   VIDPG2          ;END OF PAGE?
00E8 C2CA01     C 1400        JNZ    ISOP15          ;NO
00EB 2A3CE0       1401        LHLD   PRGLEG          ;GET PREV PAGE LEFT EDGE
00EE EB           1402        XCHG                   ;GET RUNNING AVERAGE OF CURRENT AND PREV.
00EF 19           1403        DAD    D               ;LEFT PAGE EDGE (PREV*3+CURR)/4
00F0 19           1404        DAD    D               ;
00F1 19           1405        DAD    D               ;
00F2 CD0000     E 1406        CALL   DIVBY4          ;
```

```
LOC  OBJ                 SOURCE STATEMENT

00F5 2230E0                       SHLD    PAGLEG          ;AND SET CURRENT PAGE LEFT EDGE
00F8 CD0000     E                 CALL    DIVBY8          ;PAGLEG/8= PAGE LEFT EDGE BYTE ADDRESS
00FB 7D                           MOV     A,L             ;
00FC 3C                           INR     A               ;INC ONCE TO ROUND UP
00FD 3C                           INR     A               ;INC AGAIN TO ALLOW SINGLE DCB DURING ISOLATION
00FE 320000     E                 STA     PGLEAD          ;SAVE PAGE LEFT EDGE ADDRESS
0101 320000     E                 STA     WRDSTR          ;ALSO SAVE FOR WRDSTR
0104 3EFB                         MVI     A,PGLCOL        ;SAVE RIGHT ADDRESS AS WORDEND
0106 320000     E                 STA     WRDEND          ;
0109 1600                         MVI     D,0             ;CHECK FOR TIMEOUTS
010B CD0000     E                 CALL    TIMOUT          ;

                         $EJECT
                         ;********************
                         ;SAVE LEFT PAGE EDGE AT .5 AND 10.1 INCHES INTO PAGE
010E 3A2CE0              PGSCX1:  LDA     VBLORG          ;LOW BYTE = .5 OR 10.1?
0111 E6FE                         ANI     0FEH            ;CHECK BY TWOS
0113 FE80                         CPI     80H             ;
0115 C23101     C                 JNZ     PGRSCN          ;NO, CONTINUE
0118 3A2DE0                       LDA     VBLORG+1        ;GET HIGH BYTE
011B FE01                         CPI     1               ;=.5?
011D C22601     C                 JNZ     PGSCX2          ;NOT .5 INCHES IN, CONTINUE
0120 2A3CE0                       LHLD    PAGLEG          ;GET CURRENT LEFT EDGE
0123 223EE0                       SHLD    LEAD05          ;SAVE
0126 FE09                PGSCX2:  CPI     9               ;
0128 C23101     C                 JNZ     PGRSCN          ;NOT 10.5 INCHES IN, CONTINUE
012B 2A3CE0                       LHLD    PAGLEG          ;SAVE CURRENT LEFT EDGE
012E 2240E0                       SHLD    LEA105          ;

                         ;********************
                         ;RESCAN CURRENT ROW  - CHECK FOR PAGE CANCEL AND UNREADABLE PAGE TIMEOUT
0131 0602                PGRSCN:  MVI     B,OPTRSM        ;CLEAR BUTTON PRESSED?
0133 CD0000     E                 CALL    OPTION          ;
0136 3E01                         MVI     A,ESCEPC        ;
0138 CAC701     C                 JZ      ISOPCN          ;YES, ABORT PAGE DUE TO CLEAR BUTTON
013B 3A49E0                       LDA     PAGACT+1        ;512+ PAGE ACTIVE COUNTS?
                         ;
                         ;AAAAAAAAAAAAAAAAAAAAAA
                         ; added 10-17-84 to lat 213 have 90 sec timeout before unreadable page
                         ;
                         ;        IF      X3
013E D603                         SUI     3
                         ;        ELSE
                         ;        SUI     2
                         ;        ENDIF                   ;
                         ;
                         ;AAAAAAAAAAAAAAAAAA
0140 FA7001     C                 JM      PGSCWD          ;NO, CONTINUE
0143 2A2CE0                       LHLD    VBLORG          ;PAGE ACTIVE TIME EXCEEDS 8 SECS/INCH?
0146 CD0000     E                 CALL    DIVBY4          ;
0149 44                           MOV     B,H             ;
014A 4D                           MOV     C,L             ;
014B 2A49E0                       LHLD    PAGACT          ;
014E CD0000     E                 CALL    DSUB            ;
0151 F27001     C                 JP      PGSCWD          ;NO, CONTINUE
```

```
LOC  OBJ          LINE        SOURCE STATEMENT

0154 0680          1462               MVI    B,OPTEST            ;TEST MODE?
0156 CD0000   E    1463               CALL   OPTION              ;
0159 CA7001   C    1464               JZ     PGSCWO              ;YES, CONTINUE
015C 010000        1465               LXI    B,0                 ;
015F 1110E0        1466               LXI    D,TIMER1            ;SOLVE TIMEOUT PROBLEM
0162 CD0000   E    1467               CALL   TIMOUT              ;
0165 018820        1468               LXI    B,MESDRP*256+MCTBEP+MCTRCC ;
0168 CD0000   E    1469               CALL   ERRMES              ;NO, POST UNREADABLE PAGE ERROR MESSAGE
016B 3E03          1470               MVI    A,ESCEPU            ;IF CLEAR PRESSED,
016D C2C701   C    1471               JNZ    ISOPCN              ;CANCEL PAGE
                   1472
                   1473 $EJECT
                   1474 ;*********************
                   1475 ;RESCAN CURRENT ROW - CHECK WITHIN PAPER BOUNDS FOR BLACK (POSSIBLE CHAR)
0170 2A2EE0        1476 PGSCWO:  LHLD   VBLADR-1            ;SCAN FOR NEXT WORD IN CURRENT LINE
0173 3A0000   E    1477               LDA    PGWSRC              ;SET SCAN DEPTH
0176 3D            1478               DCR    A
0177 CA8501   C    1479               JZ     PGSCZO              ;IF SINGLE SCAN, USE LINE ORIGIN
017A 24            1480               INR    H                   ;IF DOUBLE SCAN, USE NEXT ROW
017B 3A2CE0        1481               LDA    VBSIZE              ;CHECK FOR END OF BUFFER
017E C6FF          1482               ADI    HIGH SYSBJS
0180 BC            1483               CMP    H                   ;END OF BUFFER?
0181 C28501   C    1484               JNZ    PGSCZO              ;NO, CONTINUE
0184 26FF          1485               MVI    H,HIGH SYSBJS       ;YES, WRAP POINTER
0186 3A0000   E    1486 PGSCZO:  LDA    PGLEAD              ;GET PAGE LEFT EDGE ADDRESS
0189 6F            1487               MOV    L,A
018A AF            1488               XRA    A                   ;SEARCH FOR NON-WHITE
018B 060F          1489               MVI    B,15                ;TEST 15 BLOCKS OF 16 FOR WHITE
                   1490 PGSCYO:  REPT   15                  ;OR NEXT 16 BYTES TOGETHER
                   1491               INR    L                   ;=> NEXT BYTE
                   1492               ORA    M                   ;
                   1493               ENDM
01AL C2BF01   C    1526               JNZ    PGSCY1              ;FOUND BLACK
01B0 05            1527               DCR    B                   ;IF BLOCK COUNT NOT EXPIRED,
01B1 C28D01   C    1528               JNZ    PGSCYO              ;TRY NEXT BLOCK
01B4 B6            1529 PGSCLO:  ORA    M                   ;ELSE TEST RESIDUAL BLOCK
01B5 C20502   C    1530               JNZ    PGSC01              ;FOUND BLACK
01B8 2C            1531               INR    L                   ;=> NEXT BYTE
01B9 C2B401   C    1532               JNZ    PGSCLO              ;IF NO OVERFLOW, TRY NEXT BYTE
01BC C38B00   C    1533               JMP    PGSCAN              ;END OF ROW, TRY NEXT
                   1534
                   1535
                   1536 ;FAST SCAN FOUND BLACK - BACK UP 15 AND ENTER SLOW SCAN
                   1537
01BF 7D            1538 PGSCY1:  MOV    A,L                 ;BACK UP 16
01C0 D610          1539               SUI    16                  ;
01C2 6F            1540               MOV    L,A                 ;
01C3 AF            1541               XRA    A                   ;AND PROCESS RESIDUAL BLOCK
01C4 C3B401   C    1542               JMP    PGSCLO              ;
                   1543
                   1544 $EJECT
```

```
LOC  OBJ          LINE        SOURCE STATEMENT

                         ;CANCEL PAGE

01C7 3245E0              ISOPCN: STA     PAGECD          ;SAVE PAGE END CANCEL CODE
                         ISOP10:
                         ;
                         ;**********************************
                         ;
                         ; 22 AUGUST 84 - AL
                         ;
                         ; If last character separated has not been sent to recognition yet, then
                         ; do so now.
                         ;
01CA 3EFF                LETOUT: MVI     A,NULL          ;
01CC 320000    E                 STA     PRVCBF          ; Set null links in buffer pointers
01CF 320000    E                 STA     PRHCBF
01D2 2A0CE0                      LHLD    CURCBP          ; Set right link in current buffer to null
01D5 011100                      LXI     B,RECLNR
01D8 09                          DAD     B
01D9 77                          MOV     M,A
01DA 3A0000    E                 LDA     QCOUNT
01DD B7                          ORA     A
01DE C8                          RZ
01DF 3A38E0                      LDA     PPITCH
01E2 323500    D                 STA     CONPIT          ; SEND WORD WITH PREVIOUS PITCH
01E5 CD0000    E                 CALL    FBEEWD          ; Flag buffer as awaiting recognition
01E8 3A0000    E                 LDA     QCOUNT
01EB B7                          ORA     A
01EC C8                          RZ                      ; DONE WITH SENDING WORDS
01ED 2A0000    E                 LHLD    Q2STRT
01F0 220000    E                 SHLD    Q1STRT
01F3 CD0000    E                 CALL    FREEWD
01F6 3A0000    E                 LDA     QCOUNT
01F9 B7                          ORA     A
01FA C8                          RZ
01FB 2A0000    E                 LHLD    Q3STRT
01FE 220000    E                 SHLD    Q1STRT
0201 CD0000    E                 CALL    FREEWD
0204 C9                          RET                     ; END OF PAGE
                         ;
                         ;AAAAAAAAA
                         ;

0205 3E78                PGSC01: MVI     A,PGLCOL        ;IN RIGHT PAGE EDGE ZONE?
0207 BD                          CMP     L               ;
0208 DA8B00    C                 JC      PGSCAN          ;IF SO, SCAN NEXT ROW
020B 7D                          MOV     A,L             ;
020C 320000    E                 STA     PGSCOA          ;SAVE FOR WORD SCAN
020F 210000    E                 LXI     H,PGWSRC        ;GET WHITE SCAN DEPT
0212 35                          DCR     M               ;DOUBLE SKIP?
0213 3601                        MVI     M,1             ;SET TO SINGLE SINCE BLACK FOUND
0215 C23101    C                 JNZ     PGRSCA          ;DOUBLE SCAN, CHECK FIRST ROW OF PAIR FOR BLACK
                                 IF      DEBUG           ;
0218 3E03                        MVI     A,VSWSEP        ;
021A 3247E0                      STA     VIDROW          ;
```

```
LOC  OBJ            SOURCE STATEMENT

                          ENDIF                     ;

                    SEJECT
                    ;********************
                    ;PRE-ISOLATION NOISE SCAN - SEARCH -1,+0,+1 HORIZONTAL FROM FIRST BLACK BYTE,
                    ;DOWN FOR PSNFVS ROWS, UNTIL BLACK PIXEL COUNT EXCEEDS MAX FOR NOISE.
                    ;IF BLACK NOISE COUNT ACCEPTABLE, ERASE CENTRAL BYTE OF FIRST PSNFVE ROWS.
                    ;INTERNAL USAGE: B=TOTAL BLACK, C=CURRENT LOGICAL ROW.
021D CD0000    E    PGNSCN: CALL    MBEOUT          ;OUTPUT MB ESC SEQ IF REQUIRED
0220 010000             LXI     B,0             ;B=BLACK PIXEL COUNT, C=ROW COUNTER
0223 2A0000    E        LHLD    PGCHCA          ;GET FIRST BLACK COLUMN
0226 1601               MVI     D,HIGH BCTORG   ;=>BIT COUNT TABLE
0228 79         PGNL01: MOV     A,C             ;GET PHYSICAL ADDRESS FOR THIS ROW
0229 CD0000    E        CALL    GETPRW          ;
022C 78                 MOV     A,B             ;GET CURRENT TOTAL
022D 2D                 DCR     L               ;COUNT BLACK IN -1 HORIZ. BYTE
022E 5E                 MOV     E,M             ;GET BYTE
022F EB                 XCHG                    ;
0230 86                 ADD     M               ;ADD BIT COUNT
0231 EB                 XCHG                    ;RESTORE HL
0232 2C                 INR     L               ;COUNT BLACK IN +0 HORIZ. BYTE
0233 5E                 MOV     E,M             ;
0234 EB                 XCHG                    ;
0235 86                 ADD     M               ;
0236 EB                 XCHG                    ;
0237 2C                 INR     L               ;COUNT BLACK IN +1 HORIZ. BYTE
0238 5E                 MOV     E,M             ;
0239 EB                 XCHG                    ;
023A 86                 ADD     M               ;
023B EB                 XCHG                    ;
023C 2D                 DCR     L               ;POSITION POINTER AT +0
023D FE06               CPI     PSNFLN+1        ;
023F F26802    C        JP      PGNS04          ;YES, NOT NOISE
0242 47                 MOV     B,A             ;SAVE CUMULATIVE COUNT
0243 0C                 INR     C               ;ADVANCE TO NEXT ROW
0244 79                 MOV     A,C             ;AT ROW LIMIT OF BLACK SEARCH?
0245 FE08               CPI     PSNFVS          ;
0247 FA2802    C        JM      PGNL01          ;NO, CONTINUE

                    SEJECT
                    ;********************
                    ;PGNSCN - CONTD - VIDEO DUMP NOISE, IF NECESSARY, THEN ERASE NOISE
                        IF      DEBUS
024A C35902    C        JMP     PGNS02          ;NULL OUT FOR NOISE VIDEO DUMP
024D E5                 PUSH    H               ;SAVE COLUMN
024E 45                 MOV     B,L             ;START COL
024F 05                 DCR     B               ;
0250 4D                 MOV     C,L             ;END COL
0251 0C                 INR     C               ;
0252 111000             LXI     D,PSNFVS+8      ;BEGIN ROW=0, END=NOISE FIELD+8
0255 CD0000    E        CALL    VDUMP           ;VIDEO DUMP
0258 E1                 POP     H               ;RESTORE COL
                        ENDIF                   ;
0259 0E03       PGNS02: MVI     C,PSNFVE        ;YES, ERASE CENTRAL CORE
```

```
LOC  OBJ            SOURCE STATEMENT

025E OD             PGRLO3: DCR     C               ;ERASE NOISE
025C FA3101    C            JM      PGRSCN          ;IF ALL ERASED, RESCAN ROW
025F 79                     MOV     A,C             ;GET PHYSICAL ROW
0260 CD0000    E            CALL    GETPRW          ;
0263 3600                   MVI     M,0             ;
0265 C35B02    C            JMP     PGRLO3          ;ERASE NEXT ROW

0268 3A0000    E    PGNSO4: LDA     PGADWR          ;GET ROWS SINCE LAST DEEP EOP TEST
026B FE0C                   CPI     12              ;1/20 INCH OR MORE?
026D DA7D02    C            JC      PGNSO5          ;NO, CONTINUE
0270 AF                     XRA     A               ;YES, RESET COUNT
0271 320000    E            STA     PGADWR          ;
0274 CD0000    E            CALL    EOPTST          ;DEEP EOP TEST
0277 CA7D02    C            JZ      PGNSO5          ;NOT END OF PAGE, CONTINUE

               ; ADDED  8-24-84 :AL TO RELEASE LAST WORD BUFFERS
               ;
027A C3CA01    C            JMP     LETOUT          ; RELEASE LAST WORD

027D CD2203    C    PGNSO5: CALL    PGWSCN          ;ISOLATE A WORD
               ;
               ;AAAAAAAAAAAAAAAAAAAAAAAAAAAAAAAAAAAAAAAAAAAAA
               ; AL: 8-1-84    FOR ISOLAION TO DETERMINE PITCH
               ; INITIALIZATION
               ;
0280 AF                     XRA     A               ; INITIALIZE
0281 320000    D            STA     CCOUNT          ; CHAR COUNT
0284 210200    D            LXI     H,CQUEUE        ; AND QPOINTER
0287 222500    D            SHLD    QPTR
               ;
               ;
               ;DDDDDDDDDDDDDDDDDDDDDDDDDDDDDDDDDDDDDDDDDDDDDDDDDDD
               ;
               ;            CALL    OUTCLF
               ;            CALL    OUTSSP
               ;            LXI     H,4531
               ;            MVI     B,13
               ;LOOP1:      MOV     A,M
               ;            PUSH    H
               ;            PUSH    B
               ;            CALL    OUTBYT
               ;            POP     B
               ;            POP     H
               ;            INX     H
               ;            DCR     B
               ;            JNZ     LOOP1
               ;
               ;DDDDDDDDDDDDDDDDDDDDDDDDDDDDDDDDDDDDDDDDDDDDDDDDDDD
               ;
               ;*********************************
               ;
               ; Modification #4
               ;
               ;        The following code was modified so that CHRXFR will be called
               ;        immediately following CHRSEP if not bad page or end of word.
```

```
LOC  OBJ          LINE     SOURCE STATEMENT
                           ;       Control will then continue with CHRSEP instead of returning to
                           ;       PGRSCN.
                           ;
                           ; Original code
                           ;
                           ;       CALL    CHRSEP          ;BASED ON RETURN IN A
                           ;       CPI     ENDWRD          ;WAS IT THE END OF A WORD ?
                           ;       JZ      PGRSCN          ;YES
                           ;       CPI     CRGOOD          ;WAS IT SEPARATED ?
                           ;       CZ      CHRKPR          ;YES, STORE IT
                           ;       CPI     BADPAG          ;WAS IT A BAD PAGE ?
                           ;       JZ      ISOPCN          ;YES, GET OUT
                           ;       JMP     PGRSCN          ;SOMETHING FAILED - TRY AGAIN
                           ;
                           ; New code
                           ;
028A CDBC03    C           PGNS06: CALL    CHRSEP          ;CALL SEPARATION PROCESS
028D FE02                          CPI     ENDWRD          ;TEST STATUS FOR END OF WORD
028F CA3101    C                   JZ      PGRSCN          ;IF SO, THEN CONTINUE WITH PGRSCN
0292 FE01                          CPI     CRGOOD          ;TEST FOR SEPARATED CHARACTER
0294 C40000    E                   CNZ     CRASH           ;SHOULD NEVER RETURN A STATUS OTHER THAN ABOVE
                           ;
                           ;DDDDDDDDDDDDDDDDDDDDDDDDDDDDDDDDDDDDDDDDDDDDDDDDDDDD
                           ;
                           ;       CALL    OUTCLF
                           ;       CALL    OUTSSP
0297 2A0000    E                   LHLD    PGCHCL
029A 2600                          MVI     H,0
029C 29                            DAD     H
029D 29                            DAD     H
029E 29                            DAD     H
029F 3A0000    E                   LDA     PGCHPC
02A2 4F                            MOV     C,A
02A3 0600                          MVI     B,0
02A5 09                            DAD     B
02A6 3A0000    E                   LDA     PGCHSZ
02A9 B7                            ORA     A
02AA 1F                            RAR
02AB 4F                            MOV     C,A
02AC 09                            DAD     B
                           ;DDDDDDDDDDDDDDDDDDDDDDDDDDDDDDDDDDDDDDDDDDDD
```

```
LOC  OBJ                 SOURCE STATEMENT

                    ;
                    ;AAAAAAAAAAAAAAAAAAAAAAAAAAAAAAAAAAAAAAAAAAAAAAAAA
                    ;
                    ; AL: 8-1-84  FOR ISOLATION TO DETERMINE PITCH
                    ; STORE ALL CENTER OF CHARACTER TO CENTER OF CHAR DIFFERENCES
                    ;
02AD E5                      PUSH    H                ; STORE THE CENTER OF THE CHAR
02AE CD0000      E           CALL    CHRXFR           ;MOVE CHARACTER TO BUFFER
02B1 E1                      POP     H                ; GET BACK CENTER OF CHAR
02B2 FE04                    CPI     BADPAG           ; STATUS RETURNED BY M1CHST OK?
                    ;
                    ;**********************************
                    ;
                    ; TH - 22 July 1984
                    ;
                    ; If jump to ISOPCN is taken because of an aborted page, then set page end
                    ; status to aborted because of unreadable page.
                    ;
02B4 3E03                    MVI     A,ESCEPJ
                    ;
                    ;**********************************
                    ;
02B6 CAC701      C           JZ      ISOPCN           ; ABORT PAGE WITH TIMEOUT

                    ;
                    ; 9-5-84: AL    ADDED MAXIMUM NUMBER OF CHAR/WORD : MAXCHR

02B9 3A4300      D           LDA     BADCHR           ; SEE IF CHAR SENT WAS REJECTED AS NOISE
02BC B7                      ORA     A
02BD C2CB02      C           JNZ     SKPWRD           ; YES, SO DON'T DO OUT STATS ON IT, END WORD
02C0 CDFC02      C           CALL    STWCTS           ; NO, SO DO STATS ON IT

02C3 3A3000      D           LDA     CCOUNT
02C6 FE08                    CPI     MAXCHR
02C8 FABA02      C           JM      PGNS06
02CB CDE403      C    SKPWRD: CALL   CHRSS3           ; IF EXCEEDING LIMIT OF MAX CHAR/WORD
02CE C33101      C           JMP     PGSSCN
                    ;
                    ;**********************************
                    ;
02D1 53544152         MSS1:   DB      'START OF WORD'
02D5 54204F46
02D9 20574F52
02DD 44
02DE 454E4420         MSS2:   DB      'END OF WORD'
02E2 4F462057
02E6 4F5244
02E9 4D45414E         MSS3:   DB      'MEAN DEVSUM NUMCHAR'
02ED 20444556
02F1 53554D20
02F5 4E554D43
02F9 484152

                    ;
                    $EJECT
```

```
LOC   OBJ             SOURCE STATEMENT

                      ;
                      ;AAAAAAAAAAAAAAAAAAAAAAAAAAAAAAAAAAAAAAAAAAAAAAAAAAAAAA
                      ;
                      ; AL:8-1-84 STORE CHAR CENTER TO CHAR CENTER DISTANCES IN
                      ; CQUEUE.
                      ;

02FC  3A3000    D     STWCTS: LDA     CCOUNT          ; ANY COUNT YET?
02FF  B7                      ORA     A
0300  CA1A03    C             JZ      FIRSTC          ; NO, CONTINUE
0303  E5                      PUSH    H
0304  EB                      XCHG                    ; SAVE CURRENT CENTER IN DE
0305  2A2700    D             LHLD    PREVCT          ; CURRENT CENTER IN HL
0308  7C                      MOV     A,H
0309  2F                      CMA                     ; NEGATE CURRENT CENTER TO
030A  67                      MOV     H,A             ; COMPUTE DIFFERENCE
030B  7D                      MOV     A,L
030C  2F                      CMA
030D  6F                      MOV     L,A
030E  23                      INX     H
030F  19                      DAD     D               ; GET DIFFERENCE VALUE
0310  EB                      XCHG                    ; PUT IT IN DE
0311  2A2500    D             LHLD    QPTR            ; GET ADDRESS IN Q
0314  73                      MOV     M,E
0315  23                      INX     H               ; INC POINTER
0316  222500    D             SHLD    QPTR            ; STORE IT
0319  E1                      POP     H
031A  222700    D     FIRSTC: SHLD    PREVCT          ; STORE CURRENT CENTER AS PREV
031D  213000    D             LXI     H,CCOUNT
0320  34                      INR     M               ; INC COUNTER
0321  C9                      RET
                      ;
                      ;AAAAAAAAAAAAAAAAAAAAAAAAAAAAAAAAAAAAAAAAAAAAAAAAAAAAAA
                      ;

                      $EJECT
```

```
LOC  OBJ              SOURCE STATEMENT

                      ;WORD SCAN - SEARCH BACKWARDS THROUGH WORD UNTIL ALL-WHITE BYTE
                      ;(POSSIBLE INTER-WORD SPACE) FOUND.

                      PGWSCN:
                      ;
                      ;************************************
                      ;
                      ; TH - 14 July 1984
                      ;
                      ; Set search depth for white scan based on pass flag.
                      ;
0322 3A4400    D                LDA     WSCPFG              ; Set pass flag
0325 B7                         ORA     A                   ; Test for zero
0326 3E15                       MVI     A,PGBOWF            ; Load default value
0328 CA2E03    C                JZ      PGWSL1              ; Jump if not second pass
032B 3A4500    D                LDA     PGBOWS              ; Set second pass search depth
032E 324500    D      PGWSL1:   STA     PGBOWS              ; Save search depth
                      ;
                      ;************************************
                      ;
0331 3E25                       MVI     A,ISOWWH            ;FOUND WORD

                      ;!!!!!!!!!!!!!!!!!!!!!!!!!!!!!!!!!!!!!!!!!!!!!!!!!!!!!!!!!!!!

0333 CDE60A    C                CALL    PGLSEP              ;

                      ;!!!!!!!!!!!!!!!!!!!!!!!!!!!!!!!!!!!!!!!!!!!!!!!!!!!!!!!!!!!

0336 3A0000    E                LDA     WRDSFB              ;GET PAGE LEFT EDGE ADDRESS
0339 3D                         DCR     A                   ;
033A 47                         MOV     B,A                 ;
033B 3A0000    E                LDA     PGCHCA              ;CALCULATE MAX BYTES TO SEARCH
033E 6F                         MOV     L,A                 ;SET INITIAL COLUMN
033F 90                         SUB     B                   ;CAN'T SEARCH BACKWARDS INDEFINATELY,
0340 47                         MOV     B,A                 ;SAVE SEARCH COUNT
0341 3E0C             PGWSL2:   MVI     A,PGBOWD            ;SET SEARCH DEPTH
0343 CD0000    E                CALL    GETPKW              ;MAP LOGICAL ROW TO PHYSICAL ROW
0346 2D               PGWSL3:   DCR     L                   ;MOVE BACK ONE COLUMN
0347 05                         DCR     B                   ;COUNT EXHAUSTED?
0348 CA9A03    C                JZ      PGWS07              ;YES, BREAK WORD HERE
034B 7E                         MOV     A,M                 ;GET NEXT BYTE
034C B7                         ORA     A                   ;ALL WHITE?
034D C24603    C                JNZ     PGWSL3              ;NO, TRY NEXT BYTE

                      ;*******************
                      ;WHITE BYTE FOUND - TEST CURRENT COL FOR ALL WHITE SHORT BYTE COLUMN
                      ;
                      ;**********************************
                      ;
                      ; TH - 14 July 1984
                      ;
                      ; Test to see if segment 1 is long enough for search depth.
                      ;
0350 3A4500    D                LDA     PGBOWS              ; Set search depth
```

```
LOC  OBJ            SOURCE STATEMENT

0353 4F                   MOV     C,A
0354 3A0000    E          LDA     PSLS1L              ; Set segment 1 length
0357 B9                   CMP     C                   ; Segment 1 long enough ?
                    ;
                    ;***********************************
                    ;
0358 FA6503    C          JM      PGWS05              ;NO, TEST SECOND SEGMENT FIRST
035B 3A2FE0               LDA     VBLADR              ;YES, SET FIRST SEGMENT ADDRESS
035E 67                   MOV     H,A                 ;
                    ;     MVI     A,PGBOWT            ;AND TEST ALL AT ONCE
                    ;
                    ;***********************************
                    ;
                    ; TH - 14 July 1984
                    ;
                    ; Set search depth
                    ;
035F 3A4500    D          LDA     PGBOWS              ; Test all at once
                    ;
                    ;***********************************
                    ;
0362 C38003    C          JMP     PGWS05              ;

                    PGWS05:
0365 2683                 MVI     H,HIGH SYSBUF       ;=>SECOND LINE SEGMENT
                    ;     LDA     PSLS2L              ;GET ROWS IN SECOND SEGMENT
                    ;     SUI     ISOWWH-PGBOWT       ;CORRECT FOR PGPOWT
                    ;
                    ;***********************************
                    ;
                    ; TH - 14 July 1984
                    ;
                    ; Segment 1 was not long enough, so compute number of rows to test in
                    ; segment 2.
                    ;
0367 3A4500    D          LDA     PGBOWS              ; Set search depth
036A 2F                   CMA                         ;   and negate it
036B 3C                   INR     A
036C C625                 ADI     ISOWWH              ; Add total length to yeild number of rows
036E 4F                   MOV     C,A                 ;   of search depth which are in segment 2
036F 3A0000    E          LDA     PSLS2L
0372 91                   SUB     C
                    ;
                    ;
                    ;***********************************
                    ;
0373 CD0000    E          CALL    WBCOLC              ;WHITE COLUMN?
0376 C24103    C          JNZ     PGWSL2              ;NO, CONTINUE WORD SCAN
0379 3A2FE0               LDA     VBLADS              ;YES, TEST FIRST SEGMENT
037C 67                   MOV     H,A                 ;
037D 3A0000    E          LDA     PSLS1L              ;
0380 CD0000    E    PGWS06: CALL  WBCOLC              ;WHITE COLUMN?
0383 C24103    C          JNZ     PGWSL2              ;NO, CONTINUE WORD SCAN

                    $EJECT
```

```
LOC  OBJ                SOURCE STATEMENT

                   ;********************
                   ;SHORT WHITE COLUMN FOUND - SET UP
                   ;INITIAL CHARACTER SEPERATION: L=WHITE COLUMN BYTE
0386 CD0000   E              CALL    ORWCOL          ;SHORT WHITE COL FOUND - TEST FOR WHITE BIT COL
0389 CA4103   C              JZ      PGWSL2          ;NO BIT COLUMN OPEN
038C CD0000   E              CALL    BITRLB          ;ANY RIGHT SIDE BITS FREE?
038F B7                      ORA     A               ;
0390 C2B703   C              JNZ     PGWS09          ;YES, USE AS LEFT EDGE
0393 2C                      INR     L               ;NEXT COLUMN MUST CONTAIN BLACK
0394 CD0000   E              CALL    ORWCOL          ;SO OR COLUMN
0397 C3B703   C              JMP     PGWS09          ;AND USE AS LEFT EDGE

                   ;********************
                   ;WORD BREAK SEARCH COUNT EXHAUSTED - ASSUME WORD SEPERATION AT NEXT
                   ;WHITE BIT COLUMN
039A 2A0000   E    PGWS07:   LHLD    PGCHCA          ;START JUST TO LEFT OF CHAR TOUCHING LINE TOP
039D 2D            PGWSL8:   DCR     L               ;TRY NEXT COLUMN
039E 3A0000   E              LDA     WRDSTR          ;AT LEFT EDGE?
03A1 BD                      CMP     L               ;
03A2 3EFF                    MVI     A,0FFH          ;IF SO, CUT HERE
03A4 D2B703   C              JNC     PGWS09          ;TO FORCE CHAR LEFT EDGE
03A7 CD0000   E              CALL    ORWCOL          ;TEST FOR WHITE BIT COLUMN
03AA CA9D03   C              JZ      PGWSL8          ;NOT FOUND YET, CONTINUE SEARCH
03AD CD0000   E              CALL    BITRLB          ;FOUND BREAK, CREATE NEXT CHAR LEFT EDGE MASK
03B0 B7                      ORA     A               ;ANY LEFT EDGE MASK?
03B1 C2B703   C              JNZ     PGWS09          ;YES, USE IT
03B4 2C                      INR     L               ;NO, NEXT BYTE COL IS ALL BLACK
03B5 3EFF                    MVI     A,0FFH          ;
03B7 67            PGWS09:   MOV     H,A             ;
03B8 220000   E              SHLD    PGCHNA          ;
03BB C9                      RET                     ;AND RETURN

                   SEJECT
                   ;********************
                   ;CHARACTER SEPERATION - LOCATE BEGINNING OF NEXT CHARACTER - SET MASK
                   ;AND ADDRESS IN PGCHCA.
03BC 3E00          CHRSEP:   MVI     A,RECSFR        ;SET REC CONTROL=AWAITING LINKS
03BE 320000   E              STA     PGCRCF          ;
03C1 3E25                    MVI     A,ISOWWH        ;START BY SEARCHING WORKING WORD HEIGHT
03C3 CDE60A   C              CALL    PGLSET          ;
03C6 2A0000   E              LHLD    PGCHNA          ;SET RIGHT EDGE OF PREV CHAR
03C9 44                      MOV     B,H             ;SAVE NEXT CHAR LEFT EDGE MASK
03CA 3A0000   E              LDA     WRDEND          ;AT WORD END ?
03CD BD                      CMP     L               ;RUN OFF END OF ARRAY
03CE DAE003   C              JC      CHRS03          ;IF SO, END OF WORD
03D1 CD0000   E              CALL    ORWCOL          ;OR ENTIRE BYTE COLUMN
03D4 A0                      ANA     B               ;APPLY MASK FROM PREV CHAR
03D5 C20F05   C              JNZ     CHRS01          ;IF ANY BLACK, DONE
03D8 2C                      INR     L               ;SEARCH NEXT COLUMN
03D9 CD0000   E              CALL    ORWCOL          ;OR ENTIRE BYTE COLUMN
03DC B7                      ORA     A               ;ALL WHITE?
03DD C20F09   C              JNZ     CHRS01          ;YES, CONTINUE

                   ; NEED TO FREE LAST CHARACTER IN WORD, SINCE WILL BE WAITING FOR LINKS
```

```
LOC  OBJ            SOURCE STATEMENT

               CHRS03:

               ; TH - 14 July 1984
               ;
               ; End of word has been found, so clear second pass flag for PGWSCN.
               ;
               ; Moved location of this code so the flag wouldn't be reset for forced
               ; end of words: 9-5-84 :AL
               ;
03E0 AF                    XRA    A
03E1 324400    D           STA    NSCPF3
               ;
               ;**********************************
03E4 3EFF      CHRSS3:     MVI    A,NULL          ;SET FLAG FOR
03E6 320000    E           STA    PRVCBF          ;END OF WORD LINKAGE
03E9 320000    E           STA    PRHCBF          ;
03EC 2A0CE0                LHLD   CJRCBP          ;
03EF 011100                LXI    B,RECLNR        ;GET TO RIGHT LINK
03F2 09                    DAD    B
03F3 77                    MOV    M,A            ; SET CORRESPONDING FLAG
               ;           CALL   FRLBUF          ;SEE IF THE CHARACTER  CAN BE FREED
03F4 3EFF                  MVI    A,NULL          ;SET END OF WORD
03FC 320000    E           STA    PRHCBP          ;
03F9 320100    E           STA    PRHCBP+1        ;
               ;           CALL   ISOREC          ;NEED THIS CALL TO START REC ON SINGLE CHARS
               ;**********************************
               ;
               ;
               ;DDDDDDDDDDDDDDDDDDDDDDDDDDDDDDDDDDDDDDDDDDDDDDDDDD
               ;
               ;           CALL   OUTCLF
               ;           CALL   OUISSP
               ;           LXI    H,SSS2
               ;           MVI    B,11
               ;LOOP2:     MOV    A,M
               ;           PUSH   H
               ;           PUSH   B
               ;           CALL   OUTBYT
               ;           POP    B
               ;           POP    H
               ;           INX    H
               ;           DCR    B
               ;           JNZ    LOOP2
               ;
               ;DDDDDDDDDDDDDDDDDDDDDDDDDDDDDDDDDDDDDDDDDDDDDDDDD
               ;
               ;AAAAAAAAAAAAAAAAAAAAAAAAAAAAAAAAAAAAAAAAAAAAAAAAA
               ; FOR ISOLATION TO DETERMINE PITCH: AL:8-1-84
               ; COMPUTE THE MEAN PITCH AND THE SUM OF THE DEVEATIONS
               ; FOR EACH WORD
               ;
               ;
03FC CD7F04    C           CALL   WDSTAT          ; GET STATISTICS ON WORD
```

```
LOC  OBJ              SOURCE STATEMENT

                   ;          CALL    WORBDP          ; SET STAT DUMP
                   ;
                   ;  8-5-84
                   ;
03FF 3A3000    D              LDA     CCOUNT          ; GET CHAR CNT
0402 FE03                     CPI     3
0404 FA7C04    C              JM      NEXTWD
0407 3A3200    D              LDA     WDFLAG
040A FE01                     CPI     1               ; WAS FRST WORD?
040C C22B04    C              JNZ     TWORD           ; NO
040F CD3F05    C              CALL    PITCON          ; DETERMINE PITCH AND CONFIDENCE OF WORD
0412 3A3600    D              LDA     PSCR            ; GET PS SCORE
0415 323B00    D              STA     W1PSCR
0418 3A3700    D              LDA     FIXSCR
041B 323A00    D              STA     W1FSCR
041E 3A2B00    D              LDA     PREVMN
0421 47                       MOV     B,A             ; GET PREV MEAN
0422 CDD405    C              CALL    MEANDF          ; ADD SCORES DUE TO DIFF IN MEAN BETWEEN WDS
0425 3A3200    D              LDA     WDFLAG
0428 C37804    C              JMP     SETWFG
042B FE03          TWORD:     CPI     3               ; WAS LAST WORD
042D C24F04    C              JNZ     SWORD
0430 CD3F05    C              CALL    PITCON          ; DETERMINE PITCH AND CONFIDENCE OF WORD
0433 3A3500    D              LDA     PSCR
0436 324100    D              STA     W3PSCR
0439 3A3700    D              LDA     FIXSCR
043C 324000    D              STA     W3FSCR
043F 3A3800    D              LDA     CONP
0442 324200    D              STA     W3CONP
0445 3A2E00    D              LDA     MEAN3
0448 47                       MOV     B,A             ; GET PREV MEAN
0449 CDD405    C              CALL    MEANDF          ; ADD SCORES DUE TO DIFF IN MEAN BETWEEN WDS
044C C37504    C              JMP     DECIDE          ; YES, SO MUST DETERMINE PITCH
044F CD3F05    C   SWORD:     CALL    PITCON          ; DETERMINE PITCH AND CONFIDENCE OF WORD
0452 3A3600    D              LDA     PSCR
0455 323E00    D              STA     W2PSCR
0458 3A3700    D              LDA     FIXSCR
045B 323D00    D              STA     W2FSCR
045E 3A3800    D              LDA     CONP
0461 323F00    D              STA     W2CONP
0464 3A2D00    D              LDA     MEAN2
0467 47                       MOV     B,A             ; GET PREV MEAN
0468 CDD405    C              CALL    MEANDF          ; ADD SCORES DUE TO DIFF IN MEAN BETWEEN WDS
046B 3A3100    D              LDA     PSSPRT          ;
046E B7                       ORA     A
046F 3A3200    D              LDA     WDFLAG
0472 CA7804    C              JZ      SETWFG          ; WAS START OF PAGE, NEED 3 WDS
0475 CD6E05    C   DECIDE:    CALL    DETSIT          ; DETERMINE SITUATION
0478 3C            SETWFG:    INR     A
0479 323200    D              STA     WDFLAG          ; INCREMENT WORD

                   ;AAAAAA

047C 3E02          NEXTWD:    MVI     A,ENDWRD        ;SET THE PROPER FLAG
047E C9                       RET                     ;

                   OBJECT
```

```
LOC  OBJ         SOURCE STATEMENT

                 ;
                 ;AAAAAAAAAAAAAAAAAAAAAAAAAAAAAAAAAAAAAAAAAAAAAAAAAAAAAAA
                 ;
                 ; AL:8-1-84  ISOLATION DETERMINES PITCH BY LOOKING AT PITCH STATISTICS
                 ; FOR EVERY WORD
                 ;
047F AF          WDSTAT: XRA    A              ;INIT
0480 322F00   D          STA    DEVSUM         ; DEVIATION SUM
0483 322900   D          STA    MEAN           ; MEAN
0486 322A00   D          STA    MEAN+1         ; SECOND BYTE
0489 3A3000   D          LDA    CCOUNT         ; GET CENTER DISTANCES COUNT
048C FE03                CPI    3
048E FA0405   C          JM     SKIPIT         ; DONT BOTHER IF LESS THAN 3 CHAR
0491 47                  MOV    B,A
0492 05                  DCR    B              ; NUM CUTS
0493 210200   D          LXI    H,CQUEUE
0496 EB                  XCHG                  ; PUT Q ADDRESS IN DE
0497 2A2900   D          LHLD   MEAN           ; GET MEAN VALUE
049A EB                  XCHG                  ; MEAN IN DE, Q IN HL
049B 7B          DETMEN: MOV    A,E            ; LOW BYT INTO A
049C 86                  ADD    M              ; ADD A CENTER DISTANCE VALUE
049D 5F                  MOV    E,A
049E D2A204   C          JNC    ONEBYT
04A1 14                  INR    D
04A2 23          ONEBYT: INX    H              ; UPDATE Q POINTER
04A3 05                  DCR    B              ; DECREMENT COUNTER
04A4 C29B04   C          JNZ    DETMEN         ; IF NOT DONE CONTINUE
04A7 EB                  XCHG                  ; SUM IN HL, PTR IN DE
04A8 3A3000   D          LDA    CCOUNT         ; ELSE, GET COUNT
04AB 3D                  DCR    A              ; WANT NUMBER OF CUTS, NOT CHARS
04AC B7                  ORA    A
04AD 1F                  RAR                   ; CLEAR CARRY AND DIVIDE BY 2
04AE 85                  ADD    L              ; ADD IT TO THE SUM OF THE PITCHES
04AF 6F                  MOV    L,A
04B0 D2B404   C          JNC    NOVER          ;
04B3 24                  INR    H
04B4 3A3000   D  NOVER:  LDA    CCOUNT
04B7 3D                  DCR    A
04B8 CD0000   E          CALL   DIXDIV         ; B=HL/A
04BB 78                  MOV    A,B            ; GET RESULT
04BC 322900   D          STA    MEAN
04BF 3A3200   D          LDA    WDFLAG
04C2 FE01                CPI    1
04C4 C2D004   C          JNZ    TWOTHR
04C7 3A2900   D          LDA    MEAN
04CA 322C00   D          STA    MEAN1
04CD C3E404   C          JMP    FINDEV
04D0 FE02        TWOTHR: CPI    2
04D2 C2DE04   C          JNZ    THREE
04D5 3A2900   D          LDA    MEAN
04D8 322D00   D          STA    MEAN2
```

```
LOC  OBJ          LINE        SOURCE STATEMENT

04DB C3F404    C  2162          JMP     FINDEV
04DE 3A2900    D  2163 THREE:   LDA     MEAN
04E1 322E00    D  2164          STA     MEAN3
04E4 3A3000    D  2165 FINDEV:  LDA     CCOUNT
04E7 3D           2166          DCR     A
04E8 47           2167          MOV     B,A
04E9 210200    D  2168          LXI     H,CQUEUE
04EC 3A2900    D  2169 DEIVAR:  LDA     MEAN
04EF 2F           2170          CMA
04F0 3C           2171          INR     A
04F1 86           2172          ADD     M
04F2 DAF704    C  2173          JC      POSTIV
04F5 2F           2174          CMA
04F6 3C           2175          INR     A
04F7 4F           2176 POSTIV:  MOV     C,A
04F8 3A2F00    D  2177          LDA     DEVSUM
04FB 81           2178          ADD     C
04FC 322F00    D  2179          STA     DEVSUM
04FF 23           2180          INX     H
0500 05           2181          DCR     B
0501 C2EC04    C  2182          JNZ     DEIVAR
0504 C9           2183 SKIPIT:  RET
                  2184 ;
                  2185 ;AAAAAAAAAAAAAAAAAAAAAAAAAAAAAAAAAAAAAAAAAAAAAAAAAAAA
                  2186 ;
                  2187 $EJECT
                  2188
                  2189 ;AAAAAAAAAAAAAAAAAAAAAAAAA
                  2190 ;
                  2191 ;  DUMP THE STATISTICS FOR THE WORD
                  2192 ;
0505 CD0000    E  2193 MOREDE:  CALL    OUTCLF
0508 CD0000    E  2194          CALL    OUT5SP
050B 21E902    C  2195          LXI     H,MSS3
050E 0613         2196          MVI     B,19
0510 7E           2197 LOOP3:   MOV     A,M
0511 E5           2198          PUSH    H
0512 C5           2199          PUSH    B
0513 CD0000    E  2200          CALL    OUTBYT
0516 C1           2201          POP     B
0517 E1           2202          POP     H
0518 23           2203          INX     H
0519 05           2204          DCR     B
051A C21005    C  2205          JNZ     LOOP3
                  2206
051D CD0000    E  2207          CALL    OUTCLF
0520 CD0000    E  2208          CALL    OUT5SP
0523 3A2900    D  2209          LDA     MEAN
0526 4F           2210          MOV     C,A
0527 CD0000    E  2211          CALL    OUTHEX
052A CD0000    E  2212          CALL    OUT5SP
052D 3A2F00    D  2213          LDA     DEVSUM
0530 4F           2214          MOV     C,A
0531 CD0000    E  2215          CALL    OUTHEX
0534 CD0000    E  2216          CALL    OUT5SP
```

```
LOC  OBJ              SOURCE STATEMENT

0537 3A3000   D                LDA    CCOUNT
053A 4F                        MOV    C,A
053B CD0000   E                CALL   OUTHEX
053E C9                        RET
                      ;
                      $EJECT
                      ;

053F AF               PITCON:  XRA    A
0540 323700   D                STA    FIXSCR
0543 323600   D                STA    PSCR
0546 323800   D                STA    CONP
0549 3A2900   D                LDA    MEAN
054C FE12                      CPI    18
054E CA6905   C                JZ     HALFSC
0551 FA7105   C                JM     PITCO1
0554 FE16                      CPI    22
0556 CA6905   C                JZ     HALFSC
0559 FE1A                      CPI    26
055B CA6905   C                JZ     HALFSC
055E F27105   C                JP     PITCO1
0561 3E02             FULLSC:  MVI    A,2
0563 323700   D                STA    FIXSCR
0566 C37605   C                JMP    PITCO2
0569 3E01             HALFSC:  MVI    A,1
056B 323700   D                STA    FIXSCR
056E C37605   C                JMP    PITCO2
0571 3E06             PITCO1:  MVI    A,6
0573 323600   D                STA    PSCR
0576 3A2F00   D       PITCO2:  LDA    DEVSUM
0579 47                        MOV    B,A
057A 3A3000   D                LDA    CCOUNT
057D 2F                        CMA
057E 3C                        INR    A
057F 80                        ADD    B
0580 DA9005   C                JC     PITCO3
0583 2F                        CMA
0584 3C                        INR    A
0585 47                        MOV    B,A
0586 3A3700   D                LDA    FIXSCR
0589 80                        ADD    B
058A 323700   D                STA    FIXSCR
058D C39D05   C                JMP    DONE
0590 47               PITCO3:  MOV    B,A
0591 07                        RLC
0592 E6FE                      ANI    0FEH                ; MULTIPLY DIFFERENCE BY 3 FOR PS
0594 80                        ADD    B
0595 47                        MOV    B,A
0596 3A3600   D                LDA    PSCR
0599 80                        ADD    B
059A 323600   D                STA    PSCR
059D 3A3700   D       DONE:    LDA    FIXSCR
05A0 47                        MOV    B,A
05A1 3A3600   D                LDA    PSCR
05A4 B8                        CMP    B
```

```
LOC   OBJ                      SOURCE STATEMENT

05A5  FA0005  C                JM     PITC04
05A8  CA0005  C                JZ     PITC04
05AB  3E0F                     MVI    A,0FH         ; IF EQUAL, ASSUME FIXED
05AD  323800  D                STA    CONP
05B0  3A3700  D      PITC04:   LDA    FIXSCR
05B3  B7                       ORA    A
05B4  CA8C05  C                JZ     PITC07
05B7  FE05                     CPI    5
05B9  FAC505  C                JM     PITC05        ; NO SIGN OF FIX SO PS
05BC  3A3800  D      PITC07:   LDA    CONP
05BF  C610                     ADI    010H          ; COULD BE A LOW CONFIDENCE
05C1  323800  D                STA    CONP
05C4  C9                       RET                  ; DEFINATELY PS IF FIXED DIDNT SET MEAN PTS
05C5  3A3600  D      PITC05:   LDA    PSCR
05C8  FE05                     CPI    5
05CA  F8                       RM
05CB  3A3800  D      PITC06:   LDA    CONP
05CE  C610                     ADI    010H
05D0  323800  D                STA    CONP
05D3  C9                       RET

                     SEJECT
05D4  AF             MEANDF:   XRA    A
05D5  323C00  D                STA    W1CONP
05D8  78                       MOV    A,B
05D9  FE12                     CPI    18            ; B HAS THE MEAN OF THE RELAVENT NEIGHBOR
05DB  FAE305  C                JM     PSPNT1
05DE  FE1B                     CPI    27            ; IF OUT OF FIXED RANGE, ADD TO PS
05E0  FAEE05  C                JM     MEAND1
05E3  3A3B00  D      PSPNT1:   LDA    W1PSCR
05E6  C606                     ADI    6
05E8  323B00  D                STA    W1PSCR        ; WAS WAY OFF, SO PS SCORES BIG
05EB  C30905  C                JMP    MEAND2
05EE  3A2C00  D      MEAND1:   LDA    MEAN1
05F1  90                       SUB    B
05F2  F2F705  C                JP     POSIT
05F5  2F                       CMA
05F6  3C                       INR    A
05F7  FE05           POSIT:    CPI    5
05F9  F2E305  C                JP     PSPNT1        ; IS THE DIFFERENCE IN MEANS >= 5?
05FC  FE03                     CPI    3             ; YES, POINTS FOR PS
05FE  F20906  C                JP     MEAND2
0601  3A3A00  D                LDA    W1FSCR
0604  C602                     ADI    2             ; PS GETS ANOTHER CHANCE, IF MEAN IN PS
0606  323A00  D                STA    W1FSCR
0609  3A3A00  D      MEAND2:   LDA    W1FSCR        ; WAS WITHIN 2 PIXELS IN PITCH SO FIXED
060C  47                       MOV    B,A
060D  3A3B00  D                LDA    W1PSCR
0610  90                       SUB    B
0611  FA1C06  C                JM     MEAND3
0614  CA1C05  C                JZ     MEAND3
0617  3E0F                     MVI    A,0FH
0619  323C00  D                STA    W1CONP
061C  3A3A00  D      MEAND3:   LDA    W1FSCR        ; IF PS AND FIX HAVE EQUAL SCRES => FIXED
```

```
LOC  OBJ           LINE        SOURCE STATEMENT

061F B7              2326          ORA     A
0620 CA2806    C     2327          JZ      MEAND5        ; NO SIGN OF PS, SO FIXED
0623 FE0E            2328          CPI     14
0625 FA3106    C     2329          JM      MEAND4        ; COULD BE A LOW CONFIDENCE
0628 3A3C00    D     2330 MEAND6:  LDA     W1CONP
062B C680            2331          ADI     080H          ; DEFINATELY PS IF FIXED DIDNT SET MEAN PTS
062D 323C00    D     2332          STA     W1CONP
0630 C9              2333          RET
                     2334 SEJECT
0631 FE0B            2335 MEAND4:  CPI     0BH
0633 FA4005    C     2336          JM      MEAND5        ; FIX SCORE LESS THAN MIN
0636 3A3B00    D     2337          LDA     W1PSCR
0639 B7              2338          ORA     A
063A 3A3A00    D     2339          LDA     W1FSCR
063D CA2806    C     2340          JZ      MEAND5        ; HIGH CONFIDENCE FO FIX IF PS= 0
0640 FE05            2341 MEAND5:  CPI     5
0642 FA4D05    C     2342          JM      MEAND7
0645 3A3C00    D     2343          LDA     W1CONP
0648 C610            2344          ADI     010H
064A 323C00    D     2345          STA     W1CONP
064D 3A3B00    D     2346 MEAND7:  LDA     W1PSCR
0650 FE0E            2347          CPI     14
0652 F26305    C     2348          JP      MEAND8
0655 FE05            2349          CPI     5
0657 F8              2350          RM
0658 3A3C00    D     2351          LDA     W1CONP
065B E60F            2352          ANI     0FH
065D C610            2353          ADI     010H
065F 323C00    D     2354          STA     W1CONP
0662 C9              2355          RET
0663 3A3C00    D     2356 ASAND8:  LDA     W1CONP
0666 E60F            2357          ANI     0FH
0668 C6E0            2358          ADI     0E0H          ; 1 IN HIGH BYT TO INDICATE VERY CONFIDENT
066A 323C00    D     2359          STA     W1CONP
066D C9              2360          RET
                     2361
                     2362 SEJECT
                     2363
066E 3EFF            2364 DEFSIT:  MVI     A,0FFH
0670 323500    D     2365          STA     CONFIT
0673 AF              2366          XRA     A
0674 67              2367          MOV     H,A
0675 57              2368          MOV     D,A
0676 3A3100    D     2369          LDA     PSSTRT
0679 B7              2370          ORA     A
067A C26F07    C     2371          JNZ     NSTART
067D 3A3A00    D     2372          LDA     W1FSCR        ; SET FIXED PITCH SCORE OF WD 1
0680 6F              2373          MOV     L,A
0681 3A3D00    D     2374          LDA     W2FSCR
0684 85              2375          ADD     L
0685 D28906    C     2376          JNC     DEFSI0
0688 24              2377          INR     H
0689 6F              2378 DEFSI0:  MOV     L,A
068A 3A4000    D     2379          LDA     W3FSCR
```

```
LOC  OBJ          LINE        SOURCE STATEMENT

066D 85           2380          ADD    L
066E D29205    C  2381          JNC    DETSI2
0691 24           2382          INR    H
0692 6F           2383 DETSI2:  MOV    L,A
0693 EB           2384          XCHG
0694 3A3B00    D  2385          LDA    W1PSCR        ; NOW SUM OF FIX SCORES IN DE
0697 6F           2386          MOV    L,A
0698 3A3E00    D  2387          LDA    W2PSCR
069B 85           2388          ADD    L
069C D2A006    C  2389          JNC    DETSI3
069F 24           2390          INR    H
06A0 6F           2391 DETSI3:  MOV    L,A
06A1 3A4100    D  2392          LDA    W3PSCR
06A4 85           2393          ADD    L
06A5 D2A906    C  2394          JNC    DETSI6
06A8 24           2395          INR    H
06A9 6F           2396 DETSI6:  MOV    L,A
06AA 3A2D00    D  2397          LDA    MEAN2         ; SET RELATIVE DIFFERENCE BETWEEN 3 MEANS
06AD 47           2398          MOV    B,A
06AE 3A2C00    D  2399          LDA    MEAN1
06B1 FE1B         2400          CPI    27
06B3 F2D606    C  2401          JP     PSPNT
06B6 FE12         2402          CPI    19
06B8 FAD606    C  2403          JM     PSPNT
06BB 90           2404          SUB    B
06BC F2C105    C  2405          JP     DETSI7
06BF 2F           2406          CMA
06C0 3C           2407          INR    A
                  2408 $EJECT
06C1 FE05         2409 DETSI7:  CPI    5             ; IN PS RANGE?
06C3 F2D606    C  2410          JP     PSPNT         ; YES,
06C6 FE03         2411          CPI    3
06C8 F2E106    C  2412          JP     PSHPNT        ; PS HALF POINTS
06CB 3E02         2413          MVI    A,2
06CD 83           2414          ADD    E
06CE 5F           2415          MOV    E,A
06CF D2E906    C  2416          JNC    DETSI8
06D2 14           2417          INR    D
06D3 C3E906    C  2418          JMP    DETSI8
06D6 3E06         2419 PSPNT:   MVI    A,6
06D8 85           2420          ADD    L
06D9 6F           2421          MOV    L,A
06DA D2E906    C  2422          JNC    DETSI8
06DD 24           2423          INR    H
06DE C3E906    C  2424          JMP    DETSI8
06E1 3E03         2425 PSHPNT:  MVI    A,3
06E3 85           2426          ADD    L
06E4 6F           2427          MOV    L,A
06E5 D2E906    C  2428          JNC    DETSI8
06E8 24           2429          INR    H
06E9 3A2E00    D  2430 DETSI8:  LDA    MEAN3
06EC FE1B         2431          CPI    27
06EE F21107    C  2432          JP     PSPNT2
06F1 FE12         2433          CPI    19
```

```
LOC   OBJ          LINE         SOURCE STATEMENT

06F3  FA1107    C  2434           JM    PSPNT2
06F6  90           2435           SUB   B          ; STILL HAS MEAN 2
06F7  F2FC06    C  2436           JP    DETS27
06FA  2F           2437           CMA
06FB  3C           2438           INR   A
06FC  FE05         2439  DETS27:  CPI   5          ; IN PS RANGE?
06FE  F21107    C  2440           JP    PSPNT2     ; YES,
0701  FE03         2441           CPI   3
0703  F21C07    C  2442           JP    DETS29
0706  3E02         2443           MVI   A,2
0708  83           2444           ADD   E
0709  5F           2445           MOV   E,A
070A  D22407    C  2446           JNC   DETSI4
070D  14           2447           INR   D
070E  C32407    C  2448           JMP   DETSI4
0711  3E05         2449  PSPNT2:  MVI   A,5
0713  85           2450           ADD   L
0714  6F           2451           MOV   L,A
0715  D22407    C  2452           JNC   DETSI4
0718  24           2453           INR   H
0719  C32407    C  2454           JMP   DETSI4
                   2455  $EJECT
071C  3E03         2456  DETS29:  MVI   A,3
071E  85           2457           ADD   L
071F  6F           2458           MOV   L,A
0720  D22407    C  2459           JNC   DETSI4
0723  24           2460           INR   H
0724  7D           2461  DETSI4:  MOV   A,L
0725  2F           2462           CMA
0726  6F           2463           MOV   L,A        ; SUM OF PS SCORES IN HL
0727  7C           2464           MOV   A,H
0728  2F           2465           CMA
0729  67           2466           MOV   H,A
072A  23           2467           INX   H
072B  19           2468           DAD   D          ; FIXED - PS = HL
072C  7C           2469           MOV   A,H
072D  B7           2470           ORA   A
072E  3E00         2471           MVI   A,00H
0730  FA3A07    C  2472           JM    PS
0733  7D           2473           MOV   A,L
0734  B7           2474           ORA   A
0735  3E00         2475           MVI   A,0
0737  F23C07    C  2476           JP    FIXED
073A  C60F         2477  PS:      ADI   0FH
073C  323BE0       2478  FIXED:   STA   PPITCH
073F  C680         2479           ADI   80H
0741  323500    D  2480           STA   CONPIT     ; STORE ENCODED PITCH AND CONFIDENCE
0744  3A2E00    D  2481           LDA   MEAN3
0747  322B00    D  2482           STA   PREVMN
074A  CD0000    E  2483           CALL  PSLEWD
074D  2A0000    E  2484           LHLD  S2STRT
0750  220000    E  2485           SHLD  S1STRT
0753  2A0000    E  2486           LHLD  S3STRT
0756  220000    E  2487           SHLD  S2STRT
```

```
LOC  OBJ           LINE        SOURCE STATEMENT

0759 CD0000   E    2488            CALL   FREEWD
075C 2A0000   E    2489            LHLD   W2STRT
075F 220000   E    2490            SHLD   W1STRT
0762 CD0000   E    2491            CALL   FREEWD
0765 3E01          2492            MVI    A,1
0767 323100   D    2493            STA    PSSTRT
076A 3D            2494            DCR    A         ; INIT PSSTART AND WDFLS
076B 323300   D    2495            STA    PRVFLS
076E C9            2496            RET              ; RESET WORD WORD POINTER
                   2497
                   2498 $EJECT
                   2499
076F CD2608   C    2500 ASTART:  CALL   CONFTE
0772 3A3C00   D    2501            LDA    W1CONF    ; WAS CONFIDENT
0775 323500   D    2502            STA    CONFIT
0778 21A307   C    2503            LXI    H,DUMPMN  ; *** CHANGE TO A CALL FOR A DUMP ***
077B CD0000   E    2504            CALL   FREEWD
077E 2A0000   E    2505            LHLD   W2STRT
0781 220000   E    2506            SHLD   W1STRT
0784 3A3D00   D    2507            LDA    W2PSCR
0787 323A00   D    2508            STA    W1PSCR
078A 3A3E00   D    2509            LDA    W2PSCR
078D 323B00   D    2510            STA    W1PSCR
0790 3A2C00   D    2511            LDA    MEAN1
0793 322B00   D    2512            STA    PREVMN
0796 3A2D00   D    2513            LDA    MEAN2
0799 322C00   D    2514            STA    MEAN1
079C 3A2B00   D    2515            LDA    PREVMN
079F 47            2516            MOV    B,A
07A0 CD0405   C    2517            CALL   MRANDF
07A3 3E01          2518            MVI    A,1
07A5 323300   D    2519            STA    PRVFLS
07A8 C9            2520 ENTRY:     RET
                   2521 $EJECT
07A9 CD0000   E    2522 DUMPMN:  CALL   OUTCLF
07AC CD0000   E    2523            CALL   OUT15SP
07AF 210106   C    2524            LXI    H,MSG5
07B2 0625          2525            MVI    B,37
07B4 7E            2526 LOOP5:   MOV    A,M
07B5 E5            2527            PUSH   H
07B6 C5            2528            PUSH   B
07B7 CD0000   E    2529            CALL   OUTBYT
07BA C1            2530            POP    B
07BB E1            2531            POP    H
07BC 23            2532            INX    H
07BD 05            2533            DCR    B
07BE C2B407   C    2534            JNZ    LOOP5
                   2535
07C1 CD0000   E    2536            CALL   OUTCLF
07C4 CD0000   E    2537            CALL   OUT5SP
07C7 3A2C00   D    2538            LDA    MEAN1
07CA 4F            2539            MOV    C,A
07CB CD0000   E    2540            CALL   OUTHEX
07CE CD0000   E    2541            CALL   OUT5SP
```

```
LOC  OBJ          LINE        SOURCE STATEMENT

07D1 3A2000    D  2542          LDA     MEAN2
07D4 4F           2543          MOV     C,A
07D5 CD0000    E  2544          CALL    OUTHEX
07D8 CD0000    E  2545          CALL    OUT5SP
07DB 3A3B00    D  2546          LDA     W1PSCR
07DE 4F           2547          MOV     C,A
07DF CD0000    E  2548          CALL    OUTHEX
07E2 CD0000    E  2549          CALL    OUT5SP
07E5 3A3A00    D  2550          LDA     W1FSCR
07E8 4F           2551          MOV     C,A
07E9 CD0000    E  2552          CALL    OUTHEX
07EC CD0000    E  2553          CALL    OUT5SP
07EF 3A3E00    D  2554          LDA     W2PSCR
07F2 4F           2555          MOV     C,A
07F3 CD0000    E  2556          CALL    OUTHEX
07F6 CD0000    E  2557          CALL    OUT5SP
07F9 3A3D00    D  2558          LDA     W2FSCR
07FC 4F           2559          MOV     C,A
07FD CD0000    E  2560          CALL    OUTHEX
0800 C9           2561          RET
                  2562 ;
                  2563
0801 4D4E3120     2564 MSG5:    DB      'AN1    AN2    W1PS    W1FS    W2PS    W2FS'
0805 20204D4E
0809 32202020
080D 57315053
0811 20202057
0815 31465320
0819 20205732
081D 50532020
0821 20573246
0825 53
                  2565
                  2566 OBJECT
                  2567
0826 AF           2568 CONTEX:  XRA     A
0827 323900    D  2569          STA     PITCH            ; INITIALIZE PITCH INDEX VARIABLE
082A 3A3B00    D  2570          LDA     CONF             ; WHAT WAS PITCH AND CONFIDENCE OF WD 2(3)
082D E6F0         2571          ANI     0F0H
082F CA5A08    C  2572          JZ      CONTE1           ; NO CONF IN WD 2(3)
0832 3A3C00    D  2573          LDA     W1CONP           ; ANY CONF IN WD 1?
0835 E6F0         2574          ANI     0F0H
0837 CA8A08    C  2575          JZ      CONTES           ; NO,
083A 3A3B00    D  2576          LDA     CONP             ; CONF IN BOTH SO SEE WHAT PITCH
083D E60F         2577          ANI     0FH
083F FE0F         2578          CPI     0FH
0841 C24C08    C  2579          JNZ     ADDIT1           ; WD 2(3) IS FIXED PITCH
0844 3A3900    D  2580          LDA     PITCH            ; WD 2(3) IS PS
0847 C601         2581          ADI     1                ; SO ADD 1 TO INDEX
0849 323900    D  2582          STA     PITCH
084C 3A3C00    D  2583 ADDIT1:  LDA     W1CONP           ; IS WORD 1 PS?
084F E60F         2584          ANI     0FH
0851 FE0F         2585          CPI     0FH              ;
0853 C25E08    C  2586          JNZ     ADDIT2           ; FIRST WORD NOT PS
0856 3A3900    D  2587          LDA     PITCH            ; FIRST W IS PS SO ADD TO INDEX
```

```
LOC  OBJ          LINE       SOURCE STATEMENT

0859 C602         2588            ADI    2
085B 323900    D  2589            STA    PITCH
085E 3A38E0       2590   ADDIT2:  LDA    PPITCH      ; IS HISTORIC PITCH PS?
0861 B7           2591            ORA    A
0862 CA6D08    C  2592            JZ     TABLE1      ; NO, SO CONTINUE
0865 3A3900    D  2593            LDA    PITCH       ; YES, SO ADD TO INDEX
0868 C604         2594            ADI    4
086A 323900    D  2595            STA    PITCH
086D 210808    C  2596   TABLE1:  LXI    H,PTABLE    ;NOW AVE INDEX INTO TABLE FOR CASE: 1&2(3) CONF
0870 3A3900    D  2597   TABLE2:  LDA    PITCH       ; SET INTO TABLE
0873 85           2598            ADD    L
0874 6F           2599            MOV    L,A
0875 D27908    C  2600            JNC    DOIT01
0878 24           2601            INR    H
0879 7E           2602   DOIT01:  MOV    A,M         ; GET PITCH AND CONFIDENCE FOR THIS CASE
087A B7           2603            ORA    A
087B CACD08    C  2604            JZ     CONTE8      ; IF NO CONFIDENCE USE PITCH AND CONF IN WD1
087E 323C00    D  2605   DOIT02:  STA    W1CONP
0881 E60F         2606            ANI    OFH         ; SET PITCH
0883 3238E0       2607            STA    PPITCH      ; UPDATE PPITCH
0886 3E01         2608            MVI    A,1         ; RET POSITIVE STATUS
0888 B7           2609            ORA    A
0889 C9           2610            RET
088A 3A3C00    D  2611   CONTE1:  LDA    W1CONP      ; NO CONFIDENCE IN 2(3) SO SEE IF WORD 1 OK
088D E6F0         2612            ANI    OFOH
088F C29508    C  2613            JNZ    CONTE3      ; WORD 1 IS CONFIDENT
0892 C3CD08    C  2614            JMP    CONTE8      ; IF BOTH UNKNOWN USE SCORE
0895 3A3C00    D  2615   CONTE3:  LDA    W1CONP      ; WAS WD 1 PS?
0898 E60F         2616            ANI    OFH
089A CAA508    C  2617            JZ     CONTE4      ; NO, FIXED
089D 3A3900    D  2618            LDA    PITCH       ; YES, PS SO ADD TO INDEX
08A0 C601         2619            ADI    1
08A2 323900    D  2620            STA    PITCH
                  2621
08A5 3A38E0       2622   CONTE4:  LDA    PPITCH      ; GET HISTORIC PITCH
08A8 B7           2623            ORA    A
08A9 CAB408    C  2624            JZ     CONTE5      ; FIXED
08AC 3A3900    D  2625            LDA    PITCH       ; PS SO ADD TO INDEX
08AF C602         2626            ADI    2
08B1 323900    D  2627            STA    PITCH
08B4 21E008    C  2628   CONTE5:  LXI    H,PTABL2    ; GET INTO RIGHT TABLE
08B7 C37008    C  2629            JMP    TABLE2
08BA 3A3B00    D  2630   CONTE6:  LDA    CONP        ; WAS WD 2(3) PS?
08BD E60F         2631            ANI    OFH
08BF CAC A08   C  2632            JZ     CONTE7      ; NO,FIXED PITCH
08C2 3A3900    D  2633            LDA    PITCH
08C5 C601         2634            ADI    1
08C7 323900    D  2635            STA    PITCH
08CA C3A508    C  2636   CONTE7:  JMP    CONTE4
08CD 3A3C00    D  2637   CONTE8:  LDA    W1CONP
08D0 E60F         2638            ANI    OFH
08D2 3238E0       2639            STA    PPITCH
08D5 3C           2640            INR    A           ;
08D6 B7           2641            ORA    A           ; RETURN NON O STATUS
08D7 C9           2642            RET
```

```
LOC   OBJ          LINE        SOURCE STATEMENT

                   2643
08D8  80           2644 PTABLE:  DB      080H            ; PPP
08D9  10           2645          DB      010H            ; PPP
08DA  80           2646          DB      080H            ; PPP
08DB  00           2647          DB      000H            ; PPP
08DC  00           2648          DB      000H            ; PPP
08DD  8F           2649          DB      08FH            ; PPP
08DE  1F           2650          DB      01FH            ; PPP
08DF  8F           2651          DB      08FH            ; PPP
                   2652
                   2653
08E0  10           2654 PTABL2:  DB      10H             ;PP
08E1  00           2655          DB      00H             ;PP
08E2  00           2656          DB      00H             ;PP
08E3  1F           2657          DB      1FH             ;PP
                   2658
08E4  CD0000     E 2659 MORED2:  CALL    OUTCLF
08E7  CD0000     E 2660          CALL    OUT5SP
08EA  210A09     C 2661          LXI     H,MSS4
08ED  0605         2662          MVI     B,5
08EF  7E           2663 LOOP4:   MOV     A,M
08F0  E5           2664          PUSH    H
08F1  C5           2665          PUSH    B
08F2  CD0000     E 2666          CALL    OUTBYT
08F5  C1           2667          POP     B
08F6  E1           2668          POP     H
08F7  23           2669          INX     H
08F8  05           2670          DCR     B
08F9  C2EF08     C 2671          JNZ     LOOP4
                   2672
08FC  CD0000     E 2673          CALL    OUTCLF
08FF  CD0000     E 2674          CALL    OUT5SP
0902  3A3500     D 2675          LDA     CONPIT
0905  4F           2676          MOV     C,A
0906  CD0000     E 2677          CALL    OUTHEX
0909  C9           2678          RET
                   2679
090A  50495443     2680 MSS4:    DB      'PITCH'
090E  48
                   2681
                   2682 ;AAAAAAAAAAAAAAAAAAAAAAAAAAAAA
                   2683
                   2684 $EJECT
```

```
LOC  OBJ          SOURCE STATEMENT

                  ;  CHARACTER SEPARATION - WHITE COLUMN.  TRY TO ISOLATE CHARACTER THAT
                  ;   FITS IN THE MATRIX

                  ;
                  ;AAAAAAAAAAAAAAAAAAAAAAAAAAAAAAAAAAAAAAAAAAAAAAAAAAAAAAAAAAAAAAAAAA
                  ;
                  ; 6-30-84  AL: added SPASF3 so for a PS page HORSWS uses different variable
                  ;  values.
                  ;
090F 47           CHRS01: MOV     B,A             ;SAVE MSK
0910 220000   E           SHLD    PSCHCA          ;SAVE START COLUMN
0913 AF                   XRA     A
0914 320100   D           STA     SPASF3          ; CLEAR SECOND PASS FLAG
0917 78                   MOV     A,B             ; SET MSK FOR FIRST PASS
                          IF      DEBUG           ;
0918 47                   MOV     B,A             ;
0919 3E04                 MVI     A,VSHSEP        ;SET HOR SEP FLAG
091B 3247E0               STA     VIDBUN          ;
091E 78                   MOV     A,B             ;
                          ENDIF                   ;
091F 47                   MOV     B,A             ; PUT IT BACK
0920 3A3500   D           LDA     CONPIT          ; SEE IF IS A PS PITCH
0923 FE50                 CPI     80H             ; SEE IF HIGH CONFIDENCE FIXED PITCH
0925 CA2D09   C           JZ      CHRS12          ; YES, SO   CONTINUE
0928 3EFF                 MVI     A,0FFH          ; ELSE SET SECOND PASS FLAG
092A 320100   D           STA     SPASF3          ;
092D 78           CHRS12: MOV     A,B             ;
092E CD0000   E           CALL    HORSWS          ;DO INITIAL HORIZONTAL WHITE SEPERATION
0931 CD0000   E           CALL    MSKGEN          ;BUILD HORIZONTAL MASK
                          IF      DEBUG           ;
0934 3E05                 MVI     A,VSVSEP        ;SET VERT SEP FLAG
0936 3247E0               STA     VIDBUN          ;
                          ENDIF                   ;
0939 CD0000   E           CALL    VERSWS          ;DO INITIAL VERTICAL WHITE SEPERATION
                  ;
                  ; 7-10-84  AL: IF PAGE IS PS AND VERTICAL SEP SUCCEDED, REDO HORSWS AT VERSZ TO
                  ;  MAKE SURE THAT CHARACTERS FROM THE NEXT LINE DIDN'T INFLUENCE THE
                  ;  HORIZONTAL SIZE; i.e. THE VERTICAL SIZE WOULD BE RIGHT BUT THE HOR SIZE IS
                  ;  TOO LARGE DUE TO THE OVERLAP OF CHARACTERS IN THE NEXT LINE.
                  ;
093C 3A0100   D           LDA     SPASF3          ; PS?
093F B7                   ORA     A
0940 CA6709   C           JZ      CHRS13          ;NO, CONTINUE
0943 3A0000   E           LDA     PSCVSZ          ;YES, SO SEE IF VERSEP SUCCEDED
0946 B7                   ORA     A
0947 CA6709   C           JZ      CHRS13          ; NO, CONTINUE
094A CDC70B   C           CALL    SETVSZ          ; YES, REDO HORSEP WITH VERSIZE
094D 2A0000   E           LHLD    PSCHCA
0950 44                   MOV     B,H
0951 CD0000   E           CALL    OBWCOL          ; WHAT IS IN SHORTER COLUMN?
0954 A0                   ANA     B               ; ANYTHING IN COMMON WITH LONG COLUMN?
0955 C26109   C           JNZ     CHRS14          ; YES, SO HAVE THE RIGHT MASK IN ACC
0958 2C                   INR     L               ; GO TO NEXT COL
0959 26FF                 MVI     H,0FFH          ; SET A POSSIBLE MASK TO BE ANDED LATER
```

```
LOC  OBJ             LINE        SOURCE STATEMENT

095B 220000     E    2740             SHLD     PSCHNA
095E C3B003     C    2741             JMP      CHRSEP           ; END THE LAST WORD
0961 CD0000     E    2742 CHRS14:     CALL     HORSWS           ; REDO HORSEP WITH NEW SHORT HEIGHT
0964 CD0000     E    2743             CALL     MSKSEN
                     2744 CHRS13:     IF       DEBUG            ;
0967 3E02            2745             MVI      A,VSSEPR         ;SET WORD SEP
0969 3247ED          2746             STA      VIDRUN           ;
                     2747             ENDIF                     ;
096C AF              2748             XRA      A
096D 320100     D    2749             STA      SPASFG           ; CLEAR SECOND PASS FLAG
0970 CD0000     E    2750             CALL     MBCONT           ;FEATURE CONTIGUOUS TO MB?
                     2751 ;
                     2752 ;AAAAAAAAAAAAAAAAAAAAAAAAAAAAAAAAAAAAAAAAAAAAAAAAAAAAAAAAAAAAAAAAAAAAAAAAAAA
                     2753 ;
0973 CAE003     C    2754             JZ       CHRS03           ;YES, RETRY ISOLATION
0976 3A0000     E    2755             LDA      PSCVSZ           ;VERTICAL SEPERATION SUCEEDED?
0979 B7              2756             ORA      A                ;
097A CA8709     C    2757             JZ       CHRS02           ;NO, TRY TOUCH SEPERATION
097D 3A0000     E    2758             LDA      PSCHSZ           ;HORIZONTAL SEPERATION SUCEEDED?
0980 B7              2759             ORA      A                ;
0981 CA8709     C    2760             JZ       CHRS02           ;COULDN'T ISOLATE
0984 3E01            2761             MVI      A,CRGOOD         ;ISOLATED
0986 C9              2762             RET                       ;SEND BACK POSITIVE STATUS
                     2763 CHRS02:     IF       DEBUG            ;
0987 3E06            2764             MVI      A,VSTOUC         ;SET TOUCH STATUS
0989 3247ED          2765             STA      VIDRUN           ;
                     2766             ENDIF                     ;
                     2767
                     2768 ;********************
                     2769 ;WHITE SPACE SEPERATION FAILED. TRY EVERYTHING IN THE BAG OF TRICKS, THEN
                     2770 ;RETURN CC.LT=TRY NEXT CHAR, CC.EQ=RETRY WORD SEP, CC.GT=TOUCHING CHARS
                     2771 ;RESOLVED, TRANSFER CHARACTER. FIRST TRY UNDERLINE REMOVAL: IF THAT FAILS,
                     2772 ;THEN IF HORIZONTAL SEPERATION FAILED AND VERSWS FOUND ANY CHARACTER BOTTOM,
                     2773 ;TRY RESTRICTING SEARCH TO ACTUAL CHARACTER HEIGHT.
098C 3A0000     E    2774 TCHSLP:     LDA      PSCVSZ           ;VERTICAL SEPERATION SUCEEDED?
098F B7              2775             ORA      A                ;
0990 C29B09     C    2776             JNZ      TCHSX1           ;YES, TRY SEARCHING IN REDUCED FRAME
0993 3E35            2777             MVI      A,ISOUWH         ;NO, SET UNDERLINE SEARCH SIZE
                     2778
                     2779 ;!!!!!!!!!!!!!!!!!!!!!!!!!!!!!!!!!!!!!!!!!!!!!!!!!!!!!!!!!!!!!!!!!!!!!!!
                     2780
0995 CDE60A     C    2781             CALL     PSLSET           ;
                     2782
                     2783 ;!!!!!!!!!!!!!!!!!!!!!!!!!!!!!!!!!!!!!!!!!!!!!!!!!!!!!!!!!!!!!!!!!!!!!!!!
                     2784
0998 CD0000     E    2785             CALL     VERSWS           ;AND REPEAT VERTICAL SEARCH
                     2786 TCHSX1:
                     2787 ;
                     2788 ;*********************************
                     2789 ;
                     2790 ; Modification #2 - TH
                     2791 ;
                     2792 ; The following three lines of code are no longer used.
                     2793 ; The touching bit is set to early at this point, so the new code to set
                     2794 ; this bit is now in HRKSEP.
```

```
LOC  OBJ                SOURCE STATEMENT

                    ;
                    ;          LDA     PSCSFG          ;
                    ;          ORI     HORTCH          ; SET TOUCHING BIT
                    ;          STA     PSCSFG          ;
                    ;
                    ;*********************************
                    ;
099B 2A0000    E               LHLD    PSCHCA          ;SET START COLUMN
099E 2625                      MVI     H,ISOFWH        ;SET FULL HEIGHT IF NO UNDERLINE BASE FOUND
09A0 3A0000    E               LDA     PSCHUA          ;GET UNDERSCORE ADDRESS
09A3 B7                        ORA     A               ;IF NO UNDERLINE BASE FOUND,
09A4 CAAC09    C               JZ      TCHSX0          ;USE MAX HEIGHT
09A7 67                        MOV     H,A             ;
09A8 CD0000    E               CALL    GETLRW          ;MAKE LOGICAL ROW
09AB 67                        MOV     H,A             ;SET LOG ROW,COL FOR UL SEARCH
09AC CD0000    E    TCHSX0:    CALL    UNDERL          ;UNDERLINE PRESENT?
09AF CAE003    C               JZ      CHRS03          ;YES, REMOVED
09B2 CD0000    E               CALL    M3FRDC          ;CHECK FOR MONSTER BLACK KERNEL
09B5 CAE003    C               JZ      CHRS03          ;YES, RETRY
09B8 3A0000    E               LDA     PSCHSZ          ;HORIZONTAL SEP FAILED?
09BB B7                        ORA     A               ;
09BC C21F0A    C               JNZ     TCHS01          ;NO, CHECK VERTICAL SEPERATION
09BF 3A0000    E               LDA     PSCHBA          ;ANY BOTTOM FOUND?
09C2 B7                        ORA     A               ;
09C3 CA1F0A    C               JZ      TCHS01          ;NO, TRY TOUCH SEPERATION
09C6 2A0000    E               LHLD    PSCHCA          ;SET INITIAL COLUMN
09C9 3A0000    E               LDA     PSCHTA          ;GET OVERSCORE ADDRESS
09CC 67                        MOV     H,A             ;
09CD CD0000    E               CALL    GETLRW          ;MAKE LOGICAL ROW
09D0 C603                      ADI     ULMSEC          ;BIAS DOWN BY MAX UL SEARCH UP COUNT
09D2 67                        MOV     H,A             ;SET H=LOG ROW, L=COL FOR UL TEST
09D3 CD0000    E               CALL    UNDERL          ;UNDERLINE PRESENT?
09D6 CAE003    C               JZ      CHRS03          ;

                    SEJECT
                    ;********************
                    ;TRY ISOLATION IN REDUCED FRAME
09D9 CD070B    C               CALL    SETVSZ          ;SET WORKING HEIGHT
09DC 2A0000    E               LHLD    PSCHCA          ;GET FIRST COLUMN ADDR
09DF 44                        MOV     B,H             ;GET MASK
09E0 CD0000    E               CALL    ORWCOL          ;ANY BLACK IN REDUCED COLUMN?
09E3 A0                        ANA     B               ;
09E4 C2F009    C               JNZ     TCHS00          ;YES, TRY SEARCHING UNDER REDUCED HEIGHT
09E7 2C                        INR     L               ;NO, ADVANCE TO THE NEXT COLUMN
09E8 26FF                      MVI     H,0FFH          ;USING A FULL MASK
09EA 220000    E               SHLD    PSCHNA          ;SET NEXT CHAR LEFT EDGE MASK/ADDR
09ED C3DC03    C               JMP     CHRSEP          ;RETRY CHARACTER SEP
                    ;
                    ;AAAAAAAAAAAAAAAAAAAAAAAAAAAAAAAAAAAAAAAAAAAAAAAAAAAAAAAAAAAAAAAAAAAAAAAAAA
                    ; 5-30-84  AL: ADDED SPASFG SO THAT HORSWS KNOWS PITCH IS PS AND USES THE
                    ; CORRECT VARIABLE VALUES.

09F0 F5             TCHS00:    PUSH    PSW             ;SAVE MASK
09F1 3A3BE0                    LDA     PPITCH          ; SEE IF IS A PS PITCH
```

```
LOC   OBJ              LINE        SOURCE STATEMENT

09F4  B7                                 ORA   A               ;
09F5  CAFD09     C                       JZ    TCHS12          ; NO, CONTINUE
09F8  3EFF                               MVI   A,0FFH          ; ELSE SET SECOND PASS FLAG
09FA  320100     D                       STA   SPASPS          ;
09FD  F1                     TCHS12:     POP   PSW             ;
09FF  CD0000     E                       CALL  HORSWS          ;RETRY HORIZONTAL SEPERATION WITH NEW HEIGHT
0A01  CD0000     E                       CALL  MSKGEN          ;MAKE HORIZONTAL MASK
0A04  CD0000     E                       CALL  VERSWS          ;RETRY VERSEP UNDER NEW MASK
0A07  AF                                 XRA   A
0A08  320100     D                       STA   SPASPS          ; CLEAR SECOND PASS FLAG
                             ;
                             ;AAAAAAAAAAAAAAAAAAAAAAAAAAAAAAAAAAAAAAAAAAAAAAAAAAAAAAAAAAAAAA
                             ;
0A0B  CD070B     C                       CALL  SETVSZ          ;CHAR TOP FOUND?
0A0E  FABC03     C                       JM    CHRSEP          ;NO, ADVANCE TO NEXT CHARACTER
0A11  3A0000     E                       LDA   PSCHBA          ;ANY CHAR BOTTOM FOUND?
0A14  B7                                 ORA   A               ;
0A15  CA1F0A     C                       JZ    TCHS01          ;NO, TRY TOUCH SEPERATION
0A18  3A0000     E                       LDA   PSCHS2          ;HORIZONTAL SEPERATION SUCEEDED?
0A1B  B7                                 ORA   A               ;
0A1C  3E01                               MVI   A,CRGOOD        ;
0A1E  C0                                 RNZ
                             
                             ;********************
                             ;VER/HOR SEP FAILED - IF NO BOTTOM FOUND AND CHAR NOT AT TOP OF LINE, OR
                             ;IF TEXT NOT NEAR TOP OF BUFFER, TRY AGAIN WHEN AT TOP, ELSE USE TOUCH SEP.
0A1F  3A0000     E           TCHS01:     LDA   PSCVPC          ;NEAR TOP OF WORD?
0A22  FE0F                               CPI   HTKMVD          ;(DROP LESS THAN MAX VER DROP)
                             ;           JP    CHRSEP          ;NO, SKIP THIS CHAR FOR NOW
                             ;
                             ;**********************************
                             ;
                             ; TH - 14 July 1984
                             ;
                             ; Excessive word drop encountered.  Do a second pass of PSWSCN with a shorter
                             ; search depth if possible.
                             ;
0A24  F2B70A     C                       JP    TCHS08          ; New jump
                             ;
                             ;**********************************
                             ;
0A27  B7                                 ORA   A               ;AT TOP OF WORD?
0A28  CA320A     C                       JZ    TCHS02          ;YES, MUST SEPERATE THIS CHAR NOW
0A2B  3A0000     E                       LDA   PSCHBA          ;NO, TEST IF BOTTOM FOUND
0A2E  B7                                 ORA   A               ;IF NOT TOP OF WORD AND NO BOTTOM FOUND,
0A2F  CABC03     C                       JZ    CHRSEP          ;SKIP CHAR FOR NOW
0A32  CD070B     C           TCHS02:     CALL  SETVSZ          ;TOP FOUND?
0A35  FABC03     C                       JM    CHRSEP          ;NO,RETRY
0A38  3A0000     E                       LDA   PSCHS2          ;HORIZONTAL SEPERATION FAILED?
0A3B  B7                                 ORA   A               ;
0A3C  3E01                               MVI   A,CRGOOD        ;
0A3E  C0                                 RNZ                   ;
0A3F  3A0000     E                       LDA   PSCVPC          ;NO, SEPERATE CHAR
0A42  47                                 MOV   B,A             ;SET WORKING HEIGHT FOR TOUCH SEPARATION
```

```
LOC  OBJ            SOURCE STATEMENT

0A43 3E25                   MVI     A,ISOWWH          ;
0A45 90                     SUB     B                 ;
0A46 320000     E           STA     PSCVSZ            ;
0A49 3E25                   MVI     A,ISOWWH          ;RESET A FOR PSLSET

                ;!!!!!!!!!!!!!!!!!!!!!!!!!!!!!!!!!!!!!!!!!!!!!!!!!!!!!!!!!!!!!!!!

0A4B CDE60A     C           CALL    PSLSET            ;

                ;!!!!!!!!!!!!!!!!!!!!!!!!!!!!!!!!!!!!!!!!!!!!!!!!!!!!!!!!!!!!!!!!!!

0A4E CD0000     E           CALL    HPKSEP            ;YES, PERFORM HORIZONTAL TOUCH/KERN SEP
0A51 2A0000     E           LHLD    PSCHCA            ;RETRY HORIZONTAL SEPERATION
0A54 7C                     MOV     A,H
0A55 F5                     PUSH    PSW               ;SAVE RETURNED STATUS
0A56 44                     MOV     B,H               ;
0A57 CD0000     E           CALL    ORWCOL            ;
0A5A A0                     ANA     B                 ;
0A5B C2680A     C           JNZ     TCHS06            ;WHITE NOT FOUND, RETURN
0A5E 2C                     INR     L                 ;
0A5F 26FF                   MVI     H,0FFH            ;
0A61 220000     E           SHLD    PSCHNA            ;
                ;
                ;*********************************
                ;
                ; Modification #3 - PH
                ;
                ;       At this point, the stack is off by one from the PUSH PSW above.
                ;       Reset the stack before continuing.
                ;
0A64 F1                     POP     PSW               ; Reset stack
                ;
                ;*********************************
                ;
0A65 C3BC03     C           JMP     CHRSEP            ;RETURN BAD STATUS
0A68 4F         TCHS06:     MOV     C,A               ;
0A69 F1                     POP     PSW               ;
0A6A 79                     MOV     A,C               ;
                ;
                ;AAAAAAAAAAAAAAAAAAAAAAAAAAAAAAAAAAAAAAAAAAAAAAAAAAAAAAAAAA
                ;
                ; 6-30-84 AL: ADDED SPASFS SO THAT HORSWS KNOWS THAT THE PAGE IS PS AND
                ; USES THE CORRECT VARIABLE VALUES.
                ;

0A6B F5                     PUSH    PSW               ;SAVE STATUS
0A6C 3A38E0                 LDA     FPITCH            ; SEE IF IS A PS PITCH
0A6F B7                     ORA     A                 ;
0A70 CA750A     C           JZ      TCHS15            ; NOT PS SO CONTINUE
0A73 3EFF                   MVI     A,0FFH            ; ELSE SET SECOND PASS FLAG
0A75 320100     D           STA     SPASFS            ;
0A78 F1         TCHS16:     POP     PSW               ;
0A79 F40000     E           CP      HORSWS            ;
```

```
LOC  OBJ                SOURCE STATEMENT

                        ;
                        ;AAAAAAAAAAAAAAAAAAAAAAAAAAAAAAAAAAAAAAAAAAAAAAAA
                        ;
                        ; 6-24-84  ADDED FOR REV B RELEASE
                        ; IF TOUCH SEPERATION CREATED AN OVERSIZED CHARACTER, WIDTH > 24 FOR
                        ; FIXED PITCH, THEN USE HORSBC AS HORIZONTAL SIZE IF IT IS <HPITCH + 9
                        ; SO THAT SEPERATION DOES OCCUR FOR THIS CHARACTER. ELSE SKIP IT
                        ;
                        ;
0A7C 3A0000    E                  LDA     PSCHSZ          ; SET HOR SIZE
0A7F B7                           ORA     A
0A80 C29E0A    C                  JNZ     TCHS6E          ; GET HORIZONTAL PITCH FROM PAGE COMP
0A83 3A39E0                       LDA     HPITCH
0A86 47                           MOV     B,A
0A87 3A3AE0                       LDA     HPITPF          ; PITCH KNOWN YET ?
0A8A B7                           ORA     A
0A8B C2900A    C                  JNZ     TCHS6D          ; YES, CONTINUE
0A8E 0616                         MVI     B,22            ; NO, USE INTERMEDIATE PITCH
0A90 78                 TCHS6D:   MOV     A,B             ; PUT PITCH INTO B
0A91 C609                         ADI     9
0A93 4F                           MOV     C,A
0A94 3A0000    E                  LDA     HORSBC          ; GET HORIZONTAL BLACK COUNT
0A97 B9                           CMP     C               ; SMALLER THEN PITCH + 9?
0A98 F2B10A    C                  JP      TCHS07          ; NO, SO SKIP THIS CHARACTER
0A9B 320000    E                  STA     PSCHSZ          ; YES SO TAKE IT AS HOR SIZE
                        TCHS6E:
                        ;
                        ;AAAAAAAAAAAAAAAAAAAAAAAAAAAAAAAAAAAAAAAAAAAAAAAAAAA
                        ;
0A9E CD0000    E                  CALL    MSKGEN          ;BUILD NEW MASKS
0AA1 CD0000    E                  CALL    VERSWS          ;
0AA4 AF                           XRA     A
0AA5 320100    D                  STA     SPASFG          ; CLEAR SECOND PASS FLAG
                        ;
                        ;
                        ;AAAAAAAAAAAAAAAAAAAAAAAAAAAAAAAAAAAAAAAAAAAAAAAAAAAAAAAAAA
                        ;

0AA8 CD070B    C                  CALL    SETVSZ          ;SET VERT SIZE
0AAB FAB10A    C                  JM      TCHS07          ;
0AAE 3E01               TCHS6A:   MVI     A,CRGOOD        ;SEPARATED, EXIT
0AB0 C9                           RET
0AB1 CD0000    E        TCHS07:   CALL    TCHRST          ;
0AB4 C3BC03    C                  JMP     CHRSEP          ;AND RETRY CHARACTER SEPARATION

                        ;
                        ;**********************************
                        ;
                        ; TH - 14 July 1984
                        ;
                        ; Excessive word drop encountered.  If haven't already done a second pass of
                        ; PSWSCN with a reduced search depth, then do so now.  Otherwise, we will need
                        ; to separate a character now, so skip this character and go on to the next.
                        ;
0AB7 C3CF0A    C        TCHS08:   JMP     TCHS09          ; NOP out jump for video jump
```

```
LOC  OBJ                    SOURCE STATEMENT

0AEA 1600                         MVI    D,0           ; Output 37 rows starting from VELADR
0ABC 1E24                         MVI    E,36
0ABE 3A0000    E                  LDA    PSCHCA        ; Output 7 bytes per row starting at PSCHCA-1
0AC1 3D                           DCR    A
0AC2 47                           MOV    B,A
0AC3 C607                         ADI    7
0AC5 4F                           MOV    C,A
0AC6 2A0000    E                  LHLD   PSCHNA        ; Output next character address and mask
0AC9 3A0000    E                  LDA    PSCHCA        ; Output current character column
0ACC CD0000    E                  CALL   VDUMP
0ACF 3A4400    D         TCHS09:  LDA    WSCPFG        ; Get second pass flag
0AD2 B7                           ORA    A             ; Test for zero
0AD3 C2EC03    C                  JNZ    CHRSEP        ; If already did second pass for this word,
                                                       ;   then skip this character for now
0AD6 3EFF                         MVI    A,0FFH        ; Else, set second pass flag and retry
0AD8 324400    D                  STA    WSCPFG        ;   PSWSCN with reduced search depth
0ADB 3A0000    E                  LDA    PSCVPC
0ADE D602                         SUI    2
0AE0 324500    D                  STA    PSBOWS
0AE3 C3E403    C                  JMP    CHRSS3        ; FORCE END OF WORD
                         ;************************************
                         ;
                         $EJECT

                         ;SET LINE SEGMENT 1 AND 2 SIZES BASED ON HEIGHT IN ACC, AND ASSURE BUFFER
                         ;CONTAINS ENOUGH ROWS.  DESTROYS ALL REGS.
0AE6 0600                PSLSET:  MVI    B,0           ;RETURN NO ROWS
0AE8 4F                  PSRSET:  MOV    C,A           ;SAVE
0AE9 C5                           PUSH   B             ;
0AEA CD3E0B    C                  CALL   LBFILL        ;
0AED C1                           POP    B             ;
0AEE 3A2FED                       LDA    VELADR        ;FITS AFTER LINE ORIGIN?
0AF1 57                           MOV    D,A           ;
0AF2 3A2EED                       LDA    VBSIZE        ;
0AF5 C663                         ADI    HIGH SYSBUF   ;
0AF7 92                           SUB    D             ;
0AF8 B9                           CMP    C             ;
0AF9 FAFD0A    C                  JM     PSLC01        ;NO, WILL NEED BOTH SEGMENTS
0AFC 79                           MOV    A,C           ;YES, JUST NEED FIRST LINE SEGMENT
0AFD 320000    E         PSLC01:  STA    PSLS1L        ;NEED BOTH SEGS - SET FIRST SEG LEN
0B00 57                           MOV    D,A           ;COMPUTE SECOND SEGMENT LENGTH
0B01 79                           MOV    A,C           ;
0B02 92                           SUB    D             ;
0B03 320000    E                  STA    PSLS2L        ;
0B06 C9                           RET                  ;

                         $EJECT
```

```
LOC  OBJ             SOURCE STATEMENT

                     ;********************
                     ;SETVSZ - RETURN CC.LT IF NO CHAR TOP ADDRESS SET, ELSE
                     ;RETURN CC.NE IF VERT SEP SUCEEDED, ELSE SET PSCVSZ=PGHCBA-PGCHTA
                     ;IF BOTH NONZERO, =ISOWWI IF EITHER ZERO, THEN RETURN CC.EQ.
                     ;SETS WORKING HEIGHT TO NEXT LOWER BLACK-1 IF SET, ELSE TO PSCVSZ+1.
0B07 3A0000     E    SETVSZ: LDA   PSCVSZ      ;VERTICAL SEPERATION SUCEEDED?
0B0A B7                      ORA   A           ;
0B0B C22F0B     C            JNZ   SETV01      ;YES, VERSEP OK, SET WORKING HEIGHT
0B0E 3A0000     E            LDA   PSCVPC      ;SET DROP
0B11 47                      MOV   B,A         ;
0B12 3E25                    MVI   A,ISOWWH    ;SET MAX SIZE
0B14 90                      SUB   B           ;AFTER DROP
0B15 320000     E            STA   PSCVSZ      ;IN CASE EITHER TOP OR BOTTOM ZERO
0B18 3A0000     E            LDA   PSCHTA      ;ANY TOP FOUND?
0B1B B7                      ORA   A           ;
0B1C CA0000     E            JZ    REPC4       ;NO, REPORT NO TOP FOUND
0B1F 47                      MOV   B,A         ;SAVE
0B20 3A0000     E            LDA   PSCHBA      ;SET BOT BLACK ADDRESS
0B23 B7                      ORA   A           ;ANY BOTTOM FOUND?
0B24 CA2F0B     C            JZ    SETV01      ;NO, USE MAX SIZE
0B27 CD0000     E            CALL  ROWDIF      ;SET BLACK SEG SIZE
0B2A 3C                      INR   A           ;
0B2B 320000     E            STA   PSCVSZ      ;USE SMALLEST ACCEPTABLE BLACK SEG
0B2E AF                      XRA   A           ;SET PSCVSZ CALCULATED STATUS
0B2F F5              SETV01: PUSH  PSW         ;SAVE STATUS
0B30 3A0000     E            LDA   PSCVSZ      ;SET WORKING HEIGHT= DROP+CHAR SIZE+1 WHITE ROW
0B33 3C                      INR   A           ;IF PSCHBA NOT SET
0B34 47                      MOV   B,A         ;
0B35 3A0000     E            LDA   PSCVPC      ;
0B38 80                      ADD   B           ;

                     ;!!!!!!!!!!!!!!!!!!!!!!!!!!!!!!!!!!!!!!!!!!!!!!!!!!!!!!!!!!!!!!!!!!!!!

0B39 CDE50A     C            CALL  PSLSEP      ;

                     ;!!!!!!!!!!!!!!!!!!!!!!!!!!!!!!!!!!!!!!!!!!!!!!!!!!!!!!!!!!!!!!!!!!!!!

0B3C F1                      POP   PSW         ;RESTORE STATUS
0B3D C9                      RET               ;


                     ;CALL VBFILL AFTER SETTING CENTERLINE FLAG AS PER CENFLG.

0B3E 79              LBFILL: MOV   A,C         ;SAVE ROWS NEEDED
0B3F 320000     E            STA   RWSNED      ;
                             IF    DEBUG       ;
0B42 3A47E0                  LDA   VIDRUN      ;
0B45 F5                      PUSH  PSW         ;
0B46 3E01                    MVI   A,VSWVID    ;SET AWAITING VIDEO
0B48 3247E0                  STA   VIDRUN      ;
                             ENDIF             ;
0B4B 3A0000     E    LBFIL0: LDA   IFSCBF      ;CONTINUOUS BUFFER FILL?
0B4E B7                      ORA   A           ;
0B4F 3A0000     E            LDA   IFSCNT      ;SET VIDEO CONTROL
0B52 CA570B     C            JZ    LBFI01      ;IF NOT, DONT RETURN IMMEDIATE
```

```
LOC  OBJ              LINE        SOURCE STATEMENT

0B55 F620              3114           ORI     CNTRL1            ;ELSE RETURN IMMEDIATE
0B57 CD0000     E      3115 LBFI01:   CALL    VBFILL            ;REAL
0B5A F2690B     C      3116           JP      LBFI02            ;IF DONE, EXIT
0B5D CD0000     E      3117           CALL    ISOPSW            ;RUN PAGE IMAGE DURING DELAY
0B60 3A0000     D      3118           LDA     RWSNED            ;GET REQUESTED COUNT
0B63 4F                3119           MOV     C,A               ;
0B64 0600              3120           MVI     B,0               ;RETURN NO ROWS ON SUCESSIVE TRYS
0B66 C34B0B     C      3121           JMP     LBFILO            ;KEEP TRYING TILL INPUT COMPLETE
                       3122
                       3123 LBFI02:   IF      DEBUG             ;SET SEPERATION IN PROGRESS
0B69 F1                3124           POP     PSW               ;
0B6A 3247E0            3125           STA     VIDRUN            ;
                       3126           ENDIF                     ;
0B6D C9                3127           RET                       ;DONE
                       3128
                       3129
                       3130           END

ASSEMBLY COMPLETE,   NO ERRORS

CRF13.
SVP6.
S7S.
```

```
   1 $NOLIST
1027 $LIST
1028
1029 $TITLE('01/31/85 - STORE CHARACTER IN RECOGNITION BUFFER  ')
1030 ;
1031 ;                  ****************
1032 ;                  *              *
1033 ;                  *    $12451    *
1034 ;                  *              *
1035 ;                  ****************
1036
1037 ;        PUBLIC PROCEDURES
1038
1039          PUBLIC  CHRXFR
1040 ;        PUBLIC  CHBFIL          ;TRANSFER FROM VIDEO TO CHARACTER BUFFER
1041 ;        PUBLIC  CHRBUS          ;
1042 ;        PUBLIC  SEGRES          ;
1043 ;        PUBLIC  RECTAB          ;
1044          PUBLIC  ADDBUF          ;
1045 ;        PUBLIC  ALLBUF          ;CONVERT AN ADDRESS TO A BUFFER #
1046 ;        PUBLIC  FREBUF          ;ALLOCATE A CHARACTER BUFFER
1047          PUBLIC  FREEWD          ;FREE A BUFFER TO REC
1048                                  ; FREE A WORD TO REC
1049 ;        PUBLIC DATA
1050 ;        -----------
1051
1052          PUBLIC  D1STRT          ; ADDED 8-12-84 :AL
1053          PUBLIC  D2STRT
```

```
LOC  OBJ      LINE        SOURCE STATEMENT

                          PUBLIC  DBSTRT
                          PUBLIC  DCOUNT
                   ;
                   
                   ;      EXTERNAL PROCEDURES
                   ;      -------------------
                   
                   ;      EXTERNAL PROCEDURES - ISOSYS
                   
                          EXTRN   OPTION          ;
                          EXTRN   TIMOUT          ;
                   
                          EXTRN   CRASH           ;
                          EXTRN   ERRMES          ;DISPLAY ERROR MESSAGE
                   
                          EXTRN   DIVBY4          ;DIVIDE (HL) BY 4
                          EXTRN   DSUB            ;SUBTRACT (BC) FROM (HL)
                   
                   ;      EXTERNAL PROCEDURES - SEPUTL
                   
                          EXTRN   ICHRST          ;
                          EXTRN   NOITST          ;CHECK IF CHARACTER IS NOISE
                          EXTRN   SULTST          ;CHECK FOR SINGLE CHARACTER UNDERLINES
                          EXTRN   ISMTST          ;CHECK FOR BEING IN MARGIN
                          EXTRN   BUFADD          ;CONVERT A BUFFER NUMBER TO AN ADDRESS
                          EXTRN   OUTHEX
                          EXTRN   OUT2SP
                          EXTRN   OUTCLF
                          EXTRN   OUTBYT
                   
                          EXTRN   HCENTR          ;
                   ;
                   ;***********************************
                   ;
                   ; Modification #3
                   ;
                          EXTRN   BITMSK          ; Create bit mask based on count
                   ;
                   ;***********************************
                   ;
                   
                   ;      EXTERNAL PROCEDURES
                   
                          EXTRN   ISOREC
                          EXTRN   ISOPFB          ;CALL PAGE IMAGE TO FREE UP
                                                  ;CHARACTER BUFFERS
                   
                   ;      EXTERNAL PROCEDURES - H1CHRS
                   
                          EXTRN   HORSWS          ;
                          EXTRN   VERSWS          ;
                          EXTRN   VERTOP          ;
```

```
LOC  OBJ      LINE      SOURCE STATEMENT

                  ;        EXTERNAL VARIABLES - M1DATA

                           EXTRN   WDFLAG              ;
                           EXTRN   CONPIT              ;
                           EXTRN   PRVCBP              ;
                           EXTRN   PRHCBF              ;
                           EXTRN   PRVCBF              ;
                           EXTRN   TRHCBF              ;
                           EXTRN   PASCT1              ;
                           EXTRN   PASCT2              ;
                           EXTRN   SHIFTX              ;
                           EXTRN   PSCHM1              ;
                           EXTRN   PSCHM2              ;
                           EXTRN   PSCHM3              ;
                           EXTRN   PSCHM4              ;
                           EXTRN   PSCVSZ              ;
                           EXTRN   PSCHPC              ;
                           EXTRN   PSCHSZ              ;
                           EXTRN   PSCSEG              ;
                           EXTRN   PSCROF              ;
                           EXTRN   PSCVPC              ;
                           EXTRN   PSCHTA              ;
                           EXTRN   PSCHCE              ;
                           EXTRN   SPBLCT              ;

                           EXTRN   BADCHR              ; added 9-19-84 if remove a char as noise
                           EXTRN   PRVPLC
                  ;
                  ;**********************************
                  ;
                  ; Modification #3
                  ;
                  ;        Variable to flag horizontal remnant processing
                  ;
                           EXTRN   HRMPRC              ;
                  ;
                  ;**********************************

                           DSEG

                  ;        LOCAL VARIABLES
0000              CHBFOV:  DS      1                   ;HEIGHT IN EXCESS OF PSCMVS TO TRIM
0001              CHBFRC:  DS      1                   ;REG ROW COUNTER
0002              CHBFIF:  DS      2                   ;REGISTRATION INPUT
0004              CHBFOF:  DS      2                   ;REGISTRATION OUTPUT
0006              OVERSZ:  DS      1                   ; FLAG INDICATING OVERSIZED CHARACTER BUF HORIZ
0007              VREMCT:  DS      1                   ; FLAG TO INDICATE CHAR OVERSIZED VERTICALLY
                  ;
0008              TEMP4:   DS      6                   ;
                  ;
                  ;AAAAAAAAAAAAAAAAAAAAAAAAAAAAAAAAAAAAAAAAAAAAAAAAAAAAAAAAAAAAAA
                  ;
                  ; NEEDED MORE TEMPS TO DO VERTICAL REMENTS IN PS : 7-15-84
                  ;
```

```
LOC  OBJ          LINE        SOURCE STATEMENT

000E              1152 TEMP5:  DS      9                  ;
                  1153 ;
                  1164 ; VARIABLES NEEDED FOR RELEASING WORDS VS. CHARACTERS  8-12-84: AL
                  1165
0017              1156 Q1STRT: DS      2
0019              1167 Q2STRT: DS      2
001B              1168 Q3STRT: DS      2
001D              1169 QCOUNT: DS      1
001E              1170 T1STRT: DS      2
                  1171 ;
                  1172 ; added 10-1-84 to take vertical remnant buffers into account in total
                  1173 ; number of char buffers used. :AL
                  1174 ;
                  1175
                  1176 ;AAAAAAAAAAAAAAAAAAAAAAAAAAAAAAAAAAAAAAAAAAAAAAAAAAAAAAAAAAAAAA
                  1177
                  1178 ;RTSHCT:           DS      20                  ;*DBG
                  1179 ;LFSHCT:           DS      20                  ;*DBG
                  1180 ;TOTCT:  DS        2               ;*DBG
                  1181 ;SHFTR:  DS        2               ;*DBG
                  1182 ;M3CTR:  DS        2               ;*DBG
0020              1183 TEMP1:   DS        1               ;
                  1184
                  1185          CSEG
                  1186 $EJECT

                  1187 ;*****************************************************************
                  1188 ;                                                                ;
                  1189 ; MICHST Record of Changes                                       ;
                  1190 ;                                                                ;
                  1191 ;       1)   02/XX/84     KH     Original modularization         ;
                  1192 ;       2)   04/26/84     TH     Correct bug in exit from CHRKFR ;
                  1193 ;       3)   04/30/84     TH     Pass horizontal remnants to REC ;
                  1194 ;                                                                ;
                  1195 ;*****************************************************************
                  1196 ;
                  1197 $EJECT
```

```
LOC  OBJ           LINE       SOURCE STATEMENT

                   1198 ;
                   1199 ;LOCATE A CHARACTER BUFFER
                   1200
                   1201 ;*********************************
                   1202 ;
                   1203 ; Modification #3
                   1204 ;
                   1205 ;        Test to see if character width is greater than 24.  If so,
                   1206 ;        then enter horizontal remnant processing.  If not, then test
                   1207 ;        to see if in horizontal remnant processing already.  If so, then
                   1208 ;        don't do vertical remnant processing.
                   1209 ;
0000 AF            1210 CHRKFK: XRA    A
0001 320000   D    1211         STA    OVERSZ           ; INITIALIZE FLAG FOR OVERSIZED CHARS
0004 320000   D    1212         STA    VREMCT
0007 320000   E    1213         STA    BADCHR           ; INITIALIZE BADCHAR FLAG
000A 3A0000   E    1214 CHRKF1: LDA    FSCHSZ           ; Get character width
000D FE19          1215         CPI    25               ; Test to see if wider than character buffer
000F D26401   C    1216         JNC    CHRF50           ; Enter remnant processing if so
0012 CD5404   C    1217         CALL   ALBUF2           ; Allocate a buffer
0015 3E04          1218         MVI    A,BADPAG         ; Return error status if unreadable page
0017 C0            1219         RNZ                     ; ***************
0018 3A0000   E    1220         LDA    FSCVSZ
001B FE21          1221         CPI    33
001D FA2400   C    1222         JM     CHRKF2
0020 210000   D    1223         LXI    H,VREMCT
0023 34            1224         INR    M
0024 CDA305   C    1225 CHRKF2: CALL   QLOAD            ; LOAD Q WITH ADDRESS OF CHAR BUF
0027 3A0000   E    1226         LDA    WDFLAG
002A 320000   E    1227         STA    PRVFLG           ; UPDATE WORD POINTER
002D 2A0CE0        1228         LHLD   CURCBP           ; Set character status to waiting for links
                   1229 ;
                   1230 ;AAAAAAAAAAAAAAAAAAAAAAAAAAAAAAAAAAAAAAAAAAAAAAAAAAAAAAAAAAAAAAA
                   1231 ;
                   1232 ; NEXT 3 LINES COMMENTED OUT TO ENABLE VERTICAL REMNANT PROCESSING :7-15-84
                   1233 ;
                   1234 ;       LDA    HRMPRC           ; Test to see if already in horizontal
                   1235 ;       ORA    A                ;   remnant processing
                   1236 ;       JNZ    CHRF15           ; Don't do vertical test if so
                   1237 ;
                   1238 ;AAAAAAAAAAAAAAAAAAAAAAAAAAAAAAAAAAAAAAAAAAAAAAAAAAAAAAAAAAAAAA
                   1239 ;
                   1240 ;*********************************
                   1241 ;
0030 3A0000   E    1242         LDA    FSCVSZ           ;SEE IF CHARACTER IS OVERSIZED
0033 FE21          1243         CPI    33               ;GREATER THAN MAX?
0035 FAB200   C    1244         JM     CHRF15           ;NO, IGNORE REMNANT MANIPULATION (JM CHRF10)
0038 DE20          1245         SBI    32               ;SUBTRACT OFF THE LARGE HALF
003A 320000   E    1246         STA    FSCVSZ           ;AND STORE IT
003D 3A0000   E    1247         LDA    FSCSFS           ;NEED TO SET FLAG AS A REMNANT
0040 F610          1248         ORI    REMFLG           ;
0042 320000   E    1249         STA    FSCSFS           ;AND RESTORE IT
                   1250
                   1251 ;  NEED TO SAVE THE MASK VALUES FROM BEING DESTROYED SO THE SECOND
                   1252 ;  HALF OF THE CHARACTER CAN USE THEM TOO.
```

```
LOC  OBJ          LINE       SOURCE STATEMENT

                  1253
0045 2A0000    F  1254              LHLD    PSCHM1          ;DO THIS TO SAVE TIME AND SPACE
0048 220000    D  1255              SHLD    TEMP4           ;
004B 2A0000    E  1256              LHLD    PSCHM3          ; SAME
004E 220A00    D  1257              SHLD    TEMP4+2         ;
0051 3A0000    E  1258              LDA     PSCHSZ          ;SAVE THIS
0054 320000    D  1259              STA     TEMP4+4         ;
0057 3A0000    E  1260              LDA     PSCHPC          ;
005A 320000    D  1261              STA     TEMP4+5         ;
005D CD2B02    C  1262              CALL    CHBFIL          ;FILL CHARACTER BUFFER
                  1263 ;
                  1264 ;
                  1265 ;RESET FOR 2ND HALF OF REMNANT MANIPULATION
0060 2A0800    D  1266              LHLD    TEMP4           ;RESTORE MASKS
0063 220000    E  1267              SHLD    PSCHM1          ;
0066 2A0A00    D  1268              LHLD    TEMP4+2         ;
0069 220000    F  1269              SHLD    PSCHM3          ;
006C 3A0C00    D  1270              LDA     TEMP4+4         ;GET THIS VALUE
006F 320000    E  1271              STA     PSCHSZ          ;AND RESTORE THE SIZE
                  1272 ;            XRA     A               ;CALL IT WITH A ZERO
                  1273 ;            CALL    VERTOP          ;RECALCULATE THE NEEDED INFO
                  1274 ;            LDA     PSCVSZ          ;GUARANTEE THAT THE SIZE IS LESS THAN 32
                  1275 ;            CPI     021H            ;
                  1276 ;            JM      CHRF05          ;
                  1277 ;
                  1278 ;AAAAAAAAAAAAAAAAAAAAAAAAAAAAAAAAAAAAAAAAAAAAAAAAAAAAAAAAA
                  1279 ; AL: 9-6-84  added as a replacement to VERTOP to find the
                  1280 ; top of the remaining 32 rows of an oversized char buffer.
                  1281 ;
                  1282 ;AAAAAAAAAAAAAAAAAAAAAAAAAAAAAAAAAAAAAAAAAAAAAAAAAAAAAAAAA
                  1283
0072 3A2EE0       1284              LDA     VBSIZE
0075 C683         1285              ADI     HIGH SYSBUF
0077 47           1286              MOV     B,A                     ; B NOW HAS THE END OF THE VIDBUF
0078 3A0000    E  1287              LDA     PSCVSZ
007B 4F           1288              MOV     C,A
007C 3A0000    E  1289              LDA     PSCHTA
007F 81           1290              ADD     C
0080 B8           1291              CMP     B
0081 FA8700    C  1292              JM      OK                      ;TOP OF REMNANT NOT GO PAST VIDEND
0084 90           1293              SUB     B                       ; DID GO PAST SO WRAP VIDBUF
0085 C683         1294              ADI     HIGH SYSBUF
                  1295
0087 320000    E  1296 OK:          STA     PSCHTA
008A 3A0000    E  1297              LDA     PSCVPC                  ; GET VERT WORD DROP OF VERT REM
008D 47           1298              MOV     B,A
008F 3A0000    E  1299              LDA     PSCVSZ
0091 80           1300              ADD     B                       ; ADD VERTICAL SIZE OF REM TO DROP
0092 320000    E  1301              STA     PSCVPC                  ; STORE SUM AS NEW WORD DROP
                  1302 ;
                  1303 ;AAAAAAAAAAAAAAAAAAAAAAAAAAAAAAAAAAAAAAAAAAAAAAAAAAAAA
                  1304 ;
0095 3E20         1305              MVI     A,020H          ;SET SIZE FOR 32
0097 320000    E  1306              STA     PSCVSZ          ;
009A CD0404    C  1307 CHRF05:      CALL    ALBUF2          ;ALLOCATE A BUFFER
```

```
LOC  OBJ                SOURCE STATEMENT

009D 3E04                       MVI     A,BADPAG            ;
009F C0                         RNZ                         ;TIMED OUT - RETURN*************
00A0 AF                         XRA     A
00A1 320700       D             STA     VREMCT              ; DONT NEED VREMCT ANY MORE, SPACE AVAIL
00A4 CDA305       C             CALL    CLOAD               ; SET BOTTOM BUFFER ON 0
00A7 2A0CE0                     LHLD    CURCRP              ;
00AA 3A0000       E     CHRF10: LDA     PGCSFG              ;GUARANTEE
00AD E6EF                       ANI     NOT REMFLG          ;THAT REMNANT FLAG IS CLEAR
00AF 320000       L             STA     PGCSFG              ;
                        ;
                        ;**********************************
                        ;
                        ; Modification #3
                        ;
                        ;       Add label for horizontal remnant processing
                        ;
                        CHRF15:
                        ;
                        ;**********************************
                        ;
                                IF      DEBUG               ;
00B2 3E07                       MVI     A,VSREGR            ;SET REGISTRATION IN PROGRESS
00B4 3247E0                     STA     VIDRUN              ;
                                ENDIF                       ;
00B7 CD2B02       C             CALL    CHBFIL              ;STUFF THIS PART IN
                                IF      DEBUG               ;
00BA 3E02                       MVI     A,VSSEPR            ;
00BC 3247E0                     STA     VIDRUN              ;SET SEPERATION IN PROGRESS
                                ENDIF                       ;
                        ;
                        ;**********************************
                        ;
                        ; Modification #3
                        ;
                        ;       Don't do any noise tests if horizontal remnant
                        ;
00BF 3A0000       E             LDA     PGCSFG
00C2 E608                       ANI     HORREM
00C4 C2E200       C             JNZ     CHRF20
00C7 3A0600       D             LDA     OVERSZ
00CA C2E200       C             JNZ     CHRF20              ; IF OVERSIZE DONT DO TESTS OR RESET TOUCH BUF
                        ;
                        ;**********************************
                        ;
00CD CD0000       E             CALL    TCHRST              ;RESTORE SYSBUF FROM TOUCH BUFFER IF REQ.
00D0 CD0000       E             CALL    NOITST              ;TEST FOR NOISE
00D3 FAF100       C             JM      CHRF30              ;CORRECT FLAGS FOR LINKAGES
00D6 CD0000       E             CALL    ISMIST              ;TEST FOR INTRA SCAN MARGIN CHAR
00D9 FAF100       C             JM      CHRF30              ;IF IN MARGIN, FREE LINKAGES
00DC CD0000       E             CALL    SULIST              ;PERFORM SINGLE CHAR UL TEST
00DF FAF100       C             JM      CHRF30              ;JUMP IF SINGLE CHAR UNDERLINE
                        ;
                        ;*******************
                        ;START RECOGNITION PROCESS AND CONTINUE SEPERATION
                        CHRF20: IF      X3
```

```
LOC  OBJ                SOURCE STATEMENT

                                PUSH    PSW             ; Model 212 or 222
                                PUSH    H               ; Save registers and delay
                                LXI     H,953           ; Timer for 4 ms of delay per character
                       CHRF21:  DCX     H               ; Decrement counter
                                MOV     A,H
                                ORA     L               ; Test for zero
                                JNZ     CHRF21          ; Continue until counter exhausted
                                POP     H               ; Restore registers
                                POP     PSW
                                ENDIF
00E2 3A0000      E     CHRF22:  LDA     PSCSFG          ;RESET TOUCH
00E5 E6FE                       ANI     NOT HORTCH      ;
00E7 320000      E              STA     PSCSFG          ;
00EA 2A0CE0                     LHLD    CURCBP          ; NEED  FOR ALLBUF
00ED 220000      F              SHLD    PRHCBP
                       ;        CALL    ISOREC          ;START RECOGNITION PROCESS
                       ;
                       ;***********************************
                       ;
                       ; Modification #2
                       ;
                       ;        The following instruction should be a return so that the executive
                       ;        may maintain control of the separation process.
                       ;
                       ; Old code:
                       ;
                       ;CHRF25:JMP     CHRSEP          ;CONTINUE SEPERATION
                       ;
                       ; New code
                       ;
00F0 C9                CHRF25:  RET                     ;CONTINUE SEPARATION
                       ;
                       ;***********************************
                       ;

00F1 3EFF              CHRF30:  MVI     A,NULL          ;
00F3 320000      E              STA     PRVCBF          ;PREVIOUS WAS BAD - SO SET BUFFER TO REFLECT
00F6 320000      E              STA     PRHCBF          ;
00F9 2A0CE0                     LHLD    CURCBP          ;
00FC 011200                     LXI     B,RECLNU        ;SET TO UPPER LINK
00FF 09                         DAD     B               ;
0100 7E                         MOV     A,M             ;SET UPPER LINK BUFFER NUMBER
0101 3C                         INR     A               ;WAS IT NULL ?
0102 CA1301      C              JZ      CHRF40          ;YES, DON'T NEED TO DELETE PAIR
0105 7E                         MOV     A,M             ;SET TO UPPER BUFFER
0106 E63F                       ANI     03FH            ;
0108 CD0000      E              CALL    BUFADD          ;
010B 3600                       MVI     M,0H            ;FREE IT
010D 011300                     LXI     B,RECLNB        ;AND SET THE LINKS
0110 09                         DAD     B               ;
0111 36FF                       MVI     M,NULL          ;TO NULL
                       ;
0113 3EFF              CHRF40:  MVI     A,OFFH
0115 320000      E              STA     BADCHR          ; SET BAD CHR FLAG
0118 2A0CE0                     LHLD    CURCBP          ;GET TO PREVIOUS BUFFER
```

```
LOC  OBJ                SOURCE STATEMENT

011B 011000                        LXI    D,RECLNL          ;LINK OF THE PREVIOUS
011E 09                            DAD    B                 ;BUFFER POINTER
011F 7E                            MOV    A,M               ;
0120 FEFF                          CPI    NULL              ;
0122 CA3001       C                JZ     CHRF42            ;NULL , DON'T BOTHER NULLING OUT
0125 E63F                          ANI    03FH              ;
0127 CD0000       E                CALL   BUFADD            ;
012A 011100                        LXI    B,RECLNB          ;
012D 09                            DAD    B                 ;YES, NULL IT OUT
012E 36FF                          MVI    M,NULL            ;
0130 2A0CE0                CHRF42: LHLD   CURCBP            ;GET TO CURRENT (WHICH IS ALSO PREVIOUS)
0133 3600                          MVI    M,0               ; Null out current buffer
0135 3A1D00       D                LDA    CCOUNT            ;
0138 47                            MOV    B,A               ; MUST DECREMENT COUNTER OF CHAR BUFFERS
0139 EB                            XCHG                     ;
013A 211200                        LXI    H,RECLNU          ;
013D 19                            DAD    D                 ;
013E 7E                            MOV    A,M               ; Get upper link
013F 3C                            INR    A                 ; Check for upper link
0140 EB                            XCHG                     ;
0141 1180FF                        LXI    D,-80H            ;
0144 CA4901       C                JZ     CHRF43            ;
0147 19                            DAD    D                 ; Subtract 100h if there was an upper buffer
0148 05                            DCR    B                 ; DECREMENT BUFFER COUNTER
0149 19                    CHRF43: DAD    D                 ; Subtract only 80h if no upper buffer
014A 05                            DCR    B                 ; DECREMENT COUNTER OF CHAR BUFFERS
014B 78                            MOV    A,B               ;
014C 321D00       D                STA    CCOUNT            ; STORE UPDATED BUFFER COUNT
014F 7C                            MOV    A,H               ;
0150 FEE6                          CPI    HIGH SYSCHB       ; Check for wrap around
0152 C25E01       C                JNZ    UPDPTR            ; Jump if no wrap around
0155 7D                            MOV    A,L               ;
0156 B7                            ORA    A                 ; Check for extent of wrap around
0157 2180FD                        LXI    H,SYSCHB-80H      ; Assume curr buff was E700, point to FE80
015A C25E01       C                JNZ    UPDPTR            ; Jump if assumption true
015D 19                            DAD    D                 ; Curr buff was E700, so point to FE00
015E 220CE0                UPDPTR: SHLD   CURCBP            ; Save new pointer
0161 C3F000       C                JMP    CHRF25            ; Jump to end (do not free previous)
                           ;
                           ;***********************************
                           ;
                           ; Modification #3
                           ;
                           ;      The following is the code for processing horizontal remnants.
                           ;      Masks are first computed for the character and the remnant.  The
                           ;      character is then separated out as 24 bits wide.  The remnant is
                           ;      then separated out.
                           ;
                           ; Local data equates :
                           ;
0011              D        HRMHM1  EQU    TEMP5+3           ; Left mask byte for remnant
0012              D        HRMHSZ  EQU    TEMP5+4           ; Horizontal size of remnant
0013              D        HRMSPS  EQU    TEMP5+5           ; Original separation flag for character
0014              D        HRMVSZ  EQU    TEMP5+6           ; Original vertical size
0015              D        HRMVPC  EQU    TEMP5+7           ; Original vertical word drop
```

```
LOC  OBJ          LINE        SOURCE STATEMENT

0016            D  1473 HRMHTA   EQU   TEMP5+8          ; Original top address
                   1474 ;
0164 320000     D  1475 CHRF50:  STA   OVERSZ           ; MAKE OVESIZE FLAG NON ZERO
0167 3A0000     E  1476          LDA   PSCSFG           ; Save current separation flag
016A 321300     D  1477          STA   HRMSFG
016D 3A0000     E  1478          LDA   PSCVSZ           ; Save vertical size
0170 321400     D  1479          STA   HRMVSZ
0173 3A0000     E  1480          LDA   PSCVPC           ; Save vertical word drop
0176 321500     D  1481          STA   HRMVPC
0179 3A0000     E  1482          LDA   PSCHTA           ; Save top address
017C 321600     D  1483          STA   HRMHTA
017F 3A0000     E  1484          LDA   PSCHM1           ; Compute the number of pixels which
0182 4F            1485          MOV   C,A              ;   are in the fourth mask byte
0183 0601          1486          MVI   B,HIGH BCTORG    ;   for the main part of the character
0185 0A            1487          LDAX  B                ;   = 24 - ((Pixels in first byte)
0186 C610          1488          ADI   16               ;     + 16)
0188 57            1489          MOV   D,A
0189 3E18          1490          MVI   A,24
018B 92            1491          SUB   D
018C 57            1492          MOV   D,A              ; Save count
018D 3E03          1493          MVI   A,8              ; Calculate fourth byte of mask for main
018F 92            1494          SUB   D                ;   character
0190 CD0000     E  1495          CALL  BITMSK           ; Create mask based on count
0193 2F            1496          CMA                    ; Complement to left justify
0194 5F            1497          MOV   E,A              ; Save mask
0195 3A0000     E  1498          LDA   PSCHM4           ; AND with current mask to give final mask
0198 47            1499          MOV   B,A
0199 A3            1500          ANA   E
019A 320000     E  1501          STA   PSCHM4
019D 78            1502          MOV   A,B              ; XOR current mask with bit mask to give
019E AB            1503          XRA   E                ;   mask for remnant
019F 321100     D  1504          STA   HRMHM1           ; NEW VARIABLE FOR VERT REM  7-15-84
01A2 3A0000     E  1505          LDA   PSCHSZ           ; Compute width for remnant
01A5 D618          1506          SUI   24               ;   = PSCHSZ - 24
01A7 321200     D  1507          STA   HRMHSZ           ; NEW VARIABLE FOR VERT REM 7-15-84
01AA 3E18          1508          MVI   A,24             ; Set character width to 24
01AC 320000     E  1509          STA   PSCHSZ
01AF 3EFF          1510          MVI   A,0FFH           ; Set horizontal remnant processing flag
01B1 320000     E  1511          STA   HRMRPC
01B4 3A0000     E  1512          LDA   PSCSFG           ; Set touching and not remnant in separation
01B7 F601          1513          ORI   HORTCH           ;   status flag
01B9 E6E7          1514          ANI   NOT (REMFLG OR HORREM)
01BB 320000     E  1515          STA   PSCSFG
01BE CD0A00     C  1516          CALL  CHRRF1           ; Separate character
01C1 FE04          1517          CPI   BADPAG           ; Return error status if unreadable page
01C3 C8            1518          RZ
                   1519 ;
01C4 3A1100     D  1520          LDA   HRMHM1           ; Set masks for remnant, NEW VARIABLE 7-15-84
01C7 320000     E  1521          STA   PSCHM1
01CA 4F            1522          MOV   C,A              ; Compute second byte of mask if necessary
01CB 0601          1523          MVI   B,HIGH LOTORG
01CD 1600          1524          MVI   D,0              ; Initial mask
01CF 0A            1525          LDAX  B                ; Get number of black bits in first byte
01D0 47            1526          MOV   B,A
01D1 3A1200     D  1527          LDA   HRMHSZ           ; Compare with remnant width,NEW VARIABLE 7-15
```

```
LOC   OBJ          LINE        SOURCE STATEMENT

01D4 B8             1528           CMP     B
01D5 CAF201    C    1529           JZ      CHRF55          ; If equal, then second byte is blank
01D8 90             1530           SUB     B
                    1531 ;
01D9 47             1532           MOV     B,A             ; THESE 3 INSTRUCTIONS WERE
01DA 3E08           1533           MVI     A,8             ; ADDED TO CORRECT 5TH MASK 7-7-84
01DC 90             1534           SUB     B               ;
                    1535 ;
01DD CD0000    E    1536           CALL    BITMSK          ; Compute right mask for second byte
01E0 2F             1537           CMA                     ; Complement to give left mask
01E1 57             1538           MOV     D,A
01E2 7A             1539 CHRF55:   MOV     A,D
01E3 320000    E    1540           STA     PSCHM2
01E6 AF             1541           XRA     A
01E7 320000    E    1542           STA     PSCHM3
01EA 320000    E    1543           STA     PSCHM4
01ED 210000    E    1544           LXI     H,PSCHCA        ; Update starting column for remnant
01F0 34             1545           INR     M
01F1 34             1546           INR     M
01F2 34             1547           INR     M
01F3 3A1200    D    1548           LDA     HRMHSZ          ; Set width for remnant NEW VARIABLE 7-15-8
01F6 320000    E    1549           STA     PSCHSZ
01F9 3A1400    D    1550           LDA     HRMVSZ          ; Restore original character vertical size
01FC 320000    E    1551           STA     PSCVSZ
01FF 3A1500    D    1552           LDA     HRMVPC          ; Restore original vertical word drop
0202 320000    E    1553           STA     PSCVPC
0205 3A1600    D    1554           LDA     HRMHTA          ; Restore original top address
0208 320000    E    1555           STA     PSCHTA
020B 3A0000    E    1556           LDA     PSCSFG          ; Set not touching and remnant in separation
020E F608           1557           ORI     NORREM          ;   status flag
0210 E6EF           1558           ANI     NOT REMFLG
0212 320000    E    1559           STA     PSCSFG
0215 CD0A00    C    1560           CALL    CHRXF1          ; Separate remnant
0218 F5             1561           PUSH    PSW
0219 CD0000    E    1562           CALL    TCHRST
021C F1             1563           POP     PSW             ; SET BACK STATUS
021D FE04           1564           CPI     BADPAG          ; Return error status if unreadable page
021F C8             1565           RZ
0220 AF             1566           XRA     A               ; Reset horizontal remnant processing flag
0221 320000    E    1567           STA     HRMPRC
0224 3A1300    D    1568           LDA     HRMSFG          ; NEW VARIABLE 7-15-84
0227 320000    E    1569           STA     PSCSFG
022A C9             1570           RET                     ; Exit CHRXFR
                    1571 ;
                    1572 ;***********************************
                    1573 ;
                    1574 $EJECT
                    1575 ;*********************
                    1576 ;CHARACTER BUFFER FILL.  COPY REGISTERED DATA INTO CHAR BUFFER, THEN
                    1577 ;ADD CHARACTER POSITION/CONTROL INFORMATION.
                    1578 ;CENTRAL REGISTRATION - COMPUTE VERTICAL POSITION, AND INSERT LEADING NULL ROWS
                    1579
022B 2A0000         1580 CHBFIL:   LHLD    CURCBP          ;=>CURRENT RECOGNITION BUFFER
022E 112000         1581           LXI     D,RECCHB        ;=>CHAR BUFFER WITHIN REC BUFFER
```

```
LOC  OBJ              SOURCE STATEMENT

0231 19                      DAD     D               ;
0232 3A0000    E             LDA     PSCVSZ          ;GET VERTICAL CHAR SIZE
0235 3C                      INR     A               ;
0236 1F                      RAR                     ;GET ONE HALF
0237 47                      MOV     B,A             ;
0238 3E10                    MVI     A,CHBITH/2      ;GET 1/2 OF CHAR MATRIX HEIGHT
023A 90                      SUB     B               ;GET SHIFT DOWN FROM TOP
023B CA4602    C             JZ      CHBF03          ;JUMP IF NO BLANK ROWS AT TOP
023E 4F                      MOV     C,A             ;<C> = NUMBER OF ROWS TO SKIP
023F B7                      ORA     A               ;CLEAR CARRY
0240 17                      RAL                     ;MUTIPLY BY 2
0241 81                      ADD     C               ;MULTIPLY BY 3 (BYTES/ROW)
0242 4F                      MOV     C,A             ;
0243 0600                    MVI     B,0             ;
0245 09                      DAD     B               ;ADD OFFSET TO ADDRESS POINTER
                      ;
                      ;REGISTER AND OUTPUT FIRST AND SECOND CHARACTER SEGMENTS
                      ;
0246 220400    D      CHBF03: SHLD   CHBFOP          ;SAVE OUTPUT POINTER
0249 3A0000    E             LDA     PSCHTA          ;GET CHAR TOP
024C 67                      MOV     H,A             ;
024D 3A0000    E             LDA     PSCHCA          ;GET LEFT COLUMN
0250 6F                      MOV     L,A             ;
0251 220200    D             SHLD    CHBFIP          ;SAVE DATA ORIGIN
0254 CD3C03    C             CALL    CHARES          ;REGISTER CHARACTER

                      $EJECT
                      ;**********************
                      ;SET RECOGNITION BUFFER CONTROL VALUES
0257 2A0000    E      CHBF07: LHLD   PSCHCA          ;GET CURRENT COLUMN
025A 2600                    MVI     H,0             ;=BYTE COL*8+FIRST BYTE BLACK PIXEL COUNT
025C 29                      DAD     H               ;
025D 29                      DAD     H               ;
025E 29                      DAD     H               ;
025F 3A0000    E             LDA     PSCHPC          ;GET # OF BLACK PIXELS IN FIRST CHAR BYTE
0262 4F                      MOV     C,A             ;
0263 0600                    MVI     B,0             ;
0265 09                      DAD     B               ;
0266 EB                      XCHG                    ;
0267 2A0C30                  LHLD    CURCBF          ;GET REC BUFFER PTR
026A 2C                      INR     L               ;=>HORIZONTAL ORIGIN
026B 73                      MOV     M,E             ;
026C 2C                      INR     L               ;
026D 72                      MOV     M,D             ;
026E 2C                      INR     L               ;=>HORIZONTAL CHAR SIZE
026F 3A0000    E             LDA     PSCHSZ          ;
0272 77                      MOV     M,A             ;
0273 2C                      INR     L               ;=>VERTICAL LINE ORIGIN
0274 EB                      XCHG                    ;
0275 2A2CE0                  LHLD    VBLORG          ;
0278 EB                      XCHG                    ;
0279 73                      MOV     M,E             ;
027A 2C                      INR     L               ;
027B 72                      MOV     M,D             ;
```

```
LOC  OBJ                  SOURCE STATEMENT

027C 2C                          INR   L                ;=>WHITE PIXELS ABOVE CHAR
027D 3A0000   E                  LDA   PSCVPC           ;
0280 77                          MOV   M,A              ;
0281 2C                          INR   L                ;=>VERTICAL CHAR SIZE
0282 3A0000   E                  LDA   PSCVSZ           ;
0285 77                          MOV   M,A              ;
0286 7D                          MOV   A,L              ;
0287 C606                        ADI   RECSFS-RECVSZ    ;=>SEP FLAG
0289 6F                          MOV   L,A              ;
028A 3A0000   E                  LDA   PSCSFS           ;STORE SEP FLAG
028D 77                          MOV   M,A              ;
                                                        ;
                          $EJECT
                          ;*********************
                          ;SET UP HORIZONTAL LINKS
                          ;
028E 2A0CE0                      LHLD  CURCBP           ; Set current buffer address
0291 EB                          XCHG                   ; Save in <DE>
0292 21001A                      LXI   H,0-SYSCHB       ; Set offset to buffer chain origin
0295 19                          DAD   D                ; Add to buffer address
0296 29                          DAD   H                ; Double result to get buffer number
0297 4C                          MOV   C,H              ; Save buffer number in <C>
0298 3A0000   E                  LDA   PSCSFS           ; Load flag
029B 47                          MOV   B,A              ; Save in <B>
029C E610                        ANI   REMFLG           ; Check for remnant
029E C22203   C                  JNZ   CHBF20           ; Jump if remnant
                                                        ;
02A1 211000                      LXI   H,RECLNL         ;
02A4 19                          DAD   D                ; Point to left link
02A5 3A0000   E                  LDA   PRHCBF           ; Get previous horz buffer flag
02A8 77                          MOV   M,A              ; Set left link
02A9 FEFF                        CPI   NULL             ; Check for null
02AB CABC02   C                  JZ    CHBF08           ; Jump if null (no back links need to be done)
02AE D5                          PUSH  D                ; Save buffer address
02AF 2A0000   E                  LHLD  PRHCBP           ; Get previous buffer address
02B2 111100                      LXI   D,RECLNR         ;
02B5 19                          DAD   D                ; Point to previous right link
02B6 7E                          MOV   A,M              ; Get previous right link
02B7 E680                        ANI   TCHBIT           ; Isolate touch bit
02B9 B1                          ORA   C                ; OR with current buffer number
02BA 77                          MOV   M,A              ; Set previous right link
02BB D1                          POP   D                ; Restore current buffer address
02BC 78           CHBF08:        MOV   A,B              ;
02BD E601                        ANI   HORTCH           ; Check for horizontal touch
02BF 3E7E                        MVI   A,AWTNTC         ;
02C1 CAC602   C                  JZ    CHBF09           ; Jump if no touch
02C4 F680                        ORI   TCHBIT           ;
02C6 211100       CHBF09:        LXI   H,RECLNR         ;
02C9 19                          DAD   D                ; Point to right link
02CA 77                          MOV   M,A              ; Set right link
                          $EJECT

                          ;
                          ;CHECK FOR PREVIOUS BUFFER BEING A REMNANT. IF SO NEED TO DO VERTICAL
                          ;LINKS.
```

```
LOC  OBJ           SOURCE STATEMENT

                   ;
02CB 211300               LXI   H,RECLNB        ;
02CE 19                   DAD   D               ; Point to lower link
02CF 36FF                 MVI   M,NULL          ; Set lower link to null
02D1 2D                   DCR   L               ; Point to upper link
02D2 3A0000     E         LDA   PRVCBF          ; Get previous buffer flag
02D5 77                   MOV   M,A             ; Set upper link
02D6 FEFF                 CPI   0FFH            ; Check for null
02D8 CAE302     C         JZ    CHBF17          ; Jump if null
02DB D5                   PUSH  D               ; Save current buffer pointer
02DC 2A0000     E         LHLD  PRVCBP          ; Get previous buffer address
02DF 111300               LXI   D,RECLNB        ;
02E2 19                   DAD   D               ; Point to previous lower link
02E3 79                   MOV   A,C             ; Get current buffer number
02E4 F680                 ORI   TCHBIT          ; Set touching bit
02E6 77                   MOV   M,A             ; Set previous lower link
02E7 D1                   POP   D               ; Restore current buffer address
                   ;
                   ; NEED TO SET CORRECT PREVIOUS HORIZONTAL AND VERTICAL HOLDING BUFFERS
                   ;
02E8 79            CHBF17: MOV  A,C             ; Get current buffer number
02E9 320000     E         STA   PRHCBF          ; Save as previous horizontal buffer
02EC 3EFF                 MVI   A,NULL          ;
02EE 320000     E         STA   PRVCBF          ; Null previous vertical buffer number
02F1 EB                   XCHG                  ;
                   $EJECT
                   ;
                   ;IF ABORT RECOGNITION SET, PLACE REJECTED "?" IN REC BUFFER AND SEND TO
                   ;PAGE IMAGE
                   ;
02F2 36C0          CHBF40: MVI  M,0C0H          ; Set buffer status to iso hold
02F4 EB                   XCHG                  ;
02F5 210000     F         LXI   H,BFRLCT        ; Point to buffer counter
02F8 7E                   MOV   A,M             ; Get count
02F9 34                   INR   M               ; Increment counter
02FA 211700               LXI   H,RELNUM        ;
02FD 19                   DAD   D               ; Point to buffer count
02FE 77                   MOV   M,A             ; Save count
02FF 3A0000     E         LDA   PSCSFS          ; Get PSCSFS
0302 E680                 ANI   SEPSAB          ; Check for abort recognition
0304 3E03                 MVI   A,PASOOD        ;
0306 C8                   RZ                    ;Jump if not abort
0307 210000     E         LXI   H,PSCHCF        ; Point to awaiting flag
030A 7E                   MOV   A,M             ; Get flag
030B E67F                 ANI   NOT RECSWB      ; Set awaiting page image
030D F660                 ORI   RECSWP+RECERF   ; Set rec error
030F 77                   MOV   M,A             ; Save flag
0310 210800               LXI   H,RECLCH        ;
0313 19                   DAD   D               ;
0314 3E3F                 MVI   A,'?'           ;
0316 77                   MOV   M,A             ; Set low character = ?
0317 2C                   INR   L               ;
0318 36FF                 MVI   M,0FFH          ; Set low score = 0FFH
031A 2C                   INR   L               ;
```

```
LOC   OBJ            SOURCE STATEMENT

031B  77                     MOV    M,A           ; Set next char.= ?
031C  2C                     INR    L             ;
031D  36FF                   MVI    M,OFFH        ; Set separation = OFFH
031F  3E03                   MVI    A,PAS00D      ; Return status
0321  C9                     RET                  ; Buffer setup complete
                     ;
                     ;REMNANT PROCESSING
                     ;
                     CHBF20:
0322  79                     MOV    A,C           ; Set buffer number
0323  F680                   ORI    TCHBIT        ; Set touch bit
0325  320000     E           STA    PRVCBF        ; Save pointer
0328  211000                 LXI    H,RECLNL      ;
032B  19                     DAD    D             ; Point to left link
032C  3EFF                   MVI    A,NULL        ;
032E  77                     MOV    M,A           ; Clear left link
032F  2C                     INR    L             ;
0330  77                     MOV    M,A           ; Clear right link
0331  2C                     INR    L             ;
0332  77                     MOV    M,A           ; Set upper link to null
0333  2C                     INR    L             ;
0334  77                     MOV    M,A           ; Set lower link to null
0335  EB                     XCHG                 ; <HL> = current buffer address
0336  220000     E           SHLD   PRVCBF        ;
0339  C3F202     C           JMP    CHBF40        ; Continue processing
                     $EJECT
                     ;*********************
                     ;CENTRAL REGISTER CHARACTER INTO CHARACTER BUFFER AND ERASE FROM LINE BUFFER.
                     ;CHBFIP=>UPPER LEFT BYTE OF CHAR IN BUFFER;  CHBFOP=OUTPUT ADDRESS;
                     ;PSCHM1-4=MASKS FOR BYTES 1-4 OF EACH ROW;  PSCVSZ=CHAR SIZE;
                     ;OUTPUT: CHBFIP,CHBFOP UPDATED.
033C  3A0000     E   CHARES: LDA    PSCHM4        ;LOAD 4TH MASK
033F  B7                     ORA    A             ;CHECK FOR NULL MASK
0340  CA3804     C           JZ     NEWRES        ;JUMP IF CHAR FITS IN 3 BYTES
0343  0E00                   MVI    C,0           ;
0345  17                     RAL                  ;
0346  0C             SCOUNT: INR    C             ;
0347  17                     RAL                  ;
0348  DA4603     C           JC     SCOUNT        ;
034B  3EC3                   MVI    A,0C3H        ;BUILD TABLE JUMP INSTR IN RAM
034D  320000     E           STA    SHIFTX        ;TO MAKE INDEXED JUMP
0350  97                     SUB    A             ;RESET CARRY
0351  3A0000     E           LDA    PSCHSZ        ;GET HORIZONTAL CHAR SIZE
0354  3C                     INR    A             ;
0355  1F                     RAR                  ;GET 1/2 SIZE
0356  47                     MOV    B,A           ;
0357  3E0C                   MVI    A,CHBITW/2    ;SUBTRACT FROM MATRIX SIZE/2
0359  90                     SUB    B             ;TO GET LEFT PAD
035A  F25E03     C           JP     CHAR00        ;IF POS, ADD LEFT PAD
035D  AF                     XRA    A             ;ELSE NO PAD
035E  47             CHAR00: MOV    B,A           ;
035F  3A0000     E           LDA    PSCHBC        ;GET INITIAL LEFT EDGE BIT DISP
0362  90                     SUB    B             ;SUBTRACT REQUIRED LEFT PAD
                                                  ;<A> = REQUIRED PHYSICAL SHIFT
```

```
LOC  OBJ            LINE      SOURCE STATEMENT

0363 CA6B04    C              JZ     NOSHFT          ;JUMP IF NO SHIFT REQUIRED
0366 91                       SUB    C               ;
0367 FC0000    E              CM     CRASH           ;
036A 2A0CE0                   LHLD   CURCBP          ;
036D 111B00                   LXI    D,RECCTR        ;
0370 19                       DAD    D               ;
0371 77                       MOV    M,A             ;SAVE CENTER COUNT
0372 79                       MOV    A,C             ;GET REQUIRED SHIFT
0373 21D403    C              LXI    H,LSTBLE        ;POINT TO LEFT TABLE
0376 B7                       ORA    A               ;CLEAR CARRY
0377 17                       RAL                    ;
0378 5F                       MOV    E,A             ;
0379 1600                     MVI    D,0             ;<DE> = OFFSET INTO TABLE
037B 19                       DAD    D               ;INDEX INTO TABLE
037C 5E                       MOV    E,M             ;
037D 23                       INX    H               ;
037E 56                       MOV    D,M             ;
037F EB                       XCHG                   ;<HL> = TABLE ENTRY ADDRESS
                    $EJECT
                    ;
0380 220100    E    CHAR04:   SHLD   SHIFTK+1        ;
0383 2A0200    D              LHLD   CHBFIP          ;GET INPUT POINTER
0386 3A2EE0                   LDA    VBSIZE          ;ADD BUFFER SIZE TO BUFFER ORIGIN
0389 C6E3                     ADI    HIGH SYSBUF     ;TO GET BUFFER END
038B 94                       SUB    H               ;SUB CHAR TOP TO GET ROWS REMAINING
038C 47                       MOV    B,A             ;
038D 3A0000    E              LDA    PSCVSZ          ;GET VERT CHAR SIZE
0390 B8                       CMP    B               ;FITS IN ONE SEGMENT?
0391 FAA303    C              JM     SEGRES          ;YES, REGISTER ONE SEGMENT
0394 CAA303    C              JZ     SEGRES          ;
0397 90                       SUB    B               ;NO, OVERFLOWS INTO SEG TWO
0398 F5                       PUSH   PSW             ;SAVE OVERFLOW COUNT
0399 78                       MOV    A,B             ;USE SEG ONE SIZE
039A CDA303    C              CALL   SEGRES          ;REGISTER FIRST SEGMENT
039D 3EE3                     MVI    A,HIGH SYSBUF   ;WRAP BUFFER POINTER
039F 320300    D              STA    CHBFIP+1        ;
03A2 F1                       POP    PSW             ;RESTORE SEGMENT TWO COUNT

                    $EJECT
                    ;********************
                    ;REGISTER ONE LINE SEGMENT.  INPUT: ACC=COUNT OF ROWS TO REGISTER AND TRANSFER
                    ;FOR EACH ROW, LOAD 4 BYTES, MASK EDGES, NULL OUT CHAR IN BUFFER, REGISTER,
                    ;AND STORE
03A3 320100    D    SEGRES:   STA    CHBFRC          ;SAVE COUNT
03A6 2A0200    D    SEGRL1:   LHLD   CHBFIP          ;=>FIRST BYTE THIS CHAR ROW
03A9 3A0000    E              LDA    PSCHM1          ;GET FIRST MASK
03AC 2F                       CMA                    ;COMPLEMENT
03AD 56                       MOV    D,M             ;GET DATA BYTE
03AE A2                       ANA    D               ;MAKE RETAINED DATA
03AF 77                       MOV    M,A             ;STORE
03B0 AA                       XRA    D               ;MAKE MASKED DATA
03B1 57                       MOV    D,A             ;SAVE
03B2 2C                       INR    L               ;=>NEXT DATA BYTE
03B3 3A0000    E              LDA    PSCHM2          ;
03B6 2F                       CMA                    ;
```

```
LOC  OBJ         LINE        SOURCE STATEMENT

03B7 5E          1853         MOV    E,M           ;
03B8 A3          1854         ANA    E             ;
03B9 77          1855         MOV    M,A           ;
03BA AB          1856         XRA    E             ;
03BB 5F          1857         MOV    E,A           ;
03BC 2C          1858         INR    L             ;
03BD 3A0000    E 1859         LDA    PSCH33        ;
03C0 2F          1860         CMA                  ;
03C1 46          1861         MOV    B,M           ;
03C2 A0          1862         ANA    B             ;
03C3 77          1863         MOV    M,A           ;
03C4 A8          1864         XRA    B             ;
03C5 47          1865         MOV    B,A           ;
03C6 2C          1866         INR    L             ;
03C7 3A0000    E 1867         LDA    PSCH34        ;
03CA 2F          1868         CMA                  ;
03CB 4E          1869         MOV    C,M           ;
03CC A1          1870         ANA    C             ;
03CD 77          1871         MOV    M,A           ;
03CE A9          1872         XRA    C             ;
03CF 6F          1873         MOV    L,A           ;
03D0 60          1874         MOV    H,B           ;D,E,H,L=4 BYTE SHIFT REGISTER
03D1 C30000    E 1875         JMP    SHIFTX        ;INDIRECT INTO SHIFT TABLE
03D4 1F04      C 1876 LSTBLE: DW     SCONT         ;
03D6 1404      C 1877         DW     SLEFT1        ;
03D8 0C04      C 1878         DW     SLEFT2        ;
03DA 0404      C 1879         DW     SLEFT3        ;
03DC FC03      C 1880         DW     SLEFT4        ;
03DE F403      C 1881         DW     SLEFT5        ;
03E0 EC03      C 1882         DW     SLEFT6        ;
03E2 E403      C 1883         DW     SLEFT7        ;
                 1884 $EJECT
                 1885 ;*********************
                 1886 ;SHIFT 4 BYTE FIELD LEFT AND STORE RESULTING 3 BYTE CHAR MATRIX ROW
03E4 EB          1887 SLEFT7: XCHG                 ;
03E5 29          1888         DAD    H             ;
03E6 EB          1889         XCHG                 ;
03E7 29          1890         DAD    H             ;
03E8 D2EC03    C 1891         JNC    SLEFT6        ;
03EB 13          1892         INX    D             ;
03EC EB          1893 SLEFT6: XCHG                 ;
03ED 29          1894         DAD    H             ;
03EE EB          1895         XCHG                 ;
03EF 29          1896         DAD    H             ;
03F0 D2F403    C 1897         JNC    SLEFT5        ;
03F3 13          1898         INX    D             ;
03F4 EB          1899 SLEFT5: XCHG                 ;
03F5 29          1900         DAD    H             ;
03F6 EB          1901         XCHG                 ;
03F7 29          1902         DAD    H             ;
03F8 D2FC03    C 1903         JNC    SLEFT4        ;
03FB 13          1904         INX    D             ;
03FC EB          1905 SLEFT4: XCHG                 ;
03FD 29          1906         DAD    H             ;
03FE EB          1907         XCHG                 ;
```

```
LOC  OBJ                 SOURCE STATEMENT

03FF 29                           DAD     E                ;
0400 D20404    C                  JNC     SLEFT3           ;
0403 13                           INX     D                ;
0404 EB              SLEFT3:      XCHG                     ;
0405 29                           DAD     H                ;
0406 EB                           XCHG                     ;
0407 29                           DAD     H                ;
0408 D20C04    C                  JNC     SLEFT2           ;
040B 13                           INX     D                ;
040C EB              SLEFT2:      XCHG                     ;
040D 29                           DAD     H                ;
040E EB                           XCHG                     ;
040F 29                           DAD     H                ;
0410 D21404    C                  JNC     SLEFT1           ;
0413 13                           INX     D                ;
0414 EB              SLEFT1:      XCHG                     ;
0415 29                           DAD     H                ;
0416 EB                           XCHG                     ;
0417 29                           DAD     H                ;
0418 D21F04    C                  JNC     SCONT            ;
041B 13                           INX     D                ;
041C C31F04    C                  JMP     SCONT            ;

                     $EJECT
041F 44              SCONT:       MOV     B,H              ;STORE THREE OUTPUT BYTES
0420 2A0400    D                  LHLD    CHBFOP           ;GET OUTPUT CHARACTER BUFFER POINTER
0423 72                           MOV     M,D              ;
0424 2C                           INR     L                ;
0425 73                           MOV     M,E              ;
0426 2C                           INR     L                ;
0427 70                           MOV     M,B              ;
0428 2C                           INR     L                ;UPDATE AND SAVE OUTPUT CHARACTER
0429 220400    D                  SHLD    CHBFOP           ;BUFFER POINTER
042C 210300    D     SESR02:      LXI     H,CHBFIP+1       ;BUMP BUFFER ROW POINTER
042F 34                           INR     M                ;
0430 210100    D                  LXI     H,CHBFRC         ;DECREMENT ROW COUNT
0433 35                           DCR     M                ;DONE?
0434 C2A603    C                  JNZ     SESRL1           ;NO, SHIFT NEXT ROW
0437 C9                           RET                      ;YES, RETURN
                     $EJECT
                     ;
                     ;NEW CHARACTER TRANSFER - NO HORIZONTAL CENTER
                     ;
                     NEWREG:;LXI  H,$3CTR              ;*DBG

                     ;INR          M                ;*DBG
                     ;JNZ          XXXXX1           ;*DBG
                     ;INX          L                ;*DBG
                     ;INR          H                ;*DBG

0438 B7                           ORA     A                ;RESET CARRY
0439 3A0000    E                  LDA     PCCHSZ           ;GET HORIZONTAL CHAR SIZE
043C 3C                           INR     A                ;
043D 1F                           RAR                      ;GET 1/2 SIZE
043E 47                           MOV     B,A              ;
```

```
LOC   OBJ          LINE          SOURCE STATEMENT

043F  3E0C         1963           MVI    A,CHBITW/2        ;SUBTRACT FROM MATRIX SIZE/2
0441  90           1964           SUB    B                 ;TO GET LEFT PAD
0442  F24604   C   1965           JP     NEWRGO            ;IF POS, ADD LEFT PAD
0445  AF           1966           XRA    A                 ;ELSE NO PAD
0446  47           1967  NLWRGO:  MOV    L,A               ;
0447  3A0000   E   1968           LDA    PSCHPC            ;GET INITIAL LEFT EDGE BIT DISP
044A  90           1969           SUB    B                 ;SUBTRACT REQUIRED LEFT PAD
                   1970                                    ;<A> = REQUIRED PHYSICAL SHIFT
044B  F26B04   C   1971           JP     NOSHFT            ;JUMP IF NOT RIGHT SHIFT
044E  FEF9         1972           CPI    0F9H              ;CHECK FOR MORE THAN 7 REQUIRED
0450  D26B04   C   1973           JNC    NOSHFT            ;
0453  C608         1974           ADI    8                 ;
0455  2A0000   E   1975           LHLD   PSCHM1            ;LOAD MASKS
0458  54           1976           MOV    D,H               ;
0459  65           1977           MOV    H,L               ;
045A  2E00         1978           MVI    L,0               ;SHIFT RIGHT BY 8 BITS
045C  220000   E   1979           SHLD   PSCHM1            ;
045F  2A0000   E   1980           LHLD   PSCHM3            ;
0462  65           1981           MOV    H,L               ;
0463  6A           1982           MOV    L,D               ;SHIFT RIGHT BY 8 BITS
0464  220000   E   1983           SHLD   PSCHM3            ;
0467  210200   D   1984           LXI    H,CHBFIP          ;ADJUST ORIGIN ADDRESS
046A  35           1985           DCR    M                 ;
046B  2A0CE0       1986  NOSHFT:  LHLD   CURCBP            ;POINT TO CURRENT BUFFER
046E  111B00       1987           LXI    D,RECCTR          ;
0471  19           1988           DAD    D                 ;POINT TO CENTERING FLAG
0472  E67F         1989           ANI    7FH               ;CLEAR LOCKOUT BIT
0474  77           1990           MOV    M,A               ;SAVE REQUIRED SHIFT
                   1991
                   1992
                   1993
                   1994
0475  2A0000   E   1995           LHLD   PSCHM1            ;
0478  7D           1996           MOV    A,L               ;
0479  2F           1997           CMA                      ;
047A  5F           1998           MOV    E,A               ;<E> = NOT MASK1
047B  7C           1999           MOV    A,H               ;
047C  2F           2000           CMA                      ;
047D  57           2001           MOV    D,A               ;<D> = NOT MASK2
047E  2A0200   D   2002           LHLD   CHBFIP            ;GET INPUT POINTER
0481  3A2EE0       2003           LDA    VBSIZE            ;ADD BUFFER SIZE TO BUFFER ORIGIN
0484  C6E3         2004           ADI    HIGH SYSBUF       ;TO GET BUFFER END
0486  94           2005           SUB    H                 ;SUB CHAR TOP TO GET ROWS REMAINING
0487  47           2006           MOV    B,A               ;
0488  3A0000   E   2007           LDA    PSCVSZ            ;GET VERT CHAR SIZE
048B  320100   D   2008           STA    CHBFRC            ;SAVE COUNT
048E  B8           2009           CMP    B                 ;FITS IN ONE SEGMENT?
048F  FAAB04   C   2010           JM     NEWCPY            ;YES, REGISTER ONE SEGMENT
0492  CAAB04   C   2011           JZ     NEWCPY            ;
0495  90           2012           SUB    B                 ;NO, OVERFLOWS INTO SEG TWO
0496  322000   D   2013           STA    TEMP1             ;SAVE OVERFLOW COUNT
0499  78           2014           MOV    A,B               ;USE SEG ONE SIZE
049A  320100   D   2015           STA    CHBFRC            ;
049D  CDAB04   C   2016           CALL   NEWCPY            ;REGISTER FIRST SEGMENT
```

```
LOC  OBJ          LINE        SOURCE STATEMENT

04A0 3E83          2017         MVI    A,HIGH SYSBUF      ;WRAP BUFFER POINTER
04A2 320300    D   2018         STA    CHBFIP+1           ;
04A5 3A2000    D   2019         LDA    TEMP1              ;RESTORE SEGMENT TWO COUNT
04A8 320100    D   2020         STA    CHBFBC             ;
                   2021
04AB 2A0200    D   2022 NEWCPY: LHLD   CHBFIP             ;
04AE 7B            2023         MOV    A,E                ;GET FIRST MASK
04AF 46            2024         MOV    B,M                ;GET DATA BYTE
04B0 A0            2025         ANA    B                  ;MAKE RETAINED DATA
04B1 77            2026         MOV    M,A                ;STORE
04B2 A8            2027         XRA    B                  ;MAKE MASKED DATA
04B3 47            2028         MOV    B,A                ;<B> = LEFT BYTE
04B4 2C            2029         INR    L                  ;=>NEXT DATA BYTE
04B5 7A            2030         MOV    A,D                ;
04B6 4E            2031         MOV    C,M                ;
04B7 A1            2032         ANA    C                  ;
04B8 77            2033         MOV    M,A                ;
04B9 A9            2034         XRA    C                  ;
04BA 4F            2035         MOV    C,A                ;<C> = CENTER BYTE
04BB C5            2036         PUSH   B                  ;
04BC 2C            2037         INR    L                  ;
04BD 3A0000    E   2038         LDA    PSCHM3             ;
04C0 2F            2039         CMA                       ;
04C1 46            2040         MOV    B,M                ;
04C2 A0            2041         ANA    B                  ;
04C3 77            2042         MOV    M,A                ;
04C4 A8            2043         XRA    B                  ;<A> = RIGHT BYTE
04C5 C1            2044         POP    B                  ;
04C6 2A0400    D   2045         LHLD   CHBFOP             ;POINT TO OUTPUT BUFFER
04C9 70            2046         MOV    M,B                ;LOAD LEFT BYTE
04CA 2C            2047         INR    L                  ;
04CB 71            2048         MOV    M,C                ;LOAD CENTER BYTE
04CC 2C            2049         INR    L                  ;
04CD 77            2050         MOV    M,A                ;LOAD RIGHT BYTE
04CE 2C            2051         INR    L                  ;
04CF 220400    D   2052         SHLD   CHBFOP             ;
04D2 210300    D   2053         LXI    H,CHBFIP+1         ;
04D5 34            2054         INR    M                  ;POINT TO NEXT ROW
04D6 210100    D   2055         LXI    H,CHBFBC           ;
04D9 35            2056         DCR    M                  ;
04DA C2AB04    C   2057         JNZ    NEWCPY             ;
04DD C9            2058         RET                       ;
                   2059 $EJECT
```

```
LOC  OBJ            SOURCE STATEMENT

                   ;
                   ;  ADDBUF WILL CONVERT A BUFFER ADDRESS TO A BUFFER NUMBER
                   ; THE H AND D REGISTER PAIRS ARE USED. IT EXPECTS H => DESIRED
                   ; ADDRESS TO CONVERT, AND WILL RETURN THE NUMBER IN H

04EE 11001A         ADDBUF: LXI     D,0-SYSCHB          ;GET START OF BUFFER
04F1 19                     DAD     D                   ;ADD TO IT BUFFER ADDRESS
04F2 29                     DAD     H                   ;DOUBLE TO GET BUFFER NUMBER
04F3 C9                     RET

                   ;AAAAAAAAAAAAAAAAAAAAAAAAAAAAAAAAAAAAAAAAAAAAAAAAAAAAA
                   ; ROUTINE TO UPDATE FREE BUFFER POINTER
                   ;        alled 11-15-84 AL
                   ;
                   ;AAAAAAAAAAAAAAAAAAAAAAAAAAAAAAAAAAAAAAAAAAAAAAAAAAAAA

04F4 2A0CE0         ALBUF2: LHLD    CURCBP              ; GET LAST BUFFER USED, INIT TO E680
04F7 118000                 LXI     D,80H               ;
04FA 19                     DAD     D                   ;
04FB 7C                     MOV     A,H
04FC FEFE                   CPI     HIGH SYSCHE         ; FF-1=EF80
04FE C2F404    C            JNZ     ALBUD1              ; WAS NOT SO JUST GO TO NEXT BUFFER
04F1 2100E7                 LXI     H,SYSCHB+100H       ; WAS THE SAME SO START AT THE BEGINING
04F4 220CE0         ALBUD1: SHLD    CURCBP              ;
04F7 2A0CE0         STATCK: LHLD    CURCBP              ;
04FA 7E                     MOV     A,M
04FB B7                     ORA     A
04FC C20305    C            JNZ     ALBUD2              ; = STATUS FOR FREE BUFFER
04FF 220CE0                 SHLD    CURCBP              ;
0502 C9                     RET                         ;
                    ALBUD2: IF DEBUG                    ;SET AWAITING RECOGNITION
0503 3E08                   MVI     A,VSWREC            ;
0505 3247E0                 STA     VIDRUN              ;
                            ENDIF                       ;
                   ;
                   ;CHECK FOR BUFFERS NEEDING CENTERING
                   ;
0506 062E                   MVI     B,SYSCHC-2          ; Get total number of buffers
050A 2A0CE0                 LHLD    CURCBP              ;
050D 1180FF         ALBUD3: LXI     D,-80H              ;
0510 19                     DAD     D                   ; Point to previous buffer
0511 7C                     MOV     A,H                 ;
0512 FEE6                   CPI     HIGH SYSCHB         ; Check for wrap around
0514 C21A05    C            JNZ     ALBUD4              ; Jump if no wrap around
0517 2180FD                 LXI     H,SYSCHE-80H        ; Point to last buffer
051A 7E             ALBUD4: MOV     A,M                 ; Get status
051B E6C0                   ANI     0C0H                ; Clear other bits
051D FE80                   CPI     80H                 ; Check for awaiting rec
051F CA2E05    C            JZ      FOUND1              ; Jump if awaiting rec
0522 FEC0                   CPI     0C0H                ; Check for iso done
0524 CA2E05    C            JZ      FOUND1              ; Jump if found
0527 05             ALBUD5: DCR     B                   ; Decrement buffer count
0528 C20D05    C            JNZ     ALBUD3              ; Continue search
052B C36505    C            JMP     ALDONE              ; Continue idle loop
                   ;
```

```
LOC  OBJ         LINE        SOURCE STATEMENT

                 2115 ;CHECK IF BUFFER IS AWAITING CENTERING
                 2116 ;
                 2117 FOUND1:
052E AF          2118          XRA     A              ;
052F 324FE0      2119          STA     LKVCBC         ; Unlock system
0532 FB          2120          EI                     ; Re-enable interrupts
0533 00          2121          NOP                    ; Give video a chance to interrupt
0534 00          2122          NOP                    ;
0535 F3          2123          DI                     ; Disable interrupts
0536 3C          2124          INR     A              ;
0537 324FE0      2125          STA     LKVCBC         ; Try to enter system
053A 3A4EE0      2126          LDA     LKSCBC         ; Get other flag
053D B7          2127          ORA     A              ; Check for previous lock
053E C22E05   C  2128          JNZ     FOUND1         ; Already locked - try again
0541 EB          2129          XCHG                   ; Save buffer address in <DE>
0542 211B00      2130          LXI     H,RECCTR       ; Get to centering flag
0545 19          2131          DAD     D              ;
0546 7E          2132          MOV     A,M            ; Get centering flag
0547 B7          2133          ORA     A              ; Check for awaiting centering
0548 C25305   C  2134          JNZ     FOUND2         ; Jump if non-zero
054B EB          2135          XCHG                   ; Put buffer address back in <HL>
054C 324FE0      2136          STA     LKVCBC         ; Unlock system
054F FB          2137          EI                     ;
0550 C32705   C  2138          JMP     ALB005         ; If not awaiting, continue search
0553 4F          2139 FOUND2:  MOV     C,A            ;
0554 E680        2140          ANI     80H            ; Check lock-out flag
0556 C26505   C  2141          JNZ     ALCONT         ; Locked out - don't do any centering
0559 79          2142          MOV     A,C            ; Get byte
055A F680        2143          ORI     80H            ;
055C 77          2144          MOV     M,A            ; Set buffer lockout bit
055D AF          2145          XRA     A              ;
055E 324FE0      2146          STA     LKVCBC         ; Unlock system
0561 FB          2147          EI                     ; Enable interrupts
0562 CD0000   E  2148          CALL    HCENTR         ; Center buffer
                 2149 ;
                 2150 ;CONTINUE IDLE LOOP
                 2151 ;
0565 AF          2152 ALCONT:  XRA     A              ;
0566 324FE0      2153          STA     LKVCBC         ; Unlock system
0569 FB          2154          EI                     ;
056A CD0000   E  2155          CALL    ISOPFB         ;CALL PAGE IMAGE PROCESSOR TO FREE BUFFER
056D 3A49E0      2156          LDA     PAGACT+1       ;512+ PAGE ACTIVE COUNTS
0570 D603        2157          SUI     3              ;  768 FOR 212,222
0572 FAF704   C  2158          JM      STATCK         ;NO, CONTINUE CHECKING IDLE STATUS
0575 2A2CE0      2159          LHLD    VBLORG         ;PAGE ACTIVE TIME EXCEEDS 8 SECS/INCH ?
0578 CD0000   E  2160          CALL    DIVBY4         ;
057B 44          2161          MOV     B,H            ;
057C 4D          2162          MOV     C,L            ;
057D 2A46E0      2163          LHLD    PAGACT         ;
0580 CD0000   E  2164          CALL    DSJB           ;
0583 F2F704   C  2165          JP      STATCK         ;NO, CONTINUE
                 2166 ;
                 2167 ;UNREADABLE PAGE TIMEOUT OCCURRED.  TEST STATUS AND ISSUE MESSAGE
                 2168 ;IF APPLICABLE.
                 2169 ;
```

```
LOC  OBJ                SOURCE STATEMENT

05B6 0680                       MVI     B,OPTEST           ;TEST OPTION SWITCHES
05B8 CD0000    E                CALL    OPTION             ;
05BB CAF704    C                JZ      STATCK             ;DON'T PROCESS TIMEOUT IF IN TEST MODE
05BE 010000                     LXI     B,0                ;ELSE SIGNAL TIMEOUT
05C1 111CE0                     LXI     D,TIMER1           ;
05C4 CD0000    E                CALL    TIMOUT
05C7 01B320                     LXI     B,MESUBP*255+MCIBEP+MCTRCC
05CA CD0000    E                CALL    ERRMES             ;FLASH MESSAGE AND BEEP
05CD 3E03                       MVI     A,ESCEPU           ;
05CF CAF704    C                JZ      STATCK             ;CONTINUE IF READ PRESSED
05D2 C9                         RET                        ;RETURN NON ZERO STATUS IN CLEAR PRESSED

                        ;AAAAAAAAAAAAAAAAAAAAAAAAAAAAAAAAAAAAAAAAAAAAAAAAAAAAAAAAAAAA
                        ;
                        ;
                        ;ALLBUF WILL ALLOCATE A CHARACTER BUFFER, RETURNING THE ADDRESS IN
                        ; THE H-L PAIR.
                        ;
                        ;LLBUF: MVI C,RECSER              ;SEARCH FOR FREE CHARACTER BUFFER
                        ;       LHLD CURCBP               ;STARTING AFTER LAST BUFFER USED
                        ;       CALL CHBSCH               ;SEARCH FOR AN IDLE BUFFER
                        ;       JZ      ALLB10              ;FOUND ONE
                        ;
                        ;IF DEBUG              ;
                        ;       MVI A,VSWREC              ;SET AWAITING RECOGNITION
                        ;       STA VIDRUN                ;
                        ;       ENDIF                     ;
                        ;       CALL ISOPFB               ;CALL PAGE IMAGE PROCESSOR TO FREE BUFFER
                        ;LDA     PAGACT+1        ;512+ PAGE ACTIVE COUNTS
                        ;
                        ;AAAAAAAAAAAAAAAAAAAAAAAAAAA
                        ; to change timeout length for 213 from 60 to 90 secs
                        ;
                        ;       IF      X3
                        ;SUI    3               ;  768 FOR 212,222
                        ;       ELSE
                        ;       SUI     2                  ;
                        ;
                        ;AAAAAAAAAAAAAAAAA
                        ;       ENDIF
                        ;JM     ALLBUF          ;NO, CONTINUE
                        ;LHLD   VBLONG          ;PAGE ACTIVE TIME EXCEEDS 8 SECS/INCH ?
                        ;CALL   DIVBY4          ;
                        ;MOV    B,H             ;
                        ;MOV    C,L             ;
                        ;LHLD   PAGACT          ;
                        ;CALL   DSUB            ;
                        ;JP     ALLBUF          ;NO, CONTINUE
                        ;
                        ;UNREADABLE PAGE TIMEOUT OCCURRED.  TEST STATUS AND ISSUE MESSAGE
                        ;IF APPLICABLE.
                        ;
                        ;MVI    B,OPTEST        ;TEST OPTION SWITCHES
                        ;CALL   OPTION          ;
```

```
LOC  OBJ       LINE        SOURCE STATEMENT

;JZ         ALLBUF                    ;DON'T PROCESS TIMEOUT IF IN TEST MODE
;LXI        B,0                       ;ELSE SIGNAL TIMEOUT
;LXI        D,TIMER1                  ;
;CALL       TIMOUT                    ;
;LXI        B,MESDRP*256+MCTBEP+MCTRCC
;CALL       ERRMES                    ;FLASH MESSAGE AND BEEP
;MVI        A,ESCEPJ                  ;
;JZ         ALLBUF                    ;CONTINUE IF READ PRESSED
;XRA        A                         ;ABORT PAGE IF CLEAR PRESSED
;RET                                  ;
;LLB10:  SHLD      CURCBP                  ;SAVE NEW BUFFER ADDRESS
;LDA        PRHCBP+1                  ;WAS IT THE SAME AS LAST ?
;CMP        H                         ;
;JNZ        ALLB20                    ;NO, BUT SEE IF IT WAS THE SAME AS PREVIOUS
;LDA        PRHCBP                    ;
;CMP        L                         ;
;JZ         ALLBUF                    ;
;LLB20:  LHLD      PRHCBP                  ;CHECK IF IT'S THE SAME
;LXI        B,RECLNL                  ; AS THE LAST BUFFER
;DAD        B                         ;
;MOV        A,M                       ;
;ANI        03FH                      ;SEP PAST FLAGS
;CALL       BUFADD                    ;CONVERT TO AN ADDRESS
;XCHG                                 ;
;LHLD       CURCBP                    ;
;MOV        A,D                       ;
;CMP        H                         ;
;RNZ                                  ;NOT THE SAME, RETURN
;MOV        A,E                       ;CHECK THE OTHER HALF
;CMP        L                         ;
;RNZ                                  ;NOT THE SAME, RETURN
;JMP        ALLBUF                    ;SAME, FIND ANOTHER ONE
$EJECT

;  FREBUF WILL SEE IF THE BUFFER POINTED TO BY HL CAN BE SENT TO RECOGNITION
;  IF IT CAN, IT WILL CHANGE THE STATUS OF THE BUFFER TO AWAITING RECOGNITION

;FREBUF:          DI                  ;DON'T WANT ANY SURPRISES WHILE RELEASING
                                      ;  A VERTICALLY LINKED PAIR
;           LDA       PRHCBP          ;
;           INR       A               ;WAS IT THE LAST CHARACTER OF A WORD ?
;           JZ        FREB30          ;YES, ALREADY FREED
;           LHLD      PRHCBP          ;NO, FREE IT
;           MOV       A,M             ;GET STATUS
;           CPI       0C0H            ;
;           JNZ       FREB10          ;STATUS ISN'T A VALID ONE, DON'T RELEASE
;           MVI       M,RECSWH        ;FREE IT TO RECOGNITION
;FREB10:              LXI       B,RECLNU    ;IS THERE AN UPPER BUFFER TO FREE ?
;           DAD       B               ;
;           MOV       A,M             ;
;           CPI       0FFH            ;
;           JZ        FREB30          ;RESET THEM
;           ANI       03FH            ;STRIP OFF TO VERTICAL ADDRESS
;           PUSH      D               ;
```

```
LOC  OBJ            SOURCE STATEMENT

                  ;          CALL    BUFADD         ;CONVERT TO A BUFFER ADDRESS
                  ;          MOV     A,M
                  ;          CPI     050H           ;IS IT AWAITING ?
                  ;          JNZ     FREB20         ;
                  ;          MVI     M,RECSWR       ;
                  ;FREB20:           POP     D
                  ;FREB30:           EI
                  ;          LHLD    CURCBP
                  ;          SHLD    PRHCBP         ;AND UPDATE PREVIOUS HORIZONTAL
                  ;          RET                    ;
                  ;                                 ;

                  ;AAAAAAAAAAAAAAAAAAAAAAAAAAAAAAAAAAAAAAAAAAAAAAAAAAAAAAAAAAAA
                  ; ADDED 8-12-84 TO RELEASE WORDS VS. CHARS TO REC :AL
                  ;          changes 12-1 when all char buffers are in order
                  ;
05A3 3A1D00    D  QLOAD:     LDA     QCOUNT
05A6 210700    D             LXI     H,VREMCP       ; IF TOTAL IS 26 WILL MAKE ROOM FOR 2
05A9 86                      ADD     M              ; ADDITIONAL CHAR BUFFERS SO VER REMNANTS
05AA FE19                    CPI     25             ; WONT BE SPLIT BETWEEN WORDS
05AC FAB505    C             JM      QLOAD2         ; NO, SO LOAD NEXT BUFFER ONTO Q
05AF CD4C05    C             CALL    RELEAS         ; YES, SO RELEASE A BUFFER TO REC
05B2 C3A305    C             JMP     QLOAD          ; LOOP IF NECESSARY TILL ENOUGH SPACE
05B5 3A0000    E  QLOAD2:    LDA     PRVFLG         ; SEE IF ON SAME WORD
05B8 47                      MOV     B,A
05B9 3A0000    E             LDA     WDFLAG         ;
05BC B8                      CMP     B
05BD CAE605    C             JZ      ADDCNT         ; SAME WORD SO DO NOTHING
05C0 FE01                    CPI     1              ;  ON FIRST WORD?
05C2 2A0000    E             LHLD    CURCBP         ; GET CURRENT CHAR BUFFER
05C5 C2CE05    C             JNZ     SECWRD         ; NO, TRY SECOND WORD
05C8 221700    D             SHLD    Q1STRT         ; SAVE START OF FIRST WORD
05CB C3E605    C             JMP     ADDCNT         ; INCREMENT COUNT OF BUFFERS
05CE FE02         SECWRD:    CPI     2              ; ON SECOND WORD?
05D0 C2DE05    C             JNZ     THRWRD         ; NO, TRY THIRD WORD
05D3 221900    D             SHLD    Q2STRT         ; YES, SO SAVE START OF SECOND WORD
05D6 CDEB05    C             CALL    DECBOH         ; SET END OF FIRST WORD TO PREV CHAR BUF
05D9 3601                    MVI     M,001H         ; FLAG CHAR BUF AS LAST ONE IN WORD
05DB C3E605    C             JMP     ADDCNT;
05DE 221B00    D  THRWRD:    SHLD    Q3STRT         ; MUST BE THIRD WORD
05E1 CDEB05    C             CALL    DECBOH         ; SET PREV BUFFER TO END SECOND WORD
05E4 3601                    MVI     M,001H
05E6 211D00    D  ADDCNT:    LXI     H,QCOUNT
05E9 34                      INR     M              ; COUNTING WORDS SO KNOW WHEN OVERLAPPING
05EA C9                      RET

                  $EJECT
```

```
LOC  OBJ             SOURCE STATEMENT

05EB 1160FF          DECBOH: LXI   D,-BOH        ; DECREMENT TO LAST BUFFER WITH CO STATUS
05EE 19                      DAD   D
05EF 46                      MOV   B,M           ; GET STATUS OF BUFFER
05F0 7C                      MOV   A,H           ; SEE IF FALLING OFF BEGINNING OF BUFFERS
05F1 FE06                    CPI   HIGH SYSCHB   ; E6
05F3 CA0006    C             JZ    DECB1H        ; WAS WRAPPING
05F6 78                      MOV   A,B
05F7 FEC0                    CPI   0C0H          ; CHECK STATUS
05F9 C8                      RZ
05FA FEC1                    CPI   0C1H          ; MAY ALREADY BE THE END
05FC C8                      RZ
05FD C3EB05    C             JMP   DECBOH        ; WASN'T A GOOD STATUS ( MESSAGE)
0600 2100FE          DECB1H: LXI   H,SYSCHE      ; SET IT TO END OF CHAR BUF LIST
0603 C3EB05    C             JMP   DECBOH

                     SEJECT

                     ; FREEWD WILL SEE IF THE BUFFERS POINTED TO BY THE D CAN BE SENT TO RECOGNITION
                     ;   IF IT CAN, IT WILL CHANGE THE STATUS OF THE BUFFERS TO AWAITING RECOGNITION

0606 F3              FREEWD: DI                  ;DON'T WANT ANY SURPRISES WHILE RELEASING
0607 3A1D00    D             LDA   CCOUNT        ; GET BUFFER COUNT
060A 47                      MOV   B,A
060B 2A1700    D             LHLD  O1STRT
060E 7E              FREEW1: MOV   A,M           ;GET STATUS
060F FEC0                    CPI   0C0H
0611 CA1906    C             JZ    FREEW2        ;
                                                 ; IS A GOOD BUFFER
0614 FEC1                    CPI   0C1H          ; IS IT THE END OF A WORD?
0616 C23106    C             JNZ   SKIP          ;STATUS ISN'T A VALID ONE, DONT ALTER STATUS
0619 EB              FREEW2: XCHG
061A 211900                  LXI   H,RECIPF
061D 19                      DAD   D             ; DE STILL HAS BUFFER ADDRESS
061E 3A0000    E             LDA   CONPIT        ; LOAD IN PITCH INFO
0621 77                      MOV   M,A
0622 05                      DCR   B             ; DECREMENT BUFFER COUNTER
0623 EB                      XCHG                ; BUFFER ADDRESS BACK IN HL
0624 7E                      MOV   A,M           ; GET STATUS AGAIN
0625 3660                    MVI   M,RFCSWR      ;FREE IT TO RECOGNITION
0627 FEC1                    CPI   0C1H          ; END OF A WORD?
0629 CA3706    C             JZ    DONEFR        ; YES SO DONE FREEING THE WORD
062C 78                      MOV   A,B
062D B7                      ORA   A             ; SEE IF DONE WITH BUFFER COUNT
062E CA3706    C             JZ    DONEFR        ; YES, NO MORE BUFFERS TO FREE
0631 CD4005    C     SKIP:   CALL  ADDBOH        ; NO, SO GET NEXT BUFFER
0634 C30E05    C             JMP   FREEW1        ; AND REPEAT
0637 78              DONEFR: MOV   A,B
0638 321D00    D             STA   CCOUNT        ; STORE REMAINING COUNT
063B FB                      EI
063C CD0000    E             CALL  ISOREC
063F C9                      RET

0640 118000          ADDBOH: LXI   D,BOH
```

```
LOC  OBJ          LINE        SOURCE STATEMENT

0643 19           2381        DAD    D
0644 7C           2382        MOV    A,H
0645 FEFE         2383        CPI    HIGH SYSCIE       ; SEE IF GOING OFF END OFF BUFFERS
0647 C0           2384        RNZ                      ; NO, SO RETURN WITH UPDATED BUFFER
0648 2100E7       2385        LXI    H,SYSCHB+100H     ;YES, SO SET IT TO START OF BUFFERS
064B C9           2386        RET
                  2387
                  2388 $EJECT
                  2389
064C F3           2390 RELEAS: DI                      ;DON'T WANT ANY SURPRISES WHILE RELEASING
                  2391                                 ;  A VERTICALLY LINKED PAIR
064D 3A1D00    D  2392        LDA    QCOUNT
0650 47           2393        MOV    B,A
0651 2A1700    D  2394        LHLD   Q1STRT            ;GET POINTER TO FIRST BUFFER IN WORD
0654 7E           2395 RELO1: MOV    A,M               ;GET STATUS
0655 FEC0         2396        CPI    0C0H              ;
0657 CA5E06    C  2397        JZ     RELO2             ; GOOD BUFFER
065A FEC1         2398        CPI    0C1H              ; END OF WORD
065C C27E06    C  2399        JNZ    SKIP2
065F EB           2400 RELO2: XCHG                     ; ADDRESS IN DE
0660 211B00       2401        LXI    H,RECIPF
0663 19           2402        DAD    D
0664 3A38E0       2403        LDA    PPITCH
0667 77           2404        MOV    M,A
0668 05           2405        DCR    B                 ; DECREMENT BUFFER COUNT
0669 EB           2406        XCHG                     ; ADDRESS IN HL
066A 7E           2407        MOV    A,M
066B 3680         2408        MVI    M,RECSWR          ;FREE IT TO RECOGNITION
066D FEC1         2409        CPI    0C1H              ; END OF A WORD?
066F CA8E06    C  2410        JZ     RELO5             ; YES, SO NOT A VER REMNANT
0672 EB           2411        XCHG                     ; ADDRESS IN DE
0673 211300       2412        LXI    H,RECLNB
0676 19           2413        DAD    D
0677 7E           2414        MOV    A,M
0678 FEFF         2415        CPI    0FFH              ; IS THERE A LINK TO A BOTTOM BUFFER?
067A CA8406    C  2416        JZ     RELO3             ; NO SO DONE
067D EB           2417        XCHG                     ; YES, GET NEXT BUFFER IN HL
067E CD4006    C  2418 SKIP2: CALL   ADDBOH
0681 C35406    C  2419        JMP    RELO1
0684 EB           2420 RELO3: XCHG                     ; ADDRESS IN HL
0685 CD4006    C  2421        CALL   ADDBOH            ; UPDATE POINTER TO FIRST CHAR BUFFER
0688 221700    D  2422        SHLD   Q1STRT
068B C3A606    C  2423        JMP    DONER
068E 2A1900    D  2424 RELO5: LHLD   Q2STRT
0691 221700    D  2425        SHLD   Q1STRT
0694 3A0000    E  2426        LDA    ADFLAG
0697 3D           2427        DCR    A
0698 320000    E  2428        STA    PRVFLG            ; SINCE RELEASED ALL OF WD 1, STARTING OVER
069B FE02         2429        CPI    2
069D C2A606    C  2430        JNZ    DONER
06A0 2A1B00    D  2431        LHLD   Q3STRT
06A3 221900    D  2432        SHLD   Q2STRT            ; ??? NEED TO PUT AN END?????
06A6 78           2433 DONER: MOV    A,B
06A7 321D00    D  2434        STA    QCOUNT
```

```
LOC  OBJ                 SOURCE STATEMENT

06AA FB                     EI
06AB CD0000      E          CALL     ISOREC
06AE C9                     RET                        ;


                            END                    ;

ASSEMBLY COMPLETE,    NO ERRORS

SHP13.
SVPC.
EZS.
```

```
$NOLIST
$LIST
$TITLE('01/31/85 - ISOLATION CARD SOFTWARE - PAGE IMAGE INPUT')


;                         ***********
;                         *         *
;                         * ISOPSI  *
;                         *         *
;                         ***********

;********************
;PUBLIC PROCEDURES
          PUBLIC  PSIORG              ;ISOPSI ORIGIN POINT
          PUBLIC  PCIDTA              ;ISOPSI DATA ORIGIN POINT
          PUBLIC  ISOPNP              ;NEW PAGE
;PUBLIC ISOPFB          ;FREE OF RECOGNITION BUFFER
          PUBLIC  ISOPSW              ;SEPERATION WAITING - PACK AND OUTPUT PIRS
          PUBLIC  ISOPEP              ;END OF PAGE
          PUBLIC  STOESC              ;STORE A,BC,DE CHR ESC SEQ=ABCDDEE
          PUBLIC  STOESH              ;STORE A,BC,DE HEX ESC SEQ=ABCDDEE
          PUBLIC  BLDESC              ;BUILD CHAR ESC SEQ
          PUBLIC  BUFINI              ; Idle recognition buffer
          PUBLIC  BLDESH              ;BUILD HEX ESC SEQ

;********************
;PUBLIC PROCEDURES FOR ISOPSO
          PUBLIC  BASADJ              ;ASCII BASE ADJUST
          PUBLIC  OUTESH              ;OUTPUT HEX ESC SEQ
          PUBLIC  OUTESC              ;OUTPUT CHAR ESC SEQ

;********************
;PUBLIC DATA
          PUBLIC  CCHRCO              ;HORIZ CHAR ORIGIN
          PUBLIC  CCHEND              ;HORIZ CHAR END
          PUBLIC  CCHSTA              ;STATUS
          PUBLIC  RCBHVO              ;REC BUFFERS HIGHEST VERTICAL ORIGIN

$EJECT
```

```
LOC   OBJ      LINE      SOURCE STATEMENT

;********************
;PUBLIC DATA FOR SYSTEM MONITOR
           PUBLIC   VSTATE              ;
           PUBLIC   RSTATE              ;
           PUBLIC   FSTATE              ;
           PUBLIC   RECINC              ;
           PUBLIC   RECSGC              ;
           PUBLIC   CPCHRC              ;
           PUBLIC   CPREJC              ;
           PUBLIC   CPSSCC              ;
           PUBLIC   INTVEF              ;
           PUBLIC   INTF4I              ;
           PUBLIC   RUNVBF              ;
           PUBLIC   RUNCOM              ;
           PUBLIC   RUNCOF              ;
           PUBLIC   RUNCOI              ;
           PUBLIC   WAKCOM              ;
           PUBLIC   COMINC              ;
           PUBLIC   RECAB1              ;
           PUBLIC   RECAB2              ;
           PUBLIC   RECAB3              ;
           PUBLIC   RECAR1              ;
           PUBLIC   RECAR2              ;
           PUBLIC   RECAR3              ;
           PUBLIC   RECRES              ;
           PUBLIC   RECSNF              ;
           PUBLIC   RECLNF              ;
           PUBLIC   RECRB1              ;
           PUBLIC   RECRB2              ;
           PUBLIC   RECRB3              ;
           PUBLIC   RECRR1              ;
           PUBLIC   RECRR2              ;
           PUBLIC   RECRR3              ;
           PUBLIC   RECFSC              ;
           PUBLIC   RECRCC              ;
           PUBLIC   PLRMID              ;
           PUBLIC   PLESKW              ;

$EJECT

;********************
;EXTERNAL PROCEDURES - ISOPSO
           EXTRN    ISOINT              ;INITIALIZE ISOPSO FOR PAGE
           EXTRN    OUTLIN              ;OUTPUT A LINE
           EXTRN    CPPOUT              ;OUTPUT A BYTE TO CPP BUFFER
           EXTRN    CPPCLR              ;CLEAR CPP BUFFER

;********************
;EXTERNAL PROCEDURES - M1OUTF
           EXTRN    OBINIT              ;INITIALIZE OUTPUT INTERFACE

;********************
;EXTERNAL PROCEDURES - PIRUTL
           EXTRN    RSTPIR              ;RESET PIR AVAILABLE CHAIN
```

```
LOC  OBJ        LINE        SOURCE STATEMENT

                             EXTRN    GETPIR          ;ALLOCATE A NEW PIR
                             EXTRN    CMPPIR          ;COMPRESS PIRS
                             EXTRN    PIRLNK          ;LINK PIR INTO CHAIN
                             EXTRN    FINDIT          ;FIND ACCENTED ASCII EQUIVALENT CHAR
                             EXTRN    FNDACC          ;FIND ACCENT OFFSET
                             EXTRN    BUFSTR          ;START OF BUFFERS FOR FOREIGN ASCII

                        ;********************
                        ;EXTERNAL PROCEDURES
                             EXTRN    CRASH           ;SOFTWARE FAILURE
                             EXTRN    OPTION          ;CHECK SYSTEM OPTION
                             EXTRN    DSUB            ;HL=BC-HL, SETS CC
                             EXTRN    DABS            ;HL=ABS HL
                             EXTRN    DNEG            ;HL=-HL
                             EXTRN    DCMP            ;COMPARE BC TO HL
                             EXTRN    RETCNZ          ;RETURN CC.NZ
                             EXTRN    RETCZ           ;RETURN CC.Z
                             EXTRN    RETCM           ;RETURN CC.LT
                             EXTRN    RETCP           ;RETURN CC.GT
                             EXTRN    ACC2BC          ;MOVE ACC, SIGNED, TO BC4
                             EXTRN    ACC2HL          ;MOVE ACC, SIGNED, TO HL4
                             EXTRN    CNVW2H          ;CONVERT DE TO HEX IN BCDE
                             EXTRN    SIKDIV          ;B=HL/A, BY REPEATED SUBTRACTS
                             EXTRN    DIVBY2          ;DIVIDE HL BY 2
                             EXTRN    PRTCHR          ;PRINT A CHARACTER GRID
                             EXTRN    RECEOP          ;TELL REC END OF PAGE
                             EXTRN    ERRMES          ;POST ERROR MESSAGE
                             EXTRN    RNGCHK          ;RANGE CHECK
                             EXTRN    OUTCLR          ;CLEAR OUTPUT BUFFER
                             EXTRN    TIMOUT          ;TIMEOUT TEST
                             EXTRN    ZERO            ;ZERO BC BYTES AT HL
                             EXTRN    SYSERR          ;
                             EXTRN    FTMCHK          ;CHECK FOR FINAL TEST MODE
                             EXTRN    MOVE            ;MOVE DATA
                             EXTRN    BUFADD          ;CONVERT A BUFFER NUMBER TO ADDRESS
                             EXTRN    OUTCLF
                             EXTRN    OUT5SP
                             EXTRN    HEXSPC
                             EXTRN    HEXWRD
                             EXTRN    OUTHEX

                        ;************************
                        ; EXTERNAL PROCEDURES ISOREC
                             EXTRN    ISOREC          ;RESTART RECOGNITION
                             EXTRN    INITRB          ;INIT ON NEW PAGE

                        ;*********************
                        ;EXTERNAL DATA
                             EXTRN    PIRCHP          ;PIR CHAIN ORIGIN
                             EXTRN    RCVW5C          ;REC BUFFERS AWAITING FONT SELECT COUNT
                             EXTRN    RCVABA          ;RECOGNITIONS FLAG
                             EXTRN    RCVAWL
                             EXTRN    RCVPFK          ; Primary font known flag
```

```
LOC  OBJ          SOURCE STATEMENT

                  ;*********************
                  ;INTERFACE TABLE REFERENCES
                          EXTRN    ITSSCH
                          EXTRN    ITSSCV
                          EXTRN    ITSCES
                  SEJECT
                  ;                 **********************************
                  ;                 *                                *
                  ;                 *   PAGE IMAGE INPUT VARIABLES   *
                  ;                 *                                *
                  ;                 **********************************
                                    DSEG
                  PGIDTA:
                  ;*********************
                  ;PIR INPUT CONTROL
0000              INPIR:   DS       2                   ;=> INPUT PIR
0002              INPCP:   DS       2                   ;=> NEXT OUTPUT CHAR IN INPUT PIR
0004              LCHEND:  DS       2                   ;LAST CHAR HORIZONTAL END PIXEL
0006              LCHBAS:  DS       2                   ;LAST CHAR ADJUSTED BASELINE
0008              CWVORG:  DS       2                   ;CURRENT WORD VERTICAL ORIGIN
000A              CWVBAC:  DS       2                   ;CURRENT WORD BASE DISPLACEMENT ACCUMULATOR
                  ;*********************
                  ;CURRENT INPUT CHAR PARAMETERS
000C              CCHAR:   DS       1                   ;LOW SCORE CHARACTER
000D              CCHHCO:  DS       2                   ;HORIZ. CHAR ORIGIN
000F              CCHEND:  DS       2                   ;HORIZ CHAR END
0011              CCHVWO:  DS       2                   ;VERTICAL WORD ORIGIN
0013              CCHBAS:  DS       1                   ;BASE=DROP+SIZE
0014              CCHSTA:  DS       1                   ;STATUS
0015              CCHFTT:  DS       1                   ; Font type in which character recognized
                                                        ;    0 - P.S.
0016              CCHBAC:  DS       2                   ;CHAR ADJUSTED BASELINE = VERT. WORD ORG + BASE
                  ;*********************
                  ;MISC.
0018              OUTCBF:  DS       8                   ;OUTPUT ESC SEQ BUFFER
0020              ECBHVO:  DS       2                   ;RECOGNITION BUFFERS HIGHEST VERTICAL ORIGIN
                  SEJECT
                  ;*********************
                  ;SYSTEM MONITOR VARIABLES
                  EOPTAA:                               ;START OF ORDERED TABLE
0022              EOPTPT:  DS       2                   ;A - PAGE TIME IN TICKS
0024              EOPTIG:  DS       2                   ;B - INTERPAGE GAP IN PIXELS
0026              CPCHRC:  DS       2                   ;C - CURRENT PAGE CHAR COUNT
0028              CPREJC:  DS       2                   ;D - CURRENT PAGE REJECT COUNT
002A              CPSSCC:  DS       2                   ;E - CURRENT PAGE SINGLE SMALL CHAR COUNT
002C              RUNVBF:  DS       2                   ;F - VBF ACTIVE COUNTS
```

```
LOC   OBJ          LINE        SOURCE STATEMENT

002E               1227 INTVBF: DS      2              ;G - VBF INTERRUPT ACTIVE COUNTS
0030               1228 RECINC: DS      2              ;H - REC INTERRUPT COUNT
0032               1229 RECSGC: DS      2              ;I - REC SEGMENT COUNT
0034               1230 COMINC: DS      2              ;J - COMM INTERRUPT COUNT
0036               1231 RUNCOM: DS      2              ;K - COMM ACTIVE COUNTS
0038               1232 RUNCOF: DS      2              ;L - COMM RECORD FORMATTER ACTIVE
003A               1233 RUNCOI: DS      2              ;M - COMM INTERRUPT ACTIVE
003C               1234 WAKCOM: DS      2              ;N - COMM WAITING FOR WP ACTIVE
003E               1235 INTFMI: DS      2              ;O - FORMATTER INPUT INTERRUPT ACTIVE COUNTS
0040               1236 VSTATE: DS      18             ;P - AWAITING VIDEO
                   1237                                ;Q - BLACK SEARCH/NOISE FILTER/EOP TESTS
                   1238                                ;R - IN WORD SEPARATION
                   1239                                ;S - IN HORIZONTAL SEPARATION
                   1240                                ;T - IN VERTICAL SEPARATION
                   1241                                ;U - IN TOUCH SEPARATION
                   1242                                ;V - IN REGISTRATION
                   1243                                ;W - AWAITING RECOGNITION
                   1244                                ;X - PAGE BEGIN/END PROCESSING
0052               1245 RECAB1: DS      2              ;Y - REC ACCEPTED AFTER 1 BURN
0054               1246 RECAB2: DS      2              ;Z - 2
0056               1247 RECAB3: DS      2              ;[ - # OF FIRST LEVEL BURNS
0058               1248 RECAR1: DS      2              ;\ - REC ACCEPTED AFTER 1 REGROW
005A               1249 RECAR2: DS      2              ;] - 2
005C               1250 RECAR3: DS      2              ;^ - # OF SECOND LEVEL REGROWS
005E               1251 RECRB1: DS      2              ;_ - REC REJECTED AFTER 1 BURN
0060               1252 RECRB2: DS      2              ;` - 2
0062               1253 RECRB3: DS      2              ;a - # OF SECOND LEVEL BURNS
0064               1254 RECRR1: DS      2              ;b - REC REJECTED AFTER 1 REGROW
0066               1255 RECRR2: DS      2              ;c - 2
0068               1256 RECRR3: DS      2              ;d - # OF SECOND LEVEL REGROWS
006A               1257 RECREG: DS      2              ;e - REREGISTRATION COUNT
006C               1258 RECSNF: DS      2              ;f - SMALL NOISE FILTER COUNT
006E               1259 RECLNF: DS      2              ;g - LARGE NOISE FILTER COUNT
0070               1260 RECFSC: DS      2              ;h - # OF FONT SELECT PASSES
0072               1261 RECRCC: DS      2              ;i - TOTAL NUMBER OF REC STARTS
0074               1262 PLEMID: DS      2              ;j - PAGE LEFT EDGE MIDPOINT
0076               1263 PLESKW: DS      2              ;k - PAGE LEFT EDGE SIGNED SKEW
0078               1264 PLEDBG: DS      2              ;l - PAGE LENGTH IN PIXELS
007A               1265 PLELBC: DS      2              ;m - VIDEO BACKING LEFT BLACK COUNT
007C               1266 PLECWC: DS      2              ;n - VIDEO BACKING CENTER WHITE COUNT
                   1267
                   1268 $EJECT
                   1269
                   1270 ;*********************
                   1271 ;SYSTEM MONITOR VALUES - CONTINUED
007E               1272 RSTATE: DS      24             ;o - REC IDLE
                   1273                                ;p - REC HW RUNNING - AWAITING INTERRUPT
                   1274                                ;q - REC CHAR LOAD IN PROGRESS
                   1275                                ;r - REC END OF SEGMENT PROCESSING, PASS 1
                   1276                                ;s - REC END OF SEGMENT PROCESSING, PASS 2
                   1277                                ;t - REC REREGISTRATION IN PROGRESS
                   1278                                ;u - REC NOISE FILTER IN PROGRESS
                   1279                                ;v - REC BURN IN PROGRESS
                   1280
```

```
LOC  OBJ             SOURCE STATEMENT

                     ;W - REC REGROW IN PROGRESS
                     ;X - REC CLEAN UP IN PROGRESS
                     ;Y - REC FONT SELECT IN PROGRESS
0096                 FSTATE: DS     5    ;Z - REC INTERRUPT IN PROGRESS (HW RUNNING)
                                         ;{ - SINGLE FONT SELECTED
                                         ;| - FONT SWITCH RUNNING
                     EOPTZZ:             ;} - FONT SELECT RUNNING
009C                 TEMP1:  DS     2    ;END OF ORDERED TABLE
0082                 RBFLAG  EQU    82H  ;TEMPORARY VARIABLE HOLDER
0002                 RBUFCT  EQU    02H  ;FLAG INDICATING RESERVED FOR RECOGNITION
                                         ;NUMBER OF RESERVE BUFFERS
                     ;
                     ; Local variables for character buffer handling
                     ;
009E                 BUFFLG: DS     1    ; Buffer found flag
009F                 MINORG: DS     2    ; Minima of vertical word origins for search
00A1                 MINBUF: DS     2    ; Buffer address of minima
00A3                 PSCHCT: DS     2    ; Number of characters recognized in P.S. font

                             CSEG        ;CODE FOLLOWS

                     PGIOBG:

                     $EJECT
                     ;          *****************************
                     ;          *                           *
                     ;          *  PAGE IMAGE ENTRY POINTS  *
                     ;          *                           *
                     ;          *****************************

                     ;********************
                     ;NEW PAGE STARTED - INITIALIZE PAGE IMAGE ROUTINE
                     ISOPNP: IF     DEBUG
0000 017A00               LXI    B,EOPTZZ-EOPTAA ;SET ZERO LENGTH
0003 212200   D           LXI    H,EOPTAA    ;DESTINATION
0006 CD0000   E           CALL   ZERO        ;ZERO VECTOR
0009 2A1AE0               LHLD   TIMERX      ;SET PAGE START TIME
000C 3E09                 MVI    A,VSIEND    ;SET PAGE BEGIN/END PROCESSING
000E 3247E0               STA    VIDRUN      ;
0011 222200   D           SHLD   EOPTPT      ;
0014 2A2CE0               LHLD   VBLORG      ;SET INTERPAGE GAP
0017 222400   D           SHLD   EOPTIG      ;
                          ENDIF              ;
001A 210000               LXI    H,0         ;SET PREVIOUS LINE VERTICAL ORIGIN
001D 222CE0               SHLD   VBLORG      ;RESET VERTICAL PAGE ORIGIN
0020 220800   D           SHLD   CWVORG      ;SET CURRENT WORD VERTICAL ORIGIN
0023 220400   D           SHLD   LCHEND      ;SET LAST CHAR HORIZONTAL END
0026 222000   D           SHLD   RCBHVO      ;SET HIGHEST VERTICAL ORIGIN
0029 AF                   XRA    A           ;SET PAGE CODE = OK
002A 3245E0               STA    PAGECD      ;
002D 32A300   D           STA    PSCHCT      ; Initialize P.S. character count
0030 324DE0               STA    PCLRCD      ; Initialize page clear control flag
0033 CD0000   E           CALL   RSTPIR      ;RESET PIR DATABASE
0036 CD0707   C           CALL   INIPIR      ;INITIALIZE INPUT PIR
```

```
LOC  OBJ          LINE        SOURCE STATEMENT

0039 CD0000     E  1335              CALL   PGOINT          ;INITIALIZE PAGE OUT
003C CD0000     E  1336              CALL   OBINIT          ;INITIALIZE OUTPUT INTERFACE
003F 218200     C  1337              LXI    H,DUMRCB        ;=>DUMMY RCB
0042 220EE0        1338              SHLD   CURRBP          ;
0045 CD0000     E  1339              CALL   OPTION          ;SET SYSTEM OPTIONS
0048 57            1340              MOV    D,A             ;SET OPTIONS FOR ESC SEQ
0049 59            1341              MOV    E,C
004A 3E4A          1342              MVI    A,ESCINP        ;SEND NEW PAGE ESC SEQ
004C 013033        1343              LXI    B,'30'          ;NORMAL NEW PAGE
004F CDA205     C  1344              CALL   OUTESC          ;
0052 2100E6        1345              LXI    H,SYSCHB        ;RESTORE INITIAL RCB POINTER
0055 118000        1346              LXI    D,80H           ;CHARACTER BUFFER LENGTH
0058 3E82          1347              MVI    A,RBFLAG        ;
005A 77            1348 ISOP10:      MOV    M,A             ;SET FIRST TWO AS RESERVE BUFFERS
005B 19            1349              DAD    D
005C 77            1350              MOV    M,A             ;SET RESERVED FOR RECOGNITION
005D 19            1351              DAD    D               ;
005E 2180FD        1352              LXI    H,SYSCHB-80H    ; Set initial pointer values
0061 220EE0        1353              SHLD   CURRBP          ;
0064 220AE0        1354              SHLD   RECPTR          ;
0067 220CE0        1355              SHLD   CURCBP          ; Set initial char buff pointer
006A 2210E0        1356              SHLD   CURRCB          ;
006D 2100FE        1357              LXI    H,SYSMBF        ;
0070 2212E0        1358              SHLD   CURMSI          ;
0073 2214E0        1359              SHLD   CURMSO          ; Initialize message buffer pointer
0076 3600          1360              MVI    M,0             ;
0078 118000        1361              LXI    D,80H           ;
007B 19            1362              DAD    D               ;
007C 3600          1363              MVI    M,0             ;
007E CD0000     E  1364              CALL   INITRB          ;
0081 C9            1365              RET                    ;DONE
                   1366
0082 0000          1367 DUMRCB:      DW     0,0,0,0
0084 0000
0086 0000
0088 0000
                   1368
                   1369 $EJECT

                   1370 ;**********************
                   1371 ;TRY TO FREE UP CHARACTER RECOGNITION BUFFER SO SEPARATION CAN CONTINUE
008A CD1202     C  1372 ISOPFB:      CALL   RECSCR          ;ONLY WAY TO FREE A BUFFER IS TO SCORE A CHAR
008D C8            1373              RZ                     ;RETURN WHEN CHARACTER SCORED
008E C38A00     C  1374              JMP    ISOPFB          ;AND TRY AGAIN
                   1375
                   1376 ;**********************
                   1377 ;SEPARATION SW WAITING FOR MORE VIDEO DATA - COMPRESS AND OUTPUT PIBS
                   1378 ;WHERE POSSIBLE AND OUTPUT COMPLETE LINE IF FONT SELECT NOT ACTIVE.
0091 CD1202     C  1379 ISOPSW:      CALL   RECSCR          ;IF REC HAS COMPLETED A CHARACTER, SCORE IT
0094 C0            1380              RNZ                    ;RETURN IF CHAR SCORED
0095 1600          1381 ISOPS1:      MVI    D,0             ;CHECK TIMEOUT
0097 C30000     E  1382              JMP    TIMOUT          ;
                   1383
                   1384 $EJECT
```

```
LOC  OBJ          LINE       SOURCE STATEMENT

                         ;*********************
                         ;END OF PAGE - OUTPUT ALL DATA FOR THIS PAGE
009A 3A04E0              ISOPEP: LDA    RECRUN         ; Recognition running?
009D B7                          ORA    A              ;
009E CC0000    E                 CZ     ISOREC         ; No, go see if it needs to be waken
00A1 CD1202    C         ISOPE0: CALL   RECSCR         ; Free up all possible buffers
00A4 3A45E0                      LDA    PAGECD         ; Get page end code
00A7 B7                          ORA    A              ; Test for normal end
00A8 CAB000    C                 JZ     ISOPE7         ; Jump if normal
00AB 3E01                        MVI    A,1            ; Else, set page clear control flag to
00AD 324DE0                      STA    PCLRCD         ;   abort recognition
00B0 3A04E0              ISOPE7: LDA    RECRUN         ;RECOGNITION RUNNING?
00B3 B7                          ORA    A              ;
00B4 C2A100    C                 JNZ    ISOPE0         ;YES, WAIT TILL ALL RECOGNITION COMPLETE
00B7 AF                  ISOPE1: XRA    A              ; Clear any flags which state that
00B8 320030    E                 STA    RCVABA         ;   recognition is waiting on isolation
00BB 320030    E                 STA    RCVAWL
00BE 3A45E0                      LDA    PAGECD         ; Set page end code
00C1 B7                          ORA    A              ; Test for normal end
00C2 CAD800    C                 JZ     ISOPEA         ; Jump if normal
00C5 2100E7                      LXI    H,SYSCHB+100H  ; If not normal, then don't finish remaining
00C8 118000                      LXI    D,80H          ;   buffers and PIR's. Just end page.
00CB 062E                        MVI    B,SYSCHC-2     ;   Clear all buffers for next page
00CD CD0E07    C         ISOPEB: CALL   BUFINI         ; Clear character buffer
00D0 19                          DAD    D              ; Point to next buffer
00D1 05                          DCR    B              ; All buffers cleared ?
00D2 C2CD00    C                 JNZ    ISOPEB         ;   No, continue
00D5 C3F800    C                 JMP    ISOPE8         ; Skip over remaining buffer processing
00D8 CD0000    E         ISOPEA: CALL   RECEOP         ;TELL REC TO FORCE COMPLETE A BUFFER
00DB CD1202    C                 CALL   RECSCR         ;SCORE ALL CHARACTERS
00DE CAB700    C                 JZ     ISOPE1         ;
00E1 CDDB05    C                 CALL   ENDPIR         ;END INPUT PIR IF OPEN
00E4 CD0000    E         ISOPE2: CALL   CMPPIR         ;COMPRESS ALL PIRS
00E7 CAE400    C                 JZ     ISOPE2         ;
00EA 3E01                ISOPE3: MVI    A,OFORCE       ;OUTPUT ALL LINE SEGMENTS
00EC CD0000    E                 CALL   OUTLIN         ;
00EF CAEA00    C                 JZ     ISOPE3         ;
00F2 CD0000    E                 CALL   CPPCLR         ;COUNT LAST ROW
00F5 CDD501    C                 CALL   CPREJT         ;SET BLANK/UNREADABLE PAGE IF NECESSARY
00F8 3A45E0              ISOPE8: LDA    PAGECD         ;SET PAGE END CODE
00FB 4F                          MOV    C,A            ;
00FC 0600                        MVI    B,0            ;
00FE 2A2CE0                      LHLD   VBLORG         ;SET PAGE LENGTH
0101 EB                          XCHG                  ;
0102 3E4B                        MVI    A,ESCIEP       ;
0104 CDAB05    C                 CALL   OUTESH         ;SEND END OF PAGE ESC SEQ
0107 CD0000    E                 CALL   CTPCLR         ;CLEAR CONTEXTUAL POST PROCESSING BUFFER
010A 3E0B                        MVI    A,CFNEOL       ;END OF LINE COMM FUNCTION
010C CD0000    E                 CALL   OUTCLR         ;

                         $EJECT
```

```
LOC  OBJ            SOURCE STATEMENT

                    ;********************
                    ;END OF PAGE - CONTD - PERFORM END OF PASS FINAL TEST MODE TESTS
010F 3E00                 MVI     A,VSIDLE          ;SET IN FEED MODE - LOGGING DONE
0111 3247E0               STA     VIDRUN            ;
0114 CD0000     E         CALL    FTMCHK            ;TEST FOR FINAL TEST MODE
0117 C2C901     C         JNZ     ISOPE9            ;NO, CONTINUE
011A 2A2CE0               LHLD    VBLORS            ;STORE VIDEO VALUES
011D 227800     D         SHLD    PLEORS            ;
0120 2A32E0               LHLD    VIDLBC            ;
0123 227A00     D         SHLD    PLELBC            ;
0126 2A34E0               LHLD    VIDCWC            ;
0129 227C00     D         SHLD    PLECWC            ;
012C 2A3EE0               LHLD    LEA005            ;SET LEFT EDGE MIDPOINT BY AVERAGING
012F EB                   XCHG                      ;
0130 2A40E0               LHLD    LEA105            ;TOP AND BOTTOM LEFT EDGES
0133 19                   DAD     D                 ;
0134 CD0000     E         CALL    DIVBY2            ;
0137 227400     D         SHLD    PLEMID            ;SAVE PAGE MIDPOINT
013A 012800               LXI     B,40              ;EXPECTED MIDPOINT
013D 3E0F                 MVI     A,15              ;ALLOWABLE MIDPOINT ERROR
013F E5                   PUSH    H                 ;SAVE MIDPOINT
0140 CD0000     E         CALL    RNGCHK            ;CHECK IF OK
0143 C1                   POP     B                 ;RESTORE MIDPOINT
0144 3E03                 MVI     A,ERFLEM          ;
0146 C40000     E         CNZ     SYSERR            ;REPORT LEFT EDGE MIDPOINT ERROR
0149 2A40E0               LHLD    LEA105            ;SET SKEW=TOP LEFT EDGE-BOTTOM LEFT EDGE
014C 44                   MOV     B,H               ;
014D 4D                   MOV     C,L               ;
014E 2A3EE0               LHLD    LEA005            ;
0151 CD0000     E         CALL    DSUB              ;
0154 227600     D         SHLD    PLESKW            ;STORE PAGE LEFT EDGE SIGNED SKEW
0157 44                   MOV     B,H               ;
0158 4D                   MOV     C,L               ;
0159 CD0000     E         CALL    DABS              ;
015C 3E18                 MVI     A,24              ;EXCEEDS MAX SKEW?
015E 95                   SUB     L                 ;
015F 3E04                 MVI     A,ERFLES          ;
0161 FC0000     E         CM      SYSERR            ;REPORT EXCESSIVE SKEW

                    $EJECT
                    ;********************
                    ;END OF PAGE - CONTD - FINAL TEST MODE
0164 2A2CE0               LHLD    VBLORS            ;PAGE LENGTH=11/14 INCHES WITHIN ACCEPTABLE
0167 01500A               LXI     B,11*240          ;ERROR?
016A 3E1F                 MVI     A,11*240*FTMPLE/1000 ;
016C CD0000     E         CALL    RNGCHK            ;
016F CA6701     C         JZ      ISOPE5            ;YES, CONTINUE
0172 2A2CE0               LHLD    VBLORS            ;
0175 01200D               LXI     B,14*240          ;
0178 3E28                 MVI     A,14*240*FTMPLE/1000 ;
017A CD0000     E         CALL    RNGCHK            ;
017D 2A2CE0               LHLD    VBLORS            ;
0180 44                   MOV     B,H               ;
0181 4D                   MOV     C,L               ;
0182 3E01                 MVI     A,ERFPSL          ;
```

```
LOC  OBJ          SOURCE STATEMENT

0184 C40000    E            CNZ    SYSERR          ;PAGE LENGTH ERROR: BC=SCANNED PAGE LENGTH
0187 2A2400    D  ISOPE6:   LHLD   EOPTIG          ;INTER PAGE GAP LARGE ENOUGH?
018A 44                     MOV    B,H             ;
018B 4D                     MOV    C,L             ;
018C 211800                 LXI    H,FTMIPG        ;
018F CD0000    E            CALL   DSUB            ;
0192 3E02                   MVI    A,ERRIPG        ;
0194 FC0000    E            CM     SYSERR          ;INSUFFICIENT INTERPAGE GAP: BC=SCANNED GAP

                  SEJECT
                  ;*********************
                  ;END OF PAGE - CONTD - OUTPUT TEST STATS IF SELECTED
                  KOFTHD:   IF     DEBUG           ;
0197 2A1AE0                 LHLD   TIMERX          ;GET PAGE END TIME
019A 44                     MOV    B,H             ;
019B 4D                     MOV    C,L             ;
019C 2A2200    D            LHLD   EOPTIT          ;GET PAGE START TIME
019F CD0000    E            CALL   DSUB            ;GET ELAPSED TIME
01A2 222200    D            SHLD   EOPTPT          ;SET IN VECTOR
01A5 014141                 LXI    B,'AA'          ;SET INITIAL DATA DESCRIPTOR
01A8 212200    D            LXI    H,EOPTAA        ;=>FIRST WORD
01AB 5E           ISOPL4:   MOV    E,M             ;GET NEXT WORD
01AC 23                     INX    H               ;
01AD 56                     MOV    D,M             ;
01AE 23                     INX    H               ;
01AF E5                     PUSH   H               ;SAVE POINTER
01B0 C5                     PUSH   B               ;SAVE ID
01B1 3E4F                   MVI    A,ESCITM        ;SEND TEST MODE ESC SEQ
01B3 CDA205    C            CALL   OUTESC          ;
01B6 C1                     POP    B               ;RESTORE
01B7 E1                     POP    H               ;
01B8 0C                     INR    C               ;BUMP ID
01B9 7D                     MOV    A,L             ;DONE?
01BA 119C00    D            LXI    D,EOPPZZ        ;
01BD BB                     CMP    E               ;
01BE C2AB01    C            JNZ    ISOPL4          ;IF NOT AT END, CONTINUE
01C1 CD0000    E            CALL   OPPCLR          ;CLEAR OPP BUFFER
01C4 0E0E                   MVI    D,CFREOL        ;SEND CRLF
01C6 CD0000    E            CALL   OUTCLR          ;
                            ENDIF                  ;

01C9 3E02         ISOPE9:   MVI    A,CFNEOP        ;END OF PAGE COMM FUNCTION
01CB CD0000    E            CALL   OUTCLR          ;CLEAR OUTPUT BUFFER
01CE 210000                 LXI    H,0             ;RESET PAGE ORG TO GET INTERPAGE GAP
01D1 222CE0                 SHLD   VBLORG          ;
01D4 C9                     RET                    ;RETURN

                  SEJECT
                  ;*********************
                  ;TEST FOR BLANK PAGE IF FEW ENOUGH CHARS ON PAGE, ELSE TEST FOR UNREADABLE
                  ;PAGE.  PAGE BLANK IF REJECT COUNT EXCEEDS GOOD CHAR COUNT, AND <= 20 CHARS
                  ;ON PAGE. PAGE UNREADABLE IF MORE THAN 11% OF CHARS ARE REJECTED,
                  ;AND CLEAR PRESSED IN RESPONSE TO "UNREADABLE PAGE" MESSAGE.
```

```
LOC  OBJ                SOURCE STATEMENT

01D5 3A45E0             CPREJT: LDA    PAGECD         ;NORMAL PAGE?
01D8 FE00                       CPI    ESCEPN         ;
01DA C0                         RNZ                   ;NO, HONOR CURRENT ABORT INDICATION
01DB 2A2600      D              LHLD   CPCHRC         ;GET TOTAL CHAR COUNT
01DE 44                         MOV    B,H            ;SET FOR TEST
01DF 4D                         MOV    C,L            ;
01E0 2A2800      D              LHLD   CPREJC         ;
01E3 CD0000      E              CALL   DSUB           ;GET NORMAL CHAR COUNT
01E6 EB                         XCHG                  ;SAVE
01E7 21ECFF                     LXI    H,-20          ;TEST FOR BLANK PAGE?
01EA 09                         DAD    B              ;
01EB 42                         MOV    B,D            ;GET NORMAL CHAR COUNT
01EC 4B                         MOV    C,E            ;
01ED 2A2800      D              LHLD   CPREJC         ;AND REJECT COUNT
01F0 DAFE01      C              JC     CPRE02         ;TOO BIG FOR BLANK, TEST FOR UNREADABLE PAGE
01F3 23                         INX    H              ;GOOD COUNTS MUST EXCEED REJECTS
01F4 CD0000      E              CALL   DSUB           ;MORE THAN 50% REJECTS ON SHORT PAGE?
01F7 F0                         RP                    ;NO, ACCEPT PAGE
01F8 3E04                       MVI    A,ESCLPE       ;YES, FLAG BLANK PAGE
01FA 3245E0                     STA    PAGECD         ;
01FD C9                         RET                   ;AND RETURN

01FE 29                 CPRE02: DAD    H              ;
01FF 29                         DAD    H              ;
0200 29                         DAD    H              ;
0201 CD0000      E              CALL   DSUB           ;MORE THAN 11% REJECTS?
0204 F0                         RP                    ;NO, ACCEPT PAGE
0205 018820                     LXI    B,MESURP*255+ECTBEP+ECTBCC ;ASK IF PAGE TO BE REJECTED
0208 CD0000      E              CALL   ERRMES         ;
020B C8                         RZ                    ;FEED(ACCEPT PAGE) PRESSED
020C 3E03                       MVI    A,ESCLPU       ;CLEAR(UNREADABLE PAGE) PRESSED
020E 3245E0                     STA    PAGECD         ;
0211 C9                         RET                   ;RETURN

                        SEJECT
                        ;********************
                        ;LOCATE (IN REVOLVING ORDER) AND SCORE NEXT CHARACTER BUFFER AWAITING PAGE
                        ;IMAGE PROCESSING. SEND CHARACTER (AND ESCAPE SEQUENCES) TO PAGE IMAGE
                        ;RECORDS.  RETURNS CC=0 IF CHARACTER BUFFER FREED UP.
                        ;
                        ; Modified 16 Nov 1984 by CH, page composition processes character
                        ; buffers in the same physical order as isolation.
                        ;
                        RECSCH:
0212 2A14E0                     LHLD   CURMSO         ; Get message buffer pointer
0215 018000                     LXI    B,SYSCHL       ; Get character buffer length
0218 09                         DAD    B              ; Point to next buffer
0219 7C                         MOV    A,H            ; Get high address byte
021A FEFF                       CPI    HIGH SYSRBE    ; Check for wrap
021C C22202      C              JNZ    RECM10         ; Jump if no wrap
021F 2100FE                     LXI    H,SYSRBF       ; Else use first buffer
0222 7E                 RECM10: MOV    A,M            ; Get buffer status
0223 E6C0                       ANI    RECSAK         ; Test for awaiting page comp
0225 FE40                       CPI    RECSWP         ;
0227 C23002      C              JNZ    CHKCBP         ; No messages - check char buffer
```

```
LOC  OBJ             SOURCE STATEMENT

022A 2214E0            SHLD    CURMSO          ; Update message buffer pointer
022D C34902    C       JMP     DOIT            ;
             CHKCBP:
0230 2A10E0            LHLD    CURRCB          ; Get Current Buffer Pointer
0233 018000            LXI     B,SYSCHL        ; Get character buffer length
0236 09                DAD     B               ; Point to next buffer
0237 7C                MOV     A,H             ; Get high address byte
0238 FEFE              CPI     HIGH SYSCHE     ; Check for wrap
023A C24002    C       JNZ     RECB10          ; Jump if no wrap
023D 2100E7            LXI     H,SYSCHB+100H   ; Else use first buffer
0240 7E      RECB10:   MOV     A,M             ; Get buffer status
0241 E6C0              ANI     RECSMK          ; Test for awaiting page comp
0243 FE40              CPI     RECSWP          ;
0245 C0                RNZ                     ; Return if not awaiting page comp
0246 2210E0            SHLD    CURRCB          ; Update buffer pointer
0249 220EE0  DOIT:     SHLD    CURRBP          ;SAVE CURRENT REC BUFFER POINTER
024C CD7004    C       CALL    VERTST          ;DO ANY VERTICAL LINK MANIPULATIONS
             ;
             ;JMP      RBX004
             ;CALL     OUTCLF                  ; Output recognition buffer into for debug
             ;CALL     OUT5SP
             ;LHLD     CURRBP
             ;LXI      D,-SYSCHB
             ;DAD      D
             ;DAD      H
             ;MOV      C,H
             ;CALL     OUTHEX
             ;LHLD     CURRBP
             ;CALL     HEXSPC
             ;CALL     HEXWRD
             ;CALL     HEXSPC
             ;CALL     HEXWRD
             ;CALL     HEXSPC
             ;CALL     HEXSPC
             ;REPT     17
             ;CALL     HEXSPC
             ;ENDM
024F 2A0EE0  RBX004:   LHLD    CURRBP          ; Test separation flag in to see if character
0252 110D00            LXI     D,RECSPS        ;   is a horizontal remnant
0255 EB                XCHG                    ;
0256 19                DAD     D               ;
0257 7E                MOV     A,M             ;
0258 FEFF              CPI     0FFH            ;
025A CA2904    C       JZ      RECS06          ; Don't test for remnant if message
025D E608              ANI     08H             ; JUMP IF MESSAGE
025F CA6902    C       JZ      RBX005          ;
0262 EB                XCHG                    ; Jump if not
0263 CDE903    C       CALL    RECRBP          ; Else, ignore buffer and see if there are
0266 C31202    C       JMP     RECSCR          ;   any others awaiting P.C.
0269 2A0EE0  RBX005:   LHLD    CURRPP          ;
026C CD5004    C       CALL    SCTEST          ;TEST IF SMALL CHAR
026F 2A0EE0            LHLD    CURRBP          ;=>CURRENT REC BUFFER
0272 2C                INR     L               ;GET HORIZ CHAR ORIGIN
0273 4E                MOV     C,M             ;
0274 2C                INR     L               ;
```

```
LOC  OBJ           LINE         SOURCE STATEMENT

0275 46            1654             MOV     B,M                 ;
0276 2C            1655             INR     L                   ;
                   1656 ;
                   1657 ; Determine pitch for current character
                   1658 ;
0277 E5            1659             PUSH    H                   ; Test to see if in proportional space font
0278 111400        1660             LXI     D,RECPIT-RECHSZ
027B 19            1661             DAD     D
027C 7E            1662             MOV     A,M                 ; Get recognition pitch flag
027D E6F0          1663             ANI     0F0H                ; Font known ?
027F C29802   C    1664             JNZ     RX001               ;   Yes, process for known font
0282 2C            1665             INR     L                   ;   No,  point to isolation pitch flag
0283 3EFF          1666             MVI     A,0FFH              ; Set pitch to fixed
0285 321500   D    1667             STA     CCHPIT
0288 7E            1668             MOV     A,M                 ; Get isolation pitch flag
0289 E60F          1669             ANI     0FH                 ; P.S. ?
028B FE0F          1670             CPI     0FH
028D E1            1671             POP     H                   ; Reset stack in case jump taken
028E C2EE02   C    1672             JNZ     RBX001              ; Jump if fixed pitch
0291 AF            1673             XRA     A                   ; Set pitch as P.S.
0292 321500   D    1674             STA     CCHPIT
0295 C3A202   C    1675             JMP     RBX100              ; Continue
0298 7E            1676 RX001:      MOV     A,M                 ; Font known - get recognition flag
0299 E60F          1677             ANI     0FH                 ; Mask off font known flag
029B 321500   D    1678             STA     CCHPIT              ; Save result as pitch
029E E1            1679             POP     H                   ; Recover pointer
029F C2EE02   C    1680             JNZ     RBX001              ; Jump if fixed pitch
                   1681 ;
02A2 E5            1682 RBX100:     PUSH    H                   ; Save buffer pointer
02A3 110E00        1683             LXI     D,RECLNR-RECHSZ     ; Point to right link
02A6 19            1684             DAD     D
02A7 7E            1685             MOV     A,M
02A8 3C            1686             INR     A                   ; Test for null right link
02A9 CAD002   C    1687             JZ      RBX007              ; Jump if null
02AC 3D            1688             DCR     A
02AD E680          1689             ANI     80H                 ; Test for touching link
02AF CAD002   C    1690             JZ      RBX007              ; Jump if non-touching
02B2 C5            1691             PUSH    B                   ; Save horizontal origin for character
02B3 7E            1692             MOV     A,M                 ; Compute address of buffer to the right
02B4 E63F          1693             ANI     3FH
02B6 CD0000   E    1694             CALL    BUFADD
02B9 C1            1695             POP     B                   ; Recover horizontal origin
02BA 110D00        1696             LXI     D,RECSFS            ; Set separation flag for character to right
02BD EB            1697             XCHG
02BE 19            1698             DAD     D
02BF 7E            1699             MOV     A,M
02C0 E608          1700             ANI     08H                 ; Test to see if horizontal remnant
02C2 CAD002   C    1701             JZ      RBX007              ; Jump if not
02C5 210300        1702             LXI     H,RECHSZ            ; If horizontal remnant, then add width of
02C8 19            1703             DAD     D                   ;   remnant to character width to give total
02C9 56            1704             MOV     D,M                 ;   character size
02CA E1            1705             POP     H
02CB 7E            1706             MOV     A,M
02CC 82            1707             ADD     D
02CD C3D202   C    1708             JMP     RBX008              ; Continue with start end origin computation
```

```
LOC  OBJ               SOURCE STATEMENT

02D0 E1         RBX007: POP   H         ; Character to right not remnant, so use
02D1 7E                 MOV   A,M       ;   original character width
02D2 E5         RBX008: PUSH  H         ; Save buffer pointer
02D3 60                 MOV   H,B       ; Move horizontal origin to HL
02D4 69                 MOV   L,C       ;
02D5 2B                 DCX   H         ; Subtract 1 from the horzontal origin and
02D6 C602               ADI   2         ;   add 2 to the character width to include
02D8 FE0C               CPI   12        ;   white space around character.  If the
02DA D2E002   C         JNC   RBX009    ;   result is still less than 12, then
02DD 2B                 DCX   H         ;   add an additional pixel or white on
02DE C602               ADI   2         ;   each side of the char
02E0 220D00   D RBX009: SHLD  CCHBCO    ; Save character horizontal origin
02E3 5F                 MOV   E,A       ; Add adjusted character width to starting
02E4 1600               MVI   D,0       ;   origin to yield ending origin
02E6 19                 DAD   D         ;
02E7 220F00   D         SHLD  CCHEND    ;
02EA E1                 POP   H         ; Recover buffer pointer
02EB C31403   C         JMP   RBX003    ;   and continue with vertical origin process.

02EE E5         RBX001: PUSH  H         ;
02EF 7E                 MOV   A,M       ; Get width of character
02F0 F5                 PUSH  PSW       ; Save for later
02F1 B7                 ORA   A         ; Compute midpoint of character for fixed
02F2 1F                 RAR             ;   pitch font = RBCHCO + RECHSZ / 2
02F3 6F                 MOV   L,A       ;
02F4 2600               MVI   H,0       ;
02F6 09                 DAD   B         ;
02F7 F1                 POP   PSW       ; Get character width
02F8 FE16               CPI   22        ; Use the maximum of (current width, 22)
02FA D2FF02   C         JNC   RBX002    ;
02FD 3E16               MVI   A,22      ;
02FF F5         RBX002: PUSH  PSW       ; Save for later
0300 B7                 ORA   A         ; Compute 1/2 of the new width
0301 1F                 RAR             ;
0302 2F                 CMA             ;
0303 3C                 INR   A         ;
0304 5F                 MOV   E,A       ;
0305 16FF               MVI   D,0FFH    ;
0307 19                 DAD   D         ;
0308 220D00   D         SHLD  CCHBCO    ; Save hrizontal origin of character
030B F1                 POP   PSW       ; Get char width
030C 5F                 MOV   E,A       ; Compute ending origin for character
030D 1600               MVI   D,0       ;
030F 19                 DAD   D         ;
0310 220F00   D         SHLD  CCHEND    ;
0313 E1                 POP   H         ;
0314 2C         RBX003: INR   L         ;
0315 5E                 MOV   E,M       ;GET VERTICAL WORD ORIGIN
0316 2C                 INR   L         ;
0317 56                 MOV   D,M       ;=>VERT DROP
0318 2C                 INR   L         ;
0319 7E                 MOV   A,M       ;ADD VERT SIZE
031A 2C                 INR   L         ;TO GET PHYSICAL BASELINE
031B 86                 ADD   M
```

```
LOC  OBJ                SOURCE STATEMENT

031C EB                         XCHG                        ;
031D 221100    D                SHLD    CCHVWO              ;SAVE VERTICAL WORD ORIGIN
0320 321300    D                STA     CCHBAS              ;SAVE BASELINE
0323 2A0EE0                     LHLD    CURRBP              ;GET REC BUFF POINTER
0326 46                         MOV     B,M                 ;GET REC STATUS
0327 110800                     LXI     D,RECLCH            ;=>LOW CHAR
032A 19                         DAD     D                   ;
032B 7E                         MOV     A,M                 ;GET CHARACTER
032C 320C00    D                STA     CCHAR               ;SAVE IT
                       ;JMP     RBX010
                       ;PUSH    PSW
                       ;PUSH    H
                       ;PUSH    D
                       ;PUSH    B
                       ;CALL    OUTCLF
                       ;LXI     H,CCHAR
                       ;CALL    HEXSPC
                       ;CALL    OUT5SP          ;CCHAR
                       ;LXI     H,CCHHCO
                       ;CALL    HEXWRD          ;CCHHCO
                       ;CALL    HEXWRD          ;CCHEND
                       ;CALL    HEXWRD          ;CCHVWO
                       ;CALL    HEXSPC          ;CCHBAS
                       ;CALL    HEXSPC          ;CCHSTA
                       ;CALL    HEXSPC          ;CCHPIT
                       ;CALL    OUT5SP
                       ;POP     B
                       ;POP     D
                       ;POP     H
                       ;POP     PSW
                       ;RBX010:
032F 58                         MOV     E,A                 ;
0330 FE5F                       CPI     '_'                 ;UNDERLINE?
0332 CA0D04    C                JZ      RECS05              ;YES, CONVERT TO ESCAPE SEQUENCE
0335 78                         MOV     A,B                 ;GET STATUS
0336 E620                       ANI     RECERR              ;RECOGNITION ERROR?
0338 C25703    C                JNZ     RECS01              ;YES, SEND BAD CHAR ESCAPE SEQUENCE
033B 3A1300    D                LDA     CCHBAS              ;GET INITIAL CHARACTER BASE
033E CD3505    C                CALL    BASADJ              ;ADJUST BASE BY ASCII DROP VALUE
0341 321300    D                STA     CCHBAS              ;SAVE UPDATED BASE
0344 CD0000    E                CALL    ECC2BC              ;
0347 2A1100    D                LHLD    CCHVWO              ;
034A 09                         DAD     B                   ;
034B 221500    D                SHLD    CCHBAC              ;SAVE UPDATED BASE ACC
034E 3A0C00    D                LDA     CCHAR               ;GET LOW CHAR
0351 CD1A05    C                CALL    STOCHR              ;SAVE ASCII CHAR
0354 C3B603    C                JMP     RECSXT              ;FREE BUFFER AND EXIT

                       SEJECT
                       ;*********************
                       ;RECSCH - PROCESS QUESTIONABLE CHARACTER
0357 110500            RECS01:  LXI     D,RECSFS-RECLCH ;
035A 19                         DAD     D                   ;GET SEP FLAGS
035B 7E                         MOV     A,M                 ;
```

```
LOC  OBJ          LINE     SOURCE STATEMENT

035C 3C                         INR   A                     ;MESSAGE?
035D CA2304   C                 JZ    RECS06                ;YES, GENERATE ESC SEQ
0360 3A0000   D                 LDA   CCHAR                 ; See if we have a questionable accent
0363 CD0000   E                 CALL  FNDACC                ;   (FNDACC will return reg E = 0FFH if
0366 1C                         INR   E                     ;       the character is not an accent)
0367 C2B603   C                 JNZ   RECSXT                ; Treat questionable accent as noise
036A 78                         MOV   A,B                   ;GET STATUS
036B E604                       ANI   RECIPR                ;FORCED REC ERROR?
036D CA7203   C                 JZ    RECS02                ;NO, CONTINUE
0370 3E80                       MVI   A,80H                 ;YES, SET FORCED REJECT FLAG
0372 11FBFF            RECS02:  LXI   D,RECLCH-RECSFG       ;
0375 19                         DAD   D                     ;
0376 46                         MOV   B,M                   ;
0377 2C                         INR   L                     ;
0378 56                         MOV   D,M                   ;
0379 2C                         INR   L                     ;
037A 4E                         MOV   C,M                   ;
037B 2C                         INR   L                     ;
037C 5F                         MOV   E,A                   ;SAVE FLAG
037D 7E                         MOV   A,M                   ;GET SEP
037E E67F                       ANI   7FH                   ;MASK OFF HIGH BIT
0380 B3                         ORA   E                     ;
0381 5F                         MOV   E,A                   ;
0382 3E45                       MVI   A,ESCIQC              ;QUESTIONABLE CHAR
0384 2A0F00   D                 LHLD  CCHEND                ;GET CURRENT CHAR END
0387 E5                         PUSH  H                     ;SAVE
0388 CD6005   C                 CALL  STOESC                ;WRITE ESCAPE SEQUENCE TO PIR
038B E1                         POP   H                     ;GET CHAR END
038C 220400   D                 SHLD  LCHEND                ;SET

                       SEJECT
                       ;*********************
                       ;RECSCH - DUMP IF CHARACTER MATRIX IF REQUESTED
038F 0680                       MVI   B,OPTESP              ;TEST SWITCH SET?
0391 CD0000   E                 CALL  OPTION
0394 C2B603   C                 JNZ   RECSXT                ;NO, CONTINUE
0397 2A0EE0                     LHLD  CURRBP                ;=>REC BUFFER
039A 7E                         MOV   A,M                   ;GET STATUS
039B E604                       ANI   RECPPS                ;FORCED REJECT?
039D C2B603   C                 JNZ   RECSXT                ;YES, DONT DUMP
03A0 7D                         MOV   A,L                   ;=>SEPARATION FLAG
03A1 C60D                       ADI   RECSFG                ;
03A3 5F                         MOV   E,A                   ;SET SEP FLAG
03A4 54                         MOV   D,H                   ;
03A5 1A                         LDAX  D                     ;
03A6 E610                       ANI   SEPTCH                ;TOUCH FLAG SET?
03A8 79                         MOV   A,C                   ;
03A9 CAB103   C                 JZ    RECS03                ;NO, CHECK FOR REC PRINTOUT
03AC E608                       ANI   OPITPS                ;YES, IF FLAG SET
03AE C3B303   C                 JMP   RECS04                ;PRINT OUT REC ERRORS

03B1 E604              RECS03:  ANI   OPTTPR                ;PRINT REC ERROR?
03B3 C40000   E        RECS04:  CNZ   PRTCHR                ;IF SO, PRINT SCORES/BUFFER
03B6 2A0EE0            RECSXT:  LHLD  CURRBP                ;FREE REC BUFFER
```

```
LOC  OBJ          LINE        SOURCE STATEMENT

03B9 EB           1872 RECRBT:  XCHG                       ;
03BA 211A00       1873          LXI     H,RECDBI           ;
03BD 19           1874          DAD     D                  ; Check for double char buffer
03BE 7E           1875          MOV     A,M                ;
03BF B7           1876          ORA     A                  ;
03C0 C2C903    C  1877          JNZ     RECRT2             ; Jump if double char
03C3 EB           1878          XCHG                       ;
03C4 CD0E07    C  1879          CALL    BUFINI             ; Idle buffer
03C7 AF           1880          XRA     A                  ; Set status for buffer processed
03C8 C9           1881          RET                        ; Return buffer released
03C9 212000       1882 RECRT2:  LXI     H,RECCHB           ;
03CC 19           1883          DAD     D                  ;
03CD 7E           1884          MOV     A,M                ;
03CE B7           1885          ORA     A                  ;
03CF CC0000    E  1886          CZ      CRASH              ;
03D2 0604         1887          MVI     B,4                ;
                  1888 RECRT3:  REPT    B                  ;
                  1889          MOV     A,M                ;
                  1890          STAX    D                  ;
                  1891          INX     D                  ;
                  1892          INX     H                  ;
                  1893          ENDM                       ;
03F4 05           1926          DCR     B                  ;
03F5 C2D403    C  1927          JNZ     RECRT3             ;
03F8 2A0EE0       1928          LHLD    CURRBF             ;
03FB 1180FF       1929          LXI     D,-80H             ;
03FE 19           1930          DAD     D                  ;
03FF 7C           1931          MOV     A,H                ;
0400 FEE6         1932          CPI     HIGH SYSCHB        ;
0402 C20804    C  1933          JNZ     RECRB4             ;
0405 2180FD       1934          LXI     H,SYSCHB-80H       ;
0408 2210E0       1935 RECRB4:  SHLD    CURRBF             ;
040B AF           1936          XRA     A                  ;
040C C9           1937          RET                        ; Return Buffer released
                  1938
                  1939 ;********************
                  1940 ;CONVERT UNDERSCORE CHAR TO SINGLE CHARACTER UNDERLINE
040D 3A1300    D  1941 RECSO5:  LDA     CCHBAS             ;ADJUST BASELINE
0410 CD3505    C  1942          CALL    BASADJ             ;
0413 321300    D  1943          STA     CCHBAS             ;
0416 2A0D00    D  1944          LHLD    CCHHCO             ;SET UL ORIGIN
0419 44           1945          MOV     B,H                ;
041A 4D           1946          MOV     C,L                ;
041B 3A39E0       1947          LDA     HPITCH             ;SET UL WIDTH=PITCH
041E 5F           1948          MOV     E,A                ;
041F 1600         1949          MVI     D,0                ;
0421 3E43         1950          MVI     A,FSCIUL           ;
0423 CD6A05    C  1951          CALL    STOESH             ;SEND UL ESC SEQ
0426 C3B603    C  1952          JMP     RECSXT             ;RETURN ACK STATUS
                  1953
                  1954 $EJECT
```

```
LOC  OBJ             SOURCE STATEMENT

                     ;*********************
                     ;RECSCH - GENERATE ESCAPE SEQUENCE IF REQUIRED
0429 2A0EE0          RECS06: LHLD    CURREP          ;=>TRANSFER VECTOR
042C 112800                  LXI     D,SEPXHO        ;=>CHAR COORDINATES
042F 19                      DAD     D               ;
0430 EB                      XCHG                    ;SOURCE
0431 210D00     D            LXI     H,CCHHCO        ;DESTINATION
0434 010800                  LXI     B,8             ;
0437 CD0000     E            CALL    MOVE            ;
043A 2A0EE0                  LHLD    CUREBP          ;=>REC BUFFER
043D 112100                  LXI     D,SEPKAC        ;=>REGISTERS
0440 19                      DAD     D               ;
0441 7E                      MOV     A,M             ;GET REGISTERS
0442 2C                      INR     L               ;
0443 4E                      MOV     C,M             ;
0444 2C                      INR     L               ;
0445 46                      MOV     B,M             ;
0446 2C                      INR     L               ;
0447 5E                      MOV     E,M             ;
0448 2C                      INR     L               ;
0449 56                      MOV     D,M             ;
044A CD6A05     C            CALL    STOESH          ;
044D C3B603     C            JMP     RECSAT          ;

                     ;*********************
                     ;SMALL CHAR TEST - SET SMALL CHAR FLAG (CCHSTA) IF CHAR NOT TALL ENOUGH OR
                     ;WIDE ENOUGH
0450 AF              SCTEST: XRA     A               ;ASSUME NOT SMALL CHAR
0451 321400     D            STA     CCHSTA          ;
0454 2A0EE0                  LHLD    CUREBP          ;=>CURRENT REC BUFFER
0457 2C                      INR     L               ;
0458 2C                      INR     L               ;
0459 2C                      INR     L               ;
045A 3A0000     E            LDA     ITSSCH          ;CHAR WIDE ENOUGH?
045D 96                      SUB     M               ;
045E F26A04     C            JP      SCTES0          ;NO, SET SMALL CHAR FLAG
0461 2C                      INR     L               ;
0462 2C                      INR     L               ;
0463 2C                      INR     L               ;=>DROP
0464 2C                      INR     L               ;=>HEIGHT
0465 3A0000     E            LDA     ITSSCV          ;CHAR TALL ENOUGH?
0468 96                      SUB     M               ;
0469 F8                      RM                      ;YES, NOT SMALL CHAR
046A 3E80            SCTES0: MVI     A,PIESSC        ;NO, SET SMALL CHAR FLAG
046C 321400     D            STA     CCHSTA          ;
046F C9                      RET                     ;DONE

                     $EJECT
                     ;*******************************************************************
                     ;VERIST WILL DO THE RECOMBINATION OF AN ACCENT AND THE CHARACTER BELOW IT.
                     ;IT WILL DESTROY ALL REGISTERS. IT WILL ALSO GET RID OF A REMNANT THAT WAS
                     ;NOT SCORED BY RECOGNITION.
                     ;       <HL> = CURRENT BUFFER
```

```
LOC  OBJ          LINE        SOURCE STATEMENT

0470 EB           2009 VERTST: XCHG              ;
0471 211A00       2010         LXI   H,RECDBI    ; Check for double buffer
0474 19           2011         DAD   D           ;
0475 7E           2012         MOV   A,M         ;
0476 3D           2013         DCR   A           ;
0477 CADC04    C  2014         JZ    VERT30      ; Jump if double vertical buffers
                  2015
047A 211300       2016         LXI   H,RECLNB    ; Set lower link
047D 19           2017         DAD   D           ;
047E 7E           2018         MOV   A,M         ;
047F 3C           2019         INR   A           ; Null?
0480 C8           2020         RZ                ; Return if not vertical buffer pair
                  2021
0481 210800       2022         LXI   H,RECLCH    ;
0484 19           2023         DAD   D           ; Point to ASCII value of accent
0485 7E           2024         MOV   A,M         ;
0486 CD0000    E  2025         CALL  FNDACC      ; Attempt to classify
0489 7B           2026         MOV   A,E         ;
048A FEFF         2027         CPI   0FFH        ; Check for illegal value
048C CAC204    C  2028         JZ    VERT45      ; Jump if illegal accent
048F B7           2029         ORA   A           ;
0490 17           2030         RAL               ;
0491 5F           2031         MOV   E,A         ; Add to get buffer area
0492 19           2032         DAD   D           ;
0493 210000    E  2033         LXI   H,BUFSTR    ; Point to start of buffer
0496 19           2034         DAD   D           ;
0497 5E           2035         MOV   E,M         ;
0498 23           2036         INX   H           ;
0499 56           2037         MOV   D,M         ; <DE> = Table Address
                  2038
049A 2A0EE0       2039         LHLD  CURRBP      ;
049D CD0E07    C  2040         CALL  BUFINI      ; Free buffer
04A0 018000       2041         LXI   B,SYSCHL    ; Point to next buffer
04A3 09           2042         DAD   B           ;
04A4 7C           2043         MOV   A,H         ;
04A5 FEFE         2044         CPI   HIGH SYSCHE ;
04A7 C2AD04    C  2045         JNZ   VERT30      ;
04AA 2100E7       2046         LXI   H,SYSCHB+100H ;
04AD 220EE0       2047 VERT30: SHLD  CURRBP      ; Save new buffer pointer
04B0 2210E0       2048         SHLD  CURRCB      ;
04B3 010800       2049         LXI   B,RECLCH    ; Get base character ASCII
04B6 09           2050         DAD   B           ;
04B7 7E           2051         MOV   A,M         ; Get ASCII of base character
04B8 44           2052         MOV   B,H         ;
04B9 4D           2053         MOV   C,L         ; Save address in <BC>
04BA CD0000    E  2054         CALL  FINDIT      ; Is the combination legal?
04BD FEFF         2055         CPI   0FFH        ; Check for legal match
04BF C8           2056         RZ                ; Return if accented char not valid
04C0 02           2057         STAX  B           ; Set new ASCII
```

```
LOC  OBJ          SOURCE STATEMENT

04C1 C9                    RET                          ;
04C2 2A0EE0         VERT46: LHLD   CURRBP               ;
04C5 CD0E07    C           CALL   BUFINI               ;
04C8 018000                LXI    B,SYSCHL             ;
04CB 09                    DAD    B                    ;
04CC 7C                    MOV    A,H                  ;
04CD FEFE                  CPI    HIGH SYSCBE          ;
04CF C2D504    C           JNZ    VERT47               ;
04D2 2100E7                LXI    H,SYSCHB+100H        ;
04D5 220EE0         VERT47: SHLD   CURRBP               ;
04D8 2210E0                SHLD   CURRCB               ;
04DB C9                    RET                          ;
                    ;
                    ;PROCESS DOUBLE CHAR BUFFERS
                    ;
04DC AF             VERT60: XRA    A                    ;
04DD 77                    MOV    M,A                  ; Reset RECDBI flag
04DE 212300                LXI    H,RECCHB+RECLCH      ;
04E1 19                    DAD    D                    ; Point to accent ASCII
04E2 7E                    MOV    A,M                  ;
04E3 CD0000    E           CALL   FNDACC               ; Attempt to classify
04E6 7B                    MOV    A,E                  ;
04E7 FEFF                  CPI    0FFH                 ; Check for illegal value
04E9 CA0905    C           JZ     VERT81               ; Jump if illegal accent
04EC B7                    ORA    A                    ;
04ED 17                    RAL                          ;
04EE 5F                    MOV    E,A                  ; Add to get buffer area
04EF 19                    DAD    D                    ;
04F0 210000    E           LXI    H,BUFSTR             ; Point to start of buffer
04F3 19                    DAD    D                    ;
04F4 5E                    MOV    E,M                  ;
04F5 23                    INX    H                    ;
04F6 56                    MOV    D,M                  ; <DE> = Table Address
04F7 2A0EE0                LHLD   CURRBP               ;
04FA 010800                LXI    B,RECLCH             ; Get base character ASCII
04FD 09                    DAD    B                    ;
04FE 7E                    MOV    A,M                  ; Get ASCII of base character
04FF 44                    MOV    B,H                  ;
0500 4D                    MOV    C,L                  ; Save address in <BC>
0501 CD0000    E           CALL   FINDIT               ; Is the combination legal?
0504 FEFF                  CPI    0FFH                 ; Check for legal match
0506 C8                    RZ                           ; Return if accented char not valid
0507 02                    STAX   B                    ; Set new ASCII
0508 C9                    RET                          ;
                    ;
                    ;IF TOP OF DOUBLE ILLEGAL, MOVE SECOND CHAR DATA
                    ;
0509 210000         VERT81: LXI    H,RECCHB             ;
050C 19                    DAD    D                    ;
050D 0604                  MVI    B,4                  ;
                    VERT82: REPT   8                    ;
                           MOV    A,M                  ;
                           STAX   D                    ;
                           INX    D                    ;
                           INX    H                    ;
```

```
LOC  OBJ           LINE        SOURCE STATEMENT

                   2113              ENDM
052F 05            2146              DCR     B                  ;
0530 C20F05     C  2147              JNZ     VERT92             ;
0533 C9            2148              RET                        ;
                   2149                                         ;
                   2150 ;
0534 C9            2151 VERT90: RET
                   2152 ;VERT90:           CALL    HEXSPC
                   2153 ;CALL      HEXWRD
                   2154 ;CALL      HEXSPC
                   2155 ;CALL      HEXWRD
                   2156 ;CALL      HEXSPC
                   2157 ;CALL      HEXSPC
                   2158 ;LEFT      12
                   2159 ;CALL      HEXSPC
                   2160 ;ENDM
                   2161 ;RET
                   2162 $EJECT
                   2163 ;*********************
                   2164 ;BASE ADJUST: ACC IN=INITIAL BASE DROP, E=ASCII CHARACTER. GET BASE ADJUST
                   2165 ;FROM POSITIONAL POST PROCESSING ASCII TABLE AND ADD TO DROP. RETURN IN ACC.
                   2166 ;BC,HL UNCHANGED.
0535 C5            2167 BASADJ: PUSH     B                 ;SAVE BC
0536 47            2168              MOV      B,A               ;SAVE INITIAL DROP
0537 1602          2169              MVI      D,HIGH PATORG     ;=> ENTRY IN ASCII TABLE
0539 EB            2170              XCHG                       ;SAVE HL
053A 7E            2171              MOV      A,M
053B 1F            2172              RAR                        ;SHIFT DOWN DROP CLASS
053C 1F            2173              RAR                        ;
053D 1F            2174              RAR                        ;
053E E607          2175              ANI      7                 ;AND OUT BASE CLASS
0540 215B05     C  2176              LXI      H,PPPBAT          ;=> PPP BASE ADJUST TABLE
0543 CA5605     C  2177              JZ       BASA01            ;IF CLASS ZERO, USE FIRST ENTRY
0546 23            2178              INX      H                 ;
0547 3D            2179              DCR      A
0548 CA5605     C  2180              JZ       BASA01            ;IF CLASS 1, USE SECOND ENTRY
054B 23            2181              INX      H
054C 3D            2182              DCR      A                 ;
054D CA5605     C  2183              JZ       BASA01            ;IF CLASS 2, USE THIRD ENTRY
0550 23            2184              INX      H                 ;ELSE CLASS 3, USE THIRD ENTRY
0551 3D            2185              DCR      A
0552 CA5605     C  2186              JZ       BASA01            ;
0555 23            2187              INX      H                 ;CLASS 4 USE FOURTH ENTRY
0556 7E            2188 BASA01:      MOV      A,M               ;GET BASE ADJUST FOR CLASS
0557 EB            2189              XCHG                       ;RESTORE HL
0558 80            2190              ADD      B                 ;ADD ADJUST TO INITIAL DROP
0559 C1            2191              POP      B                 ;RESTORE BC
055A C9            2192              RET                        ;DONE
                   2193
055B 00            2194 PPPBAT:      DB       0                 ;BASELINE
055C F9            2195              DB       PPPSBA            ;SUBSCRIPT
055D 08            2196              DB       PPPMSA            ;MID-SUPERSCRIPT
055E 0E            2197              DB       PPPSPA            ;SUPERSCRIPT
055F FE            2198              DB       PPPSSA            ;SMALL SUBSCRIPT
                   2199
                   2200 $EJECT
```

```
LOC   OBJ              SOURCE STATEMENT

                       ;*********************
                       ;CLOSE OUT CURRENT PIR, THEN STORE 8 CHAR ESC SEQ IN PIR RECORD.  ACC,BC,DE
                       ;DEFINE ESC SEQ.  SEND EITHER CHAR SEQ (CCHHHH) OR HEX SEQ (HHHHHH).
0560 CD7405    C       STOESC: CALL    STOECP          ;CLOSE OUT CURRENT PIR
0563 CDE105    C               CALL    BLDESC          ;BUILD HEX ESC SEQ
0566 220200    D               SHLD    INPCP           ;SAVE UPDATED POINTER
0569 C9                        RET                     ;DONE

056A CD7405    C       STOESH: CALL    STOECP          ;CLOSE OUT CURRENT PIR
056D CDFA05    C               CALL    BLDESH          ;BUILD HEX ESC SEQ
0570 220200    D               SHLD    INPCP           ;SAVE UPDATED POINTER
0573 C9                        RET                     ;DONE

0574 2A0D00    D       STOECP: LHLD    CCHHCO          ;ESCAPE SEQS HAVE NO WIDTH
0577 220F00    D               SHLD    CCHEND          ;SO END=ORG
057A 67                        MOV     H,A             ;SAVE ACC
057B AF                        XRA     A               ;SET ZERO STATUS
057C 321400    D               STA     CCHSTA          ;SET AS CURRENT CHARACTER STATUS
057F 7C                        MOV     A,H
0580 F5                        PUSH    PSW             ;SAVE ESC SEQ ARGS
0581 C5                        PUSH    B               ;
0582 D5                        PUSH    D               ;
0583 CD9E05    C               CALL    STOCXX          ;CLOSE OUT CURRENT PIR AND ALLOCATE NEXT PIR
0586 3A1300    D               LDA     CCHBAS          ;GET CHARACTER BASE
0589 CD0000    E               CALL    ACC2BC          ;
058C 2A1100    D               LHLD    CCHVWO          ;GET WORD ORIGIN
058F 09                        DAD     B
0590 221600    D               SHLD    CCHBAC          ;
0593 220A00    D               SHLD    CWVBAC          ;SET BASE ACCUMULATOR
0596 2A0200    D               LHLD    INPCP           ;=>PIR DATA
0599 2D                        DCR     L               ;CORRECT FOR DUMMY BYTE
059A D1                        POP     D               ;RESTORE ESC SEQ ARGS
059B C1                        POP     B               ;
059C F1                        POP     PSW             ;
059D C9                        RET                     ;RETURN WITH STATUS=0=OK

059E F5                STOCXX: PUSH    PSW             ;SAVE DUMMY CHAR
059F C35906    C               JMP     STOCES          ;JOIN STORE

                       $EJECT
                       ;*********************
                       ;BUILD AND OUTPUT 8 CHAR ESC SEQ DEFINED BY ACC,BC,DE
05A2 211800    D       OUTESC: LXI     H,OUTCBF        ;=>HOLDING BUFF
05A5 CDE105    C               CALL    BLDESC          ;BLD ESC SEQ
05A8 C3B105    C               JMP     OUTE01          ;SEND

05AB 211800    D       OUTESH: LXI     H,OUTCBF        ;=>HOLDING BUFF
05AE CDFA05    C               CALL    BLDESH          ;BLD ESC SEQ
05B1 3A1800    D       OUTE01: LDA     OUTCBF+0        ;OUTPUT ESC SEQ
05B4 CD0000    E               CALL    CPPOUT          ;
05B7 3A1900    D               LDA     OUTCBF+1        ;
05BA CD0000    E               CALL    CPPOUT          ;
05BD 3A1A00    D               LDA     OUTCBF+2        ;
05C0 CD0000    E               CALL    CPPOUT          ;
```

```
LOC  OBJ          SOURCE STATEMENT
05C3 3A1B00  D        LDA     OUTCBF+3          ;
05C6 CD0000  E        CALL    CPPOUT            ;
05C9 3A1C00  D        LDA     OUTCBF+4          ;
05CC CD0000  E        CALL    CPPOUT            ;
05CF 3A1D00  D        LDA     OUTCBF+5          ;
05D2 CD0000  E        CALL    CPPOUT            ;
05D5 3A1E00  D        LDA     OUTCBF+6          ;
05D8 CD0000  E        CALL    CPPOUT            ;
05DB 3A1F00  D        LDA     OUTCBF+7          ;
05DE C30000  E        JMP     CPPOUT            ;
              $EJECT
              ;*********************
              ;STORE 8 CHAR ESC SEQ @ HL - UPDATE HL.  SAVES ESC CHAR, FOLLOWED BY ESC CODE
              ;(ACC), FOLLOWED BY 2 CHARS OF BC IN ASCII, FOLLOWED BY 4 CHARS OF DE IN HEX.
05E1 F5              BLDESC: PUSH    PSW               ;SAVE ACC
05E2 3A0000  E        LDA     ITSCES            ;GET ESC CHAR
05E5 77               MOV     M,A               ;SET
05E6 F1               POP     PSW               ;
05E7 23               INX     H                 ;
05E8 77               MOV     M,A               ;SAVE ESC CODE
05E9 23               INX     H                 ;
05EA 70               MOV     M,B               ;SAVE FIRST ASCII CHAR
05EB 23               INX     H                 ;
05EC 71               MOV     M,C               ;SAVE SECOND ASCII CHAR
05ED 23               INX     H                 ;
05EE CD0000  E        CALL    CNVW2H            ;CONVERT DE TO HEX IN BCDE
05F1 70               MOV     M,B               ;STORE
05F2 23               INX     H                 ;
05F3 71               MOV     M,C               ;
05F4 23               INX     H                 ;
05F5 72               MOV     M,D               ;
05F6 23               INX     H                 ;
05F7 73               MOV     M,E               ;
05F8 23               INX     H                 ;
05F9 C9               RET                       ;
              ;*********************
              ;STORE 6 CHAR ESC SEQ @ HL - UPDATE HL.  SAVE ESC CHAR, FOLLOWED BY ESC CODE
              ;(ACC), FOLLOWED BY 3 LOW HEX NIBBLES IN BC, FOLLOWED BY 3 LOW NIBBLES IN DE.
05FA F5              BLDESH: PUSH    PSW               ;SAVE ESC CODE
05FB 3A0000  E        LDA     ITSCES            ;GET ESC CHAR
05FE 77               MOV     M,A               ;SET
05FF F1               POP     PSW               ;RESTORE ESC CODE
0600 23               INX     H                 ;
0601 77               MOV     M,A               ;STORE ESC CODE
0602 23               INX     H                 ;
0603 D5               PUSH    D                 ;SAVE SECOND ARG
0604 50               MOV     D,B               ;
0605 59               MOV     E,C               ;
0606 CD0000  E        CALL    CNVW2H            ;CONVERT BC TO HEX IN BCDE
0609 71               MOV     M,C               ;SAVE LOW 3 NIBBLES
060A 23               INX     H                 ;
060B 72               MOV     M,D               ;
060C 23               INX     H                 ;
```

```
LOC  OBJ            SOURCE STATEMENT

060D 73                   MOV     M,E            ;
060E 23                   INX     H              ;
060F D1                   POP     D              ;RESTORE SECOND ARG
0610 CD0000    E          CALL    CNVW2H         ;CONVERT DE TO HEX IN BCDE
0613 71                   MOV     M,C            ;SAVE 3 LOW NIBBLES
0614 23                   INX     H              ;
0615 72                   MOV     M,D            ;
0616 23                   INX     H              ;
0617 73                   MOV     M,E            ;
0618 23                   INX     H              ;
0619 C9                   RET                    ;
                     $EJECT
                     ;********************
                     ;STORE CHARACTER (IN ACC) IN PAGE IMAGE RECORD DATABASE.  STORE CHAR IN
                     ;CURRENT PIR IF CHARACTER IMMEDIATELY FOLLOWS PREVIOUS CHARACTER IN
                     ;SAME WORD. IF CHARACTER WIDELY SEPARATED (MAY BE A SPACE), OR
                     ;PIR FULL, ALLOCATE NEW PIR.  IF ALLOCATION FAILS, COMPACT WORDS AND
                     ;OUTPUT LINES AS NECESSARY TO FREE UP PIR.
                     ;
                     ; If character to be stored is an accent, then close current PIR and
                     ; put accent in PIR by itself.  Also, test to see if current PIR contains
                     ; an accent.  If so, then close out accent PIR and start a new one.
                     ; I.E. Insure that all stand-alone accents are in a PIR by themselves.
                     ;
061A F5              STOCHR: PUSH    PSW            ;SAVE CHARACTER
061B CD0000    E          CALL    FNDACC         ; Test to see if accent
061E 7B                   MOV     A,E
061F 3C                   INR     A              ; Is it ?
0620 C25906    C          JNZ     STOCES         ;   Yes, close current PIR and start a new one
                     ;
0623 2A1600    D          LHLD    CCHBAS         ;GET BASELINE OF CURRENT CHAR
0626 44                   MOV     B,H            ;
0627 4D                   MOV     C,L            ;
0628 2A0500    D          LHLD    LCHBAS         ;GET BASELINE OF PREV CHAR
062B 3E03                 MVI     A,3            ;CLOSE ENOUGH?
062D CD0000    E          CALL    RNGCHK         ;
0630 C25906    C          JNZ     STOCES         ;NO, STORE IN NEXT PIR
                     
0633 2A0D00    D          LHLD    CCHHCO         ;GET CHARACTER ORIGIN
0636 44                   MOV     B,H            ;
0637 4D                   MOV     C,L            ;
0638 2A0400    D          LHLD    LCHEND         ;GET PREV CHAR END
063B 3E04                 MVI     A,4            ;GET MAX ALLOWABLE GAP/OVERLAP
063D CD0000    E          CALL    RNGCHK         ;TEST IF WITHIN RANGE
0640 C25906    C          JNZ     STOCES         ;EXCESS SEPARATION, USE NEW WORD
                     ;
                     ; Test to see if current PIR is an accent.
                     ;
0643 2A0200    D          LHLD    IMPCP          ; Get current output byte pointer
0646 2B                   DCX     H              ; Point to ASCII in PIR
0647 7E                   MOV     A,M            ; Get ASCII
0648 CD0000    E          CALL    FNDACC         ; Test for accent
064B 7B                   MOV     A,E
064C 3C                   INR     A
064D C25906    C          JNZ     STOCES         ; If accent, then close PIR and start a new one
```

```
LOC  OBJ            SOURCE STATEMENT

                    ;
0650 2A0200    D            LHLD    INPCP
0653 7D                     MOV     A,L                    ;
0654 E60F                   ANI     PIRSIZ-1               ;TEST FOR END OF WORD
0656 C29506    C            JNZ     STOC03                 ;IF NOT END OF RECORD, JUST STORE

                    ;********************
                    ;STOCHR - CLOSE OUT PREVIOUS PIR AND ALLOCATE NEW PIR. IF NO FREE PIR,
                    ;COMPRESS PIRS AND OUTPUT LINES AS NECESSARY TO FREE UP A PIR
0659 CD0906    C    STOCHS: CALL    ENDPIR                 ;CLOSE OUT CURRENT PIR
065C CD0000    E    STOCL1: CALL    GETPIR                 ;ALLOCATE A PIR
065F C27006    C            JNZ     STOC02                 ;GOT ONE, CONTINUE
0662 CD0000    E            CALL    CMPPIR                 ;TRY TO COMPRESS PIRS TO GET A NEW PIR
0665 CA5C06    C            JZ      STOCL1                 ;PIR FREED UP, ALLOCATE
0668 3E01                   MVI     A,OFORCE               ;FORCE OUT A LINE SEGMENT
066A CD0000    E            CALL    OUTLIN                 ;COMPRESS FAILED, TRY TO OUTPUT A LINE
066D C35C06    C            JMP     STOCL1                 ;PIR FREED UP, ALLOCATE

                    ;********************************
                    ;STOCHR - SET INITIAL PIR DATA AND INITIAL WORD ORIGIN AND CHARACTER SIZE
0670 220000    D    STOC02: SHLD    INPIR                  ;=>CURRENT PIR
0673 2A1500    D            LHLD    CCHBAC                 ;GET CHARACTER ADJUSTED BASELINE
0676 220A00    D            SHLD    CWVBAC                 ;INITIALIZE WORD BASELINE ACCUMULATOR
0679 2A0F00    D            LHLD    CCHEND                 ;SET INITIAL LAST CHAR END
067C 220400    D            SHLD    LCHEND                 ;
067F 2A0D00    D            LHLD    CCHHCO                 ;GET ADJUSTED HORIZONTAL CHAR ORG
0682 EB                     XCHG                           ;
0683 2A0000    D            LHLD    INPIR                  ;SAVE AS CURRENT PIR WORD ORIGIN
0686 73                     MOV     M,E                    ;
0687 23                     INX     H                      ;
0688 72                     MOV     M,D                    ;
0689 010300                 LXI     B,PIRSTA-1             ;
068C 09                     DAD     B                      ;
068D 3A1400    D            LDA     CCHSTA                 ;SET SMALL CHAR FLAG STATUS
0690 77                     MOV     M,A                    ;
0691 010400                 LXI     B,PIRASC-PIRSTA        ;=>ASCII BUFFER
0694 09                     DAD     B                      ;

                    ;********************
                    ;STOCHR - STORE ASCII CHARACTER IN PIR AND UPDATE MAX VERTICAL WORD SIZE
0695 F1             STOC03: POP     PSW                    ;RESTORE CHARACTER
0696 77                     MOV     M,A                    ;SAVE IN PIR
0697 23                     INX     H                      ;UPDATE PIR CHAR BUFFER POINTER
0698 220200    D            SHLD    INPCP                  ;SAVE POINTER
069B 2A0F00    D            LHLD    CCHEND                 ;MOVE CURRENT CHAR END
069E 220400    D            SHLD    LCHEND                 ;TO LAST CHAR END
06A1 2A1600    D            LHLD    CCHBAC                 ;UPDATE WORD BASELINE
06A4 220600    D            SHLD    LCHBAS                 ;
06A7 EB                     XCHG                           ;
06A8 2A0A00    D            LHLD    CWVBAC                 ;ADD CURRENT BASE TO BASE ACCUMULATOR
06AB 19                     DAD     D                      ;
06AC CD0000    E            CALL    DIVBY2                 ;TAKE AVERAGE
06AF 220A00    D            SHLD    CWVBAC                 ;
06B2 3A1500    D            LDA     CCHPIT                 ; Set font type indicator
06B5 B7                     ORA     A
```

```
LOC  OBJ             LINE       SOURCE STATEMENT

06B6 CABA06      C                       JZ      STOC35         ; Test to see if on P.S. page
06B9 C9                                  RET                    ; Return if not

06BA 21A300      D             STOC35:   LXI     H,PSCHCT       ; Test to insure that we have encountered
06BD 7E                                  MOV     A,M            ;   enough P.S. characters to say that we
06BE FE0A                                CPI     10             ;   are on a P.S. page
06C0 CACF05      C                       JZ      STOC04
06C3 2A0EE0                              LHLD    CURRBP         ; Don't add character to total if reject
06C6 7E                                  MOV     A,M
06C7 E620                                ANI     RECERR
06C9 C0                                  RNZ
06CA 21A300      D                       LXI     H,PSCHCT
06CD 34                                  INR     M              ; Not enough yet, but increment counter
06CE C9                                  RET                    ;   and exit

06CF 2A0000      D             STOC04:   LHLD    INPIR
06D2 110400                              LXI     D,PIRSPA       ; Else, set proportion space indicator in
06D5 19                                  DAD     D              ;   current PIR
06D6 7E                                  MOV     A,M
06D7 F640                                ORI     PIEPIP
06D9 77                                  MOV     M,A
06DA C9                                  RET                                            ;DONE

                               $EJECT
                               ;*********************
                               ;END OF PIR: PIR FULL OR CHAR NOT IN CURRENT WORD - SAVE COUNT, VERTICAL
                               ;MIDPOINT IN CURRENT PIR
06DB 3A0200      D             ENDPIR:   LDA     INPCP                  ;CALC # OF CHARS IN PIR
06DE C608                                ADI     B                      ;
06E0 E60F                                ANI     PIRSIZ-1               ;
06E2 47                                  MOV     B,A
06E3 2A0000      D                       LHLD    INPIR                  ;=> PIR JUST COMPLETED
06E6 7D                                  MOV     A,L                    ;=>PIR STATUS/CHAR LENGTH
06E7 C604                                ADI     PIRSPA                 ;
06E9 6F                                  MOV     L,A                    ;
06EA D8                                  RC                             ;RETURN IF NO PIR ACTIVE(INPIR=OFFFFH)
06EB 7E                                  MOV     A,M                    ;OR COUNT INTO PIR STATUS
06EC B0                                  ORA     B                      ;
06ED 77                                  MOV     M,A                    ;SAVE STATUS/COUNT WORD
06EE 2C                                  INR     L                      ;=>HORIZONTAL END - LOW BYTE
06EF 3A0400      D                       LDA     LCHEND                 ;
06F2 77                                  MOV     M,A                    ;SET
06F3 2A0A00      D                       LHLD    CKVBAC                 ;SET MEAN BASE
06F6 EB                                  XCHG
06F7 2A0000      D                       LHLD    INPIR                  ;STORE IN PIR
06FA 010600                              LXI     B,PIRROW               ;
06FD 09                                  DAD     B                      ;
06FE 73                                  MOV     M,E                    ;SAVE
06FF 2C                                  INR     L                      ;
0700 72                                  MOV     M,D                    ;
0701 2A0000      D                       LHLD    INPIR                  ;=>CURRENT PIR
0704 CD0000      E                       CALL    PIRLNK                 ;INSERT PIR INTO CHAIN

                               ;*************************************************************
```

```
LOC  OBJ          SOURCE STATEMENT

                  ;INITIALIZE INPUT PIR.  MAKE SURE CURRENT INPUT PIR IS FLAGGED AS BEING CLOSED
0707 21FFFF       INIPIR: LXI     H,0FFFFH          ;FLAG NO CURRENT PIR
070A 220000   D           SHLD    INPIR             ;
070D C9                   RET                       ;

                  $EJECT
                  ;*********************************
                  ;
                  ; BUFINI - Flag buffer in (HL) as ilie and blank fill the buffer
                  ;
070E D5           BUFINI: PUSH    D                 ; Save registers
070F E5                   PUSH    H
0710 112000               LXI     D,RECCHB          ; Point to character data
0713 19                   DAD     D
0714 AF                   XRA     A                 ; Move zeroes into character data
                          REPT    95
                          MOV     M,A
                          INR     L
                          ENDM
07D5 E1                   POP     H                 ; Recover registers
07D6 D1                   POP     D
07D7 3600                 MVI     M,0               ; Ilie buffer
07D9 C9                   RET
                  ;
                          END

ASSEMBLY COMPLETE,    NO ERRORS

SEP13.
SVIC.
SZS.
                  $NOLIST
                  $LIST
                  $TITLE ('01/31/85 - PAGE IMAGE OUTPUT')

                  ;                   ****************
                  ;                   *              *
                  ;                   *    ISOPS0    *
                  ;                   *              *
                  ;                   ****************

                  ;********************
                  ;PUBLIC PROCEDURES
                          PUBLIC  PSOORG            ;ISOPS0 ORIGIN POINT

                  ;********************
                  ;PUBLIC PROCEDURES FOR ISOPS1
                          PUBLIC  PSOINI            ;INITIALIZE ISOPS0
                          PUBLIC  OUTLIN            ;OUTPUT A LINE

                  ;********************
                  ;PUBLIC PROCEDURES FOR ISOPS1/ISOPS2
                          PUBLIC  PIRDLE            ;DELETE CURRENT OUTPUT PIR

                  ;********************
                  ;EXTERNAL PROCEDURES - ISOPS1
```

```
LOC  OBJ       LINE       SOURCE STATEMENT

                          EXTRN   OUTESH           ;OUTPUT HEX ESC SEQ
                          EXTRN   OUTESC           ;OUTPUT CHAR ESC SEQ

               ;*********************
               ;EXTERNAL DATA - ISOPC1
                          EXTRN   CPCHRC           ;CURRENT PAGE CHAR COUNT
                          EXTRN   CPREJC           ;CURRENT PAGE REJECT COUNT
                          EXTRN   CPSSCC           ;CURRENT PAGE SINGLE SMALL CHAR COUNT
                          EXTRN   RCBHVO           ;RECOGNITION BUFFER HIGHEST VERTICAL ORIGIN

               ;*********************
               ;EXTERNAL DATA - ISOCPP
                          EXTRN   CPPPTR           ;=>INTO CPP PAGE (FOR INITIALIZATION ONLY)

               ;*********************
               ;EXTERNAL PROCEDURES - PIRUTL
                          EXTRN   PIRUNL           ;PIR UNLINK
                          EXTRN   RLSPIR           ;RELEASE PIR

               ;*********************
               ;EXTERNAL DATA - PIRUTL
                          EXTRN   PIRCHP           ;PIR CHAIN POINTER

               SEJECT
               ;*********************
               ;EXTERNAL PROCEDURES - ISOPS1
                          EXTRN   PSOPS1           ;PASS 1 PROCESSING
                          EXTRN   NPPSOL           ;NPP START OF LINE
                          EXTRN   NPPEOL           ;NPP END OF LINE
                          EXTRN   PIRSUD           ;UPDATE PITCH AT END OF LINE

               ;*********************
               ;EXTERNAL DATA - ISOPS1
                          EXTRN   NPPDFS           ;NOISE DELETE FLAG

               ;*********************
               ;EXTERNAL PROCEDURES - ISOPS2
                          EXTRN   PSOPS2           ;PASS 2 PROCESSING
                          EXTRN   ULOSND           ;OUTPUT REMAINING UNDERLINES

               ;*********************
               ;EXTERNAL DATA - ISOPS2
                          EXTRN   SKWVOR           ;SKEW ADJUST VERTICAL ORIGIN
                          EXTRN   SKWADJ           ;CURRENT SKEW ADJUSTMENT
                          EXTRN   PASCAL           ;COLUMN ALIGN VALUE
                          EXTRN   HADREJ           ;HORIZ. ADDRESS ADJUST=-SKWADJ-PASLEG-PASCAL
                          EXTRN   HEPADR           ;HORIZ. OUTPUT CHAR ADDRESS
                          EXTRN   ULOORG           ;UL OUTPUT ORIGIN
                          EXTRN   ULOLEN           ;UL OUTPUT LENGTH
                          EXTRN   ULOVAD           ;UL VERTICAL ADDRESS
                          EXTRN   ULPORG           ;PREV UL ORIGIN
                          EXTRN   ULPLEN           ;PREV UL LENGTH
                          EXTRN   ULWORG           ;PREV WORD ORIGIN
                          EXTRN   ULWEND           ;PREV WORD END
```

```
LOC  OBJ        LINE        SOURCE STATEMENT

                          EXTRN   OPLCRG          ;PREV LINE ORIGIN
                          EXTRN   PSULFG          ;P.S. UNDERLINE FLAG
                          EXTRN   PSULCT          ;P.S. UNDERLINE COUNT

              $EJECT
              ;********************
              ;EXTERNAL PROCEDURES - ISOUPL
                          EXTRN   CRASH           ;SOFTWARE FAILURE
                          EXTRN   OPTION          ;CHECK SYSTEM OPTION
                          EXTRN   DSUB            ;HL=BC-HL, SETS CC
                          EXTRN   DSUBZL          ;DSUB, ZERO LIMIT
                          EXTRN   DABS            ;HL=ABS HL
                          EXTRN   ABS             ;ACC=ABS ACC
                          EXTRN   DNEG            ;HL=-HL
                          EXTRN   DCMP            ;COMPARE BC TO HL
                          EXTRN   RNGCHK          ;CHK IF BC +/IN ACC OF HL,+=-
                          EXTRN   RETCNZ          ;RETURN CC.NZ
                          EXTRN   RETCZ           ;RETURN CC.Z
                          EXTRN   RETCM           ;RETURN CC.LT
                          EXTRN   RETCP           ;RETURN CC.GT
                          EXTRN   CNVW2H          ;CONVERT DE TO HEX IN BCDE
                          EXTRN   CNVH2W          ;CONVERT HEX BCDE TO BINARY IN DE
                          EXTRN   CNV3HW          ;CONVERT 3 HEX BYTES @HL TO BINARY IN DE
                          EXTRN   CNV2HW          ;CONVERT 2 HEX BYTES @HL TO BINARY IN DE
                          EXTRN   DIKDIV          ;B=HL/A, BY REPEATED SUBTRACTS
                          EXTRN   MULTPY          ;HL=HL*A
                          EXTRN   DIVBY2          ;DIVIDE HL BY 2
                          EXTRN   OUTBYT          ;OUTPUT A BYTE
                          EXTRN   OUTCLR          ;CLEAR OUTPUT BUFFER
                          EXTRN   ACCABS          ;ACC= ABS ACC
                          EXTRN   ACC2BC          ;ACC=>BC, SIGN EXTENDED
                          EXTRN   ACC2DE          ;
                          EXTRN   ACC2HL          ;
                          EXTRN   BUFSWP          ;SWAP 2 BUFFERS

                          EXTRN   OUTCLF
                          EXTRN   OUT5SP
                          EXTRN   HEXSPC

              $EJECT
              ;                   **********************************
              ;                   *                                *
              ;                   *  PAGE IMAGE OUTPUT VARIABLES   *
              ;                   *                                *
              ;                   **********************************

                                  DSEG

              PCODPA:

              ;********************
              ;PIR OUTPUT CONTROL
                          PUBLIC  OUTPIR          ;=> OUTPUT PIR
                          PUBLIC  OUPPIR          ;=> PREVIOUS PIR
```

```
LOC  OBJ      SOURCE STATEMENT

                      PUBLIC   CURPIR       ;COPY OF CURRENT OUTPUT PIR
                      PUBLIC   LINORG       ;=> FIRST PIR IN CURRENT LINE
                      PUBLIC   LIPORG       ;=> PREVIOUS PIR FOR LINORG
                      PUBLIC   OUTCNT       ;OUTLIN FORCE/PASS CONTROL
                      PUBLIC   OUTCMP       ;COMPLETE LINE DETECTED FLAG
                      PUBLIC   CWHORG       ;CURRENT WORD HORIZONTAL ORIGIN
                      PUBLIC   CWHEND       ;CURRENT WORD HORIZONTAL END IN PIXELS
                      PUBLIC   LWHEND       ;LAST WORD HORIZONTAL END
                      PUBLIC   LWVBAS       ;LAST WORD VERTICAL END
                      PUBLIC   CWVBAS       ;CURRENT WORD VERTICAL END
                      PUBLIC   LLVORG       ;LAST LINE VERTICAL ORIGIN
                      PUBLIC   LLVSAV       ;LLVORG SAVE FOR DELETED LINES
                      PUBLIC   LINEND       ; End of line pixel location
                      PUBLIC   LNVEND       ; End of line vertical pixel location

              ;*******************
              ;PITCH DETERMINATION
                      PUBLIC   HPITPC       ;TOTAL CHARACTER WIDTH ON LINE
                      PUBLIC   HPITCC       ;TOTAL CHARACTERS ON LINE
                      PUBLIC   HPITSB       ;LINE SEG BEGIN PIXEL ADDR
                      PUBLIC   HPITSE       ;LINE SEG END PIXEL ADDR
                      PUBLIC   HPITSC       ;LINE SEG CHAR COUNT
                      PUBLIC   HPITWK       ; Working horizontal pitch
                      PUBLIC   HPITW2       ; 1/2 Working pitch
                      PUBLIC   PPITC1       ; Proportional pitch indicator for curr line

              SELECT
              ;*******************
              ;PIR OUTPUT CONTROL
0000          OUTPIR: DS       2            ;=> OUTPUT PIR
0002          OUPPIR: DS       2            ;=> PREVIOUS PIR
0004          CURPIR: DS       16           ;OUTPUT PIR
0014          LINORG: DS       2            ;=> FIRST PIR IN CURRENT LINE
0016          LIPORG: DS       2            ;=> PREVIOUS PIR FOR LINORG
0018          OUTCNT: DS       1            ;OUTLIN FORCE/PASS CONTROL
0019          OUTCMP: DS       1            ;COMPLETE LINE DETECTED FLAG
001A          CWHORG: DS       2            ;CURRENT WORD HORIZONTAL ORIGIN
001C          CWHEND: DS       2            ;CURRENT WORD HORIZONTAL END IN PIXELS
001E          LWHEND: DS       2            ;LAST WORD HORIZONTAL END
0020          CWVBAS: DS       2            ;CURRENT WORD VERTICAL END
0022          LWVBAS: DS       2            ;LAST WORD VERTICAL END
0024          LLVORG: DS       2            ;LAST LINE VERTICAL ORIGIN
0026          LLVSAV: DS       2            ;LLVORG SAVE FOR DELETED LINES
0028          LINEND: DS       2            ; End of line pixel location
002A          LNVEND: DS       2            ; End of line vertical pixel location

              ;*******************
              ;PITCH DETERMINATION
002C          HPITPC: DS       2            ;TOTAL CHARACTER WIDTH ON LINE
002E          HPITCC: DS       1            ;TOTAL CHARACTERS ON LINE
002F          HPITSB: DS       2            ;LINE SEG BEGIN PIXEL ADDR
0031          HPITSE: DS       2            ;LINE SEG END PIXEL ADDR
0033          HPITSC: DS       1            ;LINE SEG CHAR COUNT
0034          HPITWK: DS       1            ; Working horizontal pitch
0035          HPITW2: DS       1            ; 1/2 Working pitch (saves computation)
0036          PPITC1: DS       1            ; Proportional pitch indicator for curr line
```

```
LOC  OBJ            SOURCE STATEMENT

                   ;*********************.
                   ;FOLLOWING LINE SEGMENT TRAILING VERTICAL ORIGINS  *** DO NOT REORDER ***
0037               PPVW01: DS       2              ;
0039               PPVW02: DS       2              ;
003B               PPVW03: DS       2              ;
003D               PPVW04: DS       2              ;

                           CSEG                    ;CODE FOLLOWS
                   PSOORG:

                   SEJECT
                   ;*********************.
                   ;INITIALIZE PAGE OUTPUT
0000 210000        PGOINT: LXI      H,0            ;RESET
0003 222400    D           SHLD     LLVORG         ;LAST LINE VERT ORG
0006 220000    E           SHLD     SKWVOR         ;SKEW VERTICAL ORIGIN
0009 220000    E           SHLD     SKWADJ         ;SKEW ADJUST
000C 220000    E           SHLD     PASCAL         ;COLUMN ALIGN
000F 220000    E           SHLD     HADRAJ         ;HORIZONTAL ADDRESS ADJUSTMENT
0012 220000    E           SHLD     OPLORG         ;PREV LINE ORIGIN
0015 220000    E           SHLD     CPCHRC         ;PAGE CHAR COUNT
0018 220000    E           SHLD     CPREJC         ;PAGE REJECT COUNT
001B 220000    E           SHLD     CPSSCC         ;PAGE SMALL CHAR COUNT
001E 3E28                  MVI      A,40           ;
0020 323BE0                STA      VPITCH         ;SET DEFAULT VERT PITCH
0023 3E18                  MVI      A,24           ;
0025 3239E0                STA      HPITCH         ;SET DEFAULT HORIZ PITCH (ISOL COPY)
0028 323400    D           STA      HPITWK         ;SET DEFAULT HORIZ PITCH (FORMATTER COPY)
002B 0F                    RRC                     ;
002C 323500    D           STA      HPITW2         ;1/2 WORKING PITCH
002F AF                    XRA      A              ;RESET
0030 323AE0                STA      HPITFF         ;PITCH SELECT FLAG
0033 323500    D           STA      PPITC1         ;AND PROPORTIONAL PITCH FLAG
0036 320000    E           STA      CPPPTR         ;AND CONTEXTUAL POST PROC BUFFER PTR
0039 320000    E           STA      NPPDEG         ;AND NOISE DELETE FLAG
003C 320000    E           STA      PSJLFG         ;
003F 320000    E           STA      PSJLCT         ;
0042 C9                    RET                     ;DONE

                   SEJECT
                   ;*********************
                   ;SEARCH PIR CHAIN FOR A COMPLETE LINE.  IF PIR CHAIN EMPTY OR LINE INCOMPLETE
                   ;AND ACC=OCOMPL, RETURN CC.NE.  OTHERWISE, OUTPUT LINE AND RETURN CC.EQ.
                   ;OUTLIN MAKES TWO PASSES - FIRST PASS FINDS THE TOPMOST LINE ORIGIN, AND
                   ;THE SECOND PASS OUTPUTS LINES.  OUTLRP IS PASS1 FORCED RESTART POINT.
0043 321800    D   OUTLIN: STA      OUTCNT         ;SAVE OUTPUT CONTROL
0046 AF            OUTLRP: XRA      A              ;
0047 321900    D           STA      OUTCMP         ;RESET LINE COMPLETE FLAG
004A 2A0000    E           LHLD     PIRCHP         ;START WITH FIRST PIR
004D 7C                    MOV      A,H            ;
004E B7                    ORA      A              ;PIR CHAIN EMPTY?
004F F20000    E           JP       RETCNZ         ;YES, RETURN
0052 221900    D           SHLD     LINORG         ;SAVE NEW FIRST LINE ORIGIN
0055 CDD902    C           CALL     PIRLOD         ;IS ALSO CURRENT PIR
```

```
LOC  OBJ                 SOURCE STATEMENT

005B 21FEFF    E                    LXI   H,PIRCHI-2      ;SET INITIAL LINE ORIGIN PREV PIR
005B 221500    D                    SHLD  LIPORG          ;
005E 220200    D                    SHLD  OUTPIR          ;SAVE PREV PIR PTR

                       SEJECT
                       ;********************
                       ;NEW LINE ORIGIN FOUND
0061 2A0A00    D       OUTLLO:      LHLD  CURPIR+PIRROW   ;SET PAGE ROW AT BEGINNING OF LINE
0064 222200    D                    SHLD  LWVBAS          ;SET AS LAST WORD VERTICAL END
0067 CD0000    E                    CALL  NPPSOL          ;DO NPP START OF LINE PROCESSING
006A AF                             XRA   A               ;RESET LINE CHAR COUNTS
006B 323300    D                    STA   HPITSC          ;RESET LINE SEG CHAR COUNT
006E 322E00    D                    STA   HPITCC          ;RESET PITCH WIDTH/COUNT
0071 67                             MOV   H,A             ;
0072 6F                             MOV   L,A             ;
0073 222C00    D                    SHLD  HPITPC          ;
0076 222F00    D                    SHLD  HPITSB          ;RESET LINE SEG ORG/END
0079 223100    D                    SHLD  HPITSE          ;
007C 221B00    D                    SHLD  LWHEND          ;RESET LAST WORD HORIZONTAL END
007F 220000    E                    SHLD  HPPADR          ;OUTPUT CHAR ADDRESS

0082 220000    E                    SHLD  ULOORG          ;UL OUTPUT ORIGIN
0085 220000    E                    SHLD  ULOLEN          ;UL OUTPUT LENGTH
0088 220000    E                    SHLD  ULOVAD          ;UL VERTICAL ADDRESS
008B 220000    E                    SHLD  ULPORG          ;PREV UL ORIGIN
008E 220000    E                    SHLD  ULPLEN          ;PREV UL LENGTH
0091 220000    E                    SHLD  ULWORG          ;PREV WORD ORIGIN
0094 220000    E                    SHLD  ULWEND          ;PREV WORD END

0097 223700    D                    SHLD  PPVWO1          ;RESET PREV PIR WORD ORGS
009A 223900    D                    SHLD  PPVWO2          ;
009D 223B00    D                    SHLD  PPVWO3          ;
00A0 223D00    D                    SHLD  PPVWO4          ;
                       ;
                       ;**********************************
                       ;
00A3 3A1800    D                    LDA   OUTCNT          ; Get output control
00A6 FE02                           CPI   OLINE           ; First pass ?
00A8 F2AF00    C                    JP    OUTLOO          ;   No, don't initialize
00AB AF                             XRA   A               ;
00AC 323600    D                    STA   PPITC1          ; Initialize P.S. indicator for line
                       OUTLOO:

                       SEJECT
                       ;********************
                       ;NEXT WORD IN CURRENT LINE FOUND
00AF 3A1800    D       OUTLL1:      LDA   OUTCNT          ;DETERMINE WHICH PASS THIS IS
00B2 FE02                           CPI   OLINE           ;
00B4 D25000    C                    JNC   OUTL1A          ;
00B7 CD0000    E                    CALL  PGOPS1          ;PASS 1 -- DO PITCH/NOISE/POSITIONAL PROCESSING
00BA F5                             PUSH  PSW             ;SAVE PASS 1 STATUS
00BB 2A2000    D                    LHLD  CWVBAS          ;GET CURRENT WORD VERTICAL END
00BE EB                             XCHG                  ;
00BF 2A2200    D                    LHLD  LWVBAS          ;GET LAST WORD VERTICAL END
00C2 19                             DAD   D               ;ADD TOGETHER
```

```
LOC   OBJ          LINE      SOURCE STATEMENT

00C3  CD0000    E   998            CALL    DIVBY2        ;GET AVERAGE
00C6  222200    D   999            SHLD    LAVBAS        ;SAVE AVERAGE WORD END
00C9  2A1E00    D  1000            LHLD    CWHEND        ;SET LAST WORD HORIZONTAL END
00CC  221E00    D  1001            SHLD    LWHEND
00CF  F1           1002            POP     PSW           ;
00D0  CAE500    C  1003            JZ      OUTLL2        ;RESTORE STATUS
00D3  FAE600    C  1004            JM      OUTLL2        ;NORMAL RETURN -- PROCESS NEXT WORD
00D6  3A0000    E  1005            LDA     NPPDFS        ;PIR DELETION IN PROGRESS
00D9  B7           1006            ORA     A             ;TEST FOR END OF DELETION
00DA  CA0C02    C  1007            JZ      OUTEND        ;
00DD  C34600    C  1008            JMP     OUTLEP        ;END OF DELETION FOUND
                   1009                                  ;RESTART PASS 1/START DELETION
00E0  CD0000    E  1010  OUTL1A:   CALL    PSOPS2
00E3  CDCC02    C  1011            CALL    PIRDLE        ;PASS 2 -- OUTPUT PIR DATA
                   1012                                  ;FREE UP PIR
                   1013  $EJECT
                   1014  ;*********************
                   1015  ;ADVANCE TO NEXT WORD
00E6  2A0000    D  1016  OUTLL2:   LHLD    OUTPIR
00E9  220200    D  1017            SHLD    OUPPIR        ;
00EC  2A0500    D  1018            LHLD    CURPIR+PIRFOR ;SAVE AS PREVIUS POINTER
00EF  CD0902    C  1019            CALL    PIRLOD        ;=>NEXT PIR
00F2  3A0100    D  1020            LDA     OUTPIR+1      ;LOAD LOCAL VARIABLES WITH NEW PIR
00F5  B7           1021            ORA     A             ;
00F6  F21A01    C  1022            JP      OUTL03        ;END OF CHAIN?
00F9  CD3702    C  1023            CALL    ADJOIN        ;YES, END OF PASS
00FC  CAAE00    C  1024            JZ      OUTLL1        ;CURRENT WORD ON SAME LINE AS PREV WORD?
00FF  F20C02    C  1025            JP      OUTEND        ;YES, OUTPUT PIR IF PASS TWO
0102  CD2502    C  1026            CALL    TSTNRL        ;DELETED NOISE RECORD - RESTART PASS1
0105  C2E600    C  1027            JNZ     OUTLL2        ;NEW LINE ORIGIN?
0108  CD0000    E  1028            CALL    NPPSOL        ;NO - ADVANCE TO NEXT PIR
010B  2A0000    D  1029            LHLD    OUTPIR        ;RESET NOISE PROC. TO START OF LINE
010E  221400    D  1030            SHLD    LINORG        ;YES - SET CURRENT PIR POINTER
0111  2A0200    D  1031            LHLD    OUPPIR        ;SET LINE ORIGIN
0114  221600    D  1032            SHLD    LIPORG        ;=>PREVIOUS PIR
0117  C36100    C  1033            JMP     OUTLL0        ;SET AS LINE PREV PIR ORG
                   1034                                  ;PROCESS NEW LINE
                   1035  $EJECT
                   1036  ;*********************
                   1037  ;END OF PASS 1 - IF LINE COMPLETE OR FORCE FLAG SET, LOOP BACK FOR PASS 2
011A  210000    E  1038  OUTL03:   LXI     H,NPPDFS
011D  7E           1039            MOV     A,M           ;NPP DELETE IN PROGRESS?
011E  3600         1040            MVI     M,0           ;
0120  B7           1041            ORA     A             ;TURN OFF IF IN PROGRESS
0121  C20C02    C  1042            JNZ     OUTEND
0124  2A0000    E  1043            LHLD    PIRCHP        ;IF WAS IN PROGRESS, REPEAT PASS1
0127  7C           1044            MOV     A,H           ;PIR CHAIN NOW EMPTY?
0128  B7           1045            ORA     A             ;
0129  F2FB01    C  1046            JP      OUTL08        ;
012C  3A1800    D  1047            LDA     OUPCNT        ;Send end of line if so
012F  FE02         1048            CPI     2LINE         ;END OF PASS - GET PASS CONTROL
0131  F2FB01    C  1049            JP      OUTL08        ;OUTPUT PASS TWO COMPLETE(LINE/WORD)?
0134  FE00         1050            CPI     OCOMPL        ;Yes - End of line - Perform EOL processing
0136  C23D01    C  1051            JNZ     OUTL04        ;NO - END OF PASS 1
0139  CD0E02    C  1052            CALL    TSTFCL        ;OUTPUT EVEN INCOMPLETE LINES
                                                         ;TEST FOR COMPLETE LINE
```

```
LOC  OBJ               SOURCE STATEMENT

013C C0                        RNZ                  ;IF NOT FOUND, RETURN
013D CD0000    E       OUTL04: CALL    NPPEOL       ;NPP END OF LINE PROCESSING
0140 C24600    C               JNZ     OUILRP       ;RESTART PASS1 TO DELETE LAST SEGMENT/LINE
0143 3E02                      MVI     A,OLINE      ;FLAG PASS TWO
0145 321800    D               STA     OUTCNT       ;
                       ;
0148 2A1E00    D               LHLD    LWHEND       ; Save last word horizontal end as end of line
014B 222800    D               SHLD    LINEND       ;    pixel location
                       ;
014E 2A1600    D               LHLD    LIPORG       ;GET LINE ORIGIN PREVIOUS PIR
0151 220200    D               SHLD    OJPPIR       ;SAVE
0154 2A1400    D               LHLD    LINORG       ;USE LINE ORIGIN DETECTED ON PASS 1
0157 CDD902    C               CALL    PIRLOD       ;SAVE AS CURRENT PIR PTR

                       SEJECT
                       ;*********************
                       ;IF ENOUGH CHARS IN CURRENT LINE, DIVIDE DATA PIXEL COUNT BY CHAR COUNT TO
                       ;DETERMINE PIXELS/CHAR. IF 19 OR 20 PIXELS/CHAR, SET 12 PITCH.  IF 23 OR 24
                       ;PIXELS/CHAR, SET 10 PITCH, ELSE USE PREV PITCH.
015A AF                        XRA     A            ;
015B 47                        MOV     B,A          ;
015C 4F                        MOV     C,A          ;
015D 57                        MOV     D,A          ;
015E 5F                        MOV     E,A          ;
015F CD0000    E               CALL    PIRSUD       ;AND ADD CURRENT LINE SEG TO TOTALS
0162 3A2E00    D               LDA     HPITCC       ;GET CHAR COUNT
0165 FE03                      CPI     HPITSW       ;LONG ENOUGH TO SET PAGE IMAGE PITCH?
0167 FA6100    C               JM      OUTLLO       ;NO, DONT SELECT PITCH
016A 3A01E0                    LDA     FMTFLG       ;FORMATTER INSTALLED?
016D 3C                        INR     A            ;
016E C28501    C               JNZ     OUTL43       ;NO, TEXT LONG ENOUGH TO SET PAGE IMAGE PITCH
0171 3A2E00    D               LDA     HPITCC       ;YES, TEST FOR LONGER LINE REQ BY FORMATTER
0174 FE0C                      CPI     HPITMC       ;
0176 F28501    C               JP      OUTL43       ;LONG ENOUGH TO SET FORMAT PITCH
0179 3A3AE0                    LDA     HPITPF       ;PITCH ALREADY SET?
017C 3D                        DCR     A            ;
017D F26100    C               JP      OUTLLO       ;YES, DONT SET INTERMEDIATE PITCH
0180 3EFF                      MVI     A,0FFH       ;NOT LONG ENOUGH TO TRANSMIT FORMAT PITCH,
0182 323AE0                    STA     HPITPF       ;BUT LONG ENOUGH TO SET WORKING PITCH

                       SEJECT
                       ;*********************
                       ;PITCH SELECT - CONTD
0185 3A2E00    D       OUTL43: LDA     HPITCC       ;GET TOTAL CHAR COUNT ON LINE
0188 2A2C00    D               LHLD    HPITPC       ;GET TOTAL CHARACTER WIDTH ON LINE
018B CD0000    E               CALL    PIKDIV       ;GET AVERAGE WIDTH
018E 3A3600    D               LDA     PPITC1       ; If in P.S. font, then send send pitch of
0191 B7                        ORA     A            ;    18 to the formatter and set horizontal
0192 CAA401    C               JZ      OTLO01       ;   pitch for isolation to 20
0195 2139E0                    LXI     H,HPITCH     ; Has P.S. pitch sent yet ?
0198 3E16                      MVI     A,22         ;
019A BE                        CMP     M            ;
019B CA6100    C               JZ      OUTLLO       ; Yes, then start pass 2
019E 77                        MOV     M,A
```

```
LOC  OBJ              SOURCE STATEMENT
019E 3E14               MVI    A,20       ; Set intermediate pitch for use by isolation
01A1 C3DE01    C        JMP    OUTL6A     ; Set horizontal pitch for formatter use
                                          ; Send pitch change escape sequence
01A4 3E12      OTL001:  MVI    A,18       ;IF LESS THAN 19 PIXELS, IGNORE
01A6 B8                 CMP    B
01A7 F26100    C        JP     OUTLLO     ;
01AA 3E14               MVI    A,20       ;
01AC B8                 CMP    B          ;<=20?
01AD 0E14               MVI    C,20       ;
01AF F2C001    C        JP     OUTL05     ;ASSUME 12 PITCH
01B2 3E16               MVI    A,22       ;YES, SET 12 PITCH
01B4 B8                 CMP    B          ;>=23?
01B5 F26100    C        JP     OUTLLO     ;
01B8 3E18               MVI    A,24       ;NO, USE PREV PITCH
01BA B8                 CMP    B          ;IF MEAN > 24, IGNORE
01BB FA6100    C        JM     OUTLLO     ;
01BE 0E18               MVI    C,24       ;
01C0 3A3AE0    OUTL05:  LDA    HPITPF     ;YES, SET 10 PITCH
01C3 3D                 DCR    A          ;ANY HOR. PITCH SENT?
01C4 FACE01    C        JM     OUTL06     ;
01C7 3A39E0             LDA    HPITCH     ;NO, CHECK IT
01CA B9                 CMP    C          ;PITCH CHANGED?
01CB CA6100    C        JZ     OUTLLO     ;
01CE 79        OUTL06:  MOV    A,C        ;NO, CONTINUE
01CF 3239E0             STA    HPITCH     ;SET NEW PITCH
01D2 3A3AE0             LDA    HPITPF     ;
01D5 B7                 ORA    A          ;SEND NEW PITCH?
01D6 3E00               MVI    A,0        ;
01D8 FAF501    C        JM     OUTL07     ;
                                          ;NO, CONTINUE
01DB 3A39E0             LDA    HPITCH     ;
               ;********************
               ;SEND PITCH CHANGE ESCAPE SEQUENCE
01DE 5F        OUTL6A:  MOV    E,A        ;HORIZONTAL PITCH
01DF 323400    D        STA    HPITWK     ;SAVE AS WORKING PITCH
01E2 B7                 ORA    A          ;
01E3 1F                 RAR               ;COMPUTE 1/2 WORKING PITCH
01E4 323500    D        STA    HPITW2     ;SAVE IT
01E7 0600               MVI    B,0        ;
01E9 3A3BE0             LDA    VPITCH     ;SET VERTICAL PITCH
01EC 4F                 MOV    C,A        ;
01ED 50                 MOV    D,B        ;
01EE 3E45               MVI    A,ESCIPC   ;PITCH CHANGE IDENTIFIER
01F0 CD0000    E        CALL   OUTESH     ;OUTPUT ESC SEQ
01F3 3E01               MVI    A,1        ;SET PITCH SELECTED FLAG
01F5 323AE0    OUTL07:  STA    HPITPF     ;
01F8 C36100    C        JMP    OUTLLO     ;START PASS 2

               SEJECT
               ;***********************************
               ;
               ; End of line processing - Send underline if any present.  Then send end of
               ; line escape sequence.
               ;
01FB CD0000    E OUTL08: CALL  ULOSND     ; Send underline if present
```

```
LOC  OBJ                SOURCE STATEMENT

01FE 2A2600    D                 LHLD    LINEND          ; Set end of line pixel location
0201 EB                          XCHG
0202 2A2A00    D                 LHLD    LNVEND          ; Set end of line vertical location
0205 44                          MOV     B,H
0206 4D                          MOV     C,L
0207 3E53                        MVI     A,ESCEOL
0209 CD0000    E                 CALL    OUTESH          ; Send end of line escape sequence
020C AF                 OUTEND:  XRA     A
020D C9                          RET

                        $EJECT
                        ;*********************
                        ;TEST FOR COMPLETE LINE. RETURN CC.EQ IF COMPLETE LINE FOUND, ELSE CC.NE
020E 2A1400    D        TSTFCL:  LHLD    LINOBS          ;PICK UP WORD BASE AT BEGINNING OF LINE
0211 110600                      LXI     D,PIRROW        ;
0214 19                          DAD     D               ;
0215 4E                          MOV     C,M             ;
0216 2C                          INR     L               ;
0217 46                          MOV     B,M             ;
0218 2A0000    E                 LHLD    RCBHVO          ;GET REC BUFFER HIGH VERTICAL ORIGIN
021B 11F4FF                      LXI     D,-12           ;REQUIRE XX ROWS BETWEEN LINE BOTTOM AND
021E 19                          DAD     D               ;HIGHEST REC BUFFER TOP
021F CD0000    E                 CALL    DSUB            ;REC BUFFER TOP STILL OVERLAPS LINE BOTTOM?
0222 F0                          RP                      ;IF SO, NO COMPLETE LINE
0223 AF                          XRA     A
0224 C9                          RET                     ;ELSE LINE COMPLETE

                        $EJECT
                        ;*********************
                        ;CURRENT WORD IS NOT IN CURRENT LINE - RETURN CC.EQ IF CURRENT WORD
                        ;STARTS A NEW LINE
0225 2A2200    D        TSTNWL:  LHLD    LWVEAS          ;GET VERTICAL ORIGIN OF PREVIOUS WORD ON LINE
0228 44                          MOV     B,H             ;
0229 4D                          MOV     C,L             ;
022A 2A0A00    D                 LHLD    CURPIR+PIRROW   ;VERTICAL ORIGIN OF CURRENT PIR
022D 111400                      LXI     D,20            ;GET SLOPE ADJUST
0230 19                          DAD     D               ;
0231 CD0000    E                 CALL    DSUB            ;
0234 F8                          RM                      ;HL=VERTICAL LINE ORG-VERTICAL WORD ORG
0235 AF                          XRA     A               ;WORD IS LOWER, NOT NEW LINE
0236 C9                          RET                     ;WORD IS SAME OR HIGHER, NEW LINE
                                                         ;
                        $EJECT
                        ;*********************
                        ;SET CC.EQ. IF CURRENT PIR IS ON SAME LINE AS LAST PIR OF CURRENT LINE.
                        ;RETURN CC.LT IF NOT ADJOINING, CC.GT IF PIR IS DELETED NOISE RECORD.
                        ;PIR IS ADJACENT IF:
                        ;   1. VERTICAL ERROR IS <= MAXVER AND
                        ;   2. HORIZONTAL GAP <=MAXHIE OR
                        ;   3. VERTICAL ERROR BETWEEN CURRENT PIR AND ALL 4 LINE SEGMENT VERTICAL
                        ;      BASES IS .LE. MAKVIE.
0237 2A0A00    D        ADJOIN:  LHLD    CURPIR+PIRROW   ;GET VERTICAL WORD BASE
023A 44                          MOV     B,H             ;
023B 4D                          MOV     C,L             ;
023C 2A2200    D                 LHLD    LWVBAS          ;GET LAST WORD BASE
```

```
LOC  OBJ            LINE        SOURCE STATEMENT

023F 3E18           1217        MVI     A,MAXVER          ;GET MAX ACCEPTABLE VERTICAL ERROR
0241 C5             1218        PUSH    B                 ;
0242 CD0000    E    1219        CALL    KNGCHK            ;WITHIN RANGE?
0245 D1             1220        POP     D                 ;
0246 C29C02    C    1221        JNZ     ADJ001            ;NO, UPDATE OTHER LINE SEG VERTICAL ENDS
0249 2A0400    D    1222        LHLD    CURPIR+PIRCOL     ;GET HORIZONTAL WORD ORIGIN
024C 44             1223        MOV     B,H               ;
024D 4D             1224        MOV     C,L               ;
024E 2A1E00    D    1225        LHLD    LWHEND            ;IF SMALL ENOUGH GAP BETWEEN THIS WORD
0251 3E32           1226        MVI     A,MAXHIE          ;AND LAST WORD OF CURRENT LINE,
0253 D5             1227        PUSH    D                 ;
0254 CD0000    E    1228        CALL    KNGCHK            ;WORD IS IN CURRENT LINE
0257 C1             1229        POP     B                 ;
0258 FA7D02    C    1230        JM      ADJ0X0            ;IF OVERLAP, DELETE IF NOISE
025B CA6F02    C    1231        JZ      ADJ000            ;IF SMALL GAP, WORD IS IN CURRENT LINE
025E 213700    D    1232        LXI     H,PPVW01          ;=>FIRST LINE SEGMENT VERT ORIGIN BUCKET
0261 CDB502    C    1233        CALL    ADJTST            ;TEST IF CURR PIR ADJOINS FIRST SEG
0264 CDB502    C    1234        CALL    ADJTST            ;SECOND
0267 CDB502    C    1235        CALL    ADJTST            ;THIRD
026A CDB502    C    1236        CALL    ADJTST            ;FOURTH
026D AF             1237        XRA     A                 ;RETURN IN LINE STATUS
026E C9             1238        RET                       ;DONE
                    1239
                    1240 $EJECT
                    1241 ;*********************
                    1242 ;WORD IN CURRENT LINE - TEST IF SINGLE POORLY ALIGNED PUNCTUATION
026F 2A0A00    D    1243 ADJ000: LHLD    CURPIR+PIRROW     ;GET VERTICAL WORD ORIGIN
0272 44             1244        MOV     B,H               ;
0273 4D             1245        MOV     C,L               ;
0274 2A2200    D    1246        LHLD    LWVBAS            ;GET LAST WORD BASE
0277 3E0C           1247        MVI     A,12              ;CLOSE TO LAST BASE?
0279 CD0000    E    1248        CALL    KNGCHK            ;
027C C8             1249        RZ                        ;PIR WITHIN CLOSE ALIGNMENT, RETURN OK STATUS
                    1250
                    1251 ;*********************
                    1252 ;IF SINGLE SMALL CHAR WITH BAD BASE IN PASS1, DELETE
027D 3A1800    D    1253 ADJ0X0: LDA     OUTCNT            ;PASS 1?
0280 FE02           1254        CPI     OLINL             ;
0282 F20000    E    1255        JP      RETCZ             ;NO, DONT DELETE
0285 3A0000    E    1256        LDA     NPPDFS            ;DELETE ALREADY IN PROGRESS?
0288 B7             1257        ORA     A                 ;
0289 C20000    E    1258        JNZ     RETCZ             ;YES, LET NORMAL PROCESS DO DELETION
028C 3A0800    D    1259        LDA     CURPIR+PIRSTA     ;GET STATUS/LENGTH
028F E68F           1260        ANI     PIRSSC+PIRSCC     ;
0291 FE81           1261        CPI     PIRSSC+1          ;IS IT SINGLE SMALL CHAR
0293 C20000    E    1262        JNZ     RETCZ             ;NO, JUST RETURN
0296 CDCC02    C    1263        CALL    PIRDLE            ;DELETE NOISE
0299 C30000    E    1264        JMP     RETCP             ;
                    1265
                    1266 $EJECT
                    1267 ;*********************
                    1268 ;WORD NOT IN CURRENT LINE - UPDATE ALL INTERMEDIATE LINE ENDINGS
029C 2A3B00    D    1269 ADJ001: LHLD    PPVW03            ;MOVE DOWN FIRST THREE ENTRIES
029F 223D00    D    1270        SHLD    PPVW04            ;
02A2 2A3900    D    1271        LHLD    PPVW02            ;
```

```
LOC  OBJ           LINE      SOURCE STATEMENT

02A5 223B00   D    1272           SHLD    PPVWO3              ;
02A8 2A3700   D    1273           LHLD    PPVWO1              ;
02AB 223900   D    1274           SHLD    PPVWO2              ;
02AE EB            1275           XCHG                        ;
02AF 223700   D    1276           SHLD    PPVWO1              ;SAVE VERTICAL ORIGIN
02B2 C30000   E    1277           JMP     RETCA               ;
                   1278                                       ;RETURN NOT SAME LINE STATUS
                   1279 $EJECT
                   1280 ;*********************
                   1281 ;TEST IF CURR PIR VER ORG IS CLOSE TO LINE SEG VER END =>HL.  IF SO, UPDATE
                   1282 ;LINE SEG VER END BHL AND *** POP STACK TO FORCE ADJOIN RETURN W/CC.NZ.
02B5 5E            1283 ADJTSP:  MOV     E,M                 ;LOAD CURRENT LIN SEG VER END
02B6 23            1284           INX     H                   ;
02B7 56            1285           MOV     D,M                 ;
02B8 23            1286           INX     H                   ;
02B9 E5            1287           PUSH    H                   ;SAVE => VER END
02BA C5            1288           PUSH    B                   ;SAVE CURR PIR VER ORG
02BB EB            1289           XCHG
02BC 3E12          1290           MVI     A,MAXVIE            ;GET MAX LINE SEG ERROR
02BE CD0000   E    1291           CALL    RNGCHK              ;CHECK IF IN RANGE
02C1 C1            1292           POP     B                   ;RESTORE
02C2 E1            1293           POP     H
02C3 C0            1294           RNZ                         ;RETURN IF CURR PIR NOT IN SEG
02C4 2B            1295           DCX     H                   ;STORE CURR PIR VER ORG AS LINE SEG VER END
02C5 70            1296           MOV     M,B                 ;
02C6 2B            1297           DCX     H                   ;
02C7 71            1298           MOV     M,C                 ;
02C8 E1            1299           POP     H                   ;*** FORCE ADJOIN RETURN ***
02C9 C30000   E    1300           JMP     RETCNZ              ;
                   1301
                   1302 $EJECT
                   1303 ;*********************
                   1304 ;PIRDLE - DELETE PIR (UNLINK AND DELETE)
02CC 2A0000   D    1305 PIRDLE:  LHLD    OUTPIR              ;
02CF CD0000   E    1306           CALL    PIRUNL              ;UNLINK CURRENT PIR FROM CHAIN
02D2 2A0000   D    1307           LHLD    OUTPIR              ;
02D5 CD0000   E    1308           CALL    RLSPIR              ;DELETE PIR (PUT ON FREE CHAIN)
02D8 C9            1309           RET                         ;DONE
                   1310
                   1311 $EJECT
                   1312 ;*********************
                   1313 ;LOAD PIR INTO WORK AREA  --  SAVE POINTER (HL) TO NEW OUTPUT PIR.  COPY
                   1314 ; PIR BUFFER TO WORK AREA FOR EASY ACCESS
02D9 220000   D    1315 PIRLOD:  SHLD    OUTPIR              ;SAVE => OUTPUT PIR
02DC 110400   D    1316           LXI     D,CURPIR            ;=> WORK AREA
02DF 0610          1317           MVI     B,PIRSIZ            ;SIZE OF AREA
                   1318
02E1 7E            1319 PIRL10:  MOV     A,M                 ;GET BYTE
02E2 12            1320           STAX    D                   ;MOVE BYTE TO WORK AREA
02E3 23            1321           INX     H                   ;POINT TO PIR BYTE
02E4 13            1322           INX     D                   ;POINT TO NEXT WORK AREA BYTE
02E5 05            1323           DCR     B                   ;DECREMENT LOOP COUNT
02E6 C2E102   C    1324           JNZ     PIRL10              ;LOOP BACK IF NOT DONE
                   1325
```

```
LOC   OBJ              LINE           SOURCE STATEMENT

02E9  2A0400     D     1326           LHLD    CURPIR+PIRCOL     ;INITIALIZE CURRENT WORD VARIABLES
02EC  221A00     D     1327           SHLD    CWHORS
02EF  3A0900     D     1328           LDA     CURPIR+PIRLEN
02F2  BD               1329           CMP     L
02F3  D2F702     C     1330           JNC     PIRL20
02F6  2B               1331           INR     H
02F7  6F               1332  PIRL20:  MOV     L,A
02F8  221C00     D     1333           SHLD    CWHEND
02FB  2A0A00     D     1334           LHLD    CURPIR+PIRROW
02FE  222000     D     1335           SHLD    CWVBAS
0301  C9               1336           RET
                       1337
                       1338           END

ASSEMBLY COMPLETE,   NO ERRORS
```

| STATUS | ASCII | LOW ASCII | NEXT ASCII | COUNT | LOW SCORE MIN | LOW SCORE AVG | LOW SCORE MAX | SEPARATION MIN | SEPARATION AVG | SEPARATION MAX |
|---|---|---|---|---|---|---|---|---|---|---|
| | a (61) | a (51) | a (55) | 32 | 00 | 01 | 04 | 30 | 39 | 45 |
| | b (62) | b (52) | h (68) | 32 | 00 | 03 | 08 | 27 | 35 | 41 |
| | c (63) | c (53) | e (65) | 08 | 00 | 00 | 01 | 19 | 21 | 22 |
| | c (63) | c (53) | o (5F) | 24 | 00 | 01 | 06 | 15 | 20 | 28 |
| | d (64) | d (54) | ? (3F) | 09 | 00 | 00 | 01 | 99 | 99 | FF |
| | d (64) | d (64) | (14) | 15 | 00 | 00 | 02 | 40 | 43 | 46 |
| | d (64) | d (54) | (13) | 08 | 00 | 00 | 02 | 41 | 43 | 47 |
| | e (65) | e (55) | a (61) | 29 | 04 | 07 | 12 | 18 | 23 | 25 |
| | e (65) | e (65) | o (6F) | 01 | 06 | 06 | 06 | 27 | 27 | 27 |
| | e (65) | e (55) | (AB) | 02 | 09 | 11 | 13 | 16 | 19 | 23 |
| | f (66) | f (56) | (12) | 24 | 00 | 03 | 09 | 32 | 39 | 47 |
| | f (66) | f (66) | ? (3F) | 08 | 00 | 02 | 06 | 99 | 99 | FF |
| | g (67) | g (57) | q (71) | 24 | 00 | 02 | 06 | 22 | 27 | 34 |
| | g (67) | g (67) | 9 (39) | 08 | 00 | 02 | 05 | 25 | 28 | 31 |
| | h (68) | h (58) | b (52) | 27 | 00 | 02 | 05 | 29 | 37 | 45 |
| | h (68) | h (58) | ? (3F) | 01 | 04 | 04 | 04 | 99 | 99 | 99 |
| | h (68) | h (58) | (15) | 04 | 01 | 01 | 03 | 40 | 41 | 43 |
| | i (69) | i (59) | (12) | 32 | 01 | 03 | 05 | 10 | 13 | 18 |
| | j (6A) | j (5A) | ? (3F) | 31 | 00 | 01 | 05 | 99 | 99 | FF |
| | j (6A) | j (5A) | ] (5D) | 01 | 03 | 03 | 03 | 42 | 42 | 42 |
| | k (6B) | k (53) | ? (3F) | 31 | 00 | 02 | 06 | 99 | 99 | FF |
| | k (6B) | k (6B) | x (78) | 01 | 02 | 02 | 02 | 45 | 45 | 45 |
| | l (6C) | l (5C) | I (49) | 32 | 01 | 03 | 07 | 09 | 12 | 15 |
| | m (6D) | m (5D) | ? (3F) | 32 | 00 | 00 | 00 | FF | FF | FF |
| | n (6E) | n (5E) | u (75) | 32 | 00 | 02 | 06 | 28 | 33 | 38 |
| | o (6F) | o (5F) | c (53) | 32 | 01. | 04 | 09 | 14 | 18 | 23 |
| | p (70) | r (70) | P (50) | 32 | 00 | 02 | 07 | 15 | 23 | 38 |
| | q (71) | q (71) | g (57) | 32 | 00 | 02 | 06 | 26 | 31 | 41 |
| | r (72) | r (72) | ? (3F) | 22 | 01 | 01 | 03 | 99 | 99 | 99 |
| | r (72) | r (72) | (BC) | 10 | 01 | 01 | 02 | 37 | 41 | 45 |
| | s (73) | s (73) | e (55) | 04 | 03 | 05 | 09 | 18 | 22 | 25 |
| | s (73) | s (73) | a (61) | 28 | 00 | 04 | 11 | 15 | 22 | 32 |
| | t (74) | t (74) | ? (3F) | 32 | 00 | 01 | 03 | 99 | 99 | FF |

| STATUS | ASCII | LOW ASCII | NEAR ASCII | COUNT | LOW SCORE MIN | LOW SCORE AVG | LOW SCORE MAX | SEPARATION MIN | SEPARATION AVG | SEPARATION MAX |
|---|---|---|---|---|---|---|---|---|---|---|
| | u (75) | u (75) | ? (3F) | 01 | 03 | 03 | 03 | 99 | 99 | 99 |
| | u (75) | u (75) | n (6E) | 25 | 00 | 00 | 04 | 34 | 39 | 44 |
| | u (75) | u (75) | o (6F) | 03 | 02 | 02 | 03 | 37 | 40 | 43 |
| | u (75) | u (75) | (8F) | 03 | 01 | 02 | 03 | 35 | 35 | 37 |
| | v (76) | v (76) | ? (3F) | 31 | 01 | 03 | 05 | 99 | 99 | 99 |
| | v (76) | v (76) | Y (59) | 01 | 03 | 03 | 03 | 44 | 44 | 44 |
| | w (77) | w (77) | ? (3F) | 13 | 01 | 02 | 05 | 99 | 99 | 99 |
| | w (77) | w (77) | W (57) | 19 | 00 | 02 | 05 | 36 | 39 | 43 |
| | x (78) | x (78) | ? (3F) | 20 | 00 | 00 | 04 | 99 | 99 | FF |
| | x (78) | x (78) | z (7A) | 12 | 00 | 00 | 03 | 43 | 45 | 47 |
| | y (79) | y (79) | Y (59) | 32 | 00 | 04 | 11 | 17 | 24 | 32 |
| | z (7A) | z (7A) | s (73) | 30 | 00 | 01 | 05 | 32 | 40 | 47 |
| | z (7A) | z (7A) | x (78) | 01 | 00 | 00 | 00 | 41 | 41 | 41 |
| | z (7A) | z (7A) | ? (3F) | 01 | 02 | 02 | 02 | 99 | 99 | 99 |
| | A (41) | A (41) | ? (3F) | 32 | 00 | 00 | 03 | 99 | 99 | FF |
| | B (42) | B (42) | (8F) | 12 | 00 | 02 | 04 | 13 | 17 | 23 |
| | B (42) | B (42) | 8 (38) | 20 | 00 | 01 | 04 | 11 | 17 | 21 |
| | C (43) | C (43) | O (4F) | 29 | 00 | 04 | 08 | 27 | 30 | 34 |
| | C (43) | C (43) | G (47) | 03 | 03 | 07 | 12 | 29 | 30 | 32 |
| | D (44) | D (44) | O (4F) | 32 | 00 | 00 | 03 | 25 | 30 | 37 |
| | E (45) | E (45) | B (42) | 31 | 00 | 04 | 09 | 29 | 35 | 41 |
| | E (45) | E (45) | (8F) | 01 | 05 | 05 | 05 | 31 | 31 | 31 |
| | F (46) | F (46) | E (45) | 31 | 00 | 03 | 07 | 29 | 33 | 38 |
| | F (46) | F (46) | P (50) | 01 | 05 | 05 | 05 | 32 | 32 | 32 |
| | G (47) | G (47) | O (4F) | 32 | 00 | 00 | 01 | 26 | 35 | 41 |
| | H (48) | H (48) | M (4D) | 05 | 00 | 01 | 04 | 42 | 43 | 46 |
| | H (48) | H (48) | B (42) | 17 | 00 | 01 | 04 | 36 | 41 | 44 |
| | H (48) | H (48) | ? (3F) | 07 | 00 | 02 | 04 | 99 | 99 | FF |
| | H (48) | H (48) | N (4E) | 03 | 01 | 02 | 03 | 42 | 43 | 45 |
| | I (49) | I (49) | (12) | 20 | 01 | 02 | 07 | 18 | 22 | 26 |
| | I (49) | I (49) | 1 (31) | 12 | 02 | 02 | 03 | 16 | 20 | 24 |
| | J (4A) | J (4A) | ? (3F) | 32 | 00 | 01 | 04 | 99 | 99 | FF |
| | K (4B) | K (4B) | ? (3F) | 31 | 02 | 04 | 09 | 99 | 99 | 99 |
| | K (4B) | K (4B) | [ (5B) | 01 | 05 | 05 | 05 | 42 | 42 | 42 |
| | L (4C) | L (4C) | ? (3F) | 32 | 00 | 00 | 06 | 99 | 99 | FF |
| | M (4D) | M (4D) | ? (3F) | 32 | 00 | 01 | 03 | 99 | 99 | FF |

| STATUS | ASCII | LOW ASCII | NEXT ASCII | COUNT | LOW SCORE MIN | AVG | MAX | SEPARATION MIN | AVG | MAX |
|---|---|---|---|---|---|---|---|---|---|---|
| | N (4E) | N (4E) | (35) | 07 | 00 | 00 | 01 | 40 | 45 | 47 |
| | N (4E) | N (4E) | ? (3F) | 22 | 00 | 00 | 02 | 99 | 99 | FF |
| | N (4E) | N (4E) | M (4D) | 03 | 00 | 00 | 00 | 47 | 47 | 47 |
| | O (4F) | O (4F) | Q (51) | 32 | 00 | 01 | 05 | 18 | 23 | 27 |
| | P (50) | P (50) | E (45) | 31 | 00 | 02 | 06 | 19 | 25 | 33 |
| | P (50) | P (50) | p (70) | 01 | 03 | 03 | 03 | 32 | 32 | 32 |
| | Q (51) | Q (51) | O (4F) | 32 | 00 | 01 | 05 | 31 | 37 | 41 |
| | R (52) | R (52) | ? (3F) | 20 | 00 | 01 | 04 | 99 | 99 | FF |
| | R (52) | R (52) | H (48) | 03 | 00 | 01 | 04 | 43 | 45 | 47 |
| | R (52) | R (52) | K (4B) | 09 | 01 | 02 | 04 | 39 | 43 | 46 |
| | S (53) | S (53) | 8 (38) | 32 | 01 | 04 | 09 | 08 | 15 | 24 |
| | T (54) | T (54) | ? (3F) | 32 | 00 | 02 | 06 | 99 | 99 | FF |
| | U (55) | U (55) | D (44) | 08 | 00 | 00 | 01 | 34 | 37 | 43 |
| | U (55) | U (55) | (14) | 07 | 00 | 00 | 01 | 34 | 37 | 41 |
| | U (55) | U (55) | O (4F) | 11 | 00 | 00 | 01 | 34 | 37 | 40 |
| | U (55) | U (55) | H (48) | 05 | 00 | 00 | 01 | 39 | 40 | 43 |
| | U (55) | U (55) | (82) | 01 | 00 | 00 | 00 | 41 | 41 | 41 |
| | V (56) | V (56) | v (76) | 27 | 00 | 00 | 02 | 33 | 40 | 47 |
| | V (56) | V (56) | ? (3F) | 05 | 00 | 01 | 03 | 99 | 99 | FF |
| | W (57) | W (57) | w (77) | 19 | 00 | 01 | 04 | 33 | 42 | 47 |
| | W (57) | W (57) | ? (3F) | 13 | 00 | 01 | 05 | 99 | 99 | FF |
| | X (58) | X (58) | ? (3F) | 23 | 02 | 08 | 11 | 99 | 99 | 99 |
| | X (58) | X (58) | K (4B) | 09 | 04 | 05 | 07 | 35 | 38 | 43 |
| | Y (59) | Y (59) | y (79) | 32 | 01 | 05 | 10 | 22 | 31 | 40 |
| | Z (5A) | Z (5A) | ? (3F) | 31 | 02 | 05 | 10 | 99 | 99 | 99 |
| | Z (5A) | Z (5A) | E (45) | 01 | 05 | 05 | 06 | 40 | 40 | 40 |
| SUBSTITUTION | 0 (30) | O (4F) | 0 (30) | 16 | 00 | 01 | 06 | 10 | 14 | 19 |
| REJECTED SUB | 0 (30) | O (4F) | 0 (30) | 12 | 02 | 05 | 11 | 00 | 05 | 09 |
| REJECTED | 0 (30) | 0 (30) | O (4F) | 02 | 02 | 04 | 07 | 03 | 04 | 05 |
| REJECTED SUB | 0 (30) | . (2E) | ` (60) | 01 | 20 | 20 | 20 | 03 | 03 | 03 |
| REJECTED SUB | l (6C) | l (6C) | I (49) | 01 | 05 | 05 | 05 | 05 | 05 | 06 |
| | l (6C) | l (6C) | I (49) | 31 | 01 | 02 | 05 | 10 | 12 | 18 |
| | 2 (32) | 2 (32) | ? (3F) | 32 | 00 | 03 | 07 | 99 | 99 | FF |
| | 3 (33) | 3 (33) | 8 (38) | 30 | 01 | 04 | 07 | 39 | 41 | 45 |
| | 3 (33) | 3 (33) | ? (3F) | 02 | 02 | 04 | 06 | 99 | 99 | 99 |
| | 4 (34) | 4 (34) | ? (3F) | 32 | 00 | 00 | 01 | 99 | 99 | FF |

| STATUS | ASCII | LOW ASCII | NEXT ASCII | COUNT | LOW SCORE | | | SEPARATION | | |
|---|---|---|---|---|---|---|---|---|---|---|
| | | | | | MIN | AVG | MAX | MIN | AVG | MAX |
| | 5 (35) | 5 (35) | 5 (35) | 25 | 01 | 03 | 07 | 33 | 33 | 45 |
| | 5 (35) | 5 (35) | ? (3F) | 03 | 04 | 04 | 04 | 99 | 99 | 99 |
| | 5 (35) | 5 (35) | S (53) | 02 | 04 | 04 | 05 | 38 | 39 | 40 |
| | 5 (35) | 5 (35) | $ (24) | 02 | 03 | 04 | 06 | 36 | 38 | 40 |
| | 6 (36) | 6 (36) | ? (3F) | 22 | 02 | 06 | 15 | 99 | 99 | 99 |
| | 6 (36) | 6 (36) | (6F) | 10 | 01 | 06 | 11 | 33 | 39 | 45 |
| | 7 (37) | 7 (37) | ? (3F) | 32 | 01 | 02 | 07 | 29 | 35 | 42 |
| | 8 (38) | 8 (38) | B (42) | 30 | 00 | 00 | 02 | 18 | 23 | 30 |
| | 8 (38) | 8 (38) | S (53) | 02 | 00 | 00 | 00 | 24 | 25 | 28 |
| | 9 (39) | 9 (39) | W (57) | 32 | 00 | 01 | 05 | 24 | 31 | 36 |
| | ! (21) | ! (21) | \| (7C) | 19 | 04 | 05 | 13 | 26 | 31 | 35 |
| | ! (21) | ! (21) | 1 (5C) | 02 | 04 | 05 | 07 | 33 | 33 | 34 |
| | ! (21) | ! (21) | 1 (59) | 11 | 02 | 05 | 06 | 30 | 32 | 35 |
| | @ (40) | @ (40) | ? (3F) | 25 | 00 | 02 | 07 | 99 | 99 | FF |
| | @ (40) | @ (40) | (11) | 07 | 00 | 02 | 05 | 41 | 43 | 45 |
| | # (23) | # (23) | ? (3F) | 32 | 01 | 04 | 09 | 99 | 99 | 99 |
| | $ (24) | $ (24) | ? (3F) | 32 | 00 | 00 | 00 | FF | FF | FF |
| | % (25) | % (25) | ? (3F) | 32 | 01 | 03 | 12 | 99 | 99 | 99 |
| REJECTED | (BA) | (BA) | ? (3F) | 04 | 33 | 34 | 37 | 99 | 99 | 99 |
| REJECTED | (BA) | (BA) | (94) | 23 | 33 | 34 | 38 | 03 | 08 | 13 |
| REJECTED SUB | (BA) | (94) | (BA) | 02 | 32 | 32 | 33 | 00 | 00 | 00 |
| | (BA) | (BA) | (94) | 02 | 32 | 32 | 32 | 07 | 10 | 13 |
| | (BA) | (BA) | ? (3F) | 01 | 32 | 32 | 32 | 99 | 99 | 99 |
| | & (26) | & (26) | ? (3F) | 32 | 00 | 01 | 04 | 99 | 99 | FF |
| | * (2A) | * (2A) | = (3D) | 13 | 00 | 01 | 03 | 19 | 22 | 28 |
| | * (2A) | * (2A) | " (22) | 19 | 00 | 02 | 07 | 19 | 24 | 30 |
| | ( (28) | ( (28) | { (7B) | 25 | 00 | 01 | 05 | 05 | 12 | 17 |
| | ( (28) | ( (28) | [ (5B) | 05 | 00 | 02 | 04 | 09 | 11 | 14 |
| | ) (29) | ) (29) | } (7D) | 32 | 01 | 03 | 09 | 04 | 08 | 13 |
| | + (2B) | + (2B) | ? (3F) | 29 | 00 | 02 | 07 | 99 | 99 | FF |
| | + (2B) | + (2B) | * (2A) | 03 | 00 | 01 | 03 | 41 | 43 | 44 |
| | = (3D) | = (3D) | (AE) | 32 | 00 | 00 | 03 | 16 | 24 | 35 |
| REJECTED SUB | ' (27) | ' (27) | . (2E) | 07 | 00 | 01 | 02 | 05 | 06 | 08 |
| REJECTED SUB | ' (27) | ' (27) | , (2C) | 23 | 00 | 00 | 02 | 05 | 07 | 09 |
| | ' (27) | ' (27) | , (2C) | 01 | 00 | 00 | 00 | 10 | 10 | 10 |
| | ' (27) | ' (27) | . (2E) | 01 | 00 | 00 | 00 | 10 | 10 | 10 |

| STATUS | ASCII | LOW ASCII | NEXT ASCII | COUNT | LOW SCORE MIN | LOW SCORE AVG | LOW SCORE MAX | SEPARATION MIN | SEPARATION AVG | SEPARATION MAX |
|---|---|---|---|---|---|---|---|---|---|---|
| | " (22) | " (22) | (39) | 07 | 00 | 00 | 00 | 15 | 13 | 20 |
| | " (22) | " (22) | = (3D) | 25 | 00 | 00 | 00 | 11 | 15 | 20 |
| | : (3A) | : (3A) | ' (27) | 26 | 00 | 00 | 04 | 14 | 25 | 33 |
| | : (3A) | : (3A) | ; (3B) | 05 | 00 | 00 | 02 | 19 | 23 | 29 |
| | : (3A) | : (3A) | , (2C) | 01 | 02 | 02 | 02 | 29 | 29 | 29 |
| | ; (3B) | ; (3B) | : (3A) | 32 | 00 | 00 | 03 | 09 | 13 | 18 |
| | , (2C) | , (2C) | ' (27) | 19 | 00 | 00 | 01 | 06 | 05 | 10 |
| REJECTED SUB | , (2C) | , (2C) | ' (27) | 13 | 00 | 00 | 01 | 04 | 04 | 05 |
| REJECTED | , (2C) | , (2C) | ' (27) | 01 | 00 | 00 | 00 | 01 | 01 | 01 |
| | . (2E) | . (2E) | ' (5D) | 25 | 00 | 00 | 00 | 10 | 11 | 13 |
| | . (2E) | . (2E) | (CB) | 07 | 00 | 00 | 00 | 10 | 11 | 12 |
| | / (2F) | / (2F) | ? (3F) | 32 | 00 | 00 | 00 | FF | FF | FF |
| | ? (3F) | ? (3F) | 7 (37) | 18 | 02 | 04 | 07 | 30 | 35 | 41 |
| | ? (3F) | ? (3F) | 2 (32) | 13 | 02 | 04 | 06 | 36 | 33 | 43 |
| | ? (3F) | ? (3F) | ? (3F) | 01 | 05 | 05 | 05 | 99 | 99 | 99 |
| REJECTED | \| (7C) | \| (7C) | } (7D) | 14 | 00 | 00 | 01 | 16 | 18 | 19 |
| REJECTED SUB | \| (7C) | \| (7C) | [ (5B) | 01 | 02 | 02 | 02 | 05 | 05 | 05 |
| | \| (7C) | \| (7C) | [ (5B) | 12 | 00 | 01 | 03 | 06 | 03 | 10 |
| | \| (7C) | \| (7C) | { (7B) | 05 | 00 | 00 | 00 | 17 | 19 | 19 |
| | (80) | (80) | ? (3F) | 32 | 01 | 05 | 13 | 99 | 99 | 99 |
| | (81) | (81) | ? (3F) | 32 | 00 | 01 | 09 | 99 | 99 | FF |
| | (82) | (82) | ? (3F) | 30 | 00 | 01 | 05 | 99 | 99 | FF |
| | (82) | (82) | (B1) | 01 | 04 | 04 | 04 | 42 | 42 | 42 |
| | (82) | (82) | (14) | 01 | 02 | 02 | 02 | 45 | 45 | 45 |
| SUBSTITUTION | (93) | (10) | (11) | 23 | 11 | 15 | 21 | 22 | 23 | 34 |
| SUBSTITUTION | (93) | (10) | ? (3F) | 09 | 11 | 13 | 18 | 99 | 99 | 99 |
| SUBSTITUTION | (9E) | (11) | (10) | 10 | 12 | 14 | 18 | 23 | 29 | 35 |
| SUBSTITUTION | (9E) | (11) | ? (3F) | 17 | 11 | 13 | 22 | 99 | 99 | 99 |
| SUBSTITUTION | (9E) | (11) | (13) | 05 | 13 | 13 | 15 | 30 | 31 | 33 |
| REJECTED SUB | (91) | (13) | (11) | 23 | 05 | 09 | 15 | 01 | 03 | 05 |
| SUBSTITUTION | (91) | (13) | (11) | 07 | 05 | 07 | 11 | 06 | 05 | 10 |
| REJECTED SUB | (91) | (11) | (13) | 02 | 07 | 07 | 08 | 01 | 02 | 03 |
| SUBSTITUTION | (92) | (14) | U (55) | 26 | 07 | 10 | 15 | 25 | 33 | 39 |
| SUBSTITUTION | (92) | (14) | ? (3F) | 04 | 08 | 11 | 18 | 99 | 99 | 99 |
| SUBSTITUTION | (92) | (14) | (82) | 02 | 08 | 09 | 10 | 36 | 37 | 38 |
| SUBSTITUTION | (89) | (10) | (96) | 32 | 09 | 12 | 17 | 14 | 18 | 22 |
| SUBSTITUTION | (8A) | (11) | (10) | 14 | 08 | 10 | 13 | 30 | 34 | 38 |
| SUBSTITUTION | (8A) | (11) | ? (3F) | 11 | 09 | 10 | 13 | 99 | 99 | 99 |
| SUBSTITUTION | (8A) | (11) | (5C) | 07 | 10 | 10 | 12 | 34 | 35 | 37 |

| STATUS | ASCII | LOW ASCII | NEXT ASCII | COUNT | LOW SCORE MIN | LOW SCORE AVG | LOW SCORE MAX | SEPARATION MIN | SEPARATION AVG | SEPARATION MAX |
|---|---|---|---|---|---|---|---|---|---|---|
| | (8C) | (8C) | (13) | 32 | 00 | 04 | 09 | 09 | 17 | 30 |
| SUBSTITUTION | (99) | (10) | (11) | 18 | 16 | 18 | 23 | 10 | 16 | 23 |
| SUBSTITUTION | (99) | (10) | (56) | 14 | 15 | 17 | 24 | 15 | 19 | 27 |
| SUBSTITUTION | (9A) | (11) | ? (3F) | 32 | 09 | 11 | 14 | 99 | 99 | 99 |
| SUBSTITUTION | (9D) | (14) | ? (3F) | 32 | 15 | 18 | 21 | 99 | 99 | 99 |
| | (9C) | (9C) | ? (3F) | 15 | 00 | 00 | 01 | 99 | 99 | FF |
| | (9C) | (9C) | q (71) | 15 | 00 | 00 | 01 | 37 | 44 | 47 |
| SUBSTITUTION | (9E) | (12) | I (49) | 31 | 00 | 02 | 05 | 26 | 31 | 41 |
| SUBSTITUTION | (9E) | (12) | ? (3F) | 01 | 04 | 04 | 04 | 99 | 99 | 99 |
| SUBSTITUTION | (8B) | (12) | i (69) | 15 | 12 | 15 | 18 | 19 | 27 | 33 |
| SUBSTITUTION | (8B) | (12) | ? (3F) | 14 | 15 | 18 | 22 | 99 | 99 | 99 |
| REJECTED SUB | (F7) | (12) | { (7B) | 14 | 32 | 35 | 39 | 00 | 05 | 14 |
| SUBSTITUTION | (F7) | (12) | { (7E) | 03 | 30 | 31 | 32 | 10 | 13 | 16 |
| REJECTED SUB | (F7) | (12) | i (69) | 03 | 32 | 32 | 34 | 01 | 05 | 13 |
| SUBSTITUTION | (F7) | (12) | i (69) | 06 | 28 | 29 | 32 | 08 | 10 | 14 |
| REJECTED SUB | (F7) | (12) | ? (3F) | 04 | 33 | 34 | 36 | 99 | 99 | 99 |
| REJECTED SUB | (F7) | (2C) | . (2E) | 01 | 08 | 08 | 08 | 02 | 02 | 02 |
| SUBSTITUTION | (F7) | (8C) | : (3A) | 01 | 00 | 00 | 00 | 41 | 41 | 41 |
| SUBSTITUTION | (F7) | (12) | ? (3F) | 01 | 31 | 31 | 31 | 99 | 99 | 99 |
| SUBSTITUTION | (F8) | (12) | i (69) | 27 | 17 | 22 | 31 | 07 | 14 | 23 |
| SUBSTITUTION | (F8) | (12) | ? (3F) | 04 | 23 | 25 | 29 | 99 | 99 | 99 |
| REJECTED SUB | (F8) | (12) | i (69) | 01 | 23 | 23 | 23 | 04 | 04 | 04 |
| SUBSTITUTION | (6D) | (14) | ? (3F) | 31 | 10 | 14 | 18 | 99 | 99 | 99 |
| SUBSTITUTION | (6D) | (14) | (15) | 01 | 09 | 09 | 09 | 33 | 33 | 33 |
| SUBSTITUTION | (EE) | (11) | ? (3F) | 32 | 08 | 10 | 13 | 99 | 99 | 99 |
| | (A4) | (A4) | ? (3F) | 32 | 00 | 00 | 05 | 99 | 99 | FF |
| | (A5) | (A8) | ? (3F) | 32 | 00 | 00 | 00 | FF | FF | FF |
| | (83) | (83) | ? (3F) | 31 | 00 | 00 | 01 | 99 | 99 | FF |
| | (83) | (83) | $ (24) | 01 | 01 | 01 | 01 | 46 | 45 | 46 |
| | (9F) | (9F) | ? (3F) | 32 | 00 | 00 | 00 | FF | FF | FF |
| | (BD) | (BD) | = (3D) | 08 | 00 | 00 | 03 | 20 | 22 | 25 |
| | (BD) | (BD) | . (2E) | 14 | 00 | 00 | 01 | 15 | 20 | 23 |
| | (BD) | (3D) | " (22) | 10 | 00 | 00 | 01 | 16 | 20 | 22 |
| | (93) | (93) | ? (3F) | 27 | 00 | 00 | 02 | 99 | 99 | FF |
| | (93) | (93) | m (6D) | 05 | 01 | 01 | 02 | 42 | 43 | 46 |
| | (94) | (94) | (8A) | 28 | 00 | 00 | 00 | 40 | 44 | 47 |
| | (94) | (94) | ? (3F) | 04 | 00 | 00 | 00 | FF | FF | FF |

| STATUS | ASCII | LOW ASCII | NEXT ASCII | COUNT | LOW SCORE MIN | LOW SCORE AVG | LOW SCORE MAX | SEPARATION MIN | SEPARATION AVG | SEPARATION MAX |
|---|---|---|---|---|---|---|---|---|---|---|
| SUBSTITUTION | (E4) | (0D) | , (2C) | 10 | 00 | 01 | 02 | 05 | 07 | 09 |
| SUBSTITUTION | (E4) | E (45) | B (42) | 11 | 01 | 05 | 10 | 31 | 35 | 40 |
| SUBSTITUTION | (E4) | E (45) | (8F) | 01 | 06 | 05 | 06 | 33 | 33 | 33 |
| UNRECOGNIZED | (E4) | ? (3F) | ? (3F) | 20 | FF | FF | FF | 00 | 00 | 00 |
| REJECTED SUB | (E4) | (0B) | , (2C) | 02 | 01 | 02 | 04 | 05 | 05 | 05 |
| SUBSTITUTION | (E0) | (0B) | , (2C) | 10 | 00 | 00 | 02 | 06 | 07 | 09 |
| SUBSTITUTION | (E0) | A (41) | ? (3F) | 14 | 00 | 02 | 04 | 99 | 99 | FF |
| REJECTED SUB | (E0) | (80) | ? (3F) | 18 | 37 | 40 | 46 | 99 | 99 | 99 |
| REJECTED SUB | (E0) | (0B) | , (2C) | 04 | 01 | 01 | 03 | 04 | 04 | 05 |
| UNRECOGNIZED | (E7) | ? (3F) | ? (3F) | 07 | FF | FF | FF | 00 | 00 | 00 |
| REJECTED SUB | (E7) | (0B) | , (2C) | 03 | 01 | 01 | 02 | 04 | 04 | 05 |
| SUBSTITUTION | (E7) | I (49) | l (6C) | 07 | 02 | 02 | 04 | 17 | 18 | 20 |
| REJECTED SUB | (E7) | (12) | ? (3F) | 09 | 41 | 44 | 47 | 99 | 99 | 99 |
| SUBSTITUTION | (E7) | (0B) | , (2C) | 11 | 00 | 00 | 02 | 05 | 07 | 09 |
| SUBSTITUTION | (E7) | I (49) | (12) | 09 | 01 | 03 | 09 | 15 | 19 | 22 |
| SUBSTITUTION | (E7) | (0E) | . (2E) | 02 | 01 | 01 | 02 | 06 | 07 | 08 |
| REJECTED SUB | (E9) | (81) | ? (3F) | 07 | 41 | 42 | 44 | 99 | 99 | 99 |
| SUBSTITUTION | (E9) | (0B) | , (2C) | 13 | 00 | 00 | 02 | 05 | 07 | 09 |
| SUBSTITUTION | (E9) | O (4F) | Q (51) | 25 | 00 | 03 | 06 | 15 | 23 | 28 |
| SUBSTITUTION | (E9) | (0B) | . (2E) | 03 | 00 | 00 | 01 | 08 | 08 | 09 |
| REJECTED SUB | (E9) | (0B) | , (2C) | 07 | 01 | 01 | 03 | 04 | 04 | 05 |
| REJECTED SUB | (E9) | (0B) | . (2E) | 02 | 02 | 02 | 03 | 05 | 05 | 05 |
| REJECTED SUB | (E1) | (0B) | , (2C) | 03 | 00 | 01 | 02 | 05 | 05 | 05 |
| SUBSTITUTION | (E1) | U (55) | O (4F) | 13 | 00 | 01 | 06 | 30 | 37 | 42 |
| REJECTED SUB | (E1) | (82) | (14) | 02 | 41 | 42 | 43 | 03 | 03 | 04 |
| SUBSTITUTION | (E1) | U (55) | D (44) | 04 | 00 | 00 | 00 | 35 | 38 | 44 |
| REJECTED SUB | (E1) | (82) | ? (3F) | 03 | 41 | 42 | 44 | 99 | 99 | 99 |
| SUBSTITUTION | (E1) | (0B) | , (2C) | 23 | 00 | 00 | 03 | 06 | 07 | 10 |
| SUBSTITUTION | (E1) | U (55) | (14) | 05 | 00 | 00 | 01 | 32 | 35 | 38 |
| SUBSTITUTION | (E1) | (0B) | . (2E) | 01 | 01 | 01 | 01 | 07 | 07 | 07 |
| SUBSTITUTION | (E1) | U (55) | H (48) | 03 | 00 | 00 | 02 | 35 | 38 | 41 |
| SUBSTITUTION | (E1) | U (55) | (82) | 01 | 01 | 01 | 01 | 37 | 37 | 37 |
| SUBSTITUTION | (E1) | U (55) | 0 (30) | 01 | 00 | 00 | 00 | 38 | 38 | 38 |
| REJECTED SUB | (E8) | ` (60) | . (2E) | 16 | 00 | 02 | 07 | 06 | 08 | 09 |
| SUBSTITUTION | (E8) | I (49) | (12) | 21 | 00 | 02 | 05 | 15 | 19 | 23 |
| SUBSTITUTION | (E8) | I (49) | l (6C) | 10 | 01 | 02 | 05 | 18 | 19 | 21 |
| SUBSTITUTION | (E8) | ` (60) | . (2E) | 15 | 00 | 01 | 04 | 10 | 10 | 13 |
| SUBSTITUTION | (EE) | ` (60) | . (2E) | 15 | 00 | 01 | 04 | 10 | 11 | 12 |
| SUBSTITUTION | (EE) | U (55) | O (4F) | 09 | 00 | 00 | 01 | 34 | 37 | 43 |
| REJECTED SUB | (EE) | ` (60) | . (2E) | 16 | 00 | 01 | 05 | 06 | 08 | 09 |
| SUBSTITUTION | (EE) | U (55) | (14) | 11 | 00 | 00 | 01 | 30 | 35 | 41 |
| SUBSTITUTION | (EE) | U (55) | H (48) | 08 | 00 | 00 | 02 | 39 | 41 | 47 |
| SUBSTITUTION | (EE) | U (55) | (82) | 01 | 00 | 00 | 00 | 37 | 37 | 37 |
| SUBSTITUTION | (EE) | U (55) | D (44) | 01 | 00 | 00 | 00 | 37 | 37 | 37 |
| SUBSTITUTION | (EE) | U (55) | ? (3F) | 01 | 00 | 00 | 00 | FF | FF | FF |

| STATUS | ASCII | LOW ASCII | NEAT ASCII | COUNT | LOW SCORE MIN | LOW SCORE AVG | LOW SCORE MAX | SEPARATION MIN | SEPARATION AVG | SEPARATION MAX |
|---|---|---|---|---|---|---|---|---|---|---|
| REJECTED SUB | (EA) | ` (60) | . (2E) | 13 | 00 | 01 | 05 | 06 | 08 | 09 |
| SUBSTITUTION | (EA) | O (4F) | Q (51) | 29 | 00 | 02 | 05 | 18 | 22 | 27 |
| SUBSTITUTION | (EA) | . (50) | . (2E) | 16 | 00 | 01 | 03 | 10 | 11 | 13 |
| REJECTED SUB | (EA) | (91) | ? (3F) | 02 | 41 | 41 | 42 | 99 | 99 | 99 |
| SUBSTITUTION | (F4) | . (50) | . (2E) | 08 | 00 | 00 | 03 | 10 | 11 | 14 |
| SUBSTITUTION | (F4) | E (45) | B (42) | 16 | 00 | 02 | 08 | 30 | 37 | 44 |
| REJECTED SUB | (F4) | ` (60) | . (2E) | 10 | 00 | 02 | 05 | 08 | 09 | 09 |
| UNRECOGNIZED | (F4) | ? (3F) | ? (3F) | 14 | FF | FF | FF | 00 | 00 | 00 |
| SUBSTITUTION | (E1) | A (41) | ? (3F) | 20 | 01 | 01 | 04 | 99 | 99 | 99 |
| REJECTED SUB | (E1) | ` (60) | . (2E) | 10 | 00 | 02 | 05 | 05 | 08 | 09 |
| REJECTED SUB | (E1) | (90) | ? (3F) | 12 | 35 | 38 | 41 | 99 | 99 | 99 |
| SUBSTITUTION | (E1) | . (50) | . (2E) | 10 | 00 | 01 | 04 | 10 | 10 | 13 |
| SUBSTITUTION | (F1) | (80) | ? (3F) | 18 | 22 | 28 | 32 | 99 | 99 | 99 |
| REJECTED SUB | (F1) | (90) | ? (3F) | 07 | 33 | 34 | 36 | 99 | 99 | 99 |
| SUBSTITUTION | (F1) | ^ (5E) | ~ (7E) | 06 | 04 | 06 | 08 | 08 | 10 | 12 |
| SUBSTITUTION | (F1) | A (41) | ? (3F) | 07 | 00 | 02 | 04 | 99 | 99 | FF |
| REJECTED SUB | (F1) | ^ (5E) | ~ (7E) | 01 | 08 | 08 | 08 | 06 | 05 | 06 |
| UNRECOGNIZED | (E5) | ? (3F) | ? (3F) | 31 | FF | FF | FF | 00 | 00 | 00 |
| SUBSTITUTION | (E5) | ^ (5E) | ` (60) | 01 | 05 | 05 | 05 | 10 | 10 | 10 |
| SUBSTITUTION | (E5) | E (45) | b (42) | 01 | 04 | 04 | 04 | 35 | 35 | 35 |
| UNRECOGNIZED | (E6) | ? (3F) | ? (3F) | 03 | FF | FF | FF | 00 | 00 | 00 |
| REJECTED SUB | (E6) | (12) | ? (3F) | 17 | 39 | 43 | 47 | 99 | 99 | 99 |
| SUBSTITUTION | (E6) | ^ (5F) | ~ (7E) | 06 | 03 | 05 | 07 | 09 | 12 | 15 |
| SUBSTITUTION | (E6) | I (49) | (12) | 07 | 02 | 03 | 04 | 14 | 17 | 21 |
| SUBSTITUTION | (E6) | ^ (5E) | ` (60) | 06 | 05 | 05 | 11 | 07 | 11 | 13 |
| SUBSTITUTION | (E6) | I (49) | l (6C) | 05 | 02 | 03 | 05 | 17 | 19 | 22 |
| SUBSTITUTION | (EC) | O (4F) | Q (51) | 25 | 00 | 01 | 05 | 18 | 22 | 27 |
| REJECTED SUB | (EC) | ^ (5E) | (CB) | 01 | 12 | 12 | 12 | 04 | 04 | 04 |
| SUBSTITUTION | (EC) | ^ (5E) | ` (60) | 04 | 05 | 05 | 07 | 11 | 13 | 15 |
| SUBSTITUTION | (EC) | ^ (5E) | ~ (7E) | 14 | 04 | 05 | 09 | 08 | 10 | 13 |
| REJECTED SUB | (EC) | (81) | ? (3F) | 07 | 34 | 35 | 37 | 99 | 99 | 99 |
| SUBSTITUTION | (EC) | ^ (5F) | - (2D) | 04 | 03 | 04 | 06 | 11 | 13 | 15 |
| SUBSTITUTION | (FC) | (82) | ? (3F) | 05 | 26 | 29 | 32 | 99 | 99 | 99 |
| SUBSTITUTION | (FC) | (82) | (14) | 08 | 30 | 31 | 32 | 07 | 11 | 15 |
| REJECTED SUB | (FC) | (82) | ? (3F) | 06 | 34 | 36 | 39 | 99 | 99 | 99 |
| SUBSTITUTION | (FC) | ^ (5E) | ~ (7E) | 05 | 05 | 05 | 07 | 10 | 11 | 14 |
| SUBSTITUTION | (FC) | U (55) | H (48) | 03 | 01 | 01 | 02 | 36 | 37 | 40 |
| REJECTED SUB | (FC) | (82) | (14) | 04 | 33 | 34 | 36 | 07 | 10 | 13 |
| SUBSTITUTION | (FC) | U (55) | D (44) | 01 | 00 | 00 | 00 | 36 | 36 | 36 |
| SUBSTITUTION | (FC) | ^ (5E) | ` (60) | 04 | 04 | 05 | 08 | 12 | 12 | 13 |
| SUBSTITUTION | (FC) | U (55) | O (4F) | 02 | 01 | 01 | 01 | 34 | 35 | 36 |
| SUBSTITUTION | (FC) | U (55) | (82) | 01 | 00 | 00 | 00 | 37 | 37 | 37 |
| SUBSTITUTION | (FC) | U (55) | (14) | 02 | 00 | 00 | 00 | 36 | 37 | 39 |
| UNRECOGNIZED | (86) | ? (3F) | ? (3F) | 01 | FF | FF | FF | 00 | 00 | 00 |
| REJECTED | (85) | (35) | (30) | 19 | 33 | 35 | 41 | 01 | 04 | 09 |
| REJECTED SUB | (86) | (80) | (85) | 06 | 37 | 41 | 44 | 00 | 01 | 02 |

| STATUS | ASCII | LOW ASCII | NEXT ASCII | COUNT | LOW SCORE MIN | LOW SCORE AVG | LOW SCORE MAX | SEPARATION MIN | SEPARATION AVG | SEPARATION MAX |
|---|---|---|---|---|---|---|---|---|---|---|
| REJECTED | (65) | (35) | (50) | 03 | 31 | 31 | 32 | 08 | 08 | 09 |
| | (65) | (35) | ? (3F) | 01 | 44 | 44 | 44 | 99 | 99 | 99 |
| SUBSTITUTION | (96) | (FD) | . (2E) | 16 | 00 | 00 | 00 | 12 | 15 | 22 |
| SUBSTITUTION | (96) | a (61) | e (65) | 16 | 00 | 01 | 04 | 32 | 37 | 45 |
| SUBSTITUTION | (95) | a (61) | s (73) | 01 | 00 | 00 | 00 | 36 | 35 | 36 |
| SUBSTITUTION | (96) | (10) | (11) | 02 | 25 | 25 | 25 | 15 | 15 | 16 |
| SUBSTITUTION | (96) | (10) | (95) | 13 | 16 | 21 | 31 | 07 | 12 | 18 |
| SUBSTITUTION | (96) | (BD) | " (22) | 01 | 00 | 00 | 00 | 20 | 20 | 20 |
| UNRECOGNIZED | (F6) | ? (3F) | ? (3F) | 21 | FF | FF | FF | 00 | 00 | 00 |
| REJECTED SUB | (F6) | (12) | l (6C) | 01 | 39 | 39 | 39 | 05 | 05 | 05 |
| REJECTED SUB | (F6) | (12) | ? (3F) | 10 | 41 | 44 | 47 | 99 | 99 | 99 |
| REJECTED | (C9) | (C9) | - (2D) | 01 | 03 | 05 | 12 | 05 | 08 | 14 |
| | (C9) | (C9) | - (2D) | 01 | 11 | 11 | 11 | 01 | 01 | 01 |
| | (CB) | (CB) | , (2C) | 22 | 00 | 00 | 04 | 06 | 07 | 10 |
| | (CB) | (CB) | . (2E) | 04 | 00 | 00 | 02 | 07 | 08 | 10 |
| REJECTED | (CB) | (CB) | , (2C) | 03 | 01 | 02 | 04 | 04 | 04 | 05 |
| REJECTED | (CB) | (CB) | . (2E) | 01 | 03 | 03 | 03 | 05 | 05 | 05 |
| REJECTED SUB | ' (60) | ' (60) | . (2E) | 11 | 00 | 00 | 05 | 10 | 10 | 12 |
| REJECTED | ' (60) | ' (60) | . (2E) | 19 | 00 | 01 | 03 | 08 | 08 | 09 |
| | ' (60) | ' (60) | . (2E) | 02 | 02 | 04 | 07 | 04 | 04 | 05 |
| | ^ (5E) | ^ (5E) | ~ (7E) | 24 | 02 | 04 | 08 | 09 | 11 | 15 |
| | ^ (5E) | ^ (5E) | ' (60) | 04 | 04 | 05 | 08 | 10 | 12 | 15 |
| | ^ (5E) | ^ (5E) | (CB) | 01 | 07 | 07 | 07 | 11 | 11 | 11 |
| | ^ (5E) | ^ (5E) | - (2D) | 03 | 04 | 04 | 05 | 13 | 14 | 16 |
| | (BD) | (3D) | = (3D) | 01 | 00 | 00 | 00 | 24 | 24 | 24 |
| | (BD) | (BD) | . (2E) | 25 | 00 | 00 | 01 | 15 | 13 | 23 |
| | (BD) | (BD) | " (22) | 06 | 00 | 00 | 02 | 16 | 20 | 22 |

SPI 13.
SYF6.
SZS.

```
LOC  OBJ       LINE      SOURCE STATEMENT

$NOLIST
$LIST
$TITLE('01/31/85 - ISOLATION CARD SOFTWARE - PIR UTILITIES')


;                    ************
;                    *          *
;                    *  PIRUTL  *
;                    *          *
;                    ************

;*********************
;PUBLIC PROCEDURES
        PUBLIC  RSTPIR          ;RESET (INITIALIZE) PIR CHAIN
        PUBLIC  GETPIR          ;GET (ALLOCATE) PIR
        PUBLIC  RLSPIR          ;RELEASE (DEALLOCATE) PIR
        PUBLIC  PIRLNK          ;LINK PIR INTO CHAIN
        PUBLIC  PIRUNL          ;UNLINK PIR FROM CHAIN
        PUBLIC  CMPPIR          ;COMPRESS PIR
        PUBLIC  FINDIT          ;FIND ACCENTED ASCII EQUIVALENT OF CHAR
        PUBLIC  FNDACC          ;FIND ACCENT OFFSET
        PUBLIC  BUFSTR          ;START OF BUFFERS FOR FOREIGN ASCII

;*********************
;PUBLIC DATA
        PUBLIC  PIRCHN          ;PIR CHAIN ORIGIN

$EJECT

;*********************
;EXTERNAL PROCEDURES
        EXTRN   CRASH           ;SOFTWARE FAILURE
        EXTRN   DSUB            ;HL=BC-HL, SETS CC
        EXTRN   DSUBZL          ;HL=BC-HL, ZERO LIMIT
        EXTRN   DCMP            ;BC-HL, SETS CC, BC HL UNCHANGED
        EXTRN   DIVDIV          ;B=HL/A, BY REPEATED SUBTRACTS
        EXTRN   DIVBY2          ;DIVIDE HL BY 2
        EXTRN   RNGCHK          ;RANGE CHECK
;
        EXTRN   OUTCLF
        EXTRN   OUTSSP
        EXTRN   HEXSPC
        EXTRN   HEXWRD
        EXTRN   OUTHEX

        EXTRN   ITSCLS

$EJECT
;                    *********************************
;                    *                               *
;                    *  PAGE IMAGE RECORD VARIABLES  *
;                    *                               *
;                    *********************************
;
```

```
LOC  OBJ          LINE        SOURCE STATEMENT

                                  DSEG

                        ;********************
                        ;PAGE IMAGE RECORD CONTROL CELLS
0000                    FRECOL: DS      2                ;FREE CHAIN PTR COLUMN #: MUST BE 0
0002                    FRECHP: DS      2                ;PIR FREE CHAIN POINTER (0FFFFH=EMPTY)
0004                    PIRCHP: DS      2                ;PIR CHAIN POINTER

                        ;********************
                        ;PIR MANIPULATION TEMPS
0006                    OLDPIR: DS      2
0008                    NEWPIR: DS      2

                        ;********************
                        ;ACCENTED CHAR RECOMBINATION TEMPS
000A                    ACPIRA: DS      2                ; Address of accent PIR
000C                    ACPIRC: DS      2                ; Address of PIR containing accentable char
000E                    ACHORG: DS      2                ; Horizontal origin of accent
0010                    ACHMID: DS      2                ; Horizontal midpoint of accent
0012                    ACVORG: DS      2                ; Vertical origin of accent

00C9                    UMLASC  EQU     0C9H             ;ASCII CODE FOR AN UMLAUT
007E                    TILASC  EQU     07EH             ;ASCII CODE FOR A TILDE
0060                    GRVASC  EQU     060H             ;ASCII FOR A GRAVE
00BD                    ANGASC  EQU     0BDH             ;ASCII FOR AN ANGSTORM
005E                    CIRASC  EQU     05EH             ;ASCII FOR A CIRCUMFLEX
00C8                    ACTASC  EQU     0C8H             ;ASCII FOR AN ACUTE

                                CSEG                     ;CODE FOLLOWS

                        $EJECT
                        ;********************
                        ;INITIALIZE PIR DATABASE
0000 210000             RSTPIR: LXI     H,0              ;INITIALIZE FREE CHAIN AND PIR POINTERS
0003 220000      D              SHLD    FRECOL           ;
0006 21FFFF                     LXI     H,0FFFFH         ;
0009 220200      D              SHLD    FRECHP           ;
000C 212B00      C              LXI     H,PIRTRM         ;SET CHAIN POINTER TO PSUEDO END RECORD
000F 220400      D              SHLD    PIRCHP           ;
0012 21F091                     LXI     H,SYSPIE-PIRSIZ  ;START AT END OF PIR BUFFERS
0015 E5                 RSTP10: PUSH    H                ;
0016 CD3D00      C              CALL    RLSPIR           ;ADD ALL PIRS TO FREE CHAIN
0019 E1                         POP     H                ;
001A 01B08E                     LXI     B,SYSPIB         ;
001D CD0000      E              CALL    DCMP             ;END OF POOL?
0020 C8                         RZ                       ;YES, INITIALIZATION DONE
0021 01F0FF                     LXI     B,-PIRSIZ        ;NO, ADVANCE TO NEXT PIR
0024 09                         DAD     B                ;
0025 C31500      C              JMP     RSTP10           ;CONTINUE LOOP

0028 FF7F               PIRTRM: DW      07FFFH,0         ;DUMMY PIR CHAIN TERMINATION RECORD
002A 0000
                                                         ;(HAS MAX HORIZONTAL CHARACTER ORIGIN)

                        $EJECT
```

```
LOC  OBJ             SOURCE STATEMENT

                     ;*********************
                     ;ALLOCATE A PAGE IMAGE RECORD.  OUTPUT: CC=0, NO RECORD AVAILABLE.
                     ;OTHERWISE, HL=>PIR.
002C 2A0200    D     GETPIR: LHLD   FRECHP          ;=>FREE CHAIN
002F 54                      MOV    D,H             ;SAVE WILL BE PIR PTR
0030 5D                      MOV    E,L
0031 2C                      INR    L               ;
0032 C8                      RZ                     ;NO PIR AVAIL (PTR=0FFFFH)
0033 2C                      INR    L               ;=>PIR FORE POINTER
0034 7E                      MOV    A,M             ;GET => NEXT PIR IN FREE CHAIN
0035 2C                      INR    L               ;
0036 66                      MOV    H,M             ;
0037 6F                      MOV    L,A             ;
0038 220200    D     GETP01: SHLD   FRECHP          ;SAVE NEW FREE CHAIN POINTER
003B EB                      XCHG                   ;HL=>CURRENT PIR
003C C9                      RET

                     ;*********************
                     ;DEALLOCATE A PAGE IMAGE RECORD.  INPUT: HL=>PIR.
003D EB              RLSPIR: XCHG                   ;SAVE PIR PTR
003E 210400                  LXI    H,PIRSTA        ;SET STATUS=IDLE
0041 19                      DAD    D
0042 36FF                    MVI    M,0FFH          ;
                             IF     DEBUG
0044 7B                      MOV    A,E             ;IN DEBUG MODE, VERIFY ADDRESS LEGAL
0045 E60F                    ANI    PIRSIZ-1        ;MUST => BEGINNING OF PIR
0047 C40000    E             CNZ    CRASH           ;
004A 7A                      MOV    A,D             ;MUST BE WITHIN PIR REGION
004B FE8D                    CPI    HIGH SYSPIB     ;
004D DC0000    E             CC     CRASH           ;
0050 FE92                    CPI    HIGH SYSPIE     ;
0052 D40000    E             CNC    CRASH           ;
0055 62                      MOV    H,D             ;
0056 6B                      MOV    L,E             ;
                             ENDIF
0057 2A0200    D             LHLD   FRECHP          ;GET OLD FREE CHAIN POINTER
005A EB                      XCHG
005B 220200    D             SHLD   FRECHP          ;SAVE NEW FREE CHAIN POINTER
005E 2C                      INR    L
005F 2C                      INR    L               ;=>PIR FORE POINTER
0060 73                      MOV    M,E             ;SAVE NEXT PIR INDEX
0061 2C                      INR    L
0062 72                      MOV    M,D             ;
0063 C9                      RET                    ;

                     SLJECT
                     ;*********************
                     ;PIRLNK -- LINK PIR INTO PIR CHAIN IN ASCENDING HORIZONTAL CHARACTER
                     ; ORIGIN ORDER
0064 220800    D     PIRLNK: SHLD   NEWPIR          ;HL=>PIR TO BE INSERTED
0067 4E                      MOV    C,M             ;GET HIGH HORIZONTAL ORG
0068 2C                      INR    L
0069 46                      MOV    B,M             ;
006A 110400    D             LXI    D,PIRCHP        ;GET LOW HORIZ ORIGIN
                                                    ;GET INIT PREV PIR FORE POINTER
```

```
LOC  OBJ            LINE        SOURCE STATEMENT

006D 2A0400    D     861             LHLD    PIRCHP         ;SET INITIAL PIR POINTER
0070 C37600    C     862             JMP     PIRL20         ;ENTER PIR SEARCH LOOP
                     863
0073 2C              864  PIRL10:    INR     L              ;
0074 2C              865             INR     L              ;=>FORE POINTER
0075 54              866             MOV     D,H            ;SAVE PREV PIR PTR
0076 5D              867             MOV     E,L            ;
0077 7E              868             MOV     A,M            ;GET NEXT PIR ADDR
0078 2C              869             INR     L              ;
0079 66              870             MOV     H,M            ;
007A 6F              871             MOV     L,A            ;HL=>NEXT PIR
                     872
007B 7C              873  PIRL20:    MOV     A,H            ;IF END FLAG, END OF CHAIN
007C B7              874             ORA     A              ;
007D F29200    C     875             JP      PIRL30         ;
0080 2C              876             INR     L              ;=>HIGH BYTE
0081 7E              877             MOV     A,M            ;GET HIGH BYTE OF HORIZONTAL ORIGIN
0082 2D              878             DCR     L              ;=>LOW BYTE
0083 B8              879             CMP     B              ;ABOVE NEW PIR ORIGIN?
0084 DA7300    C     880             JC      PIRL10         ;YES, TRY NEXT PIR
0087 C29200    C     881             JNZ     PIRL30         ;BELOW NEW PIR, INSERT HERE
008A 7E              882             MOV     A,M            ;
008B B9              883             CMP     C              ;ABOVE NEW PIR ORIGIN
008C DA7300    C     884             JC      PIRL10         ;NO, TRY NEXT PIR
008F CA7300    C     885             JZ      PIRL10         ;IF SAME ADDR, INSERT AFTER EXISTING PIR
                     886
                     887  PIRL30:                           ;INSERT PIR HERE
0092 44              888             MOV     B,H            ;BC=NEXT PIR ADDR
0093 4D              889             MOV     C,L            ;
0094 2A0800    D     890             LHLD    NEWPIR         ;HL=>PIR TO BE INSERTED
0097 EB              891             XCHG                   ;
0098 73              892             MOV     M,E            ;PREVIOUS PIR => CURRENT PIR
0099 2C              893             INR     L              ;
009A 72              894             MOV     M,D            ;
009B EB              895             XCHG                   ;
009C 2C              896             INR     L              ;
009D 2C              897             INR     L              ;=>FORE PTR IN CURRENT PIR
009E 71              898             MOV     M,C            ;CURRENT PIR => NEXT PIR
009F 2C              899             INR     L              ;
00A0 70              900             MOV     M,B            ;
00A1 C9              901             RET                    ;PIR LINKED IN
                     902
                     903  $EJECT
                     904  ;*********************************************************************
                     905  ;PIRUNL -- UNLINK PIR FROM CHAIN
00A2 E5              906  PIRUNL:    PUSH    H              ;SAVE PIR PTR
00A3 44              907             MOV     B,H            ;
00A4 4D              908             MOV     C,L            ;
00A5 210400    D     909             LXI     H,PIRCHP       ;START OF CHAIN (FAKE PIR)
00A8 C3B300    C     910             JMP     PIRU20         ;SEARCH FOR PREVIOUS PIR IN CHAIN
                     911
00AB EB              912  PIRU10:    XCHG                   ;MAKE HL POINT TO NEXT IN CHAIN
00AC 7C              913             MOV     A,H            ;TEST FOR END OF CHAIN
00AD B7              914             ORA     A              ;
00AE F40000    E     915             CP      CRASH          ;ERROR IF FOUND BEFORE DESIRED PIR
```

```
LOC  OBJ              SOURCE STATEMENT

00B1 2C                      INR   L                ;POINT TO NEXT POINTER
00B2 2C                      INR   L                ;
00B3 5E               PIRU20: MOV  E,M              ;GET PTR TO PIR FOLLOWING THIS ONE
00B4 2C                      INR   L                ;
00B5 56                      MOV   D,M              ;
00B6 79                      MOV   A,C              ;SEE IF IT MATCHES THE ONE TO BE UNLINKED
00B7 BB                      CMP   E
00B8 C2AB00     C            JNZ   PIRU10           ;NO, JUMP
00BB 7A                      MOV   A,B              ;
00BC BA                      CMP   D                ;
00BD C2AB00     C            JNZ   PIRU10           ;NO, JUMP
00C0 EB                      XCHG                   ;GET PTR TO PIR FOLLOWING THE ONE TO BE
00C1 2C                      INR   L                ; UNLINKED
00C2 2C                      INR   L                ;
00C3 4E                      MOV   C,M              ;MAKE PREV PIR => NEXT PIR
00C4 2C                      INR   L                ;
00C5 46                      MOV   B,M              ;
00C6 EB                      XCHG                   ;GET CURRENT PIR POINTER
00C7 70                      MOV   M,B              ;UNLINK THE PIR
00C8 2D                      DCR   L                ;
00C9 71                      MOV   M,C              ;
00CA E1                      POP   H                ;RESTORE POINTER
00CB C9                      RET                    ;DONE
                      ;*********************
                      ;COMPRESS PIRS.  THE ROUTINE SEARCHES THE PIR CHAIN IN AN ATTEMPT TO COMPRESS
                      ; OR COMBINE TWO PIRS INTO ONE; THUS FREEING A PIR FOR INPUT.  RETURNS CC=0 IF
                      ; A PIR HAS BECOME AVAILABLE.
00CC 210200     D     CMPPIR: LXI  H,PIRCHF-2       ;GET FAKE PREVIOUS PIR POINTER
00CF 220500     D            SHLD  OLDPIR           ;SAVE PREVIOUS PIR POINTER
00D2 2A0400     D            LHLD  PIRCHF           ;GET POINTER TO FIRST PIR IN CHAIN
00D5 220800     D            SHLD  NEWPIR           ;SAVE AS CURRENT PIR
00D8 CDF300     C     CMPP00: CALL CMPACC           ;TRY TO RECOMBINE ACCENTS ONTO CHARS
00DB C8                      RZ                     ;RETURN IF PIR IS NOW FREE
00DC 2A0800     D            LHLD  NEWPIR           ;ELSE ADVANCE TO NEXT PIR IN CHAIN
00DF 220500     D            SHLD  OLDPIR           ;SAVE CURRENT PIR AS PREVIOUS PIR
00E2 2C                      INR   L                ;
00E3 2C                      INR   L                ;
00E4 7E                      MOV   A,M              ;GET NEW PIR POINTER
00E5 2C                      INR   L                ;
00E6 66                      MOV   H,M              ;
00E7 6F                      MOV   L,A              ;
00E8 220800     D            SHLD  NEWPIR           ;SAVE IT
00EB 7C                      MOV   A,H              ;SEE IF THE END OF CHAIN WAS FOUND
00EC B7                      ORA   A
00ED FAD800     C            JM    CMPP00           ;LOOP BACK IF NOT
00F0 F6FF                    ORI   0FFH             ;ELSE RETURN WITH CC .NE. 0
00F2 C9                      RET
```

```
LOC  OBJ              SOURCE STATEMENT

                 ;*****************************************************************
                 ;
                 ; Subroutine CMPACC
                 ;
                 ;       The following subroutine is used to try to recombine a stand-
                 ;       alone accent in a PIR with the character which appears below
                 ;       it on the line, if possible.  The PIR chain is traced from the
                 ;       beginning until a PIR whose origin matches that of the accent
                 ;       is encountered.  If found, then this PIR is used to determine
                 ;       if there is an accented character present.
                 ;
                 ;*****************************************************************
                 ;
                 CMPACC:
                 ;
                 ; Test to see if current PIR contains an accent
                 ;
00F3 220A00  D           SHLD    ACPIRA          ; Save address of current PIR
00F6 110B00              LXI     D,PIRASC        ; Point to first ASCII character in PIR
00F9 19                  DAD     D               ;   and test to see if it is an accent
00FA 7E                  MOV     A,M
00FB CD0C02  C           CALL    FNDACC          ; See if char is an accent
00FE C0                  RNZ                     ; Return with non-success status if not accent
00FF 6F                  MOV     L,A             ; Compute address of accented character
0100 2600                MVI     H,0             ;   pair table for this accent
0102 29                  DAD     H               ;   Multiply offset by 2
0103 112A02  C           LXI     D,BUFSTR        ;   Add to first address
0106 19                  DAD     D
0107 5E                  MOV     E,M             ;   Get address of table
0108 23                  INX     H
0109 56                  MOV     D,M
010A D5                  PUSH    D               ;   Save address for later
                 ;
                 ; Save positional information for accent
                 ;
010B 2A0A00  D           LHLD    ACPIRA          ; Get horizontal origin of accent and
010E 5E                  MOV     E,M             ;   save it
010F 2C                  INR     L
0110 56                  MOV     D,M
0111 010400              LXI     B,PIRLEN-1
0114 09                  DAD     B
0115 4E                  MOV     C,M
0116 42                  MOV     B,D
0117 EB                  XCHG
0118 220E00  D           SHLD    ACHORG

011B 79                  MOV     A,C             ; Get horizontal midpoint of accent and
011C BD                  CMP     L               ;   save it
011D D22101  C           JNC     CMPAC2
0120 04                  INR     B
0121 09          CMPAC2: DAD     B
0122 D5                  PUSH    D
0123 CD0000  E           CALL    DIVBY2
0126 221000  D           SHLD    ACHMID
```

```
LOC  OBJ              SOURCE STATEMENT

0129 E1                         POP     H               ; Get vertical origin of accent and
012A 2C                         INR     L               ;   save it
012B 5E                         MOV     E,M
012C 2C                         INR     L
012D 56                         MOV     D,M
012E EB                         XCHG
012F 221200     D               SHLD    ACVORG
                        ;
0132 2A0400     D               LHLD    PIRCHP          ; Start search at first PIR in chain
0135 C34101     C               JMP     CMPA10          ; Enter search loop
                        ;
                        ; Search for PIR whose horizontal and vertical origins match that of
                        ; the accent.
                        ;
0138 2C                 CMPA05: INR     L               ; Get pointer to next PIR in chain
0139 2C                         INR     L
013A 5E                         MOV     E,M
013B 2C                         INR     L
013C 56                         MOV     D,M
013D 2A0A00     D               LHLD    ACPIRA
0140 EB                         XCHG
0141 7C                 CMPA10: MOV     A,H             ; Test high address of next PIR to see
0142 B7                         ORA     A               ;   if at end of chain
0143 F2A501     C               JP      CMPA40          ; Jump if PIR chain exhausted with no delete
0146 7A                         MOV     A,D             ; Insure that PIR which we are currently
0147 BC                         CMP     H               ;   testing is not the PIR which contains
0148 C25001     C               JNZ     CMPA12          ;   the accent.  Jump if not.
014B 7B                         MOV     A,E
014C BD                         CMP     L
014D CA3801     C               JZ      CMPA05          ; Skip current PIR for search
0150 220C00     D       CMPA12: SHLD    ACPIRC          ; Save address of search PIR
0153 5E                         MOV     E,M             ; Get its horizontal origin
0154 2C                         INR     L
0155 56                         MOV     D,M
0156 2A1000     D               LHLD    ACHMID          ; Get horizontal midpoint of accent
0159 7A                         MOV     A,D             ; Test to see if the horizontal origin of
015A BC                         CMP     H               ;   the new PIR <= the horizontal midpoint of
015B DA6601     C               JC      CMPA15          ;   the accent.
015E C2A501     C               JNZ     CMPA40          ; Not less, so not a candidate
0161 7B                         MOV     A,E
0162 BD                         CMP     L
0163 D2A501     C               JNC     CMPA40          ; Not less, so not a candidate
                        
0166 2A0C00     D       CMPA15: LHLD    ACPIRC          ; Accent could be in this PIR, compute
0169 010500                     LXI     B,PIRLEN        ;   ending origin of search PIR
016C 09                         DAD     B               ; Point to ending location for PIR
016D 7E                         MOV     A,M
016E BB                         CMP     E               ; Test to see if less than low byte
016F D27301     C               JNC     CMPA20          ;   If so, then high byte needs to be
0172 14                         INR     D               ;   incremented
0173 5F                         MOV     E,A             ;   Save low byte
0174 2A1000     D       CMPA20: LHLD    ACHMID          ; Get horizontal midpoint for accent
0177 7C                         MOV     A,H             ; Test to see if horizontal midpoint of accent
0178 BA                         CMP     D               ;   <= ending origin of PIR
```

```
LOC  OBJ          SOURCE STATEMENT

0179 DA8401   C          JC     CMPA25         ;   Less, so could be merged
017C C29F01   C          JNZ    CMPA30         ;   Not less, so continue search
017F 7D                  MOV    A,L
0180 BB                  CMP    E
0181 D29F01   C          JNC    CMPA30         ;   Not less, continue search

0184 2A0000   D  CMPA25: LHLD   ACPIRC         ; Recover search PIR address
0187 110600              LXI    D,PIRROW       ; Get vertical origin for search PIR
018A 19                  DAD    D
018B 4E                  MOV    C,M
018C 2C                  INR    L
018D 46                  MOV    B,M
018E 2A1200   D          LHLD   ACVORG         ; Get vertical origin for accent
0191 CD0000   E          CALL   DSUB           ; Test to see if search PIR vertical origin
0194 7C                  MOV    A,H            ;   < accent vertical origin
0195 B7                  ORA    A              ;   If so, then can't be on same line
0196 C29F01   C          JNZ    CMPA30         ;
0199 3E20                MVI    A,32           ; Now, test to see if accent origin is within
019B BD                  CMP    L              ;   32 pixels of PIR origin
019C D2A901   C          JNC    CMPA45         ; If so, then match PIR found

019F 2A0000   D  CMPA30: LHLD   ACPIRC         ; Get search PIR address
01A2 C33801   C          JMP    CMPA05         ; Continue search

01A5 D1          CMPA40: POP    D              ; Restore stack
01A6 F6FF                ORI    0FFH           ; No match PIR found
01A8 C9                  RET                   ; Return nothing changed status
                 ;
                 ; A PIR has been found which lies directly below the accent on the same line.
                 ; Compute which character in the PIR is below the accent and test to see if
                 ; will form a valid accented character.  If so, then change character to
                 ; accented character and then delete accent PIR.
                 ;
01A9 2A0000   D  CMPA45: LHLD   ACPIRC         ; See if target PIR is an escape sequence
01AC 110800              LXI    D,PIRESC
01AF 19                  DAD    D
01B0 0602                MVI    B,2            ; Low score character in offset 2
01B2 3A0000   E          LDA    ITSCES
01B5 BE                  CMP    M
01B6 CAD401   C          JZ     CMPA52
01B9 2A1000   D          LHLD   ACHMID         ; Get accent horizontal midpoint
01BC 44                  MOV    B,H
01BD 4D                  MOV    C,L
01BE 2A0000   D          LHLD   ACPIRC         ; Recover target PIR address
01C1 5E                  MOV    E,M            ; Get horizontal origin for new PIR
01C2 2C                  INR    L
01C3 56                  MOV    D,M
01C4 EB                  XCHG
01C5 CD0000   E          CALL   DSUBZL         ; Compute difference between origins to
                                               ;   yield pixels into PIR that accent
                                               ;   occurs (limit to zero)
01C8 3A39E0              LDA    HPITCH         ; Get the current working pitch
01CB B7                  ORA    A              ; Any set ?
01CC C2D101   C          JNZ    CMPA50         ;   Yes, use pitch
01CF 3E18                MVI    A,24           ;   No, use default pitch
```

```
LOC  OBJ                SOURCE STATEMENT

01D1 CD0000    E   CMPA50: CALL    DIKDIV           ; Divide offset by pitch to yield number
                                                    ;    of characters into PIR
01D4 46            CMPA52: MOV     C,B
01D5 0600                  MVI     B,0              ; Form 16 bit result
01D7 2A0000    D           LHLD    ACPIRC           ; Recover PIR address
01DA 110800                LXI     D,PIRASC         ; Point to target character
01DD 19                    DAD     D
01DE 09                    DAD     B
01DF 7E                    MOV     A,M
01E0 D1                    POP     D                ; Get character to try to accent
01E1 E5                    PUSH    H                ; Recover table address for this accent
01E2 CDF701    C           CALL    FINDIT           ; Save address of character
01E5 E1                    POP     H                ; Test to see if valid combination
01E6 FEFF                  CPI     0FFH             ; Recover character address
01E8 CAEC01    C           JZ      CMPA55           ; Valid combination
01EB 77                    MOV     M,A              ;    No, accent must be noise
01EC 2A0A00    D   CMPA55: LHLD    ACPIRA           ;    Yes, change ASCII for character
01EF CDA200    C           CALL    PIRUNL           ; Get pointer to accent PIR
01F2 CD3D00    C           CALL    RLSPIR           ; Unlink accent PIR from chain
01F5 AF                    XRA     A                ; Put PIR on available chain
01F6 C9                    RET                      ; Return with status for PIR deleted

                   SEJECT
                   ;*****************************
                   ;FINDIT WILL SEARCH THROUGH A TABLE WHOSE ADDRESS WAS PASSED TO IT IN D/E
                   ; A CONTAINS THE VALUE LOOKED FOR. IT IS A 2 BYTE JUMP FROM ONE TO THE OTHER

01F7 EB            FINDIT: XCHG                     ;START OFF WITH POINTER IN H
01F8 BE            FIND10: CMP     M                ;MATCH ?
01F9 CA0902    C           JZ      FIND30           ;YES
01FC 5F                    MOV     E,A              ;SAVE ACCUMULATOR
01FD 7E                    MOV     A,M              ;GET VALUE TO CHECK FOR END OF TABLE
01FE FEFF                  CPI     0FFH             ;END OF TABLE ?
0200 CA0A02    C           JZ      FIND40
0203 7B                    MOV     A,E              ;RESTORE VALUE
0204 23                    INX     H
0205 23                    INX     H                ;GET TO NEXT PAIR
0206 C3F801    C           JMP     FIND10           ;
0209 23            FIND30: INX     H                ;GET TO ASCII VALUE
020A 7E            FIND40: MOV     A,M              ;MOVE IT IN
020B C9                    RET                      ;AND RETURN

                   SEJECT
                   ;************************************************************
                   ;       FNDACC WILL FIND THE OFFSET (0,1,2 ETC) INTO THE
                   ;       CURRENT ACCEPTABLE ACCENTS.  IF NO MATCH IS FOUND,
                   ;       AN FF WILL BE RETURNED. A, D,E ARE DESTROYED. THE
                   ;       VALUE IS PASSED BACK IN E, AND IT EXPECTS THAT THE
                   ;       DESIRED ASCII VALUE BE PASSED TO IT IN ACC

020C 1600          FNDACC: MVI     D,0
020E 1E00                  MVI     E,0              ;0 THE REGISTER PAIR OUT
0210 FEC9                  CPI     UMLASC           ;WAS IT AN UMLAUT ?
0212 C8                    RZ                       ;YES
```

```
LOC  OBJ        SOURCE STATEMENT

0213 13                 INX     D               ;
0214 FECB               CPI     ACTASC          ;WAS IT AN ACUTE ?
0216 C8                 RZ                      ;YES
0217 13                 INX     D               ;
0218 FEAD               CPI     ANGASC          ;WAS IT AN ANGSTROM ?
021A C8                 RZ                      ;YES
021B 13                 INX     D               ;
021C FE5E               CPI     CIRASC          ;WAS IT A CIRCUMFLEX
021E C8                 RZ                      ;YES
021F 13                 INX     D               ;
0220 FE60               CPI     GRVASC          ;WAS IT A GRAVE
0222 C8                 RZ                      ;YES
0223 13                 INX     D               ;
0224 FE7E               CPI     TILASC          ;WAS IT A TILDE
0226 C8                 RZ                      ;
0227 1EFF               MVI     E,0FFH          ;RETURN ERROR CONDITION
0229 C9                 RET

           ;**************************************************
           ;THE FOLLOWING IS A JUMP TABLE OF SORTS TO DO ASCII MATCHING

022A 3602   C  BUFSTR:  DW      UMLAUT          ;START OF UMLAUT TABLE
022C 4F02   C           DW      ACUTE           ;START OF ACUTE TABLE
022E 5802   C           DW      ANGSTR          ;START OF ANGSTROM TABLE
0230 6D02   C           DW      CIRCUM          ;START OF CIRCUMFLEX
0232 8602   C           DW      GRAVE           ;START OF GRAVE
0234 9F02   C           DW      TILDE           ;START OF TILDE TABLE

           $EJECT

           ;THE FOLLOWING TABLES ARE A 2 BYTE PAIR - THAT OF THE ASCII FOR THE CHARACTER
           ;AND THE ACCENTED EQUIVALENT. EACH TABLE ENDS WITH AN FF.

0236 41        UMLAUT:  DB      'A'             ;
0237 80                 DB      80H             ;ASCII FOR UMLAUTED A
0238 61                 DB      'a'             ;
0239 90                 DB      90H             ;
023A 45                 DB      'E'             ;
023B F5                 DB      0F5H            ;
023C 65                 DB      'e'             ;
023D 9E                 DB      9EH             ;
023E 49                 DB      'I'             ;
023F F6                 DB      0F6H            ;
0240 69                 DB      'i'             ;
0241 9B                 DB      09BH            ;
0242 FC                 DB      0FCH            ;dotless i
0243 9B                 DB      09BH            ;
0244 4F                 DB      'O'             ;
0245 81                 DB      081H            ;
0246 30                 DB      '0'             ;
0247 81                 DB      081H            ;
0248 6F                 DB      'o'             ;
0249 91                 DB      091H            ;
024A 55                 DB      'U'             ;
024B 82                 DB      82H             ;
```

```
LOC  OBJ        LINE       SOURCE STATEMENT
024C 75         1244           DB      'u'             ;
024D 92         1245           DB      92H             ;
024E FF         1246           DB      0FFH            ;END OF TABLE
                1247 $EJECT
                1248
024F 41         1249 ACUTE:    DB      'A'             ;
0250 E0         1250           DB      0E0H            ;
0251 61         1251           DB      'a'             ;
0252 F0         1252           DB      0F0H            ;
0253 45         1253           DB      'E'             ;
0254 E4         1254           DB      0E4H            ;
0255 65         1255           DB      'e'             ;
0256 8E         1256           DB      8EH             ;
0257 49         1257           DB      'I'             ;
0258 E7         1258           DB      0E7H            ;
0259 69         1259           DB      'i'             ;
025A F7         1260           DB      0F7H            ;
025B BC         1261           DB      0BCH            ;dotless i
025C F7         1262           DB      0F7H            ;
025D 4F         1263           DB      'O'             ;
025E E9         1264           DB      0E9H            ;
025F 30         1265           DB      '0'             ;
0260 E9         1266           DB      0E9H            ; NEED TO INCLUDE 0
0261 6F         1267           DB      'o'             ;
0262 F9         1268           DB      0F9H            ;
0263 55         1269           DB      'U'             ;
0264 ED         1270           DB      0EDH            ;
0265 75         1271           DB      'u'             ;
0266 FD         1272           DB      0FDH            ;
0267 FF         1273           DB      0FFH            ;END OF TABLE
                1274
                1275 $EJECT
0268 41         1277 ANGSTR:   DB      'A'             ;
0269 85         1278           DB      85H             ;
026A 61         1279           DB      'a'             ;
026B 96         1280           DB      96H             ;
026C FF         1281           DB      0FFH            ;
                1282
026D 41         1283 CIRCUM:   DB      'A'             ;
026E F1         1284           DB      0F1H            ;
026F 61         1285           DB      'a'             ;
0270 83         1286           DB      83H             ;
0271 45         1287           DB      'E'             ;
0272 E5         1288           DB      0E5H            ;
0273 65         1289           DB      'e'             ;
0274 8A         1290           DB      8AH             ;
0275 49         1291           DB      'I'             ;
0276 E6         1292           DB      0E6H            ;
0277 69         1293           DB      'i'             ;
0278 8B         1294           DB      8BH             ;
0279 BC         1295           DB      0BCH            ;dotless i
027A 8B         1296           DB      8BH             ;
027B 4F         1297           DB      'O'             ;
027C EC         1298           DB      0ECH            ;
027D 30         1299           DB      '0'             ;
027E EC         1300           DB      0ECH            ;
027F 6F         1301           DB      'o'             ;
```

```
LOC  OBJ          LINE        SOURCE STATEMENT
0280 8C           1302         DB        8CH                 ;
0281 55           1303         DB        'U'                 ;
0282 FC           1304         DB        0FCH                ;
0283 75           1305         DB        'u'                 ;
0284 8D           1306         DB        8DH                 ;
0285 FF           1307         DB        0FFH                ;END OF TABLE
                  1308
                  1309  $EJECT
                  1310
0286 41           1311  GRAVE:  DB       'A'                 ;
0287 E1           1312         DB        0E1H                ;
0288 61           1313         DB        'a'                 ;
0289 99           1314         DB        99H                 ;
028A 45           1315         DB        'E'                 ;
028B F4           1316         DB        0F4H                ;
028C 65           1317         DB        'e'                 ;
028D 9A           1318         DB        9AH                 ;
028E 49           1319         DB        'I'                 ;
028F EE           1320         DB        0EEH                ;
0290 69           1321         DB        'i'                 ;
0291 F8           1322         DB        0F8H                ;
0292 FC           1323         DB        0FCH                ;dotless i
0293 F9           1324         DB        0F9H                ;
0294 4F           1325         DB        'O'                 ;
0295 EA           1326         DB        0EAH                ;
0296 6F           1327         DB        'o'                 ;
0297 EA           1328         DB        0EAH                ;
0298 CF           1329         DB        'O'                 ;
0299 FA           1330         DB        0FAH                ;
029A 55           1331         DB        'U'                 ;
029B EB           1332         DB        0FBH                ;
029C 75           1333         DB        'u'                 ;
029D 9D           1334         DB        9DH                 ;
029E FF           1335         DB        0FFH                ;END OF TABLE
                  1336
                  1337  $EJECT
                  1338
029F 41           1339  TILDE:  DB       'A'                 ;
02A0 E2           1340         DB        0E2H                ;
02A1 61           1341         DB        'a'                 ;
02A2 F2           1342         DB        0F2H                ;
02A3 4F           1343         DB        'O'                 ;
02A4 EB           1344         DB        0EBH                ;
02A5 6F           1345         DB        'o'                 ;
02A6 E6           1346         DB        0E6H                ;
02A7 6F           1347         DB        'o'                 ;
02A8 F5           1348         DB        0F5H                ;
02A9 4E           1349         DB        'N'                 ;
02AA 85           1350         DB        85H                 ;
02AB 6E           1351         DB        'n'                 ;
02AC 95           1352         DB        95H                 ;
02AD FF           1353         DB        0FFH                ;END OF TABLE
                  1354
                  1355
                  1356         END
```

What is claimed is:

1. In an optical character recognition system, proportional spaced or fixed pitch text format recognition apparatus comprising iterative processing means for receiving and recognizing first video data repreentative of text on a document, means for determining the variation in spacing between centers of the characters of a particular word of the text, means for determining the difference in the mean of the character spacing of said particular word and its neighboring words to provide recognition between said proportional spaced or fixed pitch text format, and means for iteratively recognizing an accented character, in accordance with the output of said means for determining the difference, said means for iteratively recognizing including first buffer means for iteratively storing textual video data representative of a base portion of said accented character, and second buffer means for storing the accent portion of said accented character.

2. The apparatus as in claim 1 including means for comparing said recognized accented character with a first mask representative of generic accented character masks.

3. The apparatus as in claim 2 including means for recombining said accent portion and said base portion to form a coded character representative of said recognized accented character.

4. The apparatus as in claim 3 including means for erasing said accented portion if said recognized remnant portion is determined to be invalid.

5. In an optical character recognition system, proportional spaced or fixed pitch text format recognition apparatus comprising iterative processing means for receiving and recognizing first video representative of text on a document, said iterative processing means including means for determining the variation in spacing between centers of the characters of a particular word of the text, means for determining the difference in the mean of the character spacing of said particular word and its neighboring words to provide recognition between said proportional spaced or fixed pitch text format, means for determining the difference in the pitch for said particular word and for its neighboring words, means for establishing a fixed pitch score and a proportional spacing score, respectively, for each of said words, means for selecting the correct pitch based upon which of said scores has the highest value, means for determining a first segmentation point between first and second characters, means for recognizing if said selected score has a low value, means for determining if said first character is touching said second character, means for determining a second, different segmentation point, and means for iteratively determining if separated characters can be recognized.

6. The apparatus as in claim 5 including means for determining the confidence measure of said pitch selection using the differences in said pitch.

7. The apparatus as in claim 5 including a first character buffer for storing data representative of a portion of text on a document.

8. The apparatus of claim 7 including means for determining whether two characters are stored within said first character buffer, a second, recombination buffer, means for storing the character images in question in said second buffer, and means for storing said two stored character images, thereby forming third and fourth scores, respectively.

9. The apparatus as in claim 8 including means for selecting two characters if said third and fourth scores are less than a first predetermined value.

10. The apparatus of claim 9 including means for selecting said first character if said third and fourth scores are less than a first prdetermined value.

* * * * *